May 31, 1966     H. LUKOFF ETAL     3,254,329
COMPUTER CYCLING AND CONTROL SYSTEM
Filed March 24, 1961     35 Sheets-Sheet 1

INVENTORS
WILLIAM F. SCHMITT
J. P. ECKERT
H. LUKOFF

BY

ATTORNEY

INVENTORS
WILLIAM F. SCHMITT
J. P. ECKERT
H. LUKOFF

ATTORNEY

INVENTORS
WILLIAM F. SCHMITT
J. P. ECKERT
H. LUKOFF

ATTORNEY

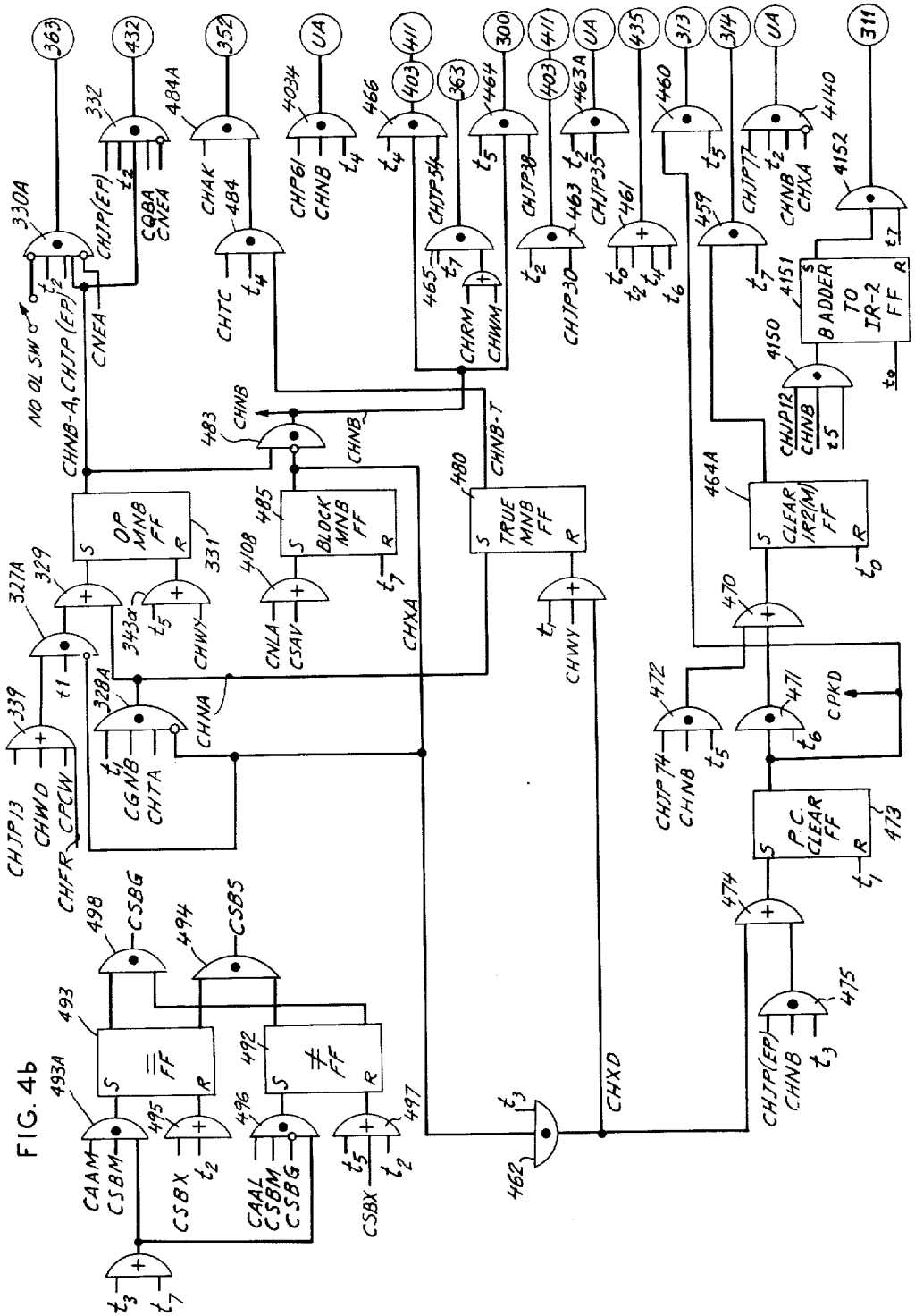

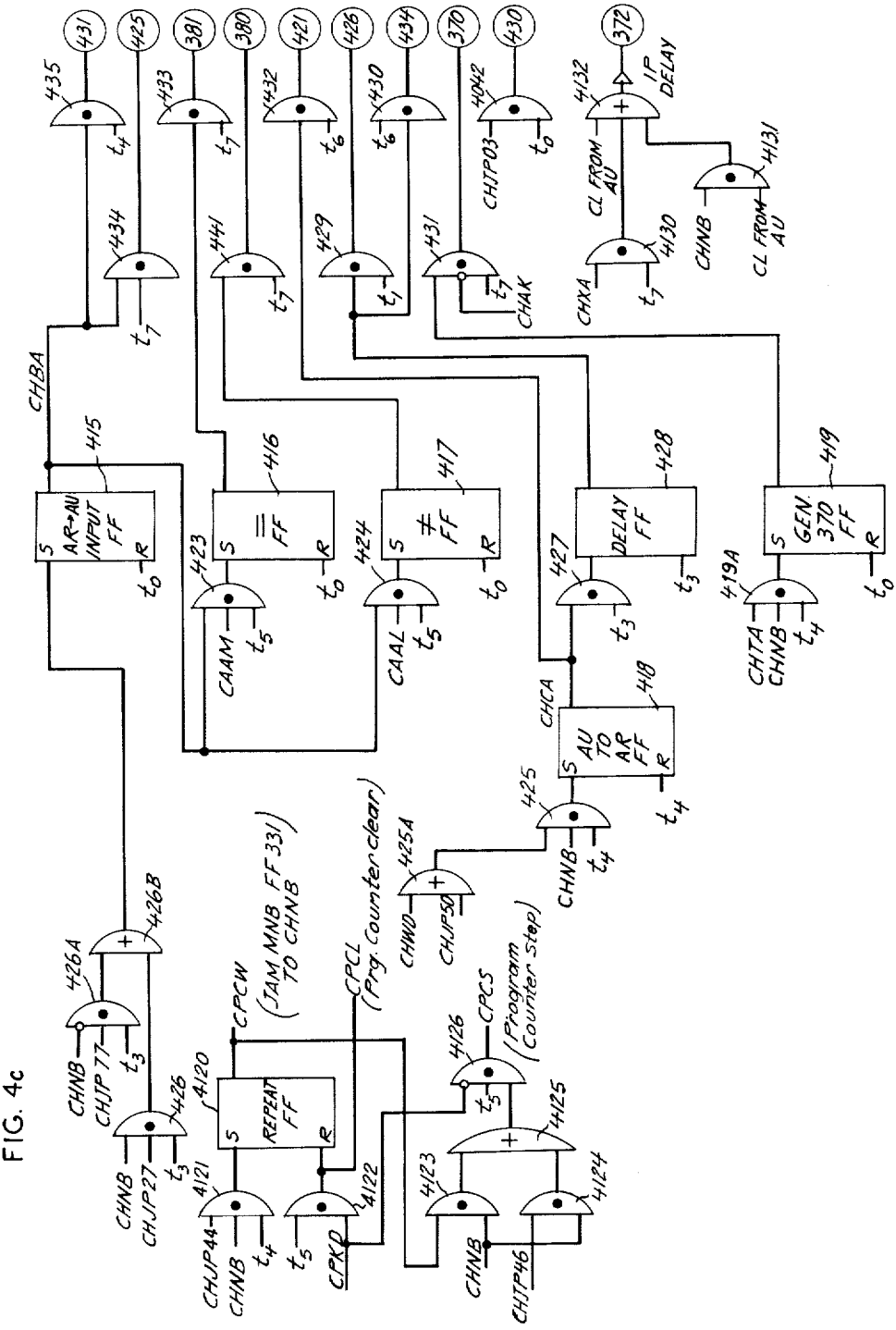

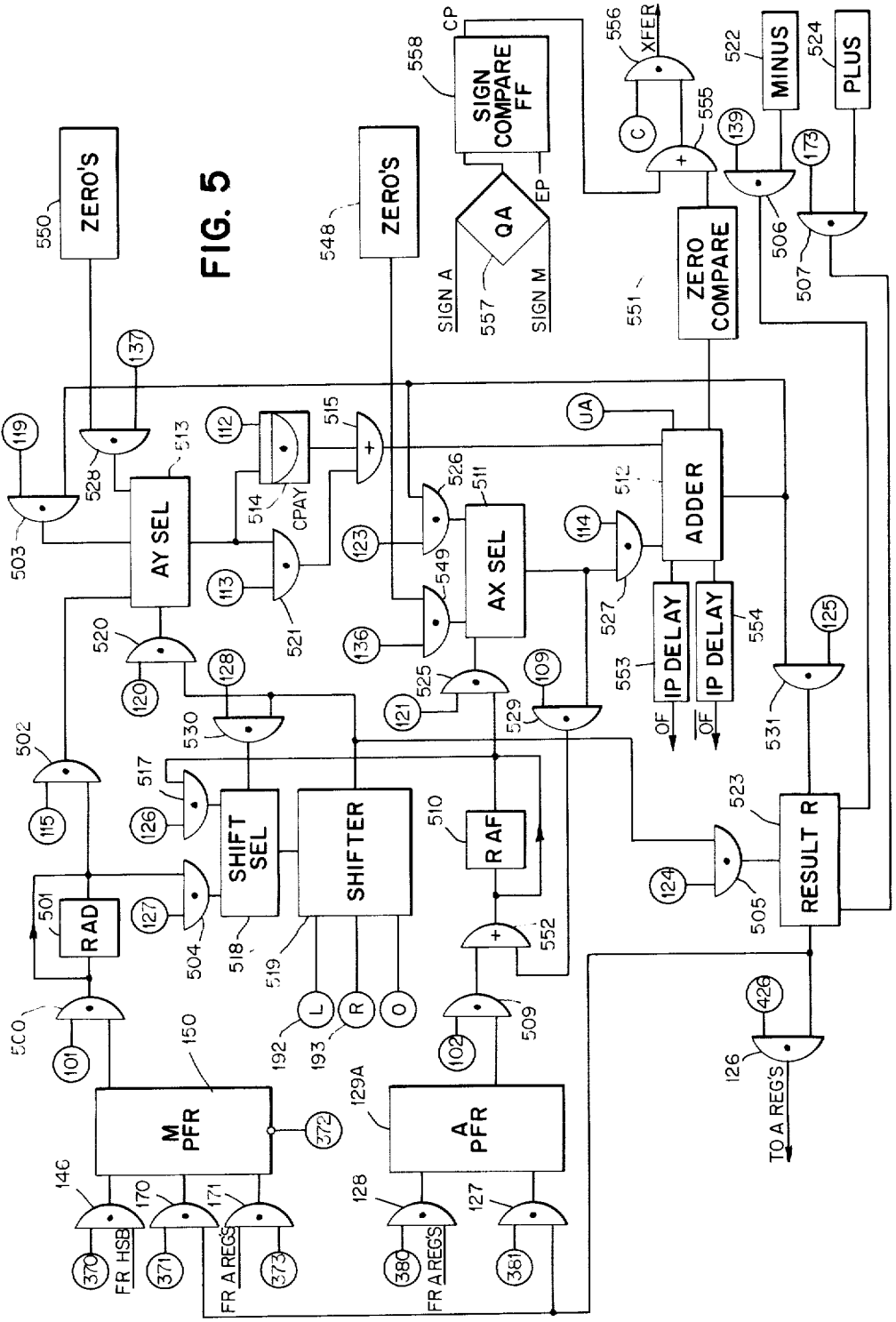

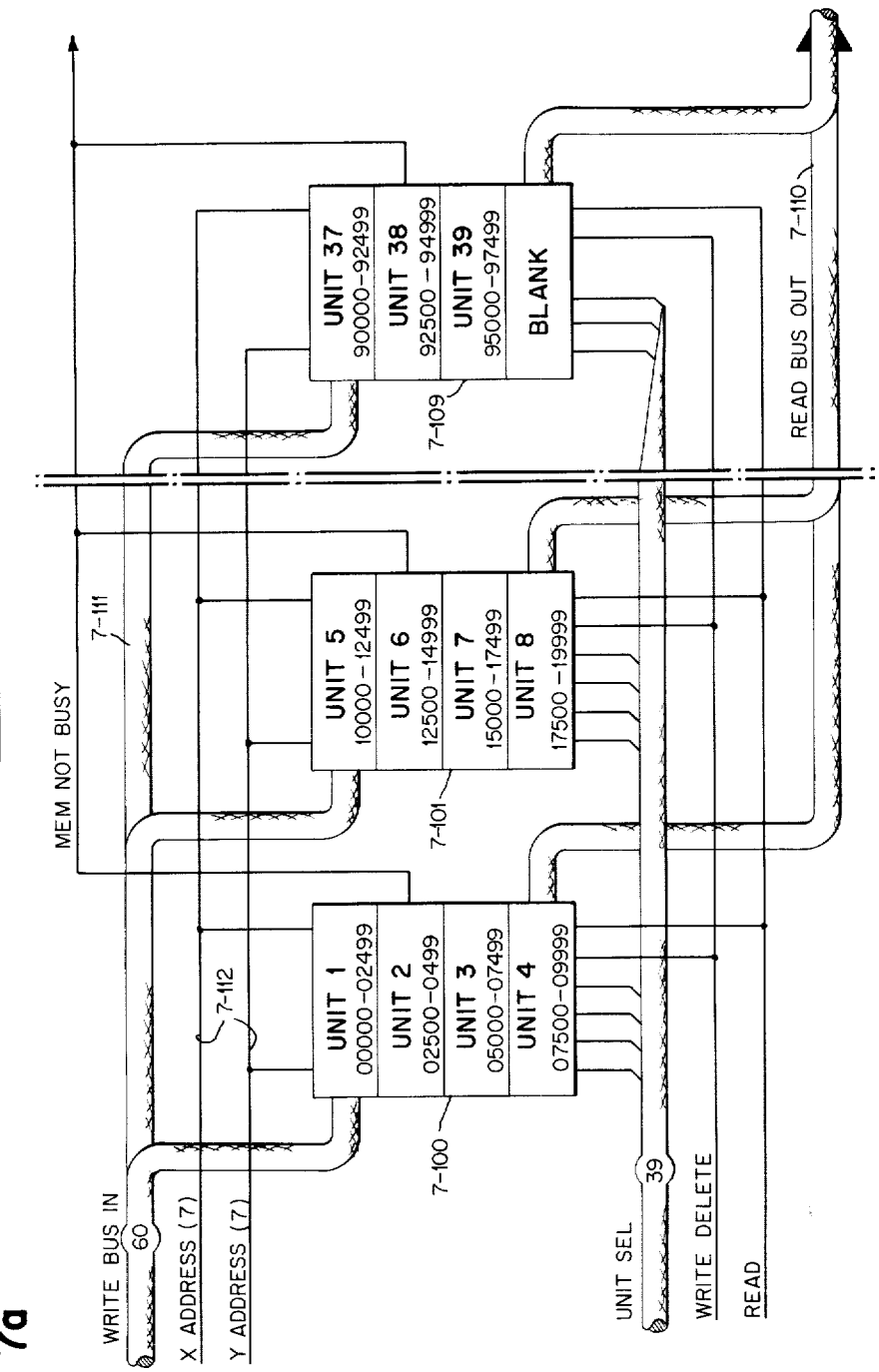

May 31, 1966 H. LUKOFF ETAL 3,254,329
COMPUTER CYCLING AND CONTROL SYSTEM
Filed March 24, 1961 35 Sheets-Sheet 20

May 31, 1966    H. LUKOFF ETAL    3,254,329
COMPUTER CYCLING AND CONTROL SYSTEM
Filed March 24, 1961    35 Sheets-Sheet 32

FIG. 11c

*INVENTOR.*

BY

May 31, 1966 H. LUKOFF ETAL 3,254,329
COMPUTER CYCLING AND CONTROL SYSTEM
Filed March 24, 1961 35 Sheets-Sheet 33

United States Patent Office 3,254,329
Patented May 31, 1966

3,254,329
COMPUTER CYCLING AND CONTROL SYSTEM
Herman Lukoff, Philadelphia, John Presper Eckert, Jr., Gladwyne, and William F. Schmitt, Wayne, Pa., assignors to Sperry Rand Corporation, New York, N.Y., a corporation of Delaware
Filed Mar. 24, 1961, Ser. No. 131,449
64 Claims. (Cl. 340—172.5)

This invention relates to a novel control arrangement for a computer. More particularly, this invention relates to a cyclically operated computer, wherein the various steps in a computer operating cycle may be carried on simultaneously.

In general, a computer comprises three main sections, which may be referred to as the memory, the processing unit, and the control unit. The memory is used to store either alphabetic or numeric data. Further, the data stored in the memory may take the form of instructions which define how the processing unit or control unit is to operate. Frequently, depending on the computer organization, these instructions determine the location of numeric operands or other data to be extracted from the memory which are thereafter to be operated upon by the processing unit.

The processing unit accepts data (alphabetic, numeric, or instructions) and manipulates it according to a given instruction, and may comprise one or more registers for storing data, a comparison device for comparing two separate units of information, means for performing arithmetical operations on data received from the memory, etc.

The control section receives instructions from the memory and in accordance therewith, controls the operation of other portions of the control section, as well as the processing unit and memory. In addition, the control unit may contain apparatus for determining the order in which instructions in the memory are to be extracted and executed.

Typical cycle of computer operation

Many of the prior art computers were designed and constructed to operate in a cyclic manner, wherein the cycle of computer operation comprised a plurality of serial steps. Typically, the first step in the cycle of operations in the prior art computers, is to determine which instruction from the memory is to be extracted. The location of the instruction in the memory and the succeeding sequence of instructions is determined by apparatus in the control section of the computer. Usually, these instructions are extracted in sequential order from adjacent portions of the main memory. To this end, there is provided in the control section, a counting mechanism which indicates the address in the memory of the particular instruction to be extracted and executed. However, it should be appreciated that other techniques are used to determine the locations of the instructions to be executed.

After the address of the instruction to be executed is determined, the computer must then extract the data stored in that address. The extraction of the required instruction from the memory is the second step in the computer operating cycle. Memory extraction circuits are required to accomplish this second step. Accordingly, the address of the instruction is transferred from the counting mechanism to the memory extraction circuits.

After the instruction is located, and extracted, the third step in the cycle of events is to transfer this extracted instruction to the computer control unit, and also, to change the information stored in the aforementioned counting mechanism, i.e. to change the counter reading so that it will indicate the address of the next instruction.

Advancing the counting mechanism may be done at anytime after the contents thereof are used to determine the location of an instruction. During this third step, the various control circuits are conditioned by the instruction to control the processing unit in accordance with this received instruction. Also, during this third step, the data or operands (if any) specified by the instruction to be manipulated by the processing unit may be extracted from the memory by the same memory extraction circuits already mentioned. After the data to be manipulated is made available (or if the instruction to be executed requires no data from the memory, then at some predetermined time) the computer operates to execute the instruction. The length of time required for executing an instruction will vary depending on the nature of the instruction. For example, a multiply order may require considerably more time than an order which merely compares the magnitude or signs of two quantities of data. As a final step after the instruction is executed, the result thereof may remain in the processing unit (if the instruction requires the use of that unit) or may be transferred to some memory location or storage register as determined by the instruction itself.

Once the result of a computation is found or some indication occurs that the instruction has been executed, a new instruction may be extracted from the memory, and the same sequence of steps just described takes place. It will be appreciated that certain steps in the cycle of operation will be executed in a fixed unit of time known as a minor cycle, and other steps will be of variable length, but generally some multiple of the fixed unit of time. In most cyclic computers, the minor cycle is equal to the amount of time necessary to extract a basic unit of data (hereinafter designated as a computer word) from the memory.

Many variations of the aforedescribed sequence are known in the art and the computer cycle just described represents a typical cycle of events. However, the various computing operation cycles known in the art have the following in common: each step in the computer cycle may begin only after the step which precedes it is complete, and the steps in any one cycle of events are all concerned with the same instruction extracted from the memory. Consequently, certain portions of the computer may not be used to their fullest extent, and the greatest overall computer efficiency is not achieved. For example, when the processing portion of the computer is active, it is entirely possible that the control unit concerned with the extractions of new instructions may be dormant.

The invention described herein departs from that known in the prior computing art, in that all the steps in the computer operating cycle may be carried on simultaneously. Each of the separate steps then being performed is associated with a different instruction. Consequently, this computer, which has a plurality of steps per cycle of operation will be simultaneously performing the various steps of several different instructions. Further this invention departs from prior art computers by employing a plurality of registers, hereinafter called addressable registers in combination with the data processing unit. These addressable registers as shall be explained, not only serve to accumulate results from the processing unit, but are further used to supply control data, and as such form a part of the control unit.

The basic advantage gained from this type of operation is a large increase in computer speed, without a corresponding enlargement of computer equipment. In the embodiment described herein, it will be seen that the speed of the overall operation of the computer may be increased under certain conditions as much as three hundred percent, without a corresponding addition of more computer circuits. This increase in speed in most cases is independent of the type of signal translating elements used in the computer, and the advantages gained are applicable to machines employing transistors, vacuum tubes, or magnetic elements for translating purposes. Further, the increase accrues whether information is transferred in the serial or parallel mode, or a combination of both.

A primary object of the invention is to provide new and improved control circuits for a digital computer.

Another object of the invention is to provide control circuits for a digital computer which permit a plurality of different steps associated with a plurality of different instructions to be carried on simultaneously.

A further object of the invention is to provide control circuits for a digital computer which are time shared by operations associated with a plurality of instructions.

Still another object of the invention is the provision of control circuits for a digital computer which are capable of handling a plurality of contingencies which may arise from a time sharing mode of operation, without the need for special programming.

Another object of the invention is the provision of control circuits for a digital computer which include a plurality of addressable registers capable of serving multiple purposes.

A still further object of the invention is the provision of control circuits for a digital computer which include a plurality of addressable registers capable of storing operands, results of computations and instruction modifying data.

Yet another object of the invention is to provide control circuits for a digital computer which include buffer registers for the temporary storage of instruction data during the manipulation thereof.

Still another object of the invention is to provide control circuits for a digital computer which include an adder serving to sequence instructions, to modify instructions and as a conduit for various portions of instructions.

Another object of the invention is to provide control circuits for a digital computer including a comparator for comparing portions of those instructions being carried out and providing signals as a result of such comparisons which determine succeeding steps in the overall operation of the computer.

Another object of the invention is to provide control circuits for a digital computer including a program counter and cycling elements for generating in proper time sequence the signals required for operating the principal control elements to enable overlapping of instructions.

A further object of the invention is to provide control circuits for a digital computer including a plurality of instruction sequencing accumulator registers thereby to enable transfers of control to new routines with minimal loss of time.

Still another object of the invention is the provision in a digital computer of control circuits including a plurality of addressable registers serving individually as accumulators and collectively as a fast access memory.

Other objects and advantages will become apparent as the description proceeds.

In the drawings—

FIGURE 1 appearing as FIGURES 1a, 1b, and 1c to be assembled as indicated depicts in general block form the computer control circuits of the invention.

FIGURE 2 is a general block diagram of the instruction decoding and encoding circuits of FIGURE 1.

FIGURE 3 (Pt. 1) and FIGURE 3 (Pt. 2) taken together show a simplified block diagram of the computer cycling elements of FIGURE 2 along with some of the general control elements of FIGURE 1 and is used to indicate the sequence of events which occur in starting the computer.

FIGURE 3a is a timing diagram to be read in conjunction with FIGURE 3 (Pt. 1) and FIGURE 3 (Pt. 2).

FIGURES 4a, 4b, 4c, 4d, 4e and 4f comprise six sheets to be assembled as shown and depicts in detail block form the cycling elements of FIGURE 2.

FIGURE 5 is a simplified general block diagram of an arithmetic unit which may be utilized in connection with the present invention.

FIGURE 6b is a more detailed block diagram of the arithmetic control circuits of FIGURE 6a.

Figure 7B:
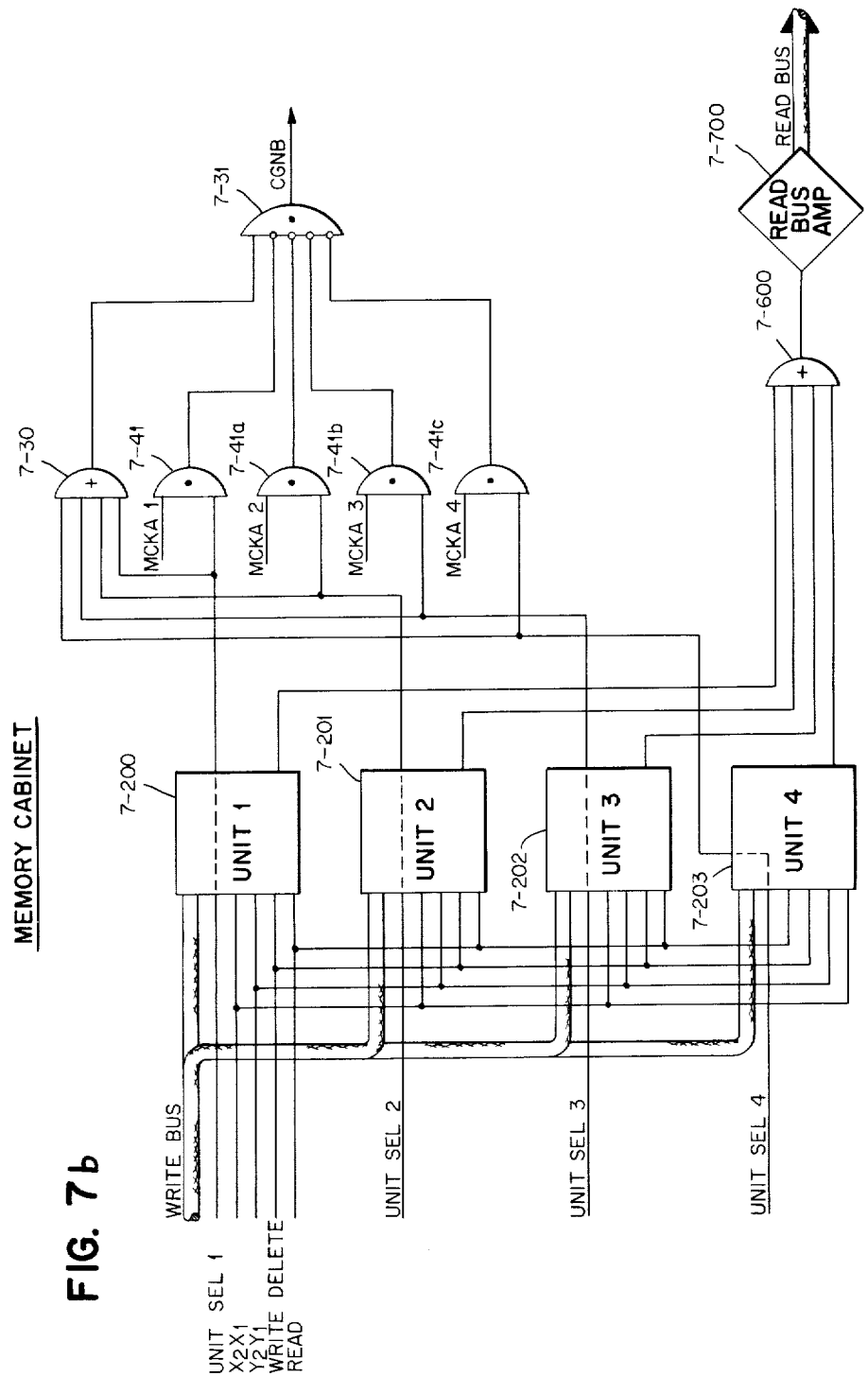
Figure 7C:
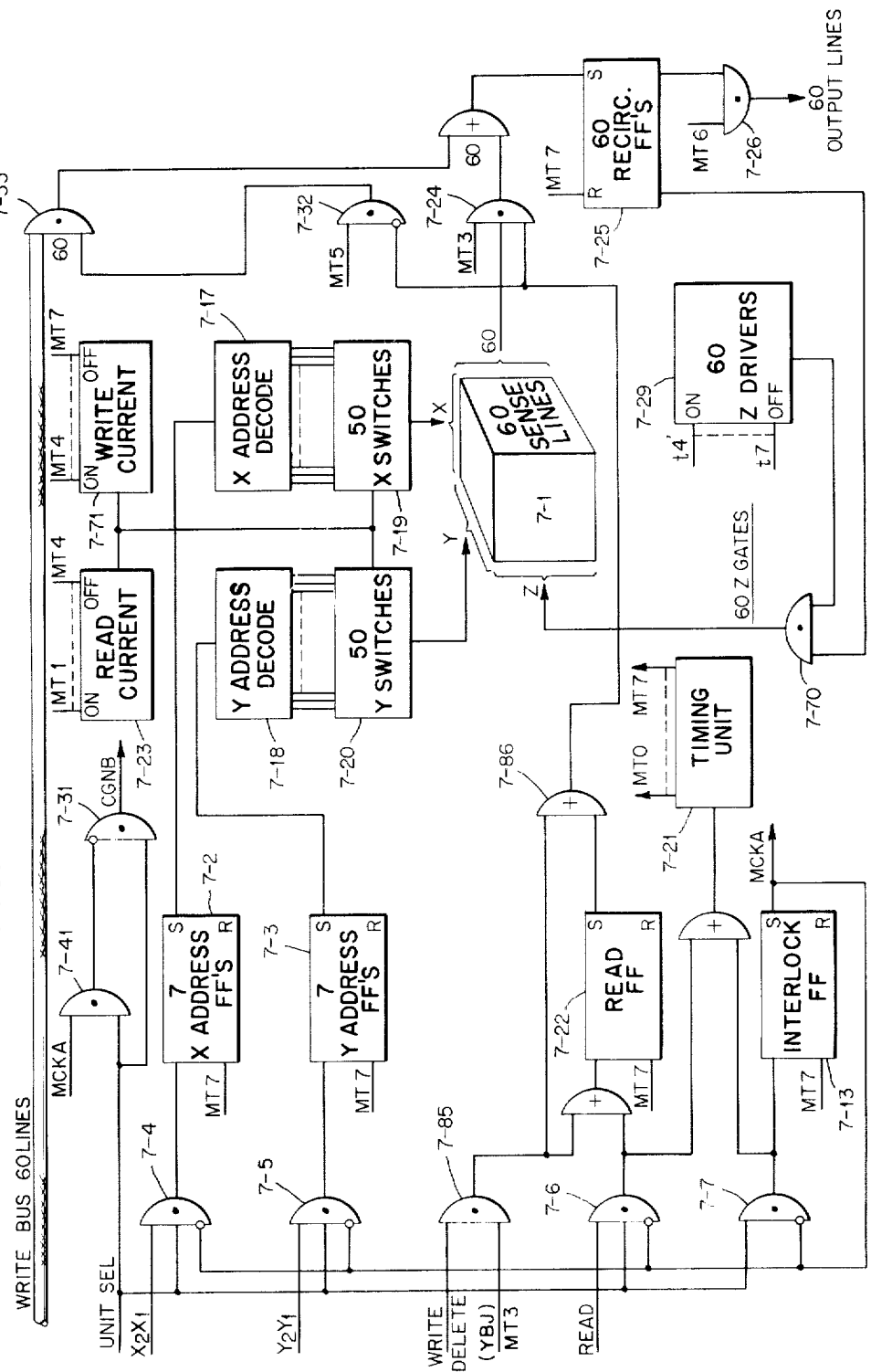

FIGURE 7 appears on three sheets as FIGURES 7a, 7b and 7c and depicts in general block form the organization of a memory suitable for use with the computer of the present invention.

FIGURE 8 appears on five sheets as FIGURES 8a, 8b, 8c, 8d and 8e and indicates the general timing of operations as carried out in the control circuits of FIGURES 1 and 4.

Figure 9A:
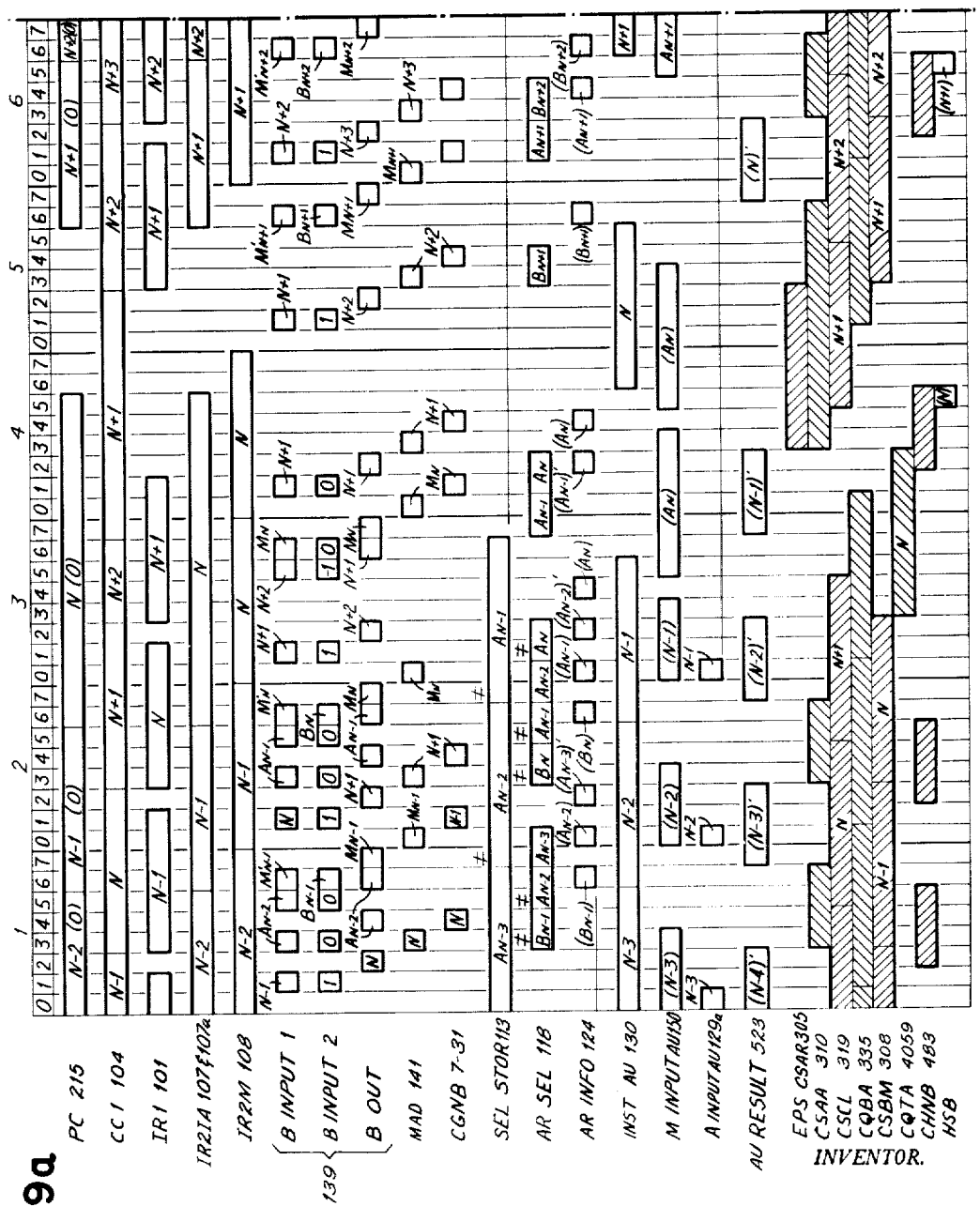
Figure 9B:
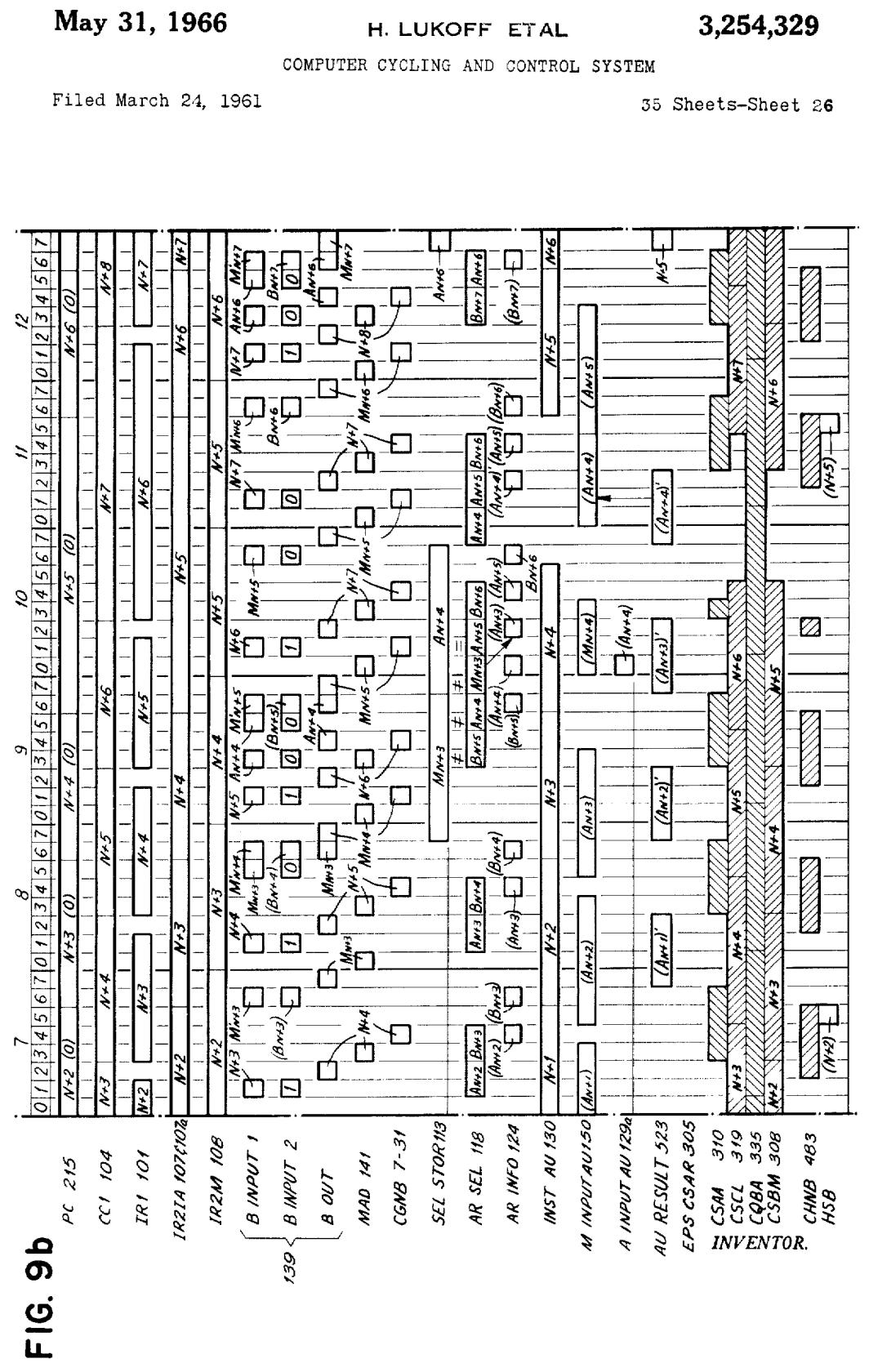
Figure 9C:
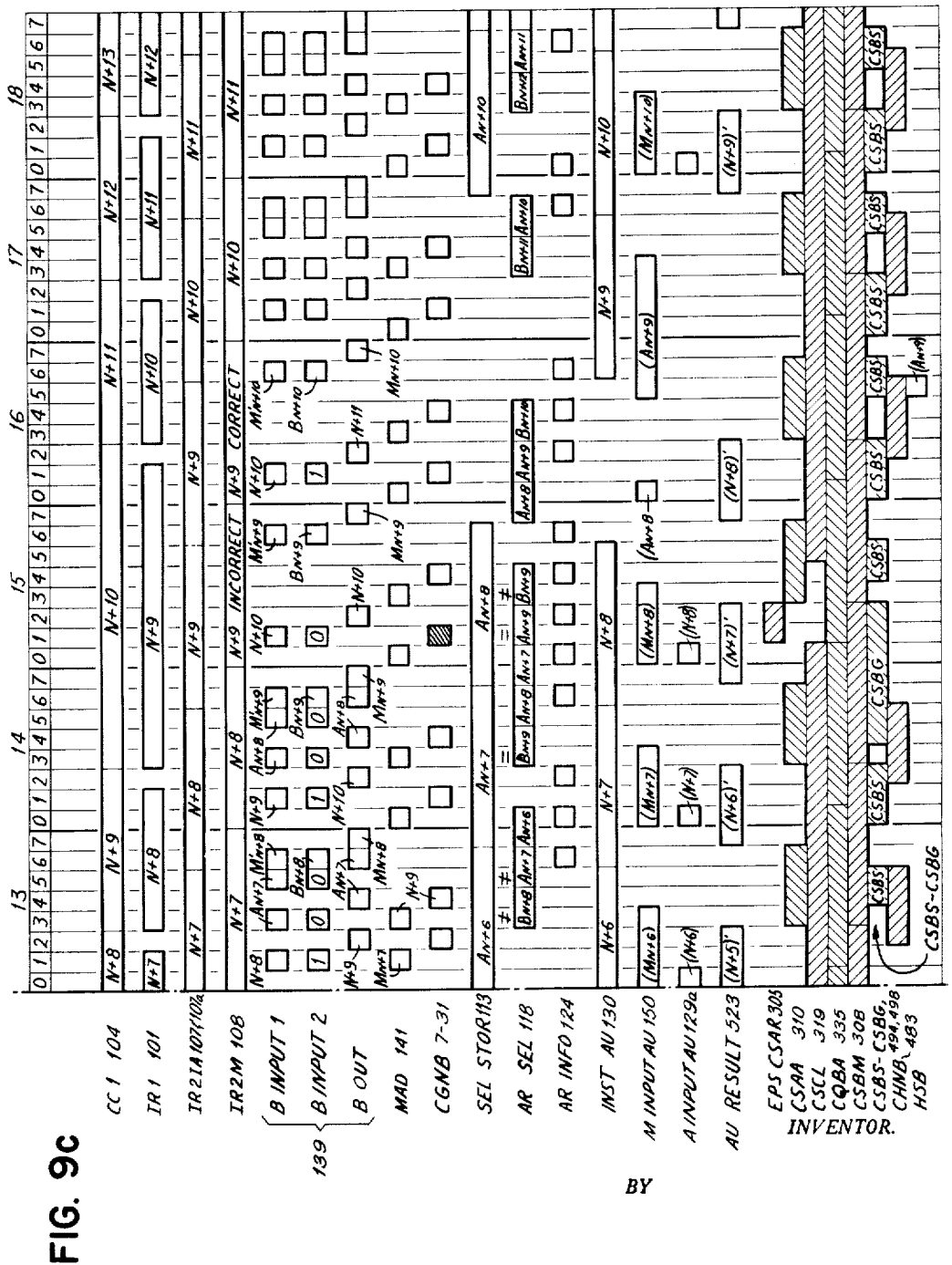

FIGURE 9 appears on three sheets as FIGURES 9a, 9b and 9c and indicates timing of operations in FIGURES 1 and 4 when data is transferred between the memory and the addressable registers.

Figure 10A:
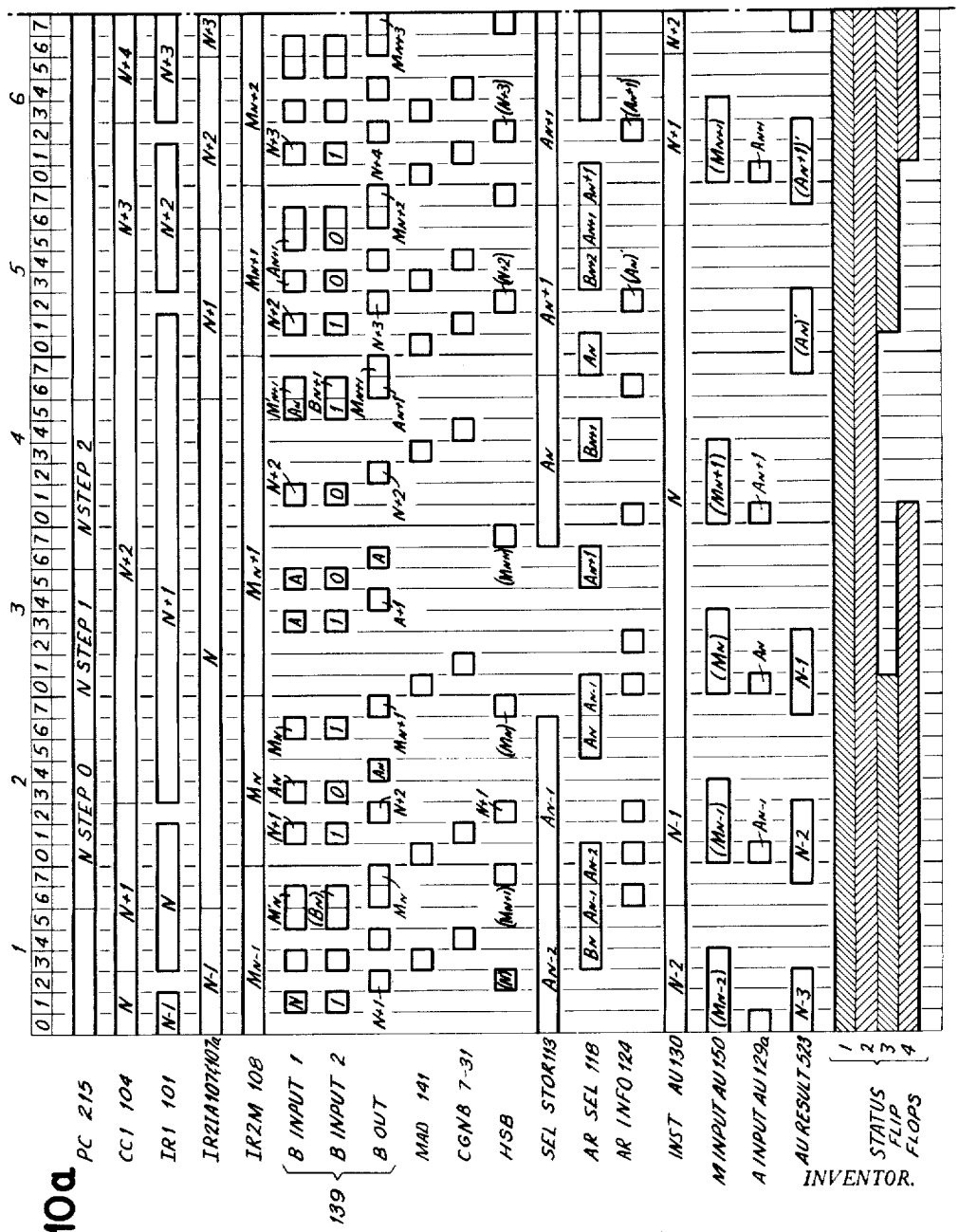
Figure 10B:
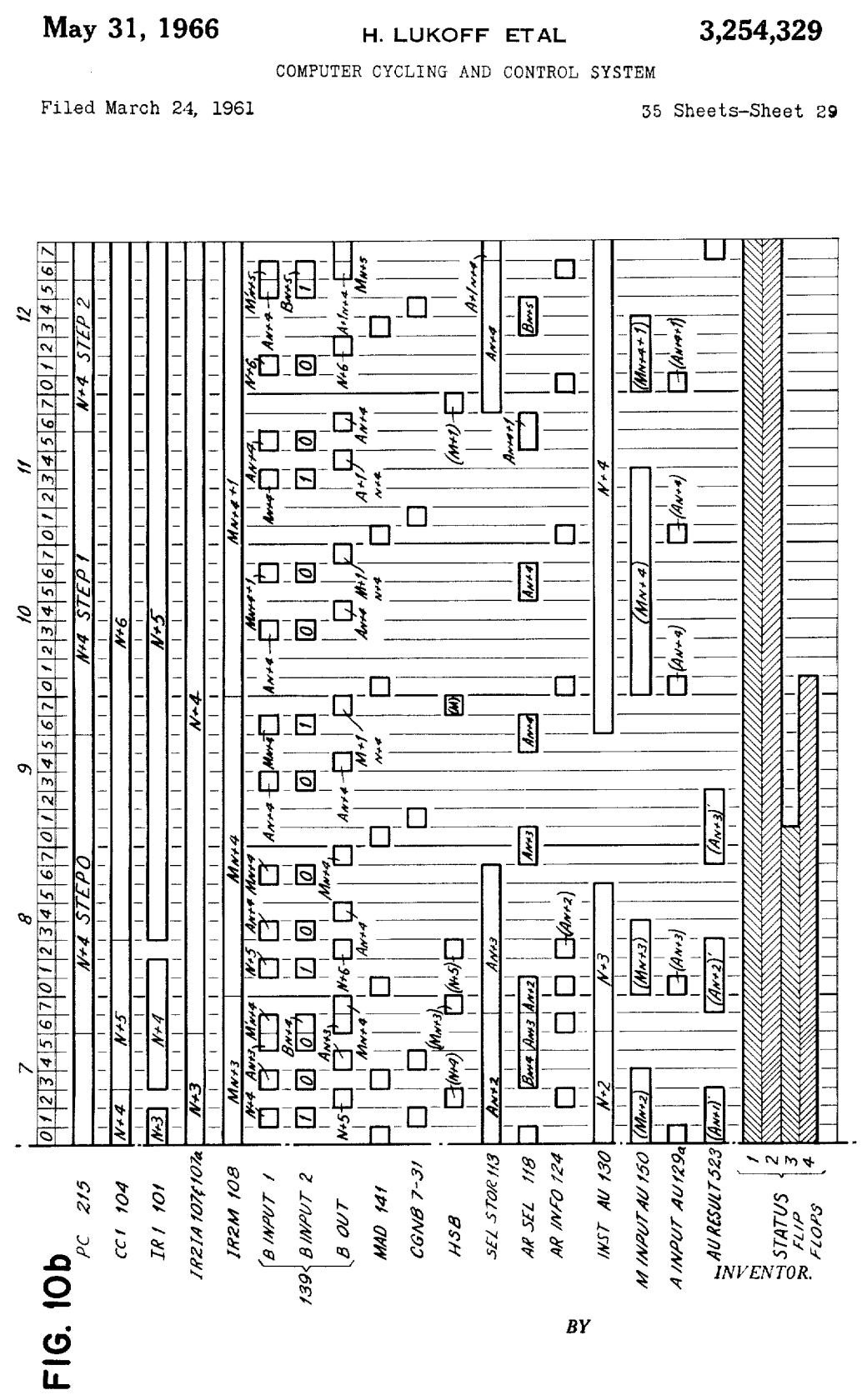

FIGURE 10 appears on two sheets as FIGURES 10a and 10b and indicates timing of operations in FIGURES 1 and 4 when certain double precision operations are performed.

Figure 11A:
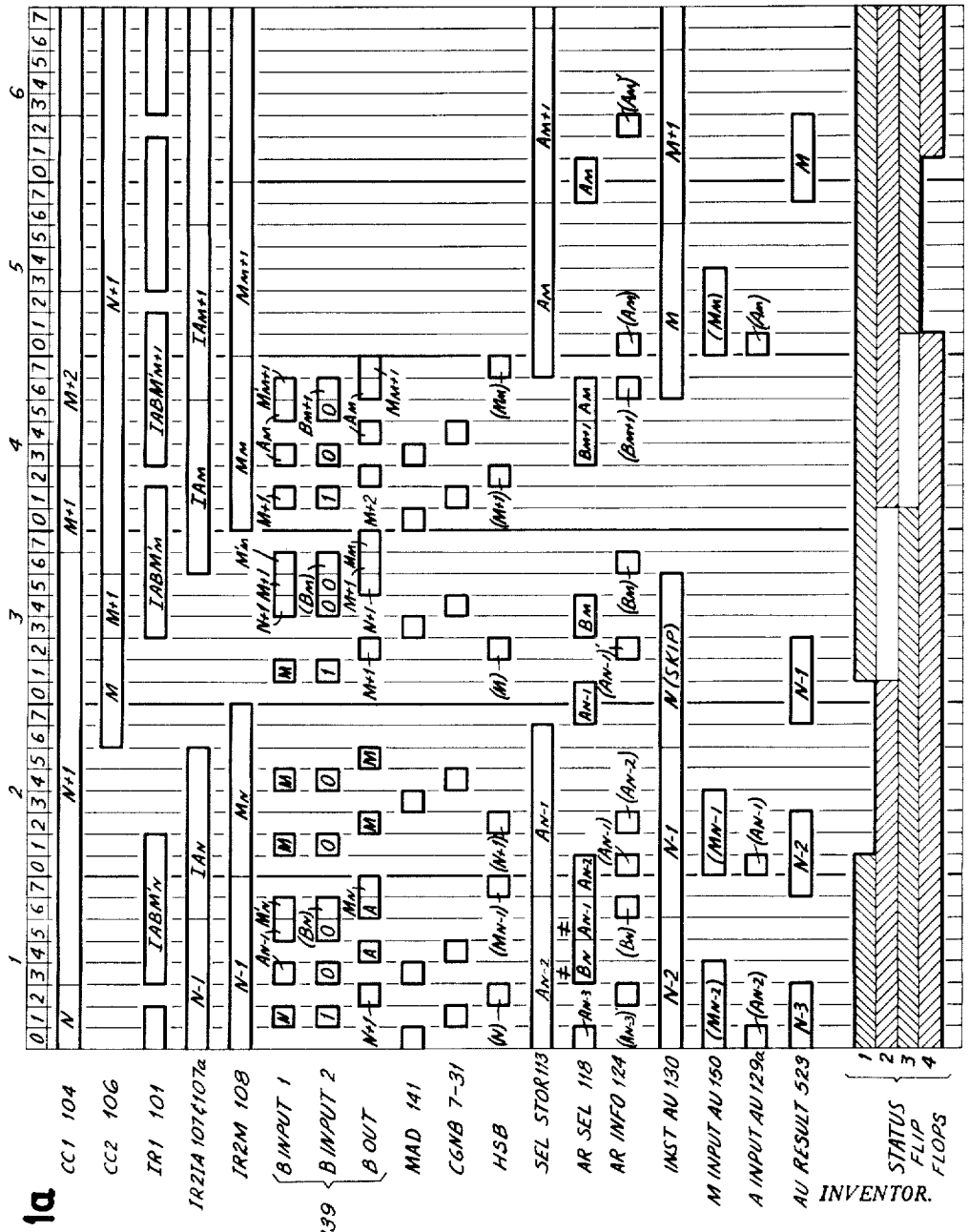
Figure 11B:
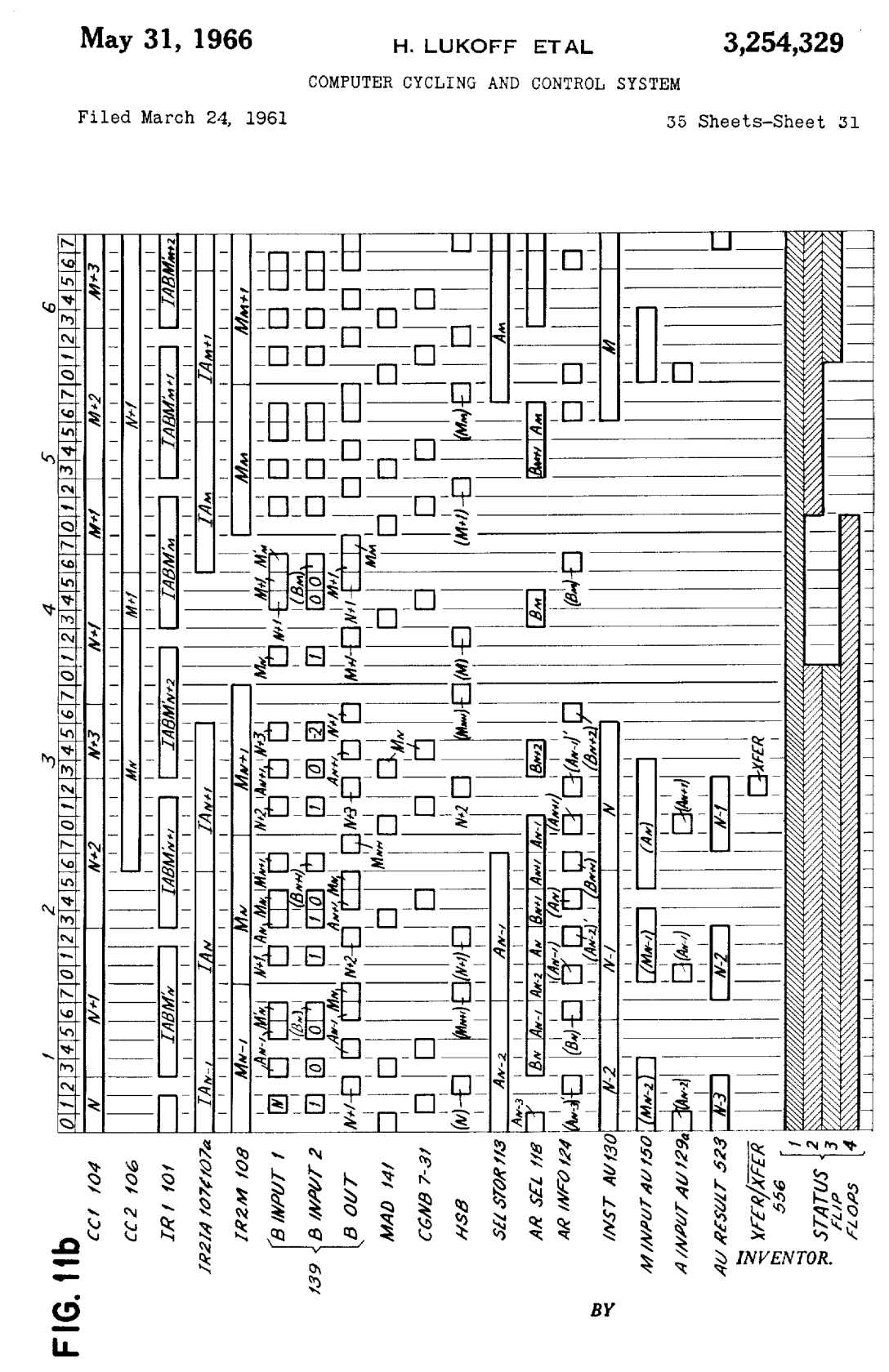

FIGURE 11 appears on three sheets as FIGURES 11a, 11b and 11c and indicates timing of operations in FIGURES 1 and 4 when transfers of control take place.

Figure 12B:
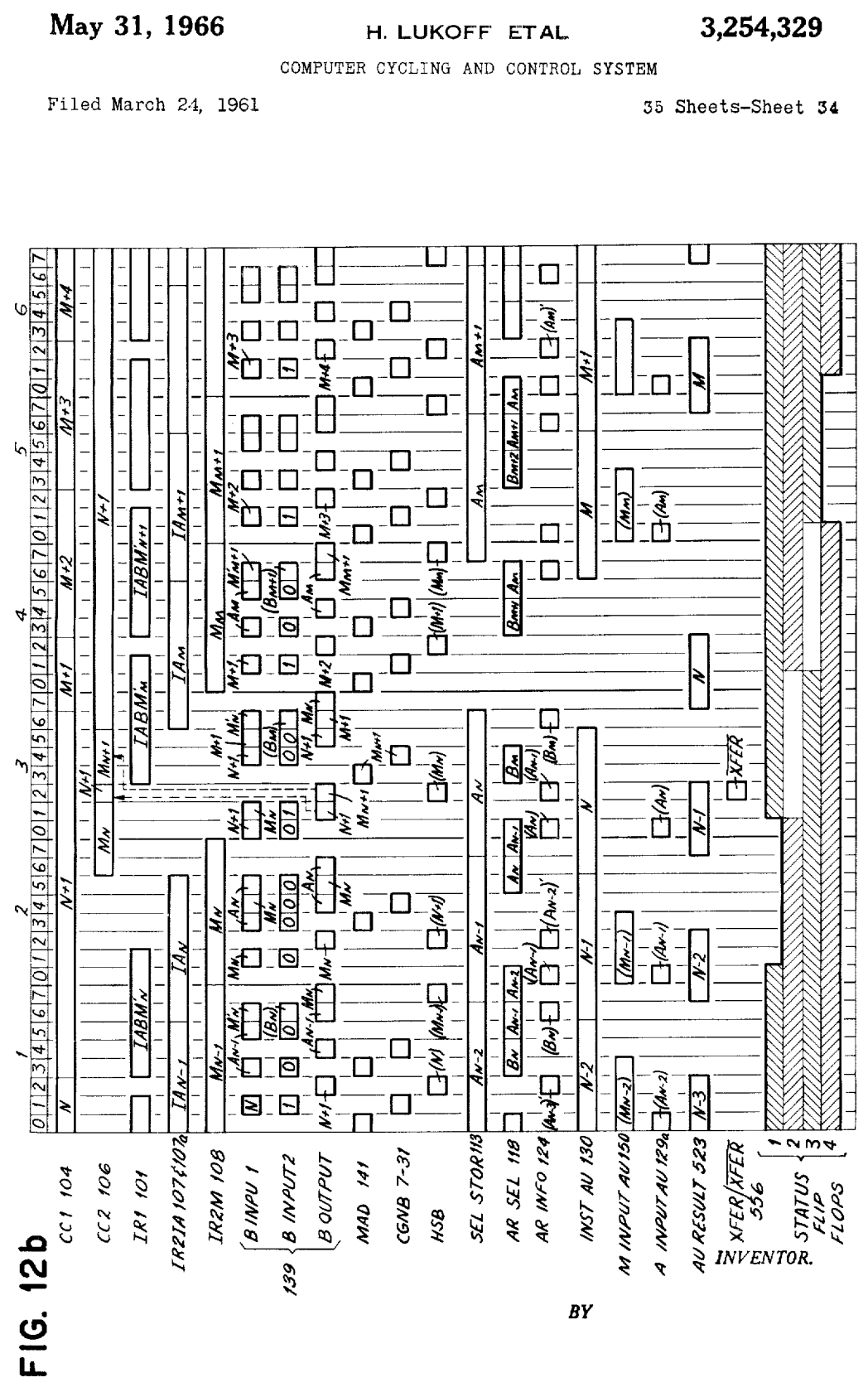

FIGURE 12 appears on two sheets as FIGURES 12a and 12b and indicates timing of operations in FIGURES 1 and 4 when transfers of control associated with certain indexing operations are carried out.

Figure 13:
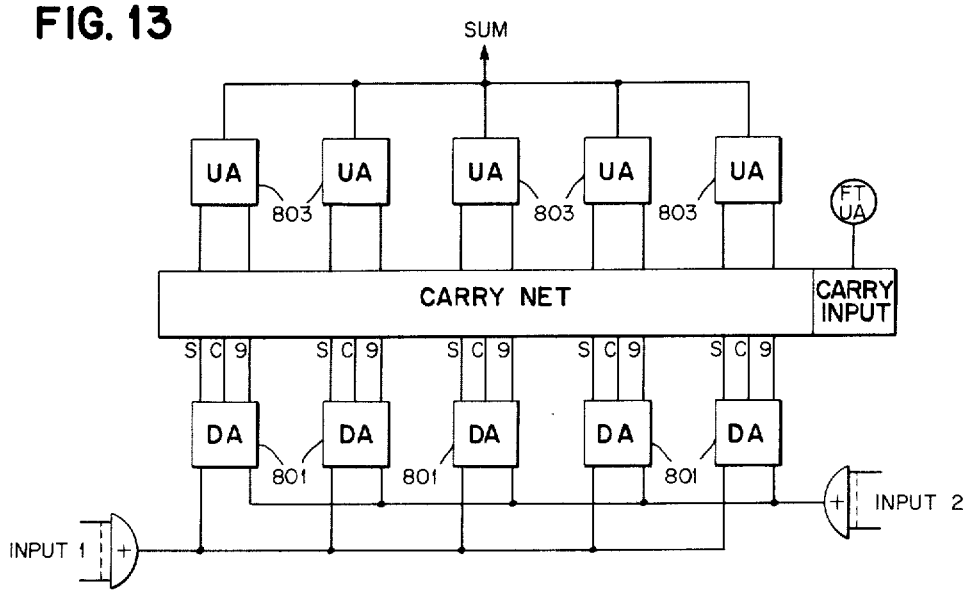

FIGURE 13 is a general block diagram of a parallel adder of the type which may be utilized in the invention.

Figure 14:
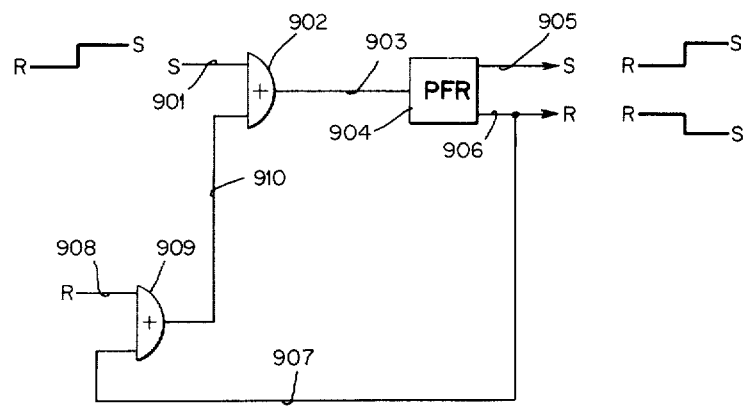

FIGURE 14 is a block diagram of a typical flip-flop as utilized by the invention wherein set input signals always override reset input signals.

In the particular embodiment of the computing apparatus shown herein, it was contemplated that the parallel mode of information transfer would be used; that is, it was contemplated that all the pulses comprising a basic unit of information (a computer word) be transferred from one element to another element (that is from register to register or adding unit) substantially simultaneously. While the following description will refer to a computer utilizing a parallel adder and the transmission of information in parallel, the basic concept of simultaneous performance of the steps in a computer cycle, hereinafter called "overlap," is equally applicable to other types of computers including those employing a serial transmission of information.

Refer now to FIGURE 1 which shows, in block diagram form, the basic control circuits for a computer utilizing the present invention. It will be appreciated that to a large extent, the arrangement of the computer control circuits determines the computer operating cycle and mode of operation; and hence, the explanation of this invention will relate primarily to the computer control arrangement. For ease of explanation, it will be assumed that the control circuits in FIGURE 1 are being utilized with a computer operating in the parallel mode, and employing a random access memory (i.e. a memory with essentially no latency time). Moreover, a particular computer word structure as defined in detail later, will also be assumed. These assumptions, however, in no way limit the invention, since the principle of "overlap" applies, notwithstanding the mode of information transfer, the computer word structure, or the type of memory employed.

*Drawing and specifications conventions*

Throughout the drawings used in connection with the description, certain conventions have been followed, e.g. a coincidence gate is shown as a half-moon configuration with a dot in the center. Further, adjacent each gate is a numeral indicating that the single gate shown is representative of a plurality of gates indicated. A buffer (i.e. an OR gate) is likewise shown as a half-moon configuration, but with a plus sign in the center. Each buffer also has a number adjacent it indicating that the single buffer shown represents the number of buffers so indicated. The terms "gate" and "buffer" are used in this specification as they are normally understood in the electronic art. Thus, a gate is a circuit with a single output and two or more inputs so designed that an output signal is produced when and only when input signals are received on all input leads; it being noted however that a gate may be inhibited from producing an output by the presence of one or more inhibit input signals. When this is the case the inhibit inputs are indicated by dots or small circles on the input side of the gate. A buffer is a circuit with a single output and two or more inputs so designed that an output is produced when an input signal is received on any of the input lines. Also referred to in the drawings and specification are devices known as encoders and decoders. Such elements are well known in the art and include an array of buffers or gates respectively. As used herein the term "encoder" will designate a circuit which has a plurality of input and output lines wherein the presence of a signal on one of the input lines causes a signal to be generated on one or more of the output lines; and the term decoder shall designate a circuit which has a plurality of input and output lines wherein the simultaneous presence of signals on a plurality of input lines causes a signal to be generated on a selected one or ones of the output lines.

The basic unit of information or word used in the preferred embodiment of this invention consists of twelve decimal digits. Each of the decimal digits in this preferred embodiment may comprise five bits which are indicative of the value of the digit (the fifth bit is used for checking purposes). If the word represents data to be processed as distinguished from an instruction word (defining the operation to be performed), eleven of the twelve digits represent different alphabetic letters or numbers, while the twelfth digit represents a sign. If the computer word under consideration is an instruction, then the digits of the instruction word are considered in groups, each group defining a certain portion of control information. The format of a computer instruction word appears as follows:

| Digits | 12 | 11 | 10 | 9 | 8 | 7 | 6 | 5 | 4 | 3 | 2 | 1 |
|---|---|---|---|---|---|---|---|---|---|---|---|---|
| | T | I | I | A | A | B | B | M | M | M | M | M |

In this format, the two I digits are representative of the instruction to be performed, so that it will be understood that 100 different instructions are possible with this instruction word structure.

The two A digits are indicative of the address of an addressable accumulator register which contains an operand to be manipulated by the processing unit, and also indicates the address of the accumulator register which will store the result of the computation.

The five M digits indicate the address in the main memory of an operand to be processed, or may indicate an address to which control is to be transferred.

The two digits indicated by the letters B represent the address of another addressable register which stores a value used to modify the M digits of an instruction.

The 12th digit, T, may be used for other purposes or not used. In this regard reference may be made to copending U.S. application No. 45,158, assigned to the assignee of the present invention.

Thus an instruction appearing as 70 25 35 02500 would be interpreted by the computer to mean (a) perform an add operation (assuming that 70 indicates add), (b) one of the operands is in addressable register 25, (c) the other operand is stored in the memory, the address of which is determined by adding a portion of the contents of addressable register 35 to the value 02500, (d) store the result of this computation in addressable register 25.

The instructions in the format just described are carried from the memory in parallel to the control circuits of FIGURE 1 by 60 signal lines, wherein five signal lines are used to transmit each digit in the instruction word. The first five lines carry the first digit (an M digit), the last five lines, i.e. lines 55–60, carry the twelfth digit. All the signal lines or buses shown in the accompanying figures, especially FIGURE 1, are of the same weight. However, it will be understood while the bus appears on the drawing as a single line, it may represent a plurality of signal lines. Also, it will be understood where a signal line represents more than one signal line entering what is apparently a coincident gate, that each one of the signal lines there represented enters its own gate (not shown separately in the figures). To make a representation showing 60 lines entering 60 gates would be unduly burdensome and would render the drawings confusing.

Figure 1A:
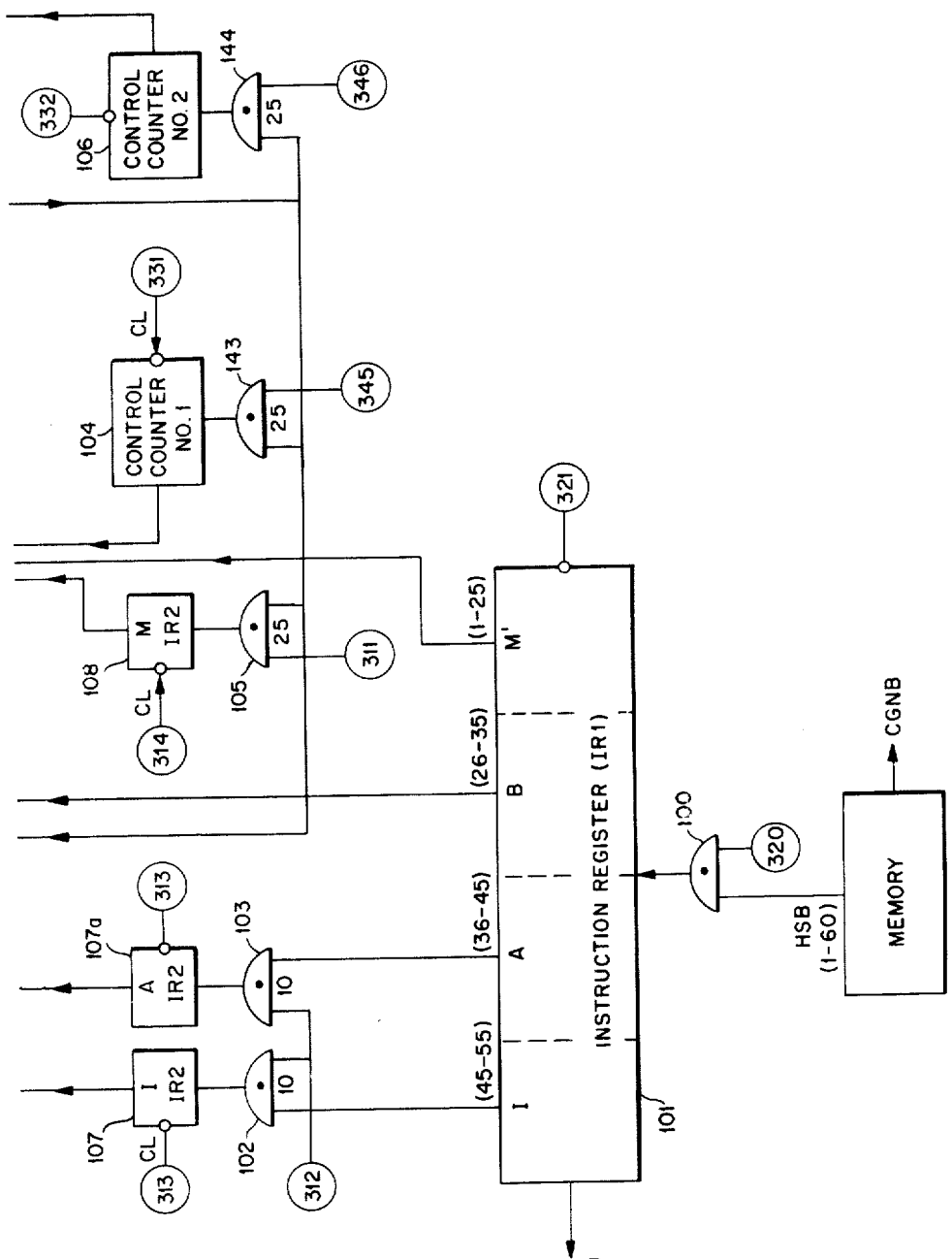

In FIGURE 1a at the bottom thereof, it will be observed that 60 lines carry an instruction into the control circuits over a high speed bus labeled HSB. The high speed bus comprises 60 lines, one for each bit of a digit, and FIGURE 1 appropriately shows the bus to be marked with a reference (1–60) to indicate a plurality of lines. Each of one of the plurality of the HSB lines is connected to a coincidence gate 100. These gates 100 are alerted by a signal FT 320 which is generated by the function control circuits 148 also shown in block form in FIGURE 1c and to be described later in detail. These gates 100 are connected to a twelve digit register designated as a first instruction register IR–1 which bears the reference character 101. The instruction register 101 comprises 60 storage units, one for each of the bits in the instruction word. Since, however, the most significant or T digit is not used for the purposes of the present invention, no provision is specifically shown for handling this digit. Twenty-five of these storage units in instruction register 101 store the bits of the five M digits and three groups of ten storage units store the B, A, and I digits of the instruction word. The ten storage units holding the bits for the two I digits, and the ten storage units holding the bits for the two A digits are connected to the inputs of ten gates 102 and ten gates 103 respectively which are in turn connected at their outputs to storage registers 107 and 107a, which comprise a portion of a second instruction register IR–2.

Instruction register 101 (IR–1) is the first of a plurality of registers used to store various parts of different instructions. For example, the instruction or part thereof stored in instruction register IR–1 will be transferred to a second instruction register comprising elements 107, 107a, and 108. After this transfer takes place, a new instruction will be stored in instruction register IR–1. In addition, as shall later be shown, a further instruction register in the arithmetic unit 131 (FIGURE 1c) accepts information originating from the instruction register 107a to control the arithmetic unit, 131. When an instruction is stored in the instruction register for the arithmetic unit, different instructions may be conveniently lodged in the instruction registers IR–1 and IR–2 (elements 101 and 107, 107a, and 108). Another register, selector storage register 113 (FIGURE 1b), also is used to store a portion of an instruction. The portion of the instruction stored in register 113 represents the address (i.e. designates 1 of 100 addressable registers 121) for storage of the result of a computation by the arithmetic unit 131.

Gates 102 and 103 connected to inputs of registers 107 and 107a respectively are both controlled by the FT 312 signal from the function control circuits 148, and serve to transmit the I and A digits from the instruction register IR–1 to the portions of the second instruction register IR–2 designated as 107 and 107a. Both the I and A digits from instruction register 101 are transmitted simultaneously to instruction register 107 and 107a, when gates 102 and 103 receive the FT 312 signal.

For reasons to be discussed hereinafter, the M digits stored in instruction register 101 are transmitted at a different time to another portion 108 of the second instruction register. These M digits from IR-1 are transmitted through gates 136 (FIG. 1b) (alerted by the FT 400 signal) to a five digit parallel adder designated as the B adder 139. The B adder 139 is connected at its output to gates 105, which are alerted by the FT 311 signal and these gates 105 are connected to the input of the five digit register 108. It will be appreciated that registers 107, 107a and 108 store respectively the I and A digits and modified M digits formerly held in instruction register IR-1. The B adder 139 also receives a portion of the contents of a selected addressable register 121 via gates 133 which are alerted by the FT 410 signal. Block 121 may comprise up to 100 addressable registers wherein each of these registers stores a computer word comprising 12 digits. The gate 133 and the signal lines connected thereto are meant to illustrate 25 signal lines and 25 gates so that through the arrangement of gates 133, the first five digits (i.e. the five least significant digits) stored in a particular addressable register are added the M digits stored in register 101. The sum of this computation is stored and transmitted to register 108. Thus, it will be understood that the instruction stored in register 101 will be transferred in modified form to a second instruction register comprising elements 107, 107a, and 108. When this transfer is completed as shall be seen, a new instruction is extracted from the memory and stored in instruction register 101.

The purpose of modifying the instruction in this manner will not be explained in detail. Suffice it to say that this operation is employed to ease the burden of programming this computer. This modification of the instruction known as indexing is explained in a copending application No. 45,242, assigned to the assignee of the present invention. It is to be noted that the five least significant digits for the instruction prior to modification and as received into IR-1 are designated by M'. When received into section 108 of IR-2 they are designated by M.

Figure 1B:
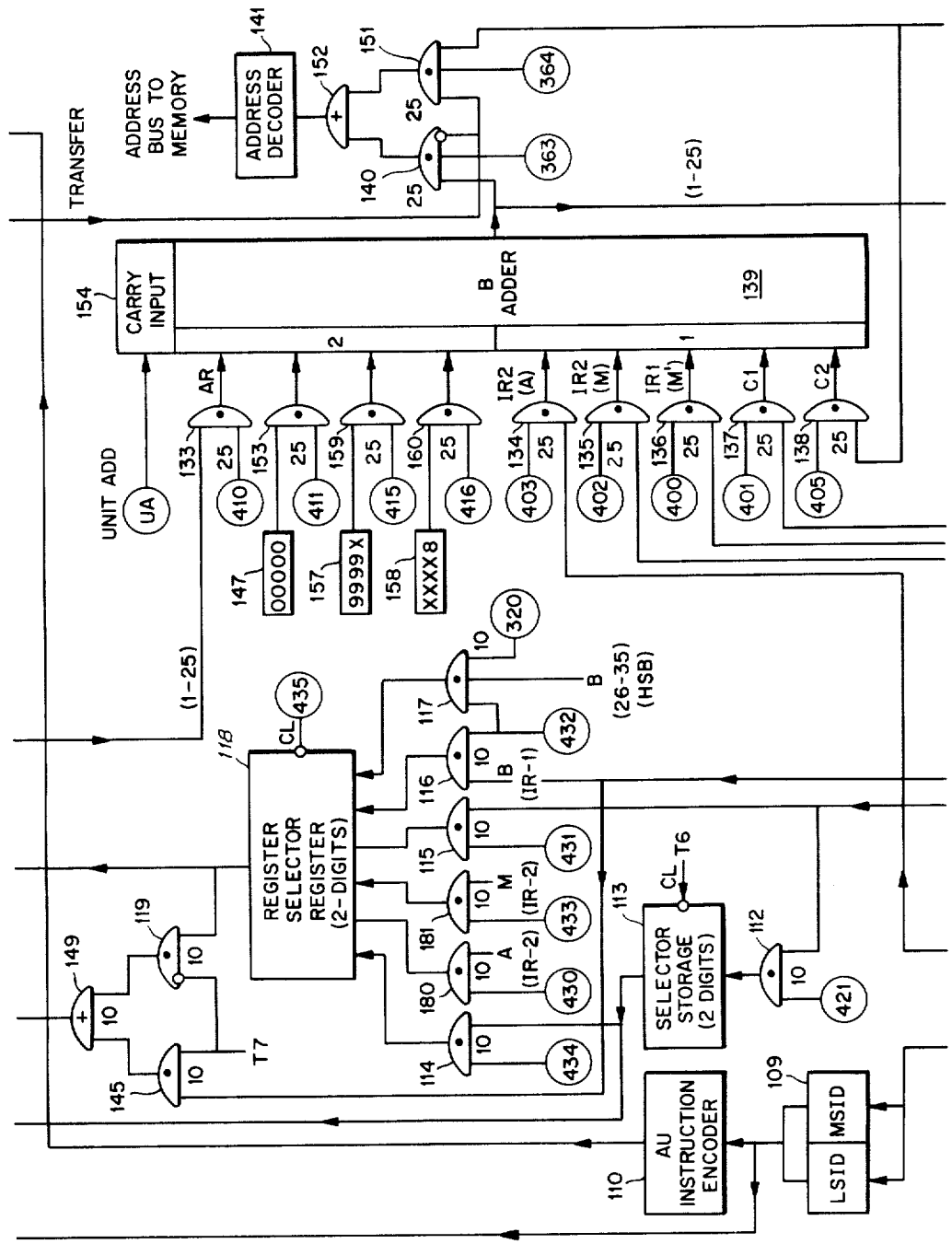
Figure 1C:
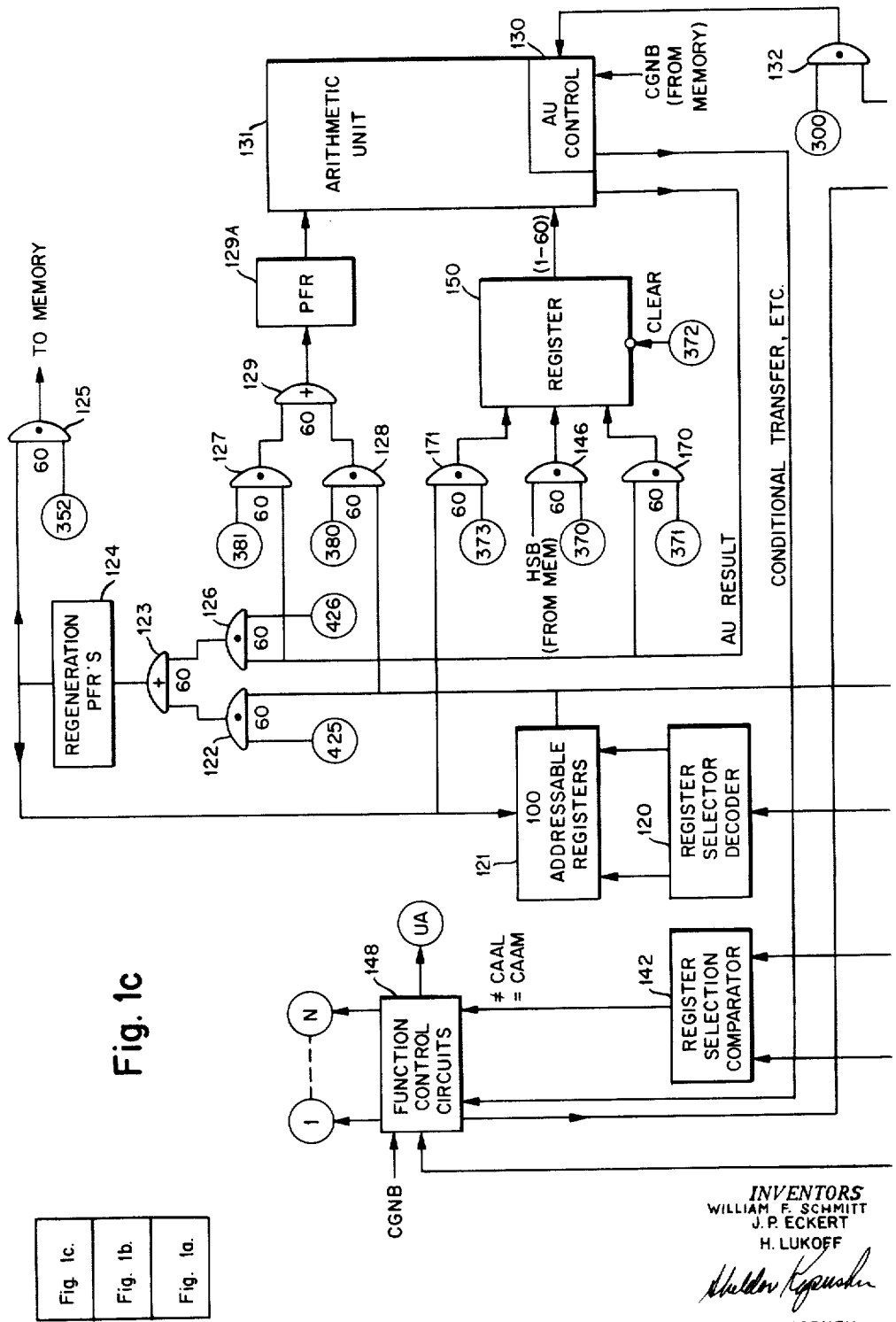

The particular accumulator register used in this last described operation is selected by the register selector decoder 120 (FIGURE 1c). The register selector decoder 120 comprises a decoding matrix and upon receiving an input, will select one of the 100 addressable registers.

The register selector decoder 120 is in turn connected at its input to the register selector register 118 which stores two digits. The two digits which are entered into register selector register 118 may be transmitted thereto via gating elements 114 through 117, 180 and 181. It will be appreciated that each of the elements 114 through 117, 180 and 181 is representative of ten gates, so that any one of these elements (e.g. the 10 gates 115) may transmit two digits to be stored in register 118. Gating elements 117 are controlled by the FT 432 and FT 320 signals, and receive selected information from the high speed bus. In particular, gates 117 receive the B digits of an instruction which are being transmitted to instruction register 101 of the control unit shown in FIGURE 1. Consequently, at the same time that gates 100 receive the entire instruction word to be stored in the instruction register 101, gates 117 receive B digits only of that instruction word, and transmit these two digits to the register selector register 118. A the same time as the instruction is being stored in the first instruction register 101, a selection of one of the plurality of addressable registers 121 may be made. The five least significant digits stored by the addressable register so selected are as before indicated transmitted to the B adder 139 via gates 133 so that five digits of the selected addressable register 121 and the five M' digits of an instruction in register 101 may be combined and stored as M in the portion 108 of the second instruction register.

It will be observed that the register selector register 118 also may receive the output of the instruction register 101 via gates 116. Again, gate 116 represents a plurality of gates which transmit 10 bits (two digits). The particular two digits which gates 116 transmit are the B digits of the instruction word as stored in the instruction register 101. The reason for transmitting the B digits of an instruction to selector register 118 via gates 116 will be explained later.

Register selector register 118 may also receive two digits from either of gates 114 and 115 which are alerted by FT 434 and FT 431 respectively. Gates 115 transmit the output of the B adder 139 (two digits) to the register 118, and gates 114 transmit the output of the selector storage register 113 which also holds two digits. Finally, gates 180 alerted by FT 430 may transmit the A digits from IR-2 (197a) to register 118 and gates 181 alerted by FT 433 may transmit the two least significant M digits from IR-2 (108) to register 118. It will be appreciated that of the six inputs to register 118 only gates 116 and 117 are ever alerted simultaneously and generally only one group of gates 114 to 117, 180 and 181 is transmitting signals at any one time.

It will be observed that selector storage register 113 is connected at its input to the output of the B adder 139 via gate 112 which is alerted by FT 421. The selector storage register 113 will, as shall be explained later, receive the two A digits from the instruction word stored in register 107a via gates 134, the B adder 139 and gates 112. The two A digits thus stored in the register 113 are used to determine the address for storage of the result of an instruction just executed by the arithmetic unit 131.

The A digits stored in the second instruction register 107a are transmitted to the B adder via gates 134. These gates are under the control of FT 403. The A digits stored in register 107a are transmitted in a normal cycle of operation two separate times to the B adder 139 via gates 134. Normally they remain unchanged by passage through B adder 139 which in this instance serves merely as a conduit. The first time the B adder 139 produces an output corresponding to the A digits in register 107a, such output is transferred to the register selector register 118 via gates 115. The A digits stored in register 118 in this manner are used to designate the address of one of the addressable registers 121 used to supply an operand to be manipulated by the arithmetic unit 131. The second time, the B adder 139 produces an output corresponding to the A digits in register 107a, it is routed to the selector storage register 113 via gates 112. As noted before, register 113 feeds data to the register selector register 118 and the data stored in register 113 ultimately determines which one of addressable registers 121 will accept a computed result from the Arithmetic Unit 131.

The M digits stored in the second instruction register 108 are transferred to the B adder 139 through gates 134 under the control of FT 402 and may ultimately reach address decoder 141.

The output of the B adder 139, as already indicated, is a five digit output and these digits may be transmitted to various parts of the control circuits already defined, and to the address decoder 141 via gates 140 (alerted by FT 363) and buffers 152. The output of the address decoder 141 is connected to the selection circuitry for the main memory (not shown on this drawing). Gates 140 are enabled by a transfer signal generated by the function control circuits 148. Thus, it will be seen from FIG. 1 that the output of the B adder 139, when decoded by the address decoder 141, may select a particular address in the main memory and cause the contents of that address to be transmitted out of the memory onto the high speed bus. The output of the B adder 139 in this connection serves to select instructions from the memory to be transmitted to the control circuitry, via gates 100, and to select operands from the memory so that such operands may be transmitted to the arithmetic unit 131 for manipulation via gates 146 (FIG. 1c).

It will be noted that the output of the control counter 104 is connected via gates 137 (which are alerted by the FT 401 signal) to the input of the B adder 139. The control counter 104 stores an address which indicates the location of the instruction last extracted from the memory. The B adder 139 is used to modify the output of the control counter 104 and then to transmit this output via gates 140, buffers 152 and the address decoder 141 to selection circuits of the main memory so that an instruction word may be extracted from the memory and put on the high speed bus.

The control counter 104 or control counter No. 1 (CC–1) is connected at its input via gates 143 to the output of the B adder 139, so that at selected times when the control counter transmits its output to the B adder 139 and thence to the address decoder, the output of the B adder 139 is also transmitted back to the control counter 104 via gates 143, which are controlled by the FT 345. The B adder 139 may receive the FT–UA signal from the function control circuits 148 which has the effect of forcing a carry into the least significant digit position and adding a one to whatever is being transmitted through the B adder. Consequently, when FT–UA is generated, and the output of the control counter CC–1 (104) is fed through the B adder 139 via gate 137, the contents returned to the control counter CC–1 (104) are incremented by one. The contents of the control counter 104 are incremented by one in the manner just described so that new instructions can be extracted from the memory in sequential order.

Control counter No. 2 (106) CC–2 may also receive its input from the B adder 139. Input gates 144 to CC–2 are alerted by FT 346. The output of CC–2 is directed to the B adder input via gates 138 which are alerted by FT 405. The output of CC–2 may also be transmitted to address decoder 141 via gates 151 and buffers 152. Gates 151 are alerted by FT 364 in combination with a transfer signal from the function control circuits 148. Control counter No. 2 (106) is used during a jump or transfer of control instruction as shall be seen hereinafter.

The two I digits (comprising 10 bits) stored in the instruction register 107, which determine the operation to be performed, are transferred into the instruction decoder 109 and from there into the function control circuits 148. The instruction decoder 109 also drives the arithmetic unit instruction encoder 110 which in turn is connected to the input of the arithmetic unit control circuits 130 via gates 132. Gates 132 are controlled by FT 300. The instruction decoder 109 comprises a plurality of gates, each having a plurality of inputs and one output. This instruction decoder 109, as in the case of all the other decoders receives a plurality of inputs and excites only one of its output lines. Thus, the ten bits comprising the two I digits are fed into instruction decoder 109 and the instruction decoder delivers only one signal in response to those inputs. As will be later shown, the instruction decoder 109 may have up to one hundred output lines, and in response to the two I digits will select one of these hundred output lines to designate the instruction to be performed. The AU instruction encoder 110 which receives the plurality of lines from decoder 109 is a buffing matrix comprising a plurality of "OR" gates, so that when one of its input lines is activated, a plurality of signals are generated by the AU instruction encoder 110 which are fed into the AU control circuits 130 of the arithmetic unit 131 via gates 132. The AU control circuits 130 comprise generally decoding and encoding function tables of the type well-known in the art (see FIG. 6a and 6b) which receive the I digits or command digits of an instruction word, and control the various elements of the arithmetic unit in accordance therewith.

The function control circuits 148 also receive the outputs of the instruction decoder 109 and included in this function control circuit is an encoding function table and other elements which produce the function table signals designated FT xxx as shall later be described in detail.

The instruction digits in register 107 are thus transferred to two separate control circuits, that is the AU control circuits 130 and function control circuit 148. In time, the I digits are first transferred to the function control circuits 148 which produce all the control signals necessary to operate the apparatus of FIGURE 1. After one minor cycle has elapsed, the function control circuits may produce a FT 300 signal which is applied to gates 132 to thereby allow the encoded instruction from encoder 110 to enter the AU control 130. While this is occurring, other control signals are generated (as shall be shown in connection with FIGS. 2 and 4) by the function control circuits 148 which cause the transfer of a further instruction in register IR–1 to IR–2 (107, 107a and 108).

The register selection comparator 142 receives information on one of its two input lines from two sources. This input line is connected to buffers 149 which in turn are connected at their inputs to gates 145 and 119. One input of gates 119 is connected to the register selector register 118, and these gates transmit the two digits stored in register 118 to the register selection comparator 142. The other input to the register selector comparator 142 via buffers 149 is transmitted via gates 145 and is derived from the B digits stored in the first instruction register 101. It will be appreciated that both gates 145 and 119 are representative of ten gates each and transmit ten bits comprising two digits to the register selection comparator 142. Gates 145 are rendered permissive at a particular point in the computer cycle, and gates 119 are inhibited at this same time, that is rendered non-permissive. The significance of the timing signals shall be explained in connection with the detailed operation of the function control circuits in FIGURES 2 and 4. The data, that is, the two digits transmitted to the register selection comparator 142 via buffer 419 are compared against the two digits stored in selector storage register 113 which are transmitted to comparator 142. If the two digits from the sources just mentioned are equal, then a CAAM equal signal is generated, and if these two digits are not equal, then the CAAL, not equal, signal is generated. The CAAM or CAAL signals are transmitted to the function control circuits 148 and their use shall be explained later.

The register selector comparator 142 will not be described in detail. Devices for comparing decimal values expressed in coded binary form are well known in the art. Such devices are described in the textbook "Arithmetic Operations in Digital Computers" by R. K. Richards. All that is required is that the comparator issue a first signal if the data being compared is equal and another signal if the data being compared is unequal.

The arithmetic unit 131 (FIGURE 1c) receives data to be manipulated from two sources. The first source to be considered is from the main memory. The high speed bus comprising 60 lines connects the memory via gates 146 and the M input register 150 to the AU131. Gates 146 are all activated by FT 370. It will be appreciated that gates 146 shown in FIGURE 1 are representative of 60 gates, and these are all connected to the M input register 150. The M input register is in turn connected to the arithmetic unit 131. Another input to the arithmetic unit 131 may be derived from one of the 100 addressable registers 121 which, on being selected by element 120, transmits its contents to gates 128 (alerted by FT 380). Again, gates 128 are representative of the 60 gates, so that all 12 digits stored in a particular addressable register may be transmitted therethrough. The outputs of gates 128 are fed via buffers 129 and input pulseformers 129A to the input of the arithmetic unit 131.

For certain operations it is necessary to transmit the contents of an addressable register to the arithmetic unit 131 via the M input register 150. When this is the case the contents of the selected register are passed via gates 122 (alerted by FT 425) and buffers 123 to regeneration pulseformers 124 and from pulseformers 124 to the M input register via gates 177 alerted by FT 373.

The output terminal of the arithmetic unit 131 is connected via gates 126 and buffers 123 to the input of the addressable registers 121, so that the results computed by the arithmetic unit 131 may be deposited in a selected one of the addressable registers 121. The selection of the addressable register will be determined by the digits stored in the selector storage 113 acting via register 118 through selector decoder 120. The results computed by the arithmetic unit 131 are in certain instances recirculated to that unit via gates 127 and buffers 129 or via gates 170 and the M input register 150. As will be observed, gates 126 and 127 are controlled by FT 426 and FT 381 respectively while gates 170 are controlled by FT 371. Thus, if the 426 signal is present, the results available from the arithmetic unit 131 will be transferred to one of the addressable registers 121. However, if FT 381 or FT 371 signal is present, the result will be returned for processing directly to the arithmetic unit 131. As shall be seen later, the reason for this option rests in the overlap feature, since at times the instructions to be next executed will call for data presently being computed. When this occurs, the result computed by the arithmetic unit is transferred via gates 126 and buffers 123 to the particular accumulator register 121 selected, and is also transferred back to the arithmetic unit via gates 127 or gates 170.

The addressable registers 121 in addition to supplying data to the arithmetic unit 131 via gates 128, and supplying the least significant five digits of a computer word to the B adder 139 via gates 133, also may have their contents transferred to the main memory via the arithmetic unit and the high speed bus. The addressable registers 121 are connected at their outputs to the M input register 150 via gates 122, buffers 123, regeneration pulseformers 124 and gates 171. In this operation the contents of an addressable register are not altered by passage through the arithmetic unit 131 which for this purpose operates only as a conduit. The output of the arithmetic unit is passed through gates 126, buffers 123 and regeneration pulseformers 124 to gates 125. These latter gates are alerted by FT 352 to pass the contents of the selected addressable register to the main memory via the high speed bus.

It will be observed that the output from regeneration pulseformers 124 is connected back into the addressable registers 121.

This recirculation feature is necessary where, as in this preferred embodiment, the information in an addressable register 121 is destroyed each time it is read out. Thus provisions are made to cause the information read out from an addressable register to be read back into the same register supplying the information.

*General cycle of computer events*

By observing FIGURE 1 in conjunction with the following description, a qualitative understanding of the cycle of computer operation may be had, and with this understanding, the operation and purpose of the various elements in the more detailed drawings will be more readily appreciated. Later in the specification, a more detailed analysis of the computer timing will be made.

The first step in the sequence of computer events is the transmission of the five digits (the value of which is stated to be equal to "N") stored in control counter 104 to one input of the B adder 139 through gates 137. The unit-add signal FT-UA at the carry input 154 to the B adder 139 is usually applied at the same time so that the B adder 139 increments by one the contents of control counter 104. However, on initially starting the computer FT-UA is not generated so that the first instruction called for will be instruction N. The output of the B adder 139 (now N) is transmitted to the address decoder 141, and the address decoder 141 operates to select the contents of the memory location N. The contents of memory location N will be the first instruction to be extracted from the memory and this entire instruction word is carried from the memory over the high speed bus and gates 100 into the first instruction register 101. It will be appreciated that some finite time elapses between that instant when an address is set up in decoder 141 and the time when the contents of the memory address so selected are available on the high speed bus. This interval of time, as before noted, defines the minor cycle period. The minor cycle is divided into eight equal periods and an electronic clock mechanism is employed (see FIG. 2) to generate a pulse for each of these eight periods. These time periods within a minor cycle are referred to as pulse periods $t_0$ through $t_7$.

At the same time as the entire instruction word N is being received by register 101, the two "B" digits of the instruction word N are transmitted directly from the high speed bus via gates 117 into the register selector register 118 thereafter to extract the contents of a thus designated addressable register. At this stage of events, the computer is said to be in the *status one condition*.

The status one condition for each instruction lasts for one minor cycle. During this status one condition, instruction N stored in register 101 will be transferred and modified. In particular the I and A digits of instruction N will be transferred to registers 107 and 107a respectively. The five M' digits of instruction N in register 101 are transferred via gates 136 to one input of the B adder 139. At the same time, the selected one of addressable registers 121 transfers a portion of the data stored therein to the other input of the B adder 139 via gates 133. It will be appreciated that only the five least significant digits of the data in the addressable register selected by the B digit of instruction N need be transferred to the B adder 139. The sum of the five M' digits from instruction N and the five least significant digits from the addressable register selected by the B digits of instruction N are transmitted from the B adder 139 to IR-2 register 108 via gates 105. At the same time as the modified M digits of instruction N are transferred to register 108, they are also fed to the address decoder 141 so that the contents of a memory location so designated may be extracted to yield an operand to be manipulated in accordance with the I digits of instruction N.

After the transfer and modification of instruction N is complete, instruction register 101 is cleared by the application of FT 321. During the same minor cycle of operation (that is, during status one for instruction N) as the aforementioned transfer and modification of instruction N in the B adder 139, the contents of control counter I (now N) are also transmitted to the B adder 139 and incremented by one. The new reading of the control counter will be $N+1$ and this address is transferred via decoder 141 and gates 140 so that the second instruction $N+1$ may be extracted from the memory and deposited in instruction register 101. It will of course be understood that the B adder 139 is time shared, since during the same minor cycle it adds the M' portion of the contents of register 101 to a portion of the contents of an addressable register 121, and also increments the number stored in control counter 1, 104, by one. While these two operations (as well as others yet to be explained) take place in the same minor cycle, it will be understood that they occur at different time periods within the minor cycle. As shall be shown, the B adder 139 increments the control counter reading at time $t_1$ of a minor cycle and performs a modification of the M' digits in instruction register 101 at time $t_6$.

After instruction N is stored in the second instruction register comprising elements 107, 107a and 108, and the succeeding instruction $N+1$ is stored in register 101, the computer is said to be in *status two condition* with regard to instruction N and in the status one condition with regard to instruction $N+1$.

At the beginning of the status two condition, a new instruction, whose location is $N+2$ is called for in the same manner as previously described; namely, the B adder in response to the reading of control counter 104 produces an output incremented by one which is applied to the address decoder 141 of the memory so that the next instruction may be extracted. The new instruction will be deposited in instruction register 101 when instruction $N+1$ is transferred to instruction register 2 (elements 107, 107a, and 108), and instruction N is almost completely executed.

During the status two condition, the two I digits of instruction N are transmitted to the instruction decoder 109 which examines the ten bits comprising these two I digits and in accordance therewith activates one of its 100 output or instruction lines. The selected instruction line of decoder 109 then alerts the elements in the function control circuits 148 to produce the proper function signals, FT XXX so that the control circuits of FIGURE 1 operate in accordance with the given instruction.

Assume that the instruction N (stored in instruction register 2) requires the arithmetic unit 131 for one minor cycle to perform a simple instruction requiring two operands, one from the main memory and one operand from a selected addressable register 121. During status 2 the two operands for the instruction N must be obtained or otherwise be made available. It will be recalled that the location in the memory of the operand required by instruction N was called for by the B adder during status one, that is, when the M digits of instruction N were stored in instruction register 101 and modified by the B adder 139. This operand will be available from the memory and on the high speed bus during the third minor cycle at time $t_7$ thereof of the status two (condition see FIG. 8a).

The status two period lasts for an indeterminate period of time. This is true because the time required to perform the computer operations during status two is a function of the particular instruction being executed, and hence may require a plurality of minor cycles for execution.

In order to extract the contents of the addressable register designated by instruction N, the two A digits of instruction N are transmitted from registers 107a via gates 134 and through the B adder 139 to gates 115 which are in turn connected at their outputs to the register selector 118. When the A digits are transmitted to one input of the B adder 139, another input thereof receives a decimal zero value from zero register 147 so that the addressable register 121 to be selected is determined by the two A digits of the instruction in register 107a (IR-2). Selector register 118 stores the two A digits so that they may be applied to the register selector decoder 120. This decoder 120 selects the particular register 121 as determined by the digits in element 118. The addressable register so selected transmits the word (operand) stored therein through gates 128, buffers 129 and pulse-formers 129a to the arithmetic unit 131.

Two pulse periods after the A digits of instruction N in register 107a are transferred in the afore-described manner, they are again applied to the B adder, 139 together with a decimal zero or one (as the instruction requires) applied to the other input of the B adder. The result of this computation is now applied to the selector storage register 113 via gates 112. These two A digits (sometimes modified) of instruction N are stored in selector storage register 113 until such time as the arithmetic unit 131 has computed a result based on this instruction.

The reason for the two A digits being stored in this manner shall later become apparent, but suffice it to say for the moment, that the instruction N will no longer be available in instruction register 2 (elements 107, 107a and 108) when the result of that instruction is available.

As previously indicated, the instruction decoder 109 selects one of its one hundred output lines to indicate the instruction to be performed in response to the I digits in register 107. These output lines are also applied to the arithmetic unit instruction encoder 110, which generates at its output a plurality of signals, that is, generates a different plurality of signals for each of the hundred lines excited. The instruction signals so generated are transmitted from encoder 110 via gates 132 to the arithmetic unit control circuits 130. There, these signals are stored in a static register so that they may determine the operation of the various elements of the arithmetic unit 131 in accordance with instruction N. Since gates 132 are shown to be under the control of FT 300, it will be appreciated that instruction N in instruction register 2 must first condition the function control circuits 148 before an output from encoder 110 is transmitted to the arithmetic control circuits 130.

Figure 2:
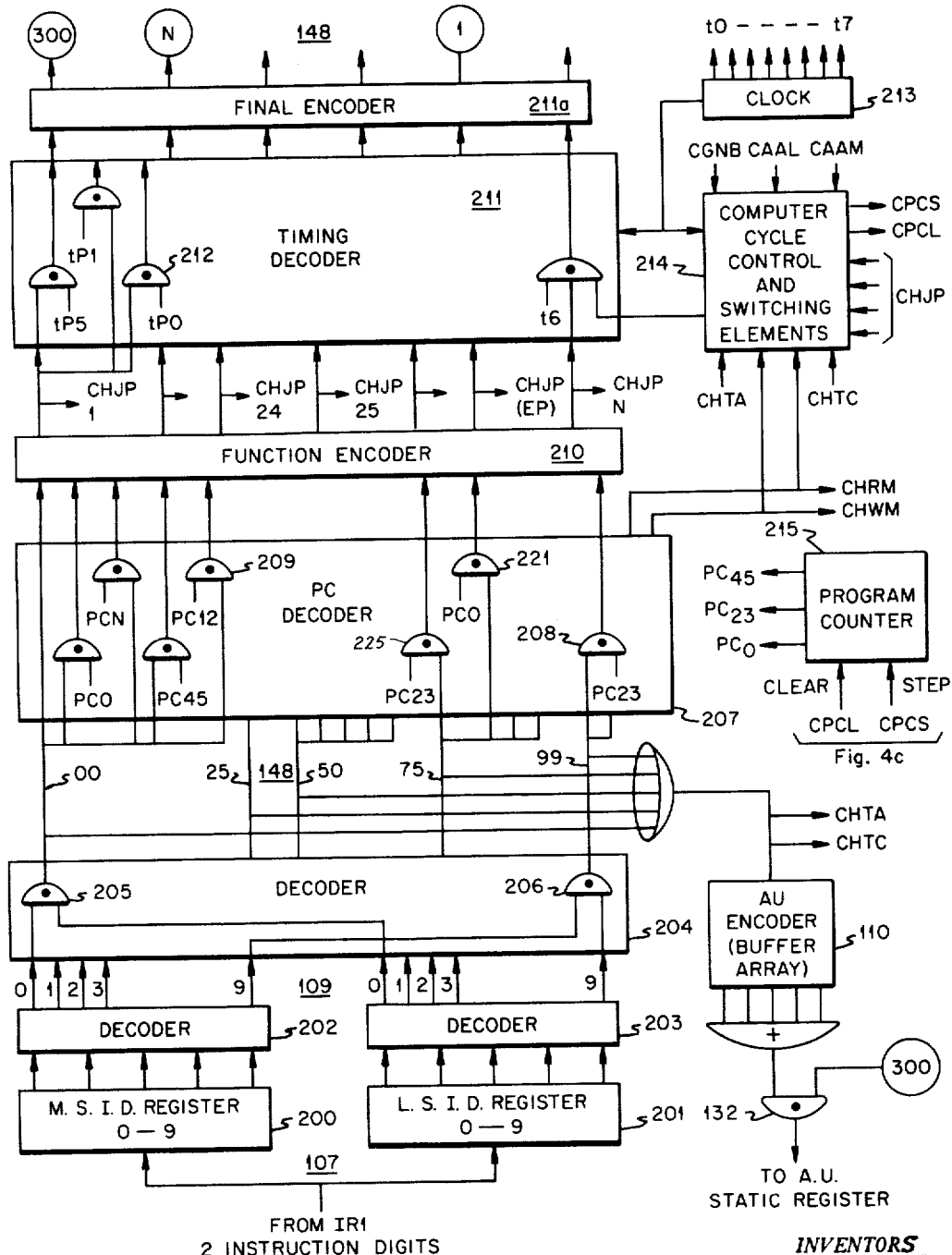

As shall be shown in connection with FIGURE 2, there is provided in the control circuits 148 a device known as a program counter, which is responsive to the instruction N stored in the second instruction register 107. The program counter is a device well-known in the art, and it serves to produce a signal when a given instruction is ending or about to end. That is, one minor cycle before the instruction being executed by the arithmetic unit 131 is to end, the program counter produces an ending signal CHJP (EP) and causes a change of the intermediate signals (CHJP) from unit 148.

The new signals so produced by control circuits 148 initiate the transfer of instruction $N+1$ stored in instruction register 101 to IR-2. The instruction $N+1$, as modified in the manner previously described, appears in the second instruction register comprising components 107, 107a, and 108. In addition, function signals (FT XXX) are generated by function control circuits 148 to allow the data stored in control counter 104 to be incremented by the B adder 139, and applied to the address decoder 141 so that a new instruction $(N+2)$ may be stored in instruction register 101. Accordingly, when one instruction (N) is almost executed by the arithmetic unit 131, a second instruction $(N+1)$ is in the second instruction register comprising elements 107, 107a and 108, and a third instruction $(N+2)$ is stored in register 101, then the computer is said to be in the *status three condition* for instruction N, the status two condition for instruction $N+1$ and the status 1 condition for instruction $N+2$.

Figure 6A:
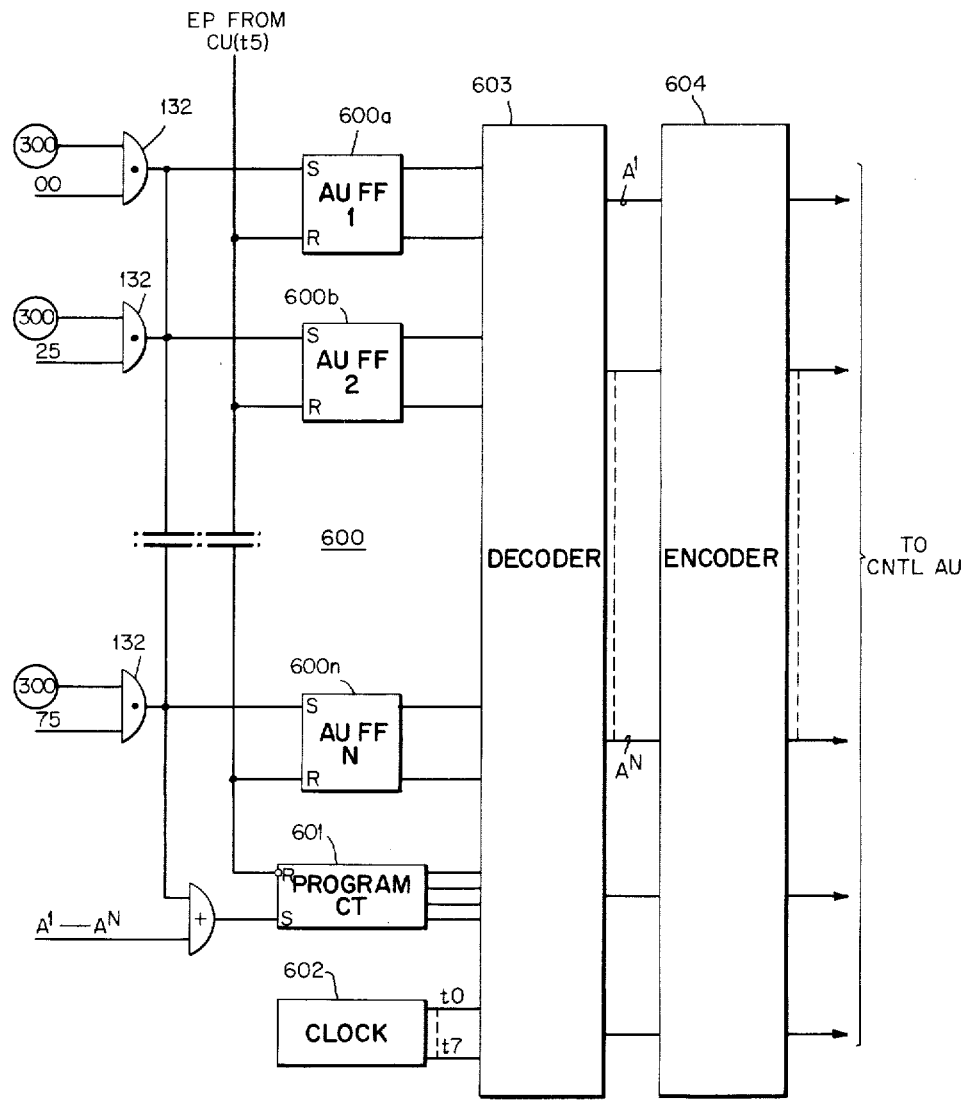
FIGURE 6a is a simplified block diagram of arithmetic control circuits which may be used in conjunction with FIGURE 5.
Figure 6B:
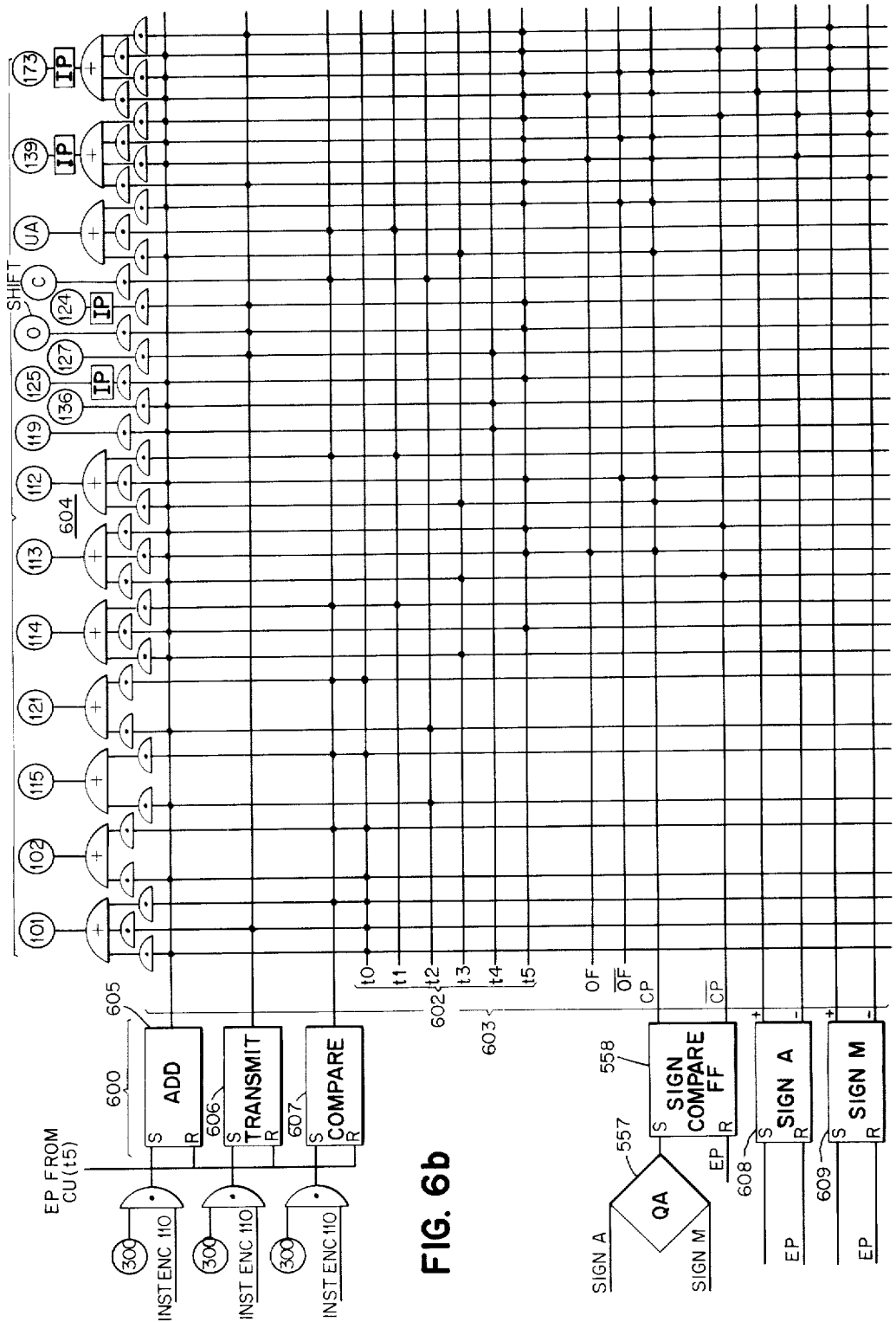

The status three condition lasts for one minor cycle only for a given instruction (N) and at the end of this minor cycle, the result of that instruction is available in the result register of the arithmetic unit (see FIG. 6b). Again, at the beginning of the status three condition, a new instruction $(N+3)$ is called for by the control counter 104.

Providing instruction $N+1$ (now stored in instruction register 2) requires but one minor cycle for its execution in the arithmetic unit 131, then during the status three condition of $N+1$, instruction $N+2$ in instruction register 101, is transferred to instruction register 2, and modified as described above. The I digits of instruction $N+1$ in instruction register 2 are also transferred to decoder 109; the A digits of that instruction are transferred to the selector storage register 113; and the two A digits of instruction N are simultaneously moved out of the selector storage register 113 and applied via gates 114 to the register selector register 118. At this point in the operation, the *status four condition* of the computer is said to exist. With regard to instruction N, the result computed during status three is transferred to an addressable register 121 selected by the A digits of instruction N that were stored in register 113 and transferred via register 118 to the register selector decoder 120 at the end of the status three time for instruction N. The result of the instruction N is transferred from the arithmetic unit 131 to the addressable register 121 via the path comprising gates 126, buffers 123 and regeneration pulseformers 124 during the status four condition.

As shall be seen in connection with FIGURES 4 and 8, the status conditions of this computer are noted by four bi-stable circuits called status 1 flip-flop through status 4 flip-flop.

When status 1 flip-flop is set, it indicates that instruction N is now in IR-1 (Register 101).

When status 2 flip-flop is set, it indicates that instruction N has been moved to IR-2 and is now being executed by the arithmetic unit. The set states of the status 1 and status 2 flip-flops indicates further that instruction $N+1$ is now in IR-1.

When the status 3 flip-flop is set, it indicates that instruction N is still being operated upon by the arithmetic unit, but that only one minor cycle is needed to complete the execution, also the set state of all three status flip-flops indicates that instruction $N+1$ is in IR-2, and instruction $N+2$ is in IR-1.

When the status 4 flip-flop is set, it indicates that the instruction N is over and the result of the computation is being transferred from the arithmetic unit to an addressable register. Also indicated by the combination of all four status flip-flops is that instruction $N+1$ is still being operated upon by the arithmetic unit, but that this order will be finished in one minor cycle. Instruction $N+2$ is in IR-2 and instruction $N+3$ is in IR-1. Thus, when all four status flip-flops are set, the computer is operating on four different instructions at the same time. However, only one of these instructions is actually controlling the arithmetic unit.

It should be noted that when the computer is in full overlap (all status flip-flops are set) for any given set of instructions, the advancement of the computer from the status three condition to status four, occurs after a predetermined time period. That is, after the last minor cycle of the arithmetic unit operation for that instruction, the result will automatically be carried to one of the addressable registers 121. However, the advancement of the computer overlap cycle with regard to the instructions in instruction register 1, 101, and instruction register 2 comprising elements 107, 107a, and 108, as well as, the instruction presently being called for by control counter 1, 104 depends primarily on the generation of an ending signal by the control circuits 148 when the program counter thereof reaches a predetermined condition; i.e. indicates that the instruction presently stored in instruction register 2 is almost executed.

It will be recalled that the addressable registers 121 are used to supply operands and receive results as well as furnishing a modifier for the M' digits in instruction register 101. When operating in full overlap (all status flip-flops set) any or all of the following conditions could occur:

(1) The result being computed and about to be stored by instruction N is the operand called for by the A digits of instruction $N+1$, (2) The result being computed and about to be stored by instruction N contains a modifier to be placed in an addressable register for the M' digits of instruction $N+2$ in instruction register 1, (3) The result which will be computed for the instruction $N+1$ (presently stored in instruction register 2) contains the modifier for the M' digits of instruction $N+2$.

Figure 8A:
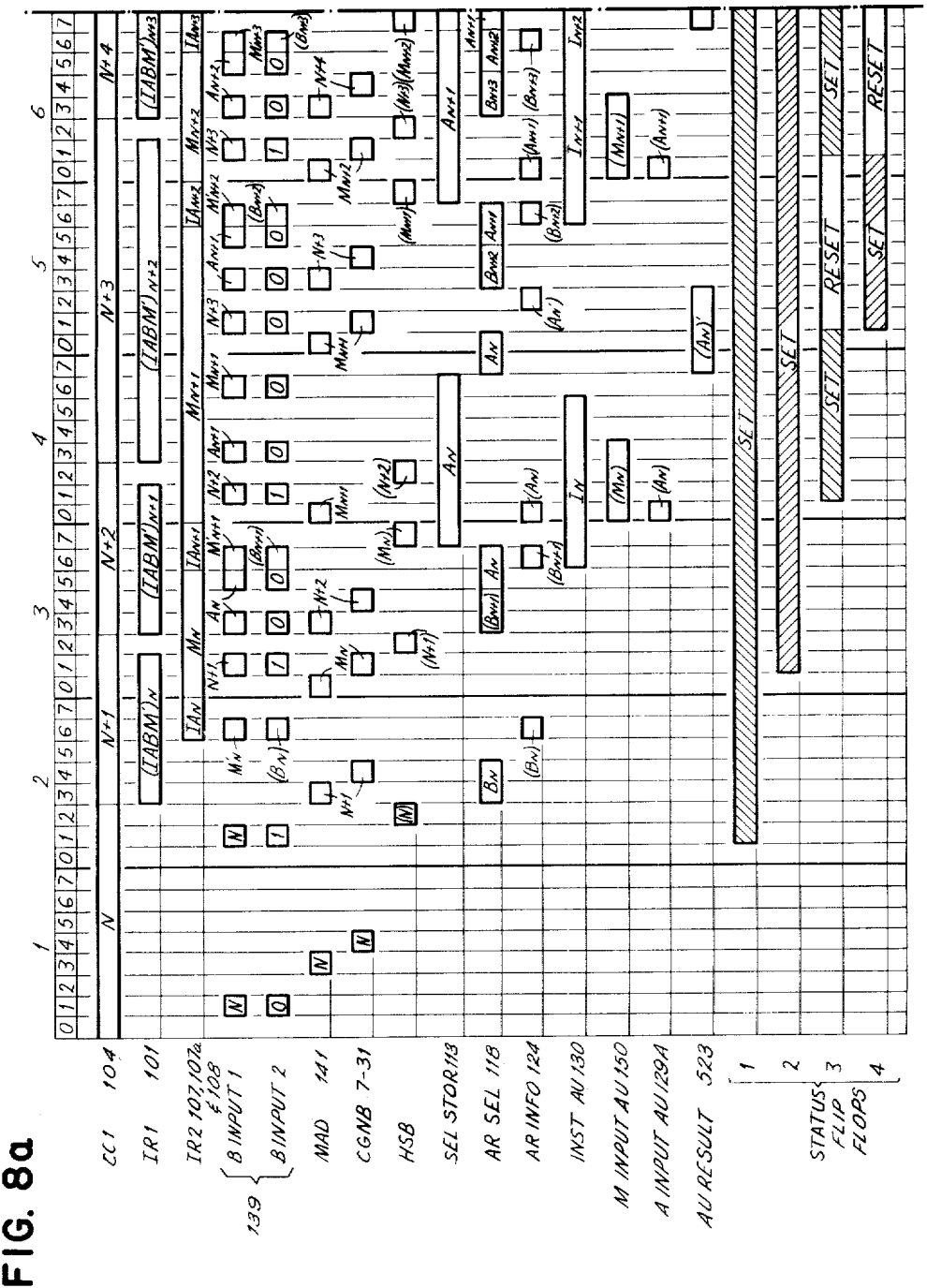
Figure 8B:
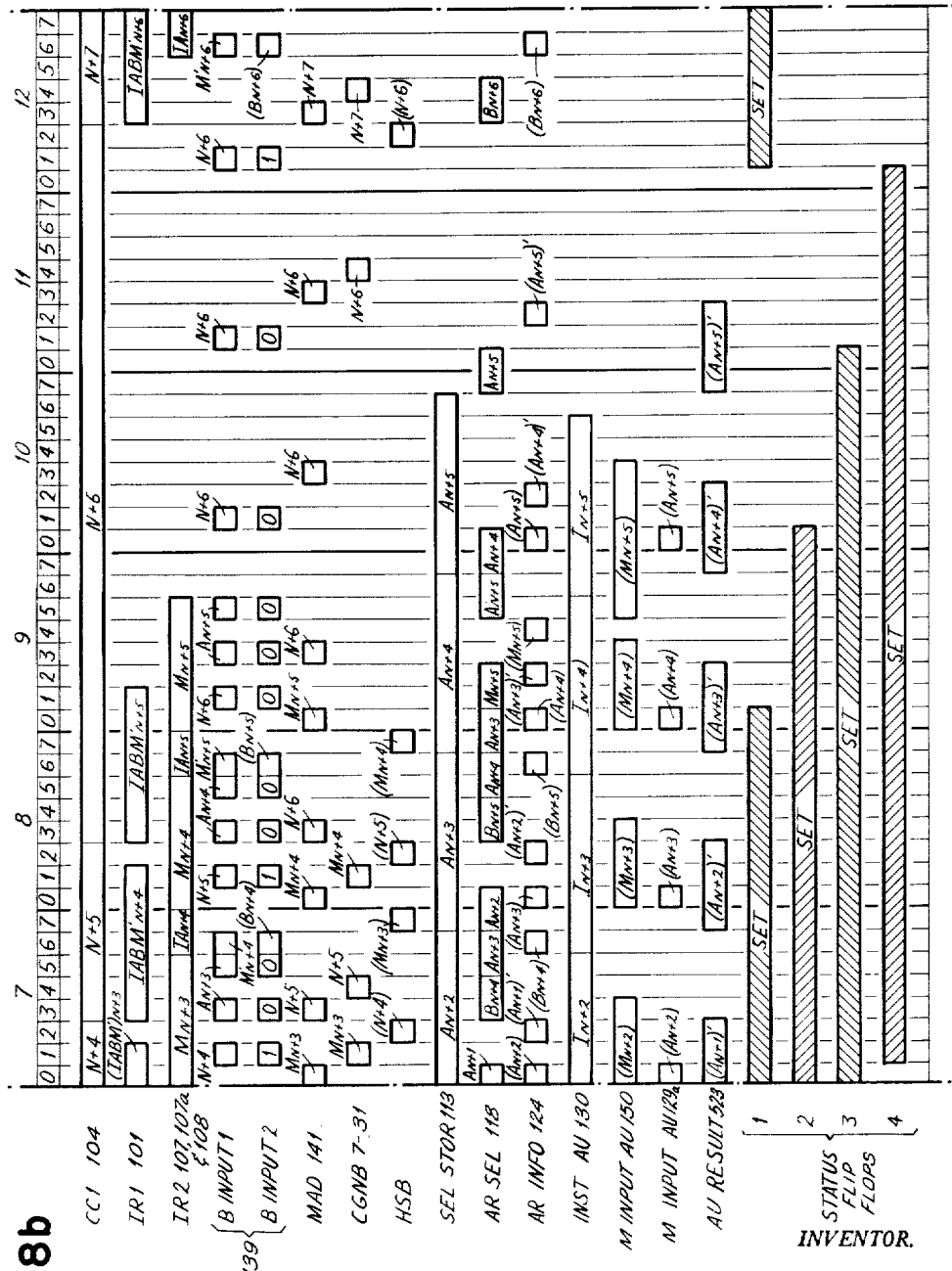
Figure 8C:
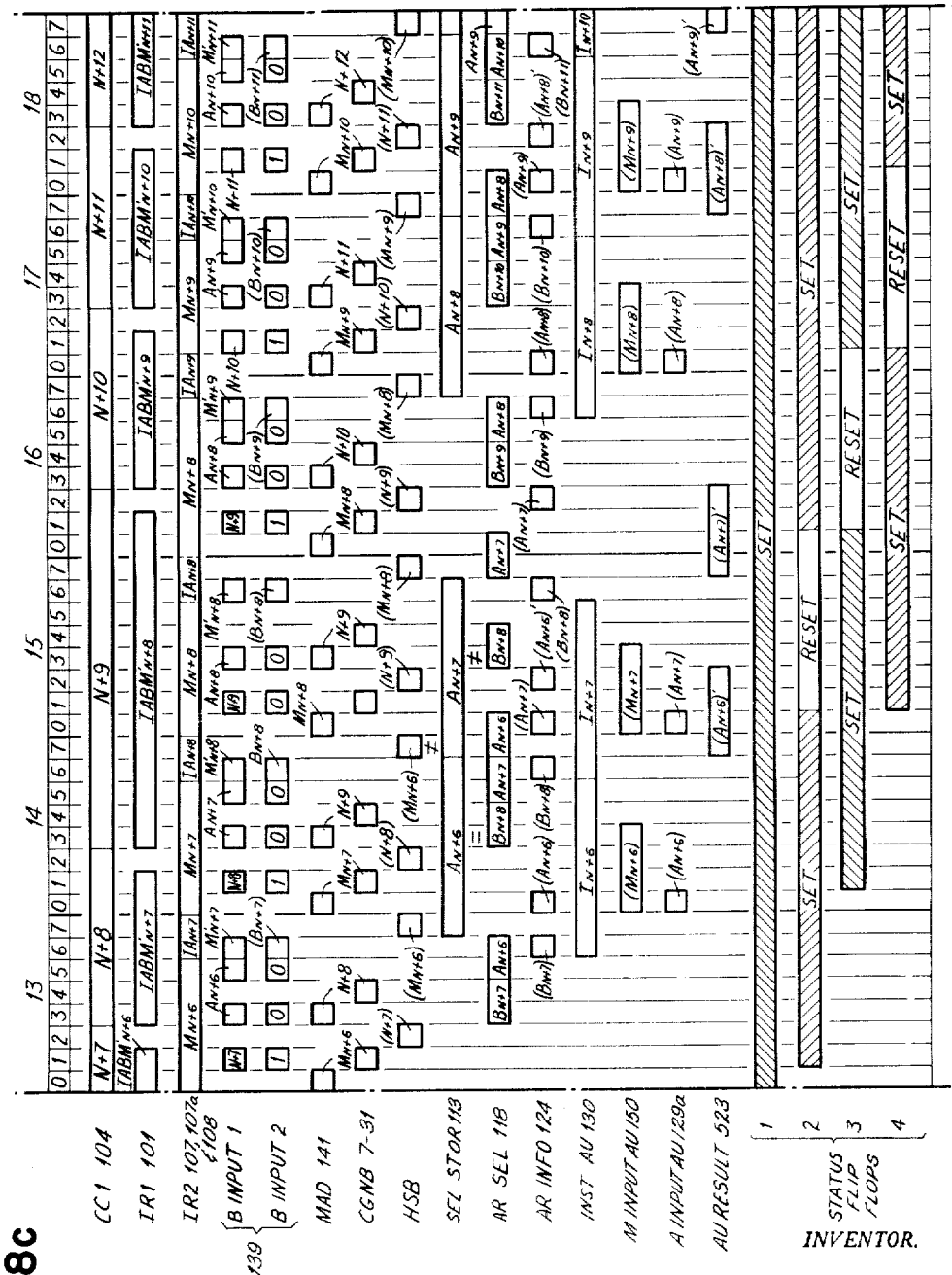
Figure 8D:
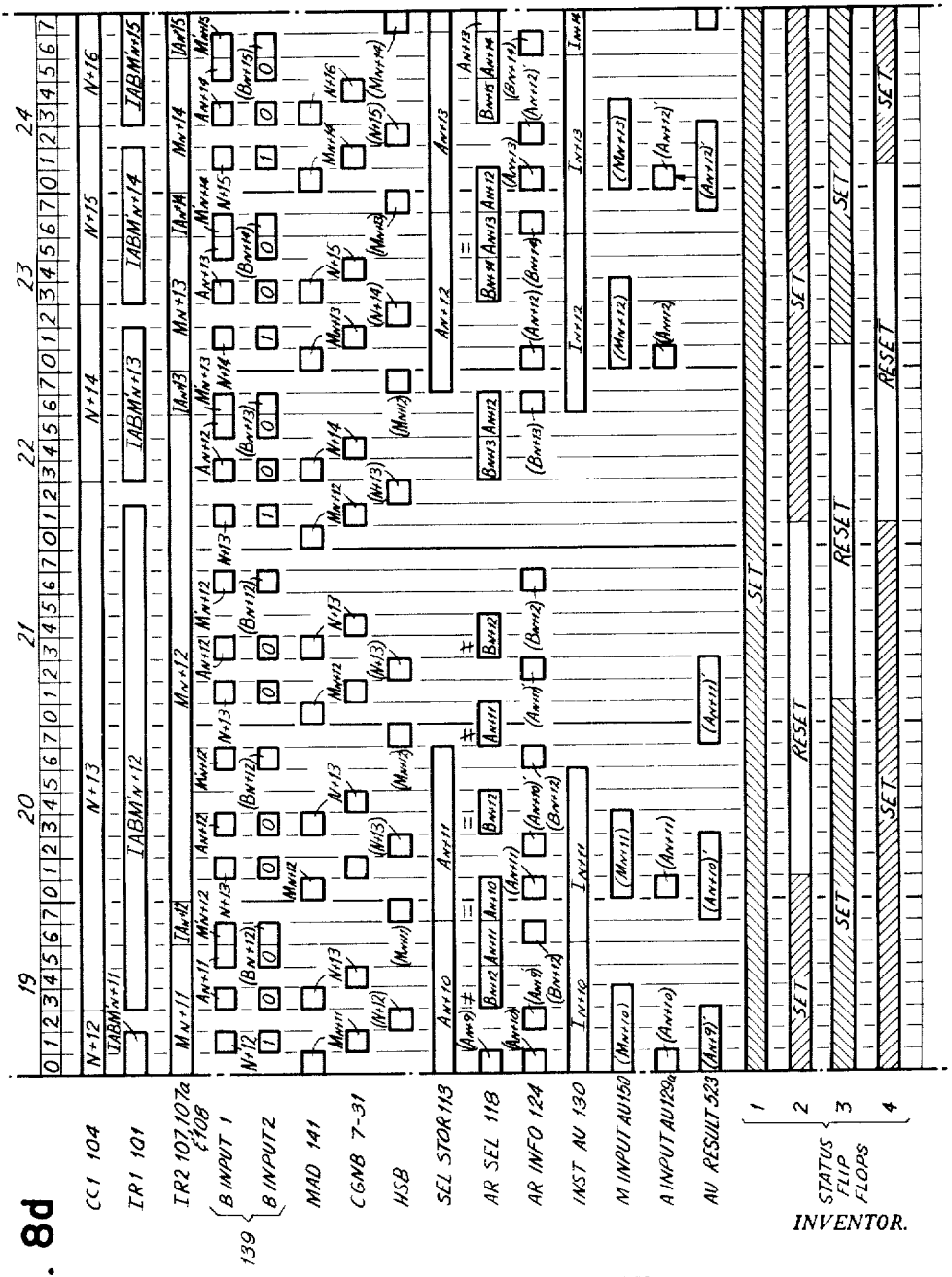

The register selection comparator 142 is used to compare the address of the results stored in selector storage register 113 against the addresses of the operands specified in instruction $N+1$ and the B digits of instructions $N+1$ and $N+2$ when stored in instruction register 1 (see FIGURES 8c and 8d). If the comparison shows that the address of the result is not equal to the address of the operands or the B digits, then the overlap operation goes on without interruption. If the comparison shows equality between the addresses of the result and either of the B digits in instruction $N+1$ or $N+2$, then the overlap operation is modified as shall be explained. However, if the address of the result is the same as the address of the addressable register to supply an operand for the instruction to be next executed, the overlap operation is not modified, and the results being computed are transferred directly back to the arithmetic unit 131 for further processing.

*Basic control circuits*

Refer now to FIGURE 2 which shows a general block diagram of the function control circuits 148 and related equipment.

It will be recalled that the register 107 of the second instruction register which stores the I digits of an instruction word, drives the instruction decoder 109. Register 107 is shown on FIGURE 2 as comprising two sections—a most significant instruction digit register 200 and a least significant instruction digit register 201. As the identifying names imply, register 200 stores the most significant digit of the two I digits of the instruction word, and the register 201 stores the least significant digit. Each of the registers 200 and 201 comprises five elements which may take the form of bistable circuits (each with two outputs) for storing the five bits of a decimal digit. The outputs of each register 200 and 201 are shown (as in the case of FIGURE 1) to be driving instruction decoder 109, which in turn comprises two separate decoders 202 and 203, associated with registers 200 and 201 respectively. Decoders 202 and 203 are gating matrices and upon receiving an input from registers 200 and 201 produce a signal on a selective one of their output lines indicative of the decimal value stored in the aforementioned registers. Since each register 200 and 201 stores five bits representing a decimal digit, it will be understood that decoders 202 or 203 will have ten output lines indicative of values 0 through 9.

The ten output lines from decoders 202 and the ten output lines from decoder 203 in turn drive another decoder 204 which comprises a plurality of coincidence gates—for example 205 and 206. Each of the output lines for decoder 202 and 203 drive ten such gates so that the decoder 204 comprises a hundred gates and has one hundred output lines which are indicated as lines 00 through 99. For example, line 00 as shown is the output line of gate 205 in decoder 204. The inputs to this gate 205 are derived from the lines representing decimal digits 0 from decoders 202 and 203. Other lines 01 to 98 while not explicitly shown would of course be derived from separate gates. Thus, output line 25 would be the output line of a gate (not shown) in the decoder 204 which is driven by a line representing a decimal 2 output from decoder 202 and a line representing a decimal 5 output from decoder 203.

The one hundred output lines from decoder 204 are transmitted to the arithmetic unit encoder 110. In response to the activation of any of the lines 00 through 99, the arithmetic unit encoder 110 which comprises a buffer array of "OR" gates produces signals on a plurality of its own output lines. Each one of the lines 00 through 99 will cause a different plurality of signals to be developed at the output of the arithmetic unit instruction encoder 110. As shown on FIGURE 1 outputs of the arithmetic encoder 110 are applied to the control circuits 130 of the arithmetic unit of the arithmetic unit 131 via gates 132. Certain of lines 00–99 are buffed together to generate signal CHTA and other lines are buffed together to generate signal CHTC. Such signals are necessary when references to the main memory are required as shall be shown subsequently. The lines 00 through 99 from decoder 204 also drive the program counter decoder 207, which again is a gating matrix. As illustrated each one of the lines 00 through 99 may be applied to the input of several different gates in PC decoder 207. Thus the 00 line is shown applied to four gates while the 99 line is shown as being applied to two gates, and line 50 is shown as being applied to five gates, in decoder 207. Each one of the gates in decoding matrix 207 also receives an input from the program counter 215.

The program counter 215 may comprise a plurality of bistable devices which are connected in series such that pulses applied to the input of the first bi-stable device cause various bi-stable elements in the counter to shift state. Such devices are well known in the art and may take the form of a decimal counter as shown on page 24 of the book entitled, "High Speed Computing Devices," published in 1950 by McGraw-Hill Publishing Company, or may comprise a binary counter driving a matrix such as shown in a description of the "Binac" published by the proceeding of the IRE, volume 40, No. 1, January 1952. In any event, the program counter employed accepts step impulses applied from the computer cycle control and switching elements 214 and produces a unique count for each such pulse. In the present invention the program counter produces outputs representative of counts 0 through 45. Thus, after receiving 45 input pulses (CPCS) from elements 214, the program counter output line PC 45 will be activated, and after receiving 23 input pulses, program counter line PC 23 would be activated. The step pulses for the program counter 215 are produced in response to other signals developed by other portions of the function control circuits 148 shown in FIG. 4 in combination with pulses $t_5$ from the clock 213. The control of the program counter will be described in conjunction with the detailed description of FIG. 4.

The output lines from the program decoder 207 drive a buffer matrix or encoder 210, such that each output line from the program decoder 207 when alerted, causes encoder 210 to produce a plurality of intermediate signals labeled CHJP–1 through CHJP–N. Additionally signals CHRM and CHWM are derived from certain output lines of PC decoder 207 and these signals as shall be shown subsequently are required for instructions which employ the main memory.

Each of the CHJP output lines from encoder 210 is connected to the timing decoder 211 which also comprises a gating matrix comprising a plurality of coincidence gates, e.g. gate 212. Each of the CHJP lines may be connected to a different number of gates such that CHJP line 1 is connected to the input of three gates and CHJP line 25 may be connected to the input of four or five gates (not shown). The gating elements within timing decoder 211 may receive other inputs, one of these other inputs being derived from the clock 213 which has eight output lines labeled $t_0$ thorugh $t_7$. Pulses are produced by the clock 213 on each of its output lines once during each minor cycle.

It will be observed that the gates in decoder 211 may also be controlled by the output of the block 214 labeled computer cycle control and switching elements. Block 214 (shown in detail in FIGURE 4) in response to CHJP signals as well as the CHTA, CHTC, CHRM and CHWM signals previously mentioned and the CGNB signal from the memory also controls some of the gates in decoder 211. The CGNB signal is derived from the memory (see FIG. 7) and will be explained in connection therewith. The presence of this signal indicates that data sought from the memory will presently be obtained. This block 214 represents a plurality of gates and switching elements. Each of the gates of decoder 211 are connected to the final encoder 211a, which is a matrix comprised of "OR" gates. In accordance with the description above on encoders and decoders, it will be understood that each output line from decoder 211 will in turn cause a different plurality of output lines of encoder 211a to be excited. The outputs of encoder 211 are referred to as function table signals and indicated as FT XXX. These signals control the computer elements of FIGURE 1 with the exception of the internal circuits of the arithmetric unit 131 for which further control circuits are provided as shown in FIGURE 6.

The program counter 215 is controlled by signals CPCS (step) and CPCL (clear) derived from cycle control elements 214. When an instruction stored in register 200 and 201 is of the type requiring the arithmetic unit 131 for a plurality of minor cycles, the encoder 210 will generate the CHJP lines necessary to step the program counter 215 via elements 214. Briefly this will occur as follows: Assume that the two digits stored in registers 200 and 201 (i.e. in the second instruction register) indicate an order, for example a multiply order, requiring the use of the arithmetic unit 131 for a plurality of minor cycles. The order stored in registers 200 and 201 will be decoded by decoders 202, 203, and 204, whereby one of the gates in decoder 204 will produce an output on one of the lines 00 to 99, for example, the 75 line. The selected output line, that is the 75 line, from decoder 204 in addition to being transferred to the arithmetic unit encoder 110 will drive selected gates in program counter decoder 207. One of these gates, for example, gate 221, selected by the 75 line will also be alerted by the PC 0 output from the program counter 215; the PC 0 output indicating that the program counter 215 is in its cleared state. Gate 221 will pass a signal into the encoder 210 which in turn generates signals on a selected plurality of CHJP lines. The number and grouping of the CHJP lines so excited will naturally depend upon which of the gates in decoder 207 produce an output. In any event, the CHJP lines excited in response to the order stored in instruction register 2 (registers 200 and 201) will be applied to further elements of block 214 as shown in detail on FIG. 4c. Signal CPCS from elements 214 steps the program counter 215 to a count of PC 1.

If the instruction stored in registers 200 and 201 requires more than one program step for its execution, the CHJP signals generated by such instruction will actuate the apparatus as shown in FIGURE 4c to generate repeatedly the CPCS stepping signal until such time as the CHJP (EP) ending signal is finally generated. When this finally occurs the CPCL program counter clear signal will be generated via a chain of logic to be discussed subsequently. For instructions requiring a number of minor cycles for execution, once each minor cycle, the program counter will produce a new output, stepping from program counter output 0 to program counter output 45 for the longest instruction performed. Each time the program counter changes state, it will be understood that new signals will be developed by the PC decoder 207 and hence new CHJP signals will be developed by encoder 210.

As was pointed out earlier, the program counter output lines PC 0 to PC 45 are connected to various gates in program decoder 207. Depending on which instruction is in instruction register 2, one of the gates in decoder 207 will emit an ending pulse signal, CHJP (EP) when the program counter 215 reaches a predetermined count. Thus, when the 75 line (output of decoder 204) is energized in response to a given instruction, gate 225 in decoder 207 will generate a signal when the program counter 215 reaches a count of PC 23. The output of gate 225 drives encoder 210 such that the CHJP (EP) line is energized. Thereafter the CPCL signal will be generated by cycle control elements 214. The CHJP (EP) signal is also applied therefore after one minor cycle to the arithmetic unit 131 to clear the registers thereof so that it may be ready for a new operand and a new instruction.

It will be appreciated that the two I digits are stored in registers 200 and 201 in static form, and the contents thereof do not change until these registers are cleared and a new pair of instruction digits from the next instructions are read therein. Consequently while a given pair of instruction digits are in registers 200 and 201, the line excited by decoder 204 will not change. However, the outputs generated by the program counter decoder (PC) 207 in response to the selected output line from decoder 204 will change as the program counter 215 steps in the manner previously indicated. Therefore the output of decoder 207 can change after every minor cycle of computer operation, and in consequence thereof, the CHJP lines activated may also change every minor cycle.

Since the gates in the timing decoder 211 are controlled both by the CHJP lines and the timing pulses from the clock 213, the various output lines from decoder 211 may last for only one pulse time. The final encoder signal lines FT XXX which are produced in response to signals from the timing decoder 211 will likewise last only one pulse time.

The control circuits of the type just described are well known in the computing arts, and it is not deemed necessary to show a more detailed analysis of elements 200 through 210. It should be clear to those skilled in the computer art that any group of CHJP signals from encoder 210 may be produced according to the instruction digits stored in registers 200 and 201. Thus, if the digits in register 201 and 200 indicate an add order, it will be understood that the proper CHJP signals will be produced in accord therewith.

Figure 3:
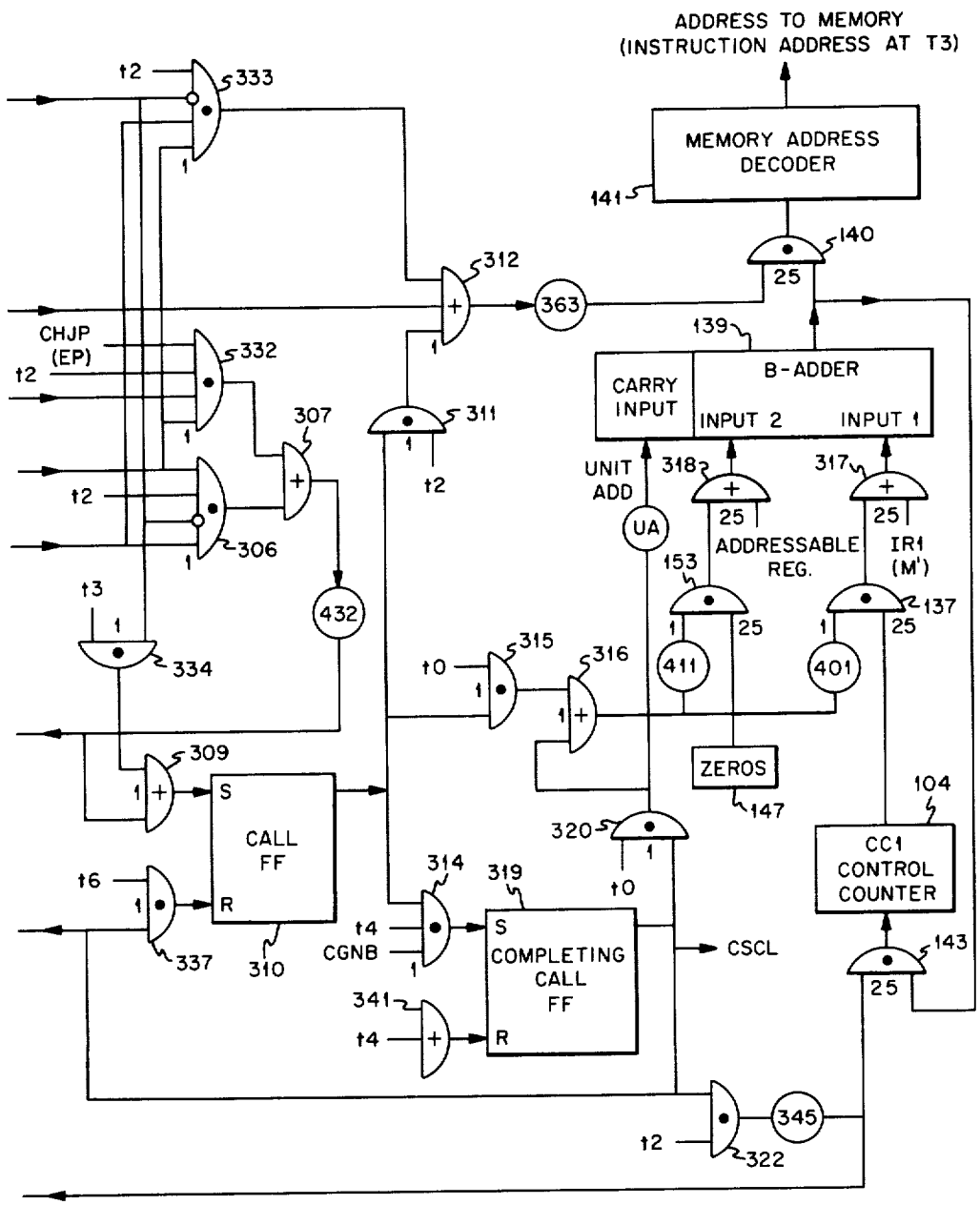
Figure 3A:
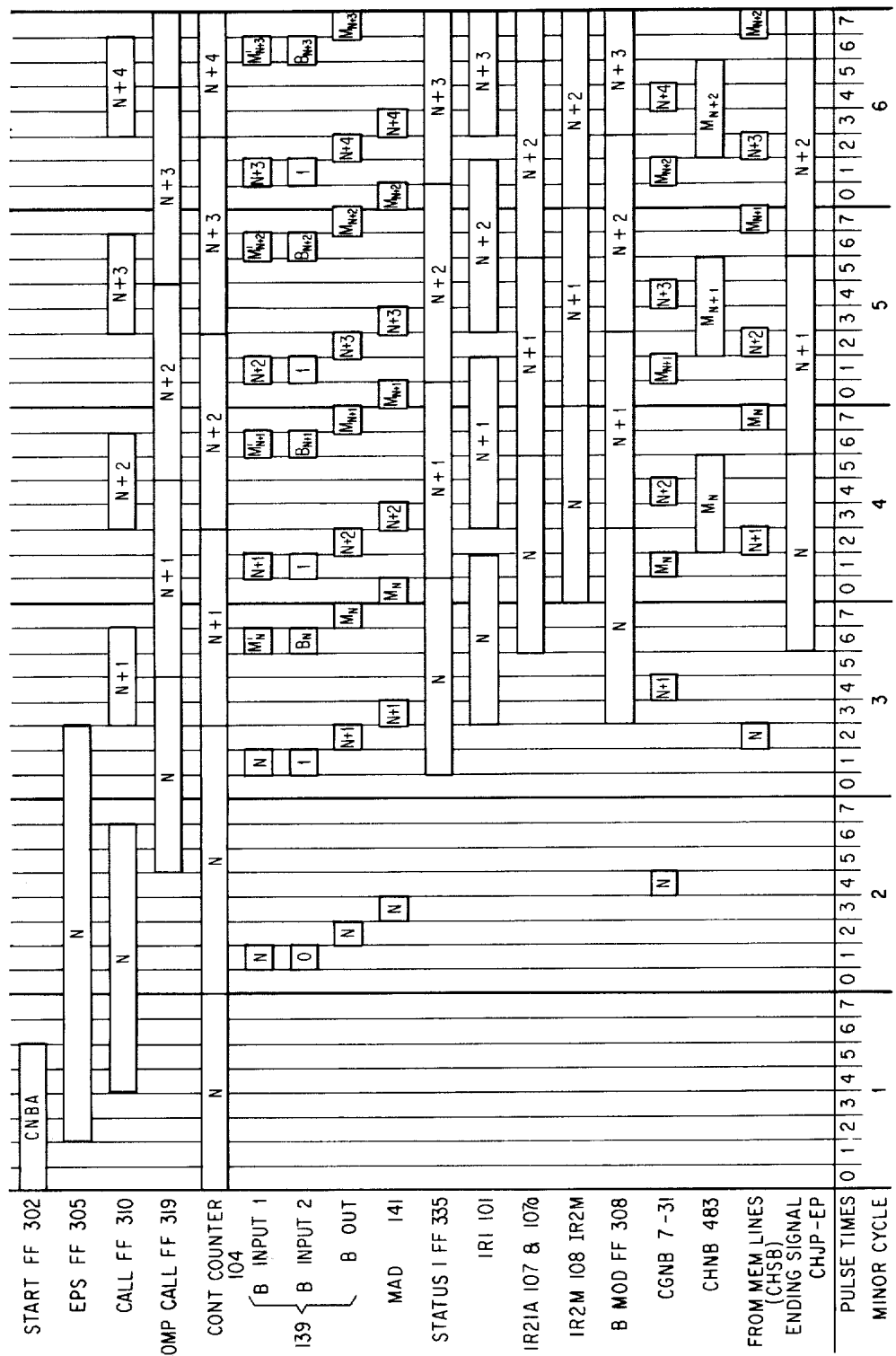

Refer now to FIGURE 3 (Pt. 1 and Pt. 2) which shown in block diagram form apparatus for starting the computer and initiating the overlap operation as well as FIG. 3a which is a timing diagram illustrating initiating overlap. Many of the elements shown on FIG. 3 are found in the computer cycling elements 214 of FIG. 2 and are shown in greater detail on FIGURE 4. Timing diagram 3a to which reference is also made shows in detail the operating cycle for the various elements of FIGURE 3. Certain of the outputs for the gates or buffers shown in FIGURE 3 are labeled with numbers or letters in a circle (for example the output of buffer 312 is characterized by the following symbol 363). Where this occurs it indicates the gate or buffer is part of the control circuits 149 shown in more detail in FIG. 4 and produces the FT signal indicated.

In viewing the timing diagram of FIGURE 3a, as well as the remaining timing diagrams of FIGURES 8, 9, etc., it should be noted that in general a flip-flop or a register produces an output one pulse period after receiving an input. Thus, for example, the call flip-flop 310 is shown in FIGURE 3a (first minor cycle) as producing a set output beginning at time $t_4$, although it received a set input at time $t_3$. This is because the flip-flops and register comprising flip-flops have a one pulse period delay. Similarly, the memory address decoder 141 receives an input at time $t_2$ (via gates 140) but because of the delay inherent in the decoder and the transmission lines to the memory an output applied to the memory is not available till one pulse period later. Further, the lines B input 1 and B input 2 indicate the condition of the pulse formers at the input circuitry of the B adder 139. Thus, inputs to the B adder 139 are applied to the gates (see FIG. 1b) at the input of the B adder one pulse period earlier than that shown on the timing diagrams for the lines B input 1 and B input 2. The output of the B adder 139 (the line marked B out) indicates the condition of the pulse formers at the output of the B adder 139.

The first thing to be accomplished is the extraction of an instruction from the memory, the address of which has been previously stored in control counter 104 (FIG. 1a). Thereafter, instructions are to be extracted in sequential order and the overlap operation is to be maintained.

*First minor cycle of operation*

The computer is started by depressing switch 300 which allows a signal pulse device 301 to transmit the first $t_7$ pulse it receives from the clock 213 (FIG. 2). Single pulse device 301 is connected to the set input of the start flip-flop 302 so that this flip-flop produces an output at time $t_0$. Start flip-flop 302 is reset at time $t_5$ by an appropriate pulse from the clock 213. The set output of the start flip-flop 302 is connected to an input of each of gates 303 and 334 and also places inhibit signals on each of gates 333 and 306. Gate 303 is connected to the $t_1$ output of the clock 213 and gate 334 is connected to the $t_3$ output of the clock 213. The output of the gate 303 is connected through buffer 304 to the set input of ending pulse storage flip-flop 305 and gate 303 transmits a pulse at time $t_1$ to the input of flip-flop 305 so that this flip-flop produces a set output at time $t_2$.

The output of gate 334 is connected through buffer 309 to the set input of call flip-flop 310. With the start flip-flop 302 set, gate 334 transmits a signal at time $t_3$ causing the call flip-flop 310 to produce a set output at time $t_4$. The set output of the call flip-flop 310 is connected to the inputs of gates 311, 314 and 315. These gates receive respectively from the clock 213 the $t_2$, $t_4$ and the $t_0$ signals. Additionally gate 314 receives the CGNB signal from the memory, indicative of a successful memory call.

*Second minor cycle of operation*

At time $t_2$ (second minor cycle of operation) gate 311 transmits a signal which is applied to the input of buffer 312. This buffer is in turn connected to the input of gates 313 which also receive the outputs of the B adder 139.

With the call flip-flop 310 set, gate 315 transmits a signal via buffer 316 at time $t_0$ which is applied to gates 153 and 137. Gate 315 is part of the timing decoder 211 (FIG. 2), which acting through encoder 211a (FIG. 2) generates signals FT 401 and 411 (see FIG. 4). The FT 411 signal and the FT 401 signal are applied to gates 153 and 137. Gates 137 are also connected at their inputs to the outputs of the control counter 1 (104) so that when the FT 401 signal is generated, the contents (five digits) of the control counter are transmitted through gates 137. The gates 137 are connected to the inputs 1 of the B adder 139. Gates 153 when alerted by the FT 411 signal transmit the coded equivalent of decimal zero from register 147 to the second input of the B adder 139. Register 147 stores permanently the decimal zeros derived therefrom. The B adder 139 is provided with pulseformers both on its input and output lines and receives the decimal equivalent of zeros and the contents of the control counter 104 so that at time $t_1$ the value zero from register 147 and the contents of the control counter are set up in the pulse formers at the input of the B adder 139. The B adder 139 thereafter delivers an output at time $t_2$. The output of the B adder 139 at this time represents the address in the memory of the first instruction (N) to be extracted. This output is transmitted via gates 313 and decoder 141 to the address lines of the memory whereafter the contents of the address specified are read out of the memory. Gates 313, it will be recalled, are alerted at time $t_2$ by the output of buffer 312 so that a call for instruction (N) can be made.

After the memory is successfully addressed, the CGNB signal is generated at time $t_4$ (see FIGURE 7b) and is applied to gate 314 together with the set output of the call flip-flop 310 and the $t_4$ output of the clock 213. In response to these signals, gate 314 transmits a pulse to the set input of the completing call flip-flop 319. The completing call flip-flop 319 produces an output at time $t_5$ labeled CSCL which is applied as a permissive signal to gates 320, 322, and 324.

In addition the output of the completing call flip-flop is applied to the reset input of the call flip-flop 310 through gate 337 which also receives a $t_6$ timing signal from the clock 213. Consequently, at time $t_7$ the call flip-flop is in its reset condition.

It should be noted that the completing call flip-flop 319 receives a $t_4$ signal (every minor cycle) from the clock 213 on its reset input and that this flip-flop will be reset at time $t_5$ if gate 314 does not pass an output at time $t_4$ to the set input thereof.

Third minor cycle of operation

Gate 320 receives the $t_0$ output from the clock 213 together with the set output of completing call flip-flop 319. Therefore at $t_0$ this gate transmits a signal via buffer 316 to generate FT 411 and FT 401 signals which are applied to gates 153 and 137. The output of gate 320 is also applied to the carry circuits of the B adder 139, so that a decimal one is added to whatever is being entered into the B adder 139 via buffers 317 and 318. Thus the contents of the control counter 104 are incremented by one every minor cycle as long as the completing call flip-flop 319 is set. The output of the B adder 139 is returned to the control counter 104 via gates 143 and is transmitted via gates 313 to decoder 141 at time $t_2$ (third minor cycle) to select the second instruction ($N+1$) in the memory.

In order for the incremented output of the control counter 104 to be applied to the address lines of the memory, gates 313 must be rendered permissive in the third minor cycle. The completing call flip-flop 319, when set (second minor cycle), produced an output at time $t_5$ labeled CSCL which is applied inter alia to gates 322 and 324. Gate 322 is rendered permissive by CSCL to pass a $t_2$ pulse from the clock so that at time $t_2$ in the third minor cycle gate 322 generates signals (FT 345 and FT 320) which are applied respectively to gates 143 at the input of control counter 104 and gates 100 at the input of instruction register 101. The signal from gate 322 (FT 345) applied to gates 143 allows the B adder output (incremented contents of the control counter) to be returned to the control counter 104, and the 320 signal also generated by gate 322 applied to gates 100 allows the instruction (N) extracted from the memory to enter instruction register 101 from the high speed bus (HSB).

The CSCL signal is applied to gate 324 the output of which is connected to the set input of status 1 flip-flop 335. Gate 324 also receives the $t_0$ signal from the clock so that this gate passes a signal at time $t_0$ (third minor cycle) to set the status 1 flip-flop 335. Gate 324 may be inhibited by a CSBG signal (not shown on FIG. 3) which will be discussed later. The status 1 flip-flop 335 produces a set output CQBA at time $t_1$ in response to the signal applied to gate 324. As previously indicated the setting of the status 1 flip indicates that the call for instruction in the memory has been satisfactorily executed and that the called for instruction will be stored in IR-1 (101). It will be appreciated that gates 100 are not rendered permissive by the FT 320 signal until time $t_2$, and accordingly IR-1 which contains pulseformer devices will not be set up until time $t_3$.

The output CQBA of the status one flip-flop 335 is applied as a permissor to the inputs of gates 332, 306 and 333. For the present, only gates 306 and 333 will be discussed.

Gate 333 receives at its inputs in addition to the status 1 signal (CQBA), the set output (CSAR) of the ending pulse storage flip-flop 305 and the $t_2$ signal from the clock 213. As discussed hereinafter gate 333 is inhibited by a set output from start flip-flop 305. See discussion of FIG. 4 infra. It will be recalled that the ending pulse storage flip-flop 305 was previously set by the start signal, and hence at time $t_2$ (third minor cycle) after the status one signal was produced, gate 333 yields an output signal. The output of gate 333 is connected to the input of buffer 312 which in turn produces (at time $t_2$) as before noted, the signal, FT 363. The FT 363 signal is applied to gate 313 along with the output of the B adder 139 and acts as a permissive signal so that the memory may be addressed and the second instruction $N+1$ may be extracted therefrom.

Gate 306 receives at its inputs the same signals as previously described in connection with gate 333. The output of gate 306 is connected via buffer 307 (which produces signal FT 432) to the reset input of the ending pulse storage flip-flop 305 and through buffer 309 to the set input of the call flip-flop 310; and to the set input of the B Mod flip-flop 308. Consequently, at time $t_2$ of the third minor cycle, the call flip-flop again receives a set signal and the B Mod flip-flop 308 receives a set signal for the first time. Unless the B Mod flip-flop 308 again receives a set input signal at time $t_2$ of the next minor cycle, a $t_2$ pulse applied to the reset input of this flip-flop causes the output of this flip-flop to be terminated at time $t_3$ of the next minor cycle (4).

When the second instruction ($N+1$) is successfully called from the memory, a CGNB signal is again generated at time $t_4$ so that the completing call flip-flop remains in its set condition and in consequence thereof, and the status 1 flip-flop 335 will be caused to remain in its set condition. As before noted, the completing call flip-flop 319 causes the FT 320 signal to be generated via gate 322 which is applied to the input of gates 100 and IR-1 (101) so that instruction $N+1$ may be gated into IR-1 at time $t_2$ of the fourth minor cycle.

The setting of the B Mod flip-flop 308 allows the first instruction N stored previously in IR-1 to be moved to IR-2 (107, 107$\alpha$) and to have the M' portion of the first instruction modified via the B adder 139. The set output of the B Mod flip-flop 308 is connected to one input of gate 335$a$ which also receives the $t_5$ signal. Gate 335$a$ is responsible for the generation of the FT 312 signal which is produced at time $t_5$ and is applied to gates 102 and 103 interposed between the instruction registers 1 and 2. Consequently, when the B Mod flip-flop is set and at time $t_5$, the I and A digits of IR-1 (in particular the I and A digits of instruction N) will be transmitted through gates 102 and 103 to IR-2 (registers 107 and 107$a$, see FIGURE 1).

Fourth minor cycle of operation

In the fourth minor cycle of operation at time $t_0$, gate 320 transmits a signal in response to the set output of the completing call flip-flop 319, and the $t_0$ signal so as to again produce the FT 411, FT 401 and the unit add signals. These function table signals (FT signals) allow the contents of the control counter 1 to be incremented by one by the B adder 139. The output of the B adder 139 is returned to the control counter 104 which now stores the address of the third instruction ($N+2$). This address is also transmitted by the B adder through gates 313 to decoder 141 in an attempt to address the memory. Gates 313 are rendered permissive at this time by the FT 363 signal which is generated by gate 330 as explained below. The completing call flip-flop 319 as previously explained causes the extraction of the second instruction $N+1$.

It will be recalled that the I and A digits of the instruction N were stored in IR-2 at $t_6$ during the third minor cycle of operation. The I digits are transferred in coded form to the arithmetic unit control circuits and to the control circuits 148 (FIGURE 2) which produce inter alia the CHJP (EP) signal.

The CHJP (EP) signal is applied to gate 330 along with the $t_2$ timing signal and the output of the memory not busy flip-flop 331. The flip-flop 331 is controlled at its set input by the output of buffer 329 which is in turn connected to the outputs of gates 328 and 327. Gate 328 receives a $t_1$ signal from the clock, the CGNB signal and CHTA signal which is generated by the circuits 148 (in particular decoder 204, FIGURE 2) for every instruction requiring an operand from the memory. Consequently, if the memory not busy signal (CGNB) is produced at time $t_1$ (indicating that an operand has been successfully called from the memory) the gate 328 causes flip-flop 331 to be set and to produce a set output beginning at time $t_2$.

Certain instructions require a setting of the memory not busy flip-flop 331 even though no operand is actually called from the memory. Accordingly gate 327 is provided as a further source of inputs to buffer 329 and is in turn enabled by the output of buffer 339. The various inputs to buffer 339 will be discussed subsequently in connection with FIGURE 4.

Gate 330 is connected at its output to the buffer 312 which, as before noted, produces the FT 363 signal to allow the output of the memory address decoder 141 to address the memory. The 363 signal produced by the output of buffer 312 is applied as previously to gate 313 so that the third instruction ($N+2$) may be extracted from the memory.

Gate 332 is controlled by the $t_2$ timing signal, the CHJP (EP) signal, the set output of the operand memory not busy flip-flop 331 and set output of the status one flip-flop 334. If overlap is to be maintained, all the inputs to this gate 332 must be present, so that this gate can produce an output which is coupled to the buffer 307 to produce the 432 signal. As noted before the FT 432 signal sets the call flip-flop 310 via buffer 309 and sets the B Mod flip-flop 308.

The B Mod flip-flop 308 causes Function Table signal 312 to be produced via gates 335 so that the instruction $N+1$ may be gated from IR–1 to IR–2 at time $t_5$ of the fourth minor cycle. At this time the encoded I digits from instruction N in IR–2 are gated to the static register 600A–600N of the Arithmetic Unit 131 (see FIG. 6a).

The completing call flip-flop 319 acting through gates 322 produces at time $t_2$ FT 345 and 320 whereby control counter 104 may receive increments via gates 143, and instruction register 101 may receive from the memory instruction $N+2$ in the fifth minor cycle.

The status 1 flip-flop will again remain set for instruction $N+2$ (now in IR–1) in response to CSCL on gate 324.

The operands for instruction N are set up in the respective AU input registers at time $t_0$ of minor cycle five and at time $t_7$ thereof the result of instruction N is available (assuming a one minor cycle operation).

Thus, at the completion of minor cycle five, the following operations have been accomplished.

Instruction N is completed.
Instruction $N+1$ is in the Arithmetic Unit.
Instruction $N+2$ is in IR–2 and IR–1.
Addressing of $N+3$ has been completed.
Completing Call flip-flop for $N+3$ has been set.
B Mod flip-flop set by $N+1$ for $N+2$, is still set.
Status one for $N+2$ is still set.

At this time the computer will be in full overlap operation and the sequencing of the various operations will follow as indicated hereinabove. A detailed account of overlap and the various contingencies which may arise to interfere therewith is reserved for discussion in connection with FIGURE 4 and the various timing diagrams, FIGURES 8–12, inclusive.

Refer now to FIGURE 4. FIGURE 4 is composed of six portions indicated on the drawings themselves as FIGURES 4a–4f, and should be assembled as indicated on FIGURE 4a. FIGURE 4 is a detailed showing of the control circuits as shown by block 148 on FIGURE 1 and more particularly the timing decoder 211 and the computer cycle control and switching elements 214 of FIGURE 2. The final encoder 211A of FIGURE 2 is not shown in detail in FIGURE 4 but the outputs to be obtained therefrom which comprise the various function table signals used throughout FIGURE 1 are indicated in the right hand portion by encircled designations. The final encoder comprises a buffing or encoding matrix by means of which a single input thereto may result in one or more outputs therefrom.

FIGURE 4 includes, of necessity, the various control elements already considered with regard to FIGURE 3. However, FIGURE 4, which provides the means by which the various contingencies arising during a cycle of operations may be dealt with shows a great deal more detail.

Figure 4A:
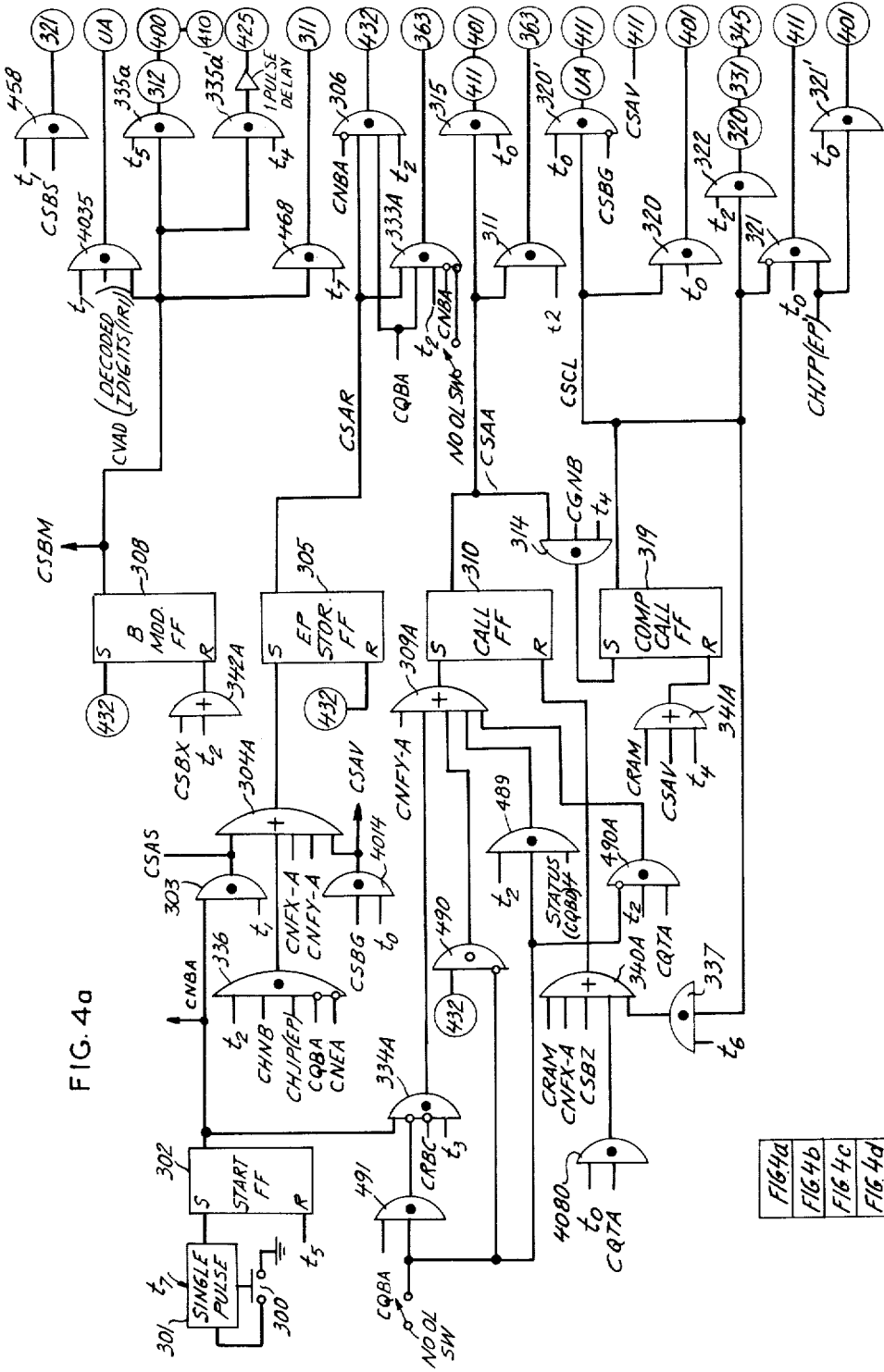

Refer to FIGURE 4a. As in the case of FIGURE 3, start flip-flop 302 is set by means of start button 300 which enables single pulser 301 to pass the first $t_7$ pulse from the clock 213 (FIGURE 2). Thereafter start flip-flop 302 is reset by a $t_5$ pulse from the clock. The set output terminal of start flip-flop 302 is connected to gates 303 and 334A and when in its set condition flip-flop 302 places an enabling signal on these gates. This enabling signal is designated CNBA. The CNBA signal applied to gate 303 enables it to pass a $t_1$ timing pulse which in turn will be passed by buffer 304A to the set input terminal of ending pulse storage flip-flop 305. Various other inputs to buffer 304A may likewise set ending pulse storage flip-flip 305. Thus, an output from gate 336 will be passed by buffer 304A and an output from gate 4014 designated CSAV will likewise be effective via buffer 304A to set flip-flop 305. It is noted that signal CSAV is also applied to the final encoder to generate FT 411 therefrom. Other inputs to buffer 304A include signals designated CNFX–A and CNFY–A and these will be considered in due course.

The CNBA signal from start flip-flop 302 enables gate 334A to pass a $t_3$ timing pulse provided that the inhibit signals derived from gate 491 and CRBC from C2 call flip-flop 412 (FIGURE 4e) are not present. The output of gate 334A, namely, the $t_3$ pulse, is applied via buffer 309A to the set input terminal of call flip-flop 310. Buffer 309A also receives signals from various other sources thereby to set call flip-flop 310 and the reasons for such other signals will appear subsequently. Thus, buffer 309A receives as inputs the CNFY–A signal, the output of gate 490, the output of gate 490A, and the output of gate 489 in addition to the output of gate 334A previously noted. The set output signal from call flip-flop 310 designated as CSAA is applied to a plurality of gates upon which it places enabling signals. Thus, signal CSAA enables gate 315 of the timing decoder to pass a $t_0$ clock pulse into the final encoder thereby to derive FT 411 and FT 401. The signal CSAA is also applied to gate 311 in the timing decoder, enabling gate 311 to pass a $t_2$ clock signal into the final encoder thereby to derive FT 363. Finally, CSAA is applied to gate 314. Gate 314 requires a further enabling input which is signal CGNB. This CGNB signal is derived from the memory following a call thereto and indicates that the memory is not busy. The presence of enabling signals CSAA and CGNB permits gate 314 to pass a $t_4$ clock pulse which is applied to the set input terminal of completing call flip-flop 319.

The set output of completing call flip-flop 319 is applied to a plurality of gates in the timing decoder as well as to gate 337, this latter being for the resetting of call flip-flop 310. The output signal from completing call flip-flop 319 is designated CSCL. Signal CSCL is permissive with respect to gates 320, 320' and 322 and is inhibitory with respect to gate 321, these last mentioned gates all forming a portion of the timing decoder. Gate 320' is enabled by the CSCL signal in the absence of a CSBG signal (to be discussed hereinafter) to pass a $t_0$ clock pulse into the final encoder thereby to derive FT 411 and FTUA. Gate 320' is enabled by signal CSCL to pass a $t_0$ clock pulse thereby to derive FT 401 in the final encoder. Gate 322 is enabled by the CSCL signal to pass a $t_2$ clock pulse thereby to derive via the final encoder FT 320, FT 331, and FT 345. The inhibitory signal which CSCL applies to gate 321 will prevent derivation of FT 411 via this gate. The signal CSCL on being applied to gate 337 enables gate 337 to pass a $t_6$ clock pulse via buffer 340A thereby to reset call flip-flop 310. Buffer 340A also may receive thereon signals CRAM, CNFX–A, CSBZ and the output from gate 4080. The presence of any of these signals will therefore be effective to reset call flip-flop 310 and the reasons for providing such signals will become apparent hereinafter. Completing call flip-flop 319 may be reset via buffer 341A and the inputs to this buffer include signals CRAM, CSAV and the $t_4$ clock signal.

Consider now the ending pulse storage flip-flop 305. As previously noted flip-flop 305 is set by a signal obtained from buffer 304A. The set output signal from flip-flop 305 is designated CSAR and is applied as an enabling input to a pair of gates in the timing decoder. These are, respectively, gates 306 and 333A. Both of these gates are enabled by the CSAR signal acting in concert with status 1 signal CQBA the derivation of which will be explained subsequently. Gates 306 and 333A also have applied thereto inhibitory signals CNBA derived from the set condition of start flip-flop 302 so that in the event that start flip-flop 302 is set gates 306 and 333A are inhibited from passing any signals. In addition, gate 333A may be inhibited by throwing a switch designated No Overlap Switch. The enabling of gate 306 passes a $t_2$ clock pulse to the final encoder thereby to derive FT 432 and the enabling of gate 333A passes a $t_2$ clock pulse to the final encoder to generate FT 363.

FT 432 is, inter alia, applied to the set input terminal of B-Mod flip-flop 308 thereby to cause the B-Mod flip-flop 308 to generate an output designated CSBM. Signal CSBM operates as an enabling signal to four gates in the timing decoder. Gate 4035 upon being further enabled by the decoding of certain specific instruction digits from IR–1 (element 101 of FIGURE 1) passes a $t_7$ clock pulse to the final encoder thereby to derive FTUA. Gate 335a is enabled by CSBM to pass a $t_5$ clock pulse to the final encoder thereby to derive FT 312, FT 400, and FT 410. Gate 335a' is enabled to pass a $t_4$ clock signal and the latter after passing through a 1 pulse delay generates FT 425 at time $t_5$. Gate 468 is enabled by CSBM to pass a $t_7$ clock pulse to the final encoder thereby to generate FT 311. The reset input of B-Mod flip-flop 308 is connected to the output of buffer 342A so that either a $t_2$ clock pulse or a signal designated CSBX will effect a resetting of this flip-flop 308.

Consider next the equality circuits shown in the top left-hand portion of FIGURE 4b. These consist of a pair of flip-flops 493 and 492 along with associated set and reset input gates and set and reset output gates. The equal flip-flop 493 has its set input terminal connected to the output of gate 494. Gate 494 is enabled by the simultaneous presence of the CSBM signal (derived from B-Mod flip-flop 308) and the CAAM signal derived from the register selector comparator 142 (see FIG. 1c) to pass either a $t_3$ or $t_7$ clock pulse to effect setting of flip-flop 493. Flip-flop 493 is reset by the application to its reset terminal of either a CSBX signal or a $t_2$ clock pulse via buffer 495. The unequal flip-flop 492 has its set input terminal connected to the output of a gate 496 and this gate is likewise enabled to pass either a $t_3$ or a $t_7$ clock pulse by the coincident appearance thereon of the CSBM signal and the CAAL signal also derived from the register selector comparator 142 (see FIG. 1c). It will be noted that gate 496 may have applied thereto an inhibit signal CSBG. The unequal flip-flop 492 will be reset by the application to its reset terminal of either a $t_2$ clock pulse, a $t_5$ clock pulse or a CSBX signal. The set output of flip-flop 493 is gated with the reset output from flip-flop 492 in gate 498 to generate signal CSBG which, as above noted, serves to inhibit gate 496. The reset output of flip-flop 493 is gated with the set output of flip-flop 492 in gate 494 to generate a signal designated CSBS. The application of this latter signal will become more apparent as this description proceeds.

Figure 4D:
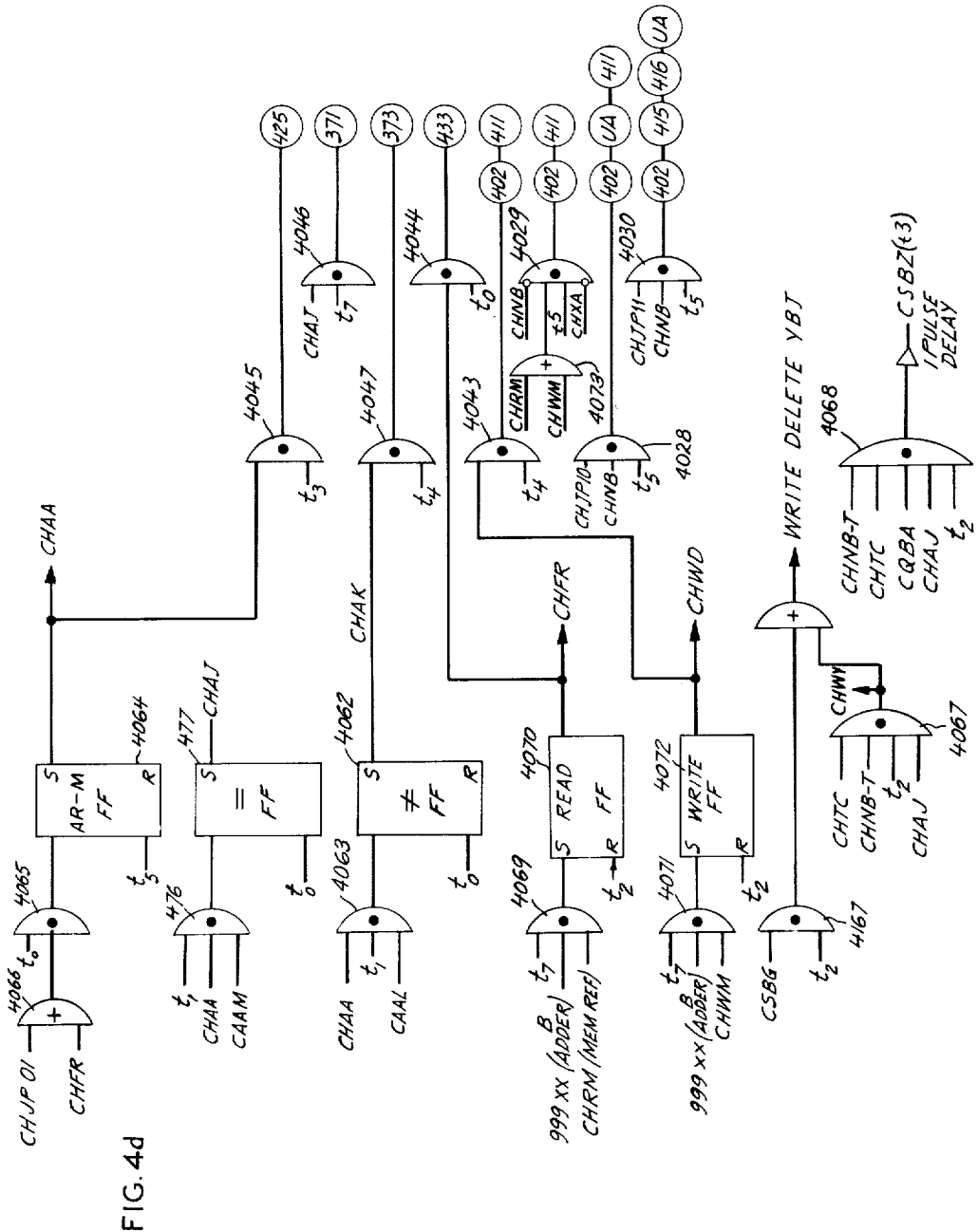
Figure 4E:
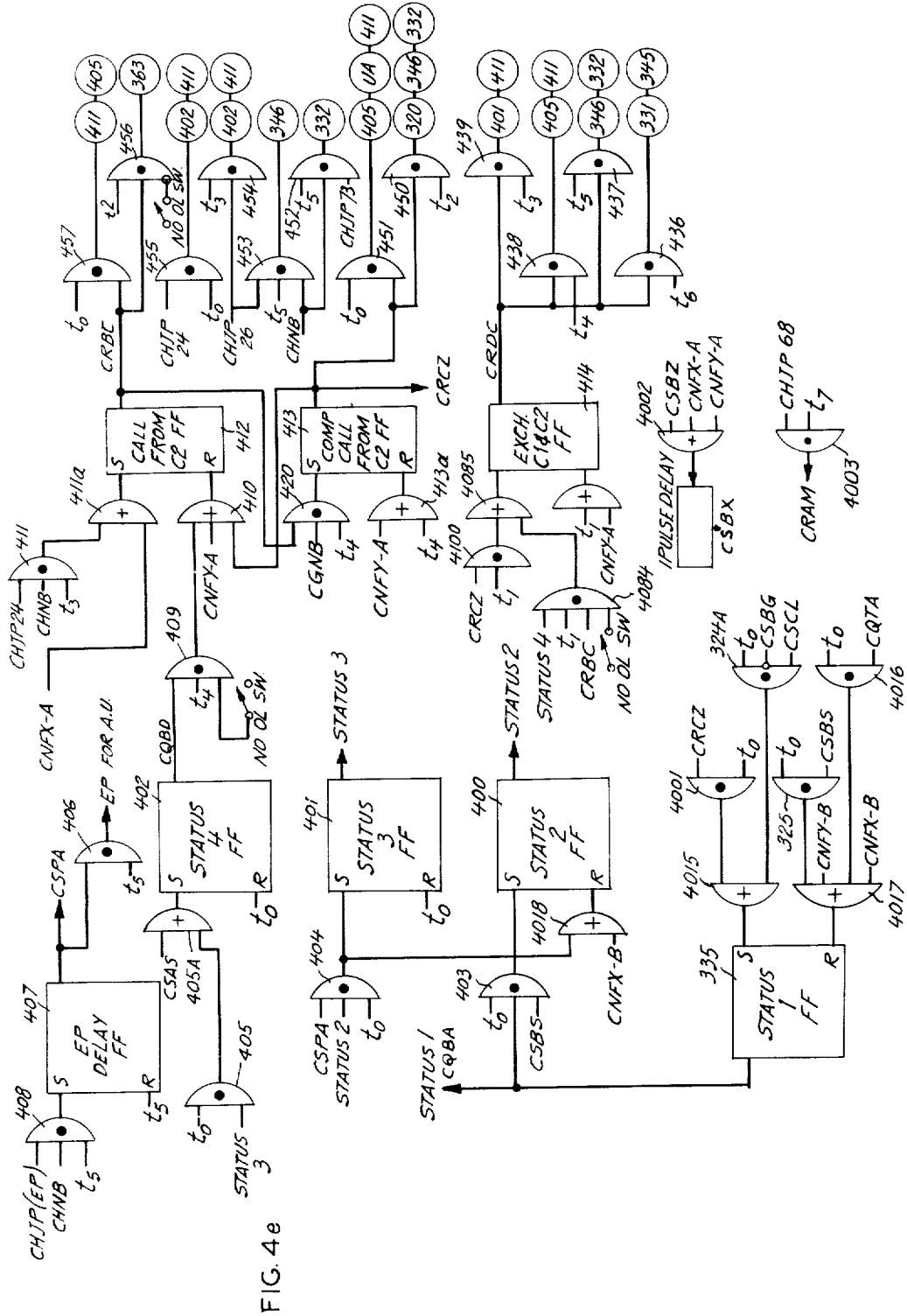

Consider next FIGURE 4e. Herein will be found status 1 flip-flop 335 along with status 2 flip-flop 400, status 3 flip-flop 401 and status 4 flip-flop 402. These status flip-flops perform an essential function in the cycling operation of the control circuits and to a limited extent the status 1 flip-flop has already been discussed in connection with FIGURE 3. Status 1 flip-flop 335, in the detailed showing of FIGURE 4e, is provided with a plurality of inputs both for setting and for resetting. Thus, to the set input terminal of status 1 flip-flop 335 are applied outputs from gates 324A and 4001 via buffer 4015. Gate 4001 is enabled by signal CRCZ to pass a $t_0$ clock pulse for the setting of flip-flop 335 as will be hereinafter discussed. Signal CRCZ is derived from the set output terminal of C2 completing call flip-flop 413 (FIG. 4e). Gate 324A is enabled by the CSCL signal and from the completing call flip-flop 319 (FIG. 4a) to pass a $t_0$ clock pulse. Gate 324A will be inhibited by the presence thereon of the CSBG signal as obtained from the coincident set condition of equal flip-flop 493 and reset condition of unequal flip-flop 492. The reset input of status 1 flip-flop 335 has signals applied thereto via buffer 4017. These comprise respectively CNFYB, CNFXB and the outputs of gates 325 and 4016. Gate 325 is enabled by a CSBS signal, as derived from equal and unequal flip-flops 493 and 492 (FIG. 4b supra), to pass a $t_0$ clock pulse. Gate 4016 is enabled by a signal CQTA also to pass a $t_0$ clock pulse.

The set output of status 1 flip-flop 335 is designated CQBA and is applied as an enabling input to gate 403 so that the coincident appearance on gate 403 of CQBA and CSBS signals enables gate 403 to pass a $t_0$ clock pulse to the set input terminal of status 2 flip-flop 400. The set output of status 2 flip-flop 400 is connected as an enabling input to gate 404 and with the coincident appearance on gate 404 of a CSPA signal, a $t_0$ clock pulse will be passed to the set input terminal of status 3 flip-flop 401 and to reset input terminal of status 2 flip-flop 400 via buffer 4018. Buffer 4018 also enables a resetting of the status 2 flip-flop 400 by means of a CNFXB signal. The set output of status 3 flip-flop 401 is applied as an enabling input to the gate 405 thereby permitting gate 405 to pass a $t_0$ clock pulse to the set input terminal of status 4 flip-flop 402 via buffer 405A. Buffer 405A also receives signal CSAS derived from the output of gate 303 (FIG. 4a). Status 3 flip-flop 401 and status 4 flip-flop 402 may both be reset by the application to the reset input terminals of $t_0$ clock pulses. The output of status 4 flip-flop 402 is designated CQBD and is applied to a number of elements all of which will be discussed subsequently.

Referring once again to FIGURE 4a, there will be observed thereon gates 458 and 4014 both forming a portion of the timing decoder. Gate 458 is enabled by the presence of the CSBS signal from gate 494 (FIGURE 4b) to pass a $t_1$ clock pulse to the final encoder thereby to generate FT 321. Gate 4014 is enabled by the CSBG signal from gate 498 (FIGURE 4b) to pass a $t_0$ clock pulse thereby to derive a CSAV signal. The CSAV signal is applied at various points as previously mentioned i.e. to the set input terminal of ending pulse storage flip-flop 305 via buffer 304A and to the reset input terminal of completing call flip-flop 319. In addition, as noted supra, the CSAV signal drives the final encoder thereby to generate FT 411.

Finally, in conjunction with FIGURE 4a not specifically described heretofore are gates 321 and 321'. Both these gates form part of the timing decoder and gate 321 is enabled by certain ending signals (CHJP) to pass a $t_0$ clock pulse to the final encoder thereby to generate FT 411 provided that no inhibitory CSCL signal is present thereon. Gate 321' is similarly enabled by the same CHJP ending signals to pass $t_0$ clock pulses to the final encoder to derive therefrom FT 401.

FIGURE 4b, in addition to flip-flops 493 and 492 and associated circuitry provides further elements whereby needed signals may be generated in the final encoder. Thus, there is provided operand memory not busy flip-flop 331. A number of inputs are provided whereby flip-flop 331 may be placed in its set output condition. Thus, buffer 329 connected to the set input terminal of flip-flop 331 will pass signals from either of gates 327A or 328A. Gate 327A is enable to pass a $t_1$ clock pulse by any one of a plurality of signals applied to buffer 339. Thus, CHJP signal 13 which is derived from the decoding of an instruction from IR-2 via the function encoder 210 in FIGURE 2, is for the purpose of simulating a memory not busy signal to the input of flip-flop 331. A similar effect is derived by a CHWD signal (from flip-flop 4072 FIG. 4d), a CPCW signal from the repeat flip-flop 4120 (FIG. 4c) or a CHFR signal from flip-flop 4070 (FIG. 4d). Gate 327A is inhibited by the application thereto of a CHXA signal derived from the set output terminal of the block memory not busy flip-flop 435. The CHXA signal is likewise applied as an inhibitor to gate 328A. Gate 328A has as its permissive inputs a CHTA signal and a CGNB or memory not busy signal. The coincidence of signals CGNB and CHTB in the absence of a CHXA signal enables gate 328A to pass a $t_1$ clock signal to the set input terminal of flip-flop 331. The CHTA signal is also derived from the function encoder 210 of FIGURE 2 and is obtained from certain instructions which require memory access. The output of gate 328A is designated CHNA and in addition to being applied to the set input of flip-flop 331 is applied to the set input of flip-flop 480 which is the true memory not busy flip-flop. The set output of operand memory not busy flip-flop 331 is designated CHNB-A and is applied to a plurality of gates in the timing decoder as well as various other elements within the overall cycling unit. Thus, CHNB-A provides an enabling signal for gates 330A, 332 and 483. Gate 330A is provided with a further enabling input which is a CHJP ending signal and a coincidence of the aforesaid signals will pass a $t_2$ clock pulse to the final encoder thereby to generate FT 363. Two inhibit inputs may prevent an output from gate 330A and these occur if the No Overlap Switch is engaged or also if a CNEA signal is present. Gate 332 is similarly enabled by the coincidence of a CHNB-A signal as derived from flip-flop 331 and CHJP ending signal but in addition requires a CQBA or status 1 signal. Gate 332 is also inhibited by the presence thereon of a CNEA signal. When rendered permissive gate 332 passes a $t_2$ clock pulse to the final encoder to generate therefrom FT 432.

Gate 483 receives the CHNB-A signal as a single enabling signal, however, also applied to gate 483 as an inhibit signal is the CHXA output from the block memory not busy flip-flop 485. In the absence, however, of a CHXA signal gate 483 will pass the CHNB-A signal to generate signal CHNB which is applied to gates 466 and 464 in the timing decoder. Gate 466 is enabled by a coincidence CHNB and a CHJP 54 function encoder signal to pass a $t_4$ clock pulse to the final encoder thereby to generate FT 403 and FT 411. Gate 464 is enabled by the coincidence of the CHNB signal derived from 483, with a CHJP 38 function encoder signal to pass a $t_5$ clock pulse thereby to generate FT 300 via the final encoder.

The block memory not busy flip-flop 485 may be set by one of two signals. Thus, it may be set by a CNLA signal (from gate 4056, FIG. 4f), or a CSAV signal. It will be reset by the application to its reset input terminal of a $t_7$ clock signal. The output of block memory not busy flip-flop 485 which is signal CHXA has already been previously mentioned. It is applied, in addition, as heretofore noted, to gate 462 whereby gate 462 will be enabled to pass a $t_3$ clock pulse to generate signal CHXD and this in turn is applied to various further elements.

The CHXD signal derived from gate 462 will reset true memory not busy flip-flop 480 and is also effective via buffer 474 to set program counter clear flip-flop 473. Also connected to the set input terminal of flip-flop 473 via buffer 474 is the output of gate 475. This gate is enabled by the coincidence thereon of a CHJP-EP from the function encoder 210 of FIGURE 2, and a CHNB signal to pass a $t_3$ clock pulse. The set output of Program Counter clear flip-flop 473 is designated CPKD and is applied as an enabling signal to gate 471 and also as an enabling signal to gate 460 in the timing decoder. Gate 460 is thus enabled to pass at $t_5$ clock pulse to the final encoder to derive therefrom FT 313. Gate 471 is enabled to pass a $t_6$ clock pulse and this is applied via buffer 470 to the set input terminal of the clear IR-2 flip-flop 464A. A further input to the set terminal of flip-flop 464A is provided via buffer 470 from gate 472 which is enabled by a coincidence thereon of a CHJP 74 and CHNB signal to pass a $t_5$ clock pulse. Clear IR-2 flip-flop 464A produces an output signal which on being applied to gate 459 in the timing decoder enables such gate to pass at $t_7$ clock signal to the final encoder thereby to derive FT 314. Clear IR-2 flip-flop 464 will be reset by a $t_0$ clock pulse and the program counter clear flip-flop 473 will be reset by a $t_1$ clock pulse.

Also appearing in the timing decoder as shown by FIGURE 4b are gates 484, 4034, 465, 463, 463A, 4140 and buffer 461. Gate 484 receives as an enabling input the output from true memory not busy flip-flop 480 and the CHTC signal. With the coincident appearance of these signals gate 484 is enabled to pass a $t_4$ clock pulse to place an enabling signal on gate 484A. When signal CHAK from flip-flop 4062 (FIG. 4d) is also present gate 484A derives the final encoder thereby to derive FT 352. Gate 4034 is rendered permissive by the coincident appearance thereon of a CHJP 61 signal from the function encoder of FIGURE 2 and the CHNB signal. The coincidence of such signals enables gate 4034 to pass a $t_4$ clock pulse thereby to generate from the final encoder FTUA. Gate 465 is rendered permissive by either of signals CHRM or CHWM. These signals are derived from the Program Counter decoder 207 of FIGURE 2 and are generated by instructions which require respectively a memory read or a memory write. The presence of either of these signals will enable gate 465 to pass a $t_7$ clock signal thereby causing final encoder to generate FT 363. Gate 463 is enabled by CHJP 30 signal from the function encoder 210 of FIGURE 2 to pass a $t_2$ clock signal to the final encoder and thus generate FT 403 and FT 411. Gate 463A is enabled by CHJP 35 to pass a $t_2$ clock signal to generate FTUA from the final encoder. Buffer 461 will pass any of clock signals $t_0$, $t_2$, $t_4$, or $t_6$ to the final encoder thereby to generate FT 435. Finally, gate 4140 is enabled by CHJP 77 and CHNB to pass a $t_2$ clock signal to generate FT UA in the final encoder. Gate 4140 is inhibited by the CHXA signal generated by flip-flop 485.

FIGURE 4c shows further details of the overall cycling unit and timing decoder. FIGURE 4c also shows the control circuits for the program counter. AR to AU input flip-flop 415 will be set by an output from either of gates 426 or 426A connected to the set input terminal thereof via buffer 426B. Gate 426 is rendered permissive by the coincident appearance thereon of a CHNB signal along with CHJP signal 27, as derived from function encoder 210 of of FIGURE 2. Thus rendered permissive gate 426 will pass a $t_3$ clock signal to the set input terminal of flip-flop 415. Gate 426A is enabled by CHJP 77, but will be inhibited by the presence of signal CHNB. When enabled gate 426A passes a $t_3$ clock signal to the set input terminal of flip-flop 415. Flip-flop 415 is reset by the application to its reset input terminal of a $t_0$ clock signal. The output of flip-flop 415 is designated CHBA and is applied as an enabling signal to gates 435 and 434 of the timing decoder and also as an enabling signal to gates 423 and 424. Gate 435 is thus enabled to pass a $t_4$ clock signal to the final encoder thereby to generate FT 431. Gate 434 is similarly enabled to pass a $t_7$ clock signal thereby to generate from the final encoder FT 425.

Gate 423 is enabled as above noted by the CHBA signal and requires in addition a CAAM signal from the register selection comparator 142 of FIGURE 1. Thus enabled, gate 423 will pass a $t_5$ clock signal to the set input terminal of equality flip-flop 416. The CHBA signal, when coincidental with a CAAL signal also from register selection comparator 142 will enable gate 424 to pass a $t_5$ clock signal to the set input terminal of inequality flip-flop 417. Both of these latter flip-flops will be reset by a $t_0$ clock signal applied to their reset input terminals. The output of flip-flop 416 operates as an enabling signal to permit gate 433 in the timing decoder to pass a $t_7$ clock pulse thereby to generate FT 381 in the final encoder. Flip-flop 417 in a similar manner enables gate 441 to pass a $t_7$ clock signal thereby to generate FT 380.

Flip-flop 418 indicated as the AU to AR flip-flop will be set by a coincidence of signals on its set input gate 425. Gate 425 is rendered permissive by the coincident appearance thereon of either CHJP signal 50 or the CHWD signal (to be discussed infra) from function encoder 210 and the CHNB signal to pass a $t_4$ clock signal. AU to AR flip-flop 418 is reset by a $t_4$ clock signal. The output signal from flip-flop 418 is designated CHCA and is applied to gate 432 in the timing decoder whereby gate 432 is enabled to pass a $t_6$ clock signal to the final encoder thereby to generate FT 421. The CHCA signal is also applied to gate 427 and this gate in turn is enabled to pass a $t_3$ clock signal to be applied to the set input terminal of delay flip-flop 428. The set output of delay flip-flop 428 is applied as a permissive input to gates 429 and 430 in the timing decoder. Gate 429 is thereby enabled to pass a $t_1$ clock pulse to the final encoder thereby to generate FT 426 and gate 430 is similarly enabled to pass a $t_6$ clock pulse to the final encoder thereby to generate FT 434.

The Generate 370 flip-flop 419 is set by a coincidence of signals on its input terminal gate 419A. These signals comprise the CHTA signal and the CHNB signal and when present enable gate 426 to pass a $t_4$ clock signal to the set input terminal of flip-flop 419. It will be recalled that the CHTA signal (see FIG. 2) is also enabling with respect to gate 328A (FIG. 4b). Flip-flop 419 will be reset by a $t_0$ clock signal. The output of flip-flop 419 is connected to gate 431 in the timing decoder and enables gate 431 to pass a $t_7$ clock signal to the final encoder whereby FT 370 is generated. Gate 431 will be inhibited by the presence of a CHAK signal. Also on FIGURE 4c, will be observed gate 4042. This gate is rendered permissive by the appearance of a CHJP 03 signal thereby to pass a $t_0$ clock signal to the final encoder whence FT 430 is generated.

For generating FT 372 which operates to clear the M input register 150 (FIG. 1) buffer 4132 is provided. The output of buffer 4132 is passed through a one pulse delay so that FT 372 appears one pulse time subsequent to inputs to buffer 4132. These inputs include certain clear signals derived from arithmetic unit 131 as well as outputs from gates 4130 and 4131. Gate 4130 is enabled by the CHXA signal from block memory not busy flip-flop 485 to pass a $t_7$ clock pulse. Gate 4131 is enabled by other clear signals from the arithmetic unit 131 in the presence of the CHNB signal.

The program counter step signal CPCS is obtained from gate 4126 and the program counter clear signal CPCL is obtained from gate 4122. Gate 4126 is enabled by an output from buffer 4125 and will be inhibited by the presence of the CPKD signal obtained from the program counter clear flip-flop 473 (FIG. 4b). When enabled gate 4126 passes a $t_5$ clock signal to generate CPCS. Buffer 4125 passes signals from either of gate 4123 or 4124. Gate 4124 is enabled by the coincidence of a CHJP 46 and a CHNB signal. Gate 4123 is enabled by the coincidence of CHNB and CPCW signals. The CPCW signal which is also used to set the operand memory not busy flip-flop 331 (FIG. 4b) is obtained from the set output terminal of repeat flip-flop 4120. Repeat flip-flop 4120 has its set input terminal connected to gate 4121 and its reset input terminal connected to gate 4122. Gate 4121 passes a $t_4$ clock signal when a coincidence of signals CHJP 44 and CHNB occurs. Gate 4122 passes a $t_5$ reset signal following the generation of CPKD by flip-flop 473 (FIG. 4b).

Considering now part d of FIGURE 4, there are provided thereon additional flip-flops and gates as employed for certain special operations within the machine. Flip-flop 4064 is designated as the Addressable register AR–M flip-flop and has its set input terminal connected to the output of gate 4065. Gate 4065 is enabled by either a CHJP 01 signal from the function encoder 210 (FIG. 2) or CHFR signal derived from flip-flop 4070 as will be described hereinafter. The appearance of either of these signals enables gate 4065 to pass a $t_0$ clock pulse to flip-flop 4064 thereby to generate a set output signal designated as CHAA. Flip-flop 4064 will be reset by a $t_5$ clock signal. The signal CHAA is applied to gate 4045 in the timing decoder and enables this latter gate to pass a $t_3$ clock signal to the final encoder thereby to generate FT 425. The CHAA signal is also applied to gates 4063 and 476. When CHAA occurs coincident with CAAL derived from the register selection comparator 142 (FIGURE 1) gate 4063 is enabled to pass a $t_1$ clock signal to the set input terminal of inequality flip-flop 4062. The set output terminal of this latter flip-flop designated CHAK is connected to gate 4047 in the timing decoder and a set output therefrom enables gate 4047 to pass a $t_4$ clock signal to the final encoder thereby to generate FT 373. Flip-flop 4062 will be reset by the application to the reset input terminal thereof a $t_0$ clock pulse. Flip-flop 477 is an equality flip-flop and is set by coincident signals CHAA and CAAM (from register selection comparator 142) enabling gate 476 to pass a $t_1$ clock pulse. Flip-flop 47 is reset by a $t_0$ clock pulse. The output of flip-flop 477 is designated CHAJ and enables gate 4046 in the timing decoder to pass a $t_7$ clock signal thereafter to generate FT 371 in the final encoder.

Two further flip-flops are found on FIGURE 4d. These comprise respectively the read flip-flop 4070 and the write flip-flop 4072. Read flip-flop 4070 has its set input terminal connected to gate 4069 and gate 4069 is enabled by signal CHRM (memory read) from the function encoder 210 of FIGURE 2, coincidental with signals indicating digits 999XX from the output of the B adder. Thus enabled, gate 4069 will pass a $t_7$ clock signal to effect a setting of flip-flop 4070. The output of flip-flop 4070 is designated CHFR and as above noted is effective to place a set input signal on flip-flop 4064 and also on operand memory not busy flip-flop 331 as noted in connection with FIGURE 4b. Additionally, CHFR is applied to gate 4044 in the timing decoder and enables this latter gate to pass a $t_0$ clock signal thereby to generate FT 433 from the final encoder. Write flip-flop 4072 receives a set input signal from gate 4071 which in turn receives at its inputs the $t_7$ clock signal, the CHWM signal and certain outputs (999XX) from the B adder 139. When signal CHWM from the function encoder 210 (indicative of a write order) is coincidental with signals indicative of digits 999XX obtained from the B adder output gate 4071 passes a $t_7$ clock signal to set flip-flop 4072. The set output of write flip-flop 4072 is designated CHWD. This signal, as previously noted in connection with FIGURE 4b, is effective to set operand memory not busy flip-flop 331. Additionally, the CHWD signal is applied to gate 4043 in the timing decoder and enables the latter to pass a $t_4$ clock signal thereby to generate FT 402 and FT 411 in the final encoder. Both the read and the write flip-flops 4070, 4072, respectively, are reset by the application thereto of a $t_2$ clock signal.

Additional gates found in the timing decoder section of FIGURE 4d include gates 4029, 4028 and 4030. Gate 4029 is enabled by the application thereto via buffer 4073 of either a CHRM or CHWM signal from the Program Counter decoder 207 of FIGURE 2. These latter signals have already been discussed in connection with FIGURE 4b. When gate 4029 is thus enabled it will pass a $t_5$ clock signal to the final encoder to generate therein FT 402 and FT 411. It is to be noted that gate 4029 may be inhibited by the presence of a CHNB signal as derived from the set output of operand memory not busy flip-flop 331 (FIGURE 4b) or a CHXA signal from the block memory not busy flip-flop 485. Gate 4028 is enabled by the coincident application thereto of a CHJP 10 signal from the function encoder 210 and the CHNB signal. When enabled, gate 4028 will pass a $t_5$ clock signal to the final encoder thereby to generate FT 402, FTUA and FT 411. Gate 4030 is enabled by the coincident occurrence of a CHJP 11 signal from the function encoder 210 and a CHNB signal from the operand memory not busy flip-flop 331 to pass a $t_5$ clock signal to the final encoder thereby to generate FT 402, FT 415, FT 416 and FTUA.

Further logic appearing on FIGURE 4d includes gates 4067, 4068 and 4167. Gate 4067 is enabled by the coincident occurrence of a CHTC signal from the instruction decoder 204 of FIGURE 2, a CHNB signal from the operand memory not busy flip-flop 331 and a CHAJ signal from a set output of equality flip-flop 477 to pass a $t_2$ clock signal thereby to generate signal CHWY.

Gate 4167 is enabled by the CSBG signal from gate 498 (FIG. 4b supra) to pass a $t_2$ clock signal. This is buffed with the CHWY signal so that either of these signals will generate the write delete signal YBJ. The function of this latter signal will be discussed infra and also in connection with the memory (FIGURE 7). Gate 4068 is enabled by the coincidence of CHNB-T from the time memory not busy flip-flop 480 (FIG. 4b), CHTC from the instruction decoder (FIG. 2), CQBA from status 1 flip-flop 335 (FIG. 4e) and CHAJ supra. When thus enabled, gate 4068 passes a $t_2$ clock signal which after passing through a one pulse delay generates signal CSBZ. The application of signal CSBZ will become apparent hereinafter.

Consider now FIGURE 4e. This has already been discussed in part with reference in particular to the four status flip-flops shown thereon. In addition elements are therein provided for the generation of signals required in effecting conditional and unconditional jumps within the machine as well as for several miscellaneous purposes. Ending pulse delay flip-flop 407 is set by the application thereto of an output from gate 408. Gate 408 will be enabled to pass a $t_5$ clock signal when there are coincident CHJP ending pulse signals from function encoder 210 and a CHNB signal from gate 483 (FIG. 4b). The set output of flip-flop 407 is designated CSPA and has previously been discussed in connection with the setting of status 3 flip-flop 401. Additionally, CSPA is applied to gate 406 which is thereby enabled to pass a $t_5$ clock signal to generate an ending pulse for the Arithmetic Unit.

Call from C2 flip-flop 412 is set by the application to the set input terminal thereof of an output signal from gate 411, or alternatively by the application of signal CNFX–A via buffer 411A. Gate 411 is enabled by coincident application thereto of a CHJP 24 signal from function encoder 210, and a CHNB signal to pass a $t_3$ clock signal. The output of flip-flop 412 is designated CRBC. As will have been previously noted CRBC will operate as an inhibit on gate 334A (FIGURE 4a) thus preventing the setting of call flip-flop 310 by either the start flip-flop 302 or gate 491. Signal CRBC is applied to a pair of gates 457 and 456 in the timing decoder and also to gate 420 which serves as a set input gate for completing call from C2 flip-flop 413. Gate 457 is thus enabled to pass a $t_0$ clock signal to the final encoder thereby to generate FT 411 and FT 405 . Gate 456 is similarly enabled to pass a $t_2$ clock signal provided that thereby to generate FT 411 and FT 405. Gate 456 is the No Overlap Switch is disengaged. The output of gate 456 is applied to the final encoder thereby to generate FT 363. Flip-flop 412 is reset by any of a plurality of signals applied by way of buffer 410 to its reset input terminal. Thus, it may be reset by an output from gate 409 derived via the status 4 flip-flop or from a CNFY–A signal or from a set output from the completing call from C2 flip-flop 413.

Flip-flop 413 is set when a CRBC signal from flip-flop 412 is coincident with a CGNB memory not busy signal on gate 420 to pass a $t_4$ clock signal. The output of flip-flop 413 is designated as CRCZ and is applied to a number of elements including as previously noted the reset input terminal of flip-flop 412. The signal CRCZ is applied to gate 451 in the timing decoder which is thus enabled to pass a $t_0$ clock signal to derive from the final encoder FT 405, FT 411 and FTUA. Also gate 450 is enabled to pass a $t_2$ clock signal to the final encoder thereby generating FT 320, FT 346 and FT 332.

Exchange flip-flop 414 has two inputs applied to its set input terminal via buffer 4085. The first of these is by way of gate 4100 which is enabled by a CRCZ signal to pass a $t_1$ clock signal. Additionally, the Exchange flip-flop may be set by the output of gate 4084. Gate 4084 is alerted when the No Overlap Switch is engaged. When running in this condition coincident occurrence of a CQBD signal from status 4 flip-flop 402 and a CRBC set output signal from flip-flop 412 will enable the passage of a $t_1$ clock signal thereby to set Exchange flip-flop 414. The set output of Exchange flip-flop 414, which is designated as CRDC, is applied as an enabling signal to four gates in the timing decoder. These are gate 439 which will pass a $t_3$ clock signal to generate FT 401 and FT 411 from the final encoder, gate 438 which passes a $t_4$ clock signal to generate FT 405 and FT 411, gate 437 which passes a $t_5$ clock signal to generate FT 346 and FT 332, and gate 436 which will pass a $t_6$ clock signal to generate FT 331 and FT 345. All such signals are of course generated by the final encoder.

Flip-flop 413 is reset by the application to the reset input terminal thereof of either a CNFY–A signal or a $t_4$ clock signal via buffer 413A. Exchange flip-flop 414 will be reset by the application thereto of either a $t_1$ clock signal or a CNFY–A signal.

The remaining gates in the timing decoder section of FIGURE 4e include gates 455, 454, 453 and 452. Gate 455 is enabled by CHJP 24 to pass a $t_0$ clock signal to generate FT 402 and FT 411 in the final decoder. Gate 454 is enabled by a CHJP 26 signal from the function encoder 210 to pass a $t_3$ clock signal to the final encoder thereby to generate FT 402 and FT 411. Gate 453 which is also enabled by CHJP 26 requires, in addition, a coincident CHNB signal from gate 483 (FIG. 4b). Thus enabled gate 453 will pass a $t_5$ clock signal to the final encoder to generate therein FT 346. Gate 452 is enabled by the coincidence thereon of a CHJP 73 signal and the CHNB signal and when enabled will pass a $t_5$ clock signal to generate FT 332 via the final encoder.

Two further elements are shown on FIGURE 4e. The first of these is buffer 4002. This passes any of signals CSBZ, CNFY–A or CNFX–A. The output of buffer 4002 is applied to a one pulse delay element to generate signal CSBX, which as previously noted will reset B Mod flip-flop 308 (FIG. 4a) and flip-flops 493 and 492 (FIG. 4b). CSBZ is, as previously noted, derived from the output of gate 4068 appearing on FIGURE 4b. The derivation of CNFY–A and CNFX–A will be discussed hereinafter. Gate 4003 is the second of two elements and it receives as an enabling signal CHJP 68 from the function encoder 210 of FIGURE 2. This enables the gate to pass a $t_7$ cock signa thereby to generate the signal designated as CRAM. The signal CRAM is effective, as previously noted with regard to the discussion of FIGURE 4a, to reset call flip-flop 310 via buffer 340A and to reset completing call flip-flop 319 via buffer 341A.

Figure 4F:
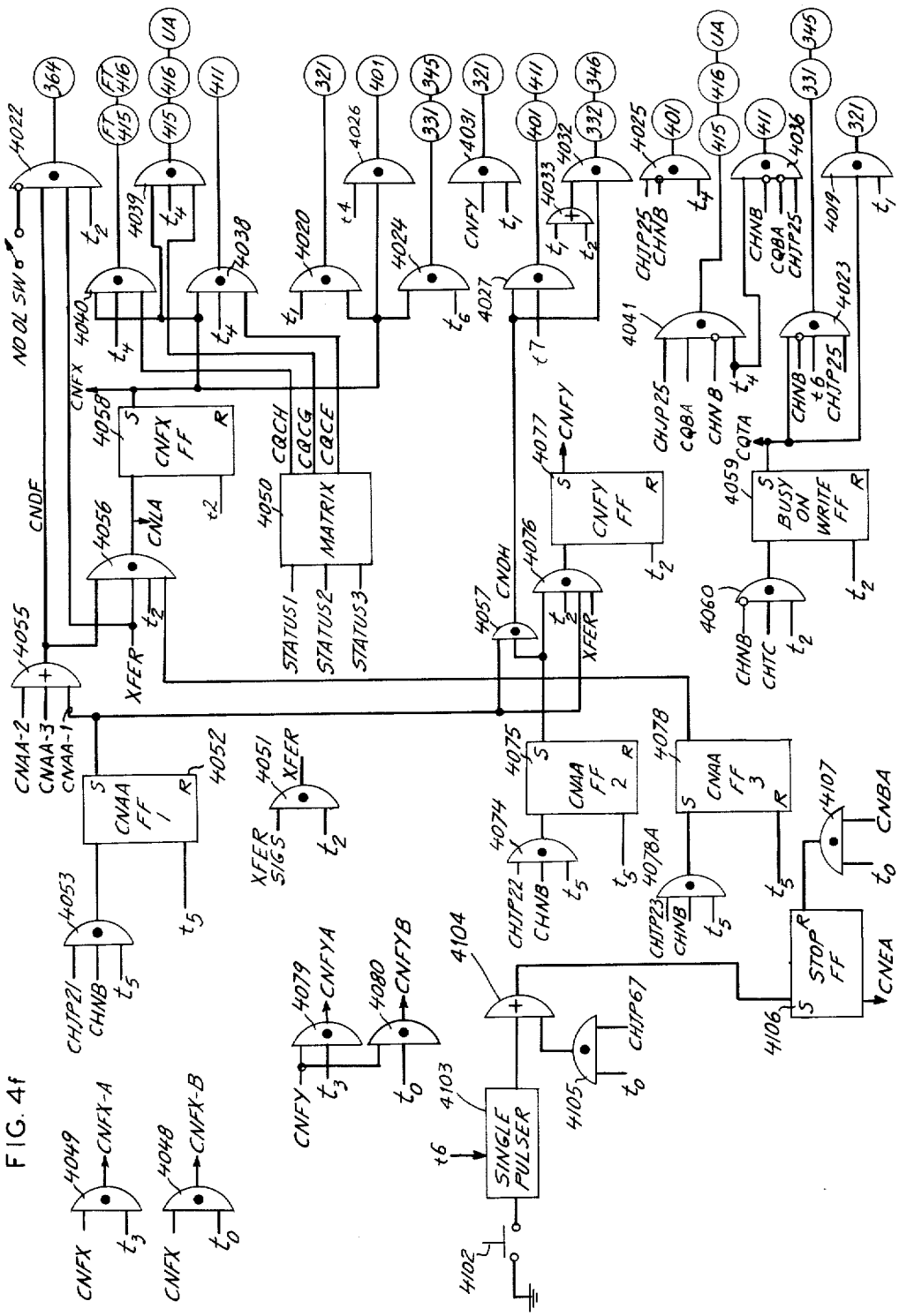

Consider now FIGURE 4f. Again this figure is for the most part concerned with signals generated during transfer of control instructions whether conditional or unconditional. CNAA–1 flip-flop 4052 is set when its input gate 4053 is enabled to pass a $t_5$ clock signal to the set input terminal thereof. Gate 4053 is enabled by a coincidence thereon of a CHJP 21 signal from the function encoder 210 and a CHNB signal from gate 483 (FIG. 4b). The set output of the CNAA–1 flip-flop is connected to a number of further elements which include buffer 4055, gate 4057 and gate 4076. The CNAA–2 flip-flop 4075 is similar to CNAA–1 flip-flop 4052 except that its input gate 4074 is enabled by a combination of CHJP 22 and CHNB to pass a $t_5$ clock signal. Similarly, CNAA–3 flip-flop 4078 is set by the coincidence on its input gate 4078A of the CHNB signal and the CHJP 23 function encoder signal again to pass a $t_5$ clock signal. Each of the CNAA flip-flops are reset by the application to the reset terminals thereof of a $t_5$ clock signal. Transfer gate 4051 may receive transfer signals from any one of a number of sources located within the Arithmetic Unit 131 of FIGURE 1. These transfer signals are representative of the results of tests taking place at various points within the machine and indicate whether or not certain comparisons have resulted. The receipt of a transfer signal enables the transfer gate 4051 to pass a $t_2$ clock signal resulting in a signal designated XFER.

As previously noted the output of CNAA–1 flip-flop is applied to buffer 4055. Also applied to this buffer are the outputs of the CNAA–2 and CNAA–3 flip-flops. The output from buffer 4055 is designated CNDF and is applied as a permissive input to gate 4056 as well as to gate 4022 in the timing decoder. Also applied as a permissive signal to this latter gate is the transfer signal obtained from transfer gate 4051. If, however, the No Overlap Switch should be engaged this will inhibit gate 4022. With permissive signals applied to gate 4022 it is enabled to pass a $t_2$ clock signal to the final encoder thereby to generate FT 364.

Gate 4056 constitutes the set input gate for CNFX flip-flop 4058. The permissive signals applicable to gate 4056 comprise the output signal CNDF from buffer 4055, the transfer signal XFER and the set output signal from CNAA–3 flip-flop 4078. The coincidence of these signals enables gate 4056 to pass a $t_2$ clock signal thereby to generate signal CNLA to set the block memory not busy flip-flop 485 (FIG. 4b) and to set CNFX flip-flop 4058. The resetting of this latter flip-flop is by application to the reset input terminal thereof of a $t_2$ clock signal. The output of flip-flop 4058 is designated CNFX and is applied to a number of gates in the timing decoder as well as to various other portions of the overall control system. Considering first of all the timing decoder it will be observed that gates 4040, 4039, 4038, 4020, 4026 and 4024 all receive permissive signals from CNFX flip-flop 4058. Gates 4040, 4039 and 4038 also have connected thereto, as permissive inputs, outputs from the status decoding matrix 4050. This decoding matrix comprises an array of gates (not shown in detail) to which are applied as inputs the outputs from the status flip-flops 1, 2 and 3, respectively, 335, 400 and 401, appearing on FIGURE 4e. If all three of the status flip-flops are in their set output condition that an output signal from decoding matrix 4050, designated CQCH, will be obtained. This, when coincident with a CNFX signal enables gate 4040 to pass a $t_4$ clock signal thereby generating FT 415 and FT 416 in the final encoder. If status 3 flip-flop should be in its set output condition along with either status 1 or status 2 an output from decoding matrix 4050 designated CQCG will be obtained. This, on being applied coincidentally with a CNFX signal to gate 4039, will pass a $t_4$ clock signal to the final encoder to generate FT 415, FT 416 and FTUA. If status 3 only is set then an output from decoding matrix 4050 will be obtained designated CQCE. This on being applied to gate 4038 in coincidence with CNFX permits the passage of a $t_4$ clock signal thereby to generate FT 411 from the final encoder.

Gate 4020 is enabled by CNFX to pass a $t_1$ clock signal the final encoder to generate therein FT 321. Gate 4026 is similarly enabled to pass a $t_4$ clock signal to generate FT 401. Gate 4024 is also similarly enabled to pass a $t_8$ clock signal to generate FT 331 and FT 345.

The output signals from flip-flops CNAA–1 and 2 are gated together in gate 4057 and where both signals are present, gate 4057 produces an output signal designated CNDH. The signal CNDH is permissive with respect to two gates 4027 and 4032 in the timing decoder. Gate 4027 is enabled to pass a $t_7$ clock signal to generate FT 401 and FT 411 in the final encoder. Gate 4032 is enabled to pass either a $t_1$ or a $t_2$ clock signal applied via buffer 4033 to the final encoder thereby to generate FT 332 and FT 346.

The output of CNAA–1 flip-flop is also as noted applied to gate 4076 constituting the set input gate for CNFY flip-flop 4077. This gate is rendered permissive with the coincidental application thereto of the set output signal from CNAA–1 flip flop 4052, the set output signal from CNAA–2 flip-flop 4075 and the transfer signal XFER. When permissive it will pass a $t_2$ clock signal to effect the setting of CNFY flip-flop 4077. The output of flip-flop 4077 is designated CNFY and applies to various elements throughout the control system. In the timing decoder CNFY is permissive with respect to gate 4031 which is enabled to pass a $t_1$ clock signal to the final encoder to generate FT 321.

The outputs of CNFX flip-flop 4058 and CNFY flip-flop 4077 are each split into a pair of outputs. Thus the signal CNFX is applied to gates 4049 and 4048 and these are rendered permissive to pass respectively a $t_3$ clock signal and a $t_0$ clock signal. The output of gate 4049 is designated as CNFX–A and the output of gate 4048 is designated as CNFX–B. The application of these signals at various points has already been noted. However, by way of recollection it may be observed that CNFX–A will reset call flip-flop 310 on FIGURE 4a via buffer 340A and will set ending pulse storage flip-flop 305 via buffer-304A. The CNFX–B signal is also applied to various points and it may be observed that this signal will effect the resetting of the status 1 flip-flop 335 via buffer 4017 and the resetting of status 2 flip-flop 400 via buffer 4018.

The signal CNFY is applied to gates 4079 and 4080 and these are respectively enabled to pass $t_3$ clock signal and a $t_0$ clock signal thereby generating CHFY–A and CNFY–B. CHFY–A which, as previously noted, is effective to set call flip-flop 310 via buffer 309A, and to reset call from C2 flip-flop 412, completing call from C2 flip-flop 413, and exchange flip-flop 414 furthermore enables buffer 4002 to generate CSBX (FIG. 4e). CNFY–A also effects a setting of ending pulse storage flip-flop 305 (FIG. 4a), while CNFY–B effects a resetting of status 1 flip-flop 335 via buffer 4017 (FIG. 4e).

Another logical network found on FIGURE 4f is the busy on write flip-flop 4059. This has its set input terminal connected to the output of gate 4060. Gate 4060 is enabled by a CHTC signal derived from the instruction decoder 204 of FIGURE 2. This signal is generated by instructions requiring the writing of information into the memory. Gate 4060 is inhibited by the presence of a CHNB signal but in the absence of this latter signal and the presence of a CHTC signal it will be enabled to pass the $t_2$ clock signal to effect a setting of busy on write flip-flop 4059. The set output of this latter flip-flop is designated CQTA. Gate 4023 is enabled by the CQTA signal, the CHNB signal and the CHJP 25 signal from the function encoder 210 of FIG. 2 to pass a $t_6$ clock signal thereby to generate in the final encoder FT 331 and FT 345. Gate 4019 is enabled by the CQTA signal to pass a $t_1$ clock signal thereby to generate in the final encoder FT 321.

Gate 4025 is enabled by CHJP 25 and inhibited by CHNB. When enabled gate 4025 passes a $t_4$ clock signal to generate FT 401 in the final encoder. Gate 4041 is also enabled by CHJP 25 and inhibited by CHNB but requires as an additional enabling signal CQBA from status 1 flip-flop 335. Gate 4041 when enabled passes a $t_4$ clock signal to generate FT 415, FT 416 and FTUA. Gate 4036 is enabled by CHJP 25 but is inhibited by either CHNB or CQBA. When enabled gate 4036 passes a $t_4$ clock signal to generate FT 411.

The stop circuits are also shown on FIGURE 4f. Flip-flop 4106 is the stop flip-flop and when set produces an output signal designated CNEA. This is applied, as previously noted, to gates 330A and 332 in FIGURE 4b as an inhibit signal, each of these gates being in the timing decoder and to gate 336 in FIGURE 4a again as an inhibit. This latter gate serves as one of the sources of set input signals to the ending pulse storage flip-flop 305. Flip-flop 4106 will be set by the application to the set input terminal thereof of a $t_0$ clock signal passed by gate 4105 when gate 4105 is rendered permissive by a CHJP 67 signal from the function encoder of FIGURE 2. The stop flip-flop 4106 may also be set by means of the stop button 4102. When stop button 4102 is depressed it causes single pulser 4103 to pass the first $t_6$ timing signal from the clock via buffer 4104 to the set input terminal of the stop flip-flop 4106. Stop flip-flop 4106 is reset from gate 4107. Gate 4107 is rendered permissive by CNBA signal obtained from the set output terminal of the start flip-flop 302. The application of the CNBA signal to gate 4107 allows this gate to pass a $t_0$ clock signal to effect the resetting of the stop flip-flop.

Consider now the operation of the overall computer with respect to the control functions provided by FIGURE 4 in view of the contingencies which may arise. Initially, FIGURE 4 will be considered with respect to the basic contingencies which may arise in carrying out those arithmetic instructions which require only one minor cycle for execution in the Arithmetic Unit. As the description proceeds it will be indicated how FIGURE 4 is enabled to provide for all contingencies regardless of the type of instruction being executed. For the time being, however, it will be assumed that all instructions are arithmetic in nature and require one minor cycle of time for execution by the Arithmetic unit.

To be considered with reference to FIGURE 4 at present is FIGURE 8. FIGURE 8 is a timing diagram which comprises five sheets 8a–8e respectively. When assembled in a horizontal row from FIGURE 8a to 8e, FIGURE 8 will show the states existing in the various major elements of FIGURE 1 and some of the elements of FIGURE 4 over a period of thirty minor cycles and includes the start operation, the stop operation, and various contingencies leading to losses of overlap as well as the regaining of overlap after such losses. In reading the timing diagram of FIGURE 8 and reconciling such timing diagram to the times shown in conjunction with the timing decoder of FIGURE 4 it is to be understood that the times shown on FIGURE 8 are those times at which signals are actually set up within the elements. Since most of the major elements include pulse formers and since one pulse time is required between the application of an input to such an element and an output to be obtained therefrom it is obvious that the timing indicated by the timing decoder of FIGURE 4 will be one pulse time in advance of the time in which the various elements are actually set up.

In conjunction with the timing diagram it will also be observed that for reasons of simplicity in presentation and to avoid overburdening of the case with minor details, only the events which concern major elements are shown. To a limited extent the condition of certain of the flip-flops appearing in FIGURE 4 may also be shown in certain conditions. The elements with which FIGURE 8 is concerned and for which the timing is specifically shown include the following: control counter-1 (104), instruction register-1 (101), instruction register-2 (107, 107A, 108); B-adder input-1 (via gates 134, 135, 136, 137 and 138); B-adder input-2 (via gates 133, 153, 152, 160); memory address decoder (141), information lines coming from the memory, selector storage 113, register selector 118, addressable register recirculation pulseformers (124), Arithmetic unit control (130), M input register to Arithmetic unit (150), A input to Arithmetic Unit 129A and the Arithmetic Unit result lines (see also register 523, FIG. 5). Also shown are the memory not busy signals CGNB (see gate 7–31, FIG. 7b) as derived from the memory and the condition of the four status flip-flops 335, 400, 401 and 402 respectively appearing on FIGURE 4e.

The first minor cycle following actuation of the start button has already been considered in conjunction with FIGURE 3a and is not specifically shown by FIGURE 8. It is sufficient to note that with the receipt of the $t_7$ pulse from the single pulser 301 (FIG. 4a), start flip-flop 302 will produce the set output signal CNBA by time $t_0$ and subsequently receives a reset input signal at time $t_5$. The set output signal from flip-flop 302 (CNBA) enables gate 334A to pass a $t_3$ clock signal to set call flip-flop 310 via buffer 309A. Call flip-flop 310 will produce an output signal CSAA at $t_4$ of the first minor cycle. Also as previously noted in conjunction with FIGURE 3a ending pulse storage flip-flop 305 will be set through generation of CNBA to produce a set output signal CSAR at $t_2$ of the first minor cycle. The first minor cycle however with which FIGURE 8 is concerned assumes these events to have taken place. Therefore, at $t_0$ of what is actually the second minor cycle, although the first to be shown on FIGURE 8, gate 315 is effective via the final encoder to generate FT 411 and FT 401 as will be noted from FIG. 1b enables gate 153 to place zeros on input 2 of the B-adder and FT 401 enables gate 137 to read the contents of the control counter-1 (104) into the first input of the B-adder. FIGURE 8 indicates, therefore, that at time $t_1$, N from the first control counter (104) is set up in the B-adder along with zeros to be added thereto. At time $t_2$ an output will be obtained from the B-adder representing the sum of $N+0$, and at $t_2$ it will be observed from the timing decoder of FIGURE 4a that gate 311 passes a $t_2$ clock signal thereby to generate FT 363. Again reference to FIG. 1b will show that FT 363 enables the output of the B-adder 139 to be placed into the memory address decoder 141. Since this element also involves pulseformers, N is shown set up therein at $t_3$ of this first minor cycle as indicated on line MAD of FIG. 8a.

It will be assumed initially that the memory is not busy. Accordingly, the application of N to the memory address lines will result in the memory generating the CGNB signal for instruction N at time $t_4$. By reference to FIGURE 4a, it will be noted that since call flip-flop 310 is still set, gate 314 will be enabled to pass the $t_4$ clock signal to set completing call flip-flop 319. The output signal CSCL obtained therefrom enables still further signals to be generated. Thus, at $t_6$ of the first minor cycle call flip-flop 310 is reset via gate 337 and buffer 340A. At $t_0$ of the second minor cycle gates 320 and 320' in the timing decoder are enabled by CSCL to generate FT 401, FT 411 and FTUA. Also gate 324 appearing on FIGURE 4e is enabled. Thus, N from control counter-1 is again placed on input 1 of the B-adder. Input 2 of the B-adder, however, receives decimal digit one (00001) from register 147 and the carry input since both FT 411 and FTUA are present. Thus, a second instruction call is made and this time the call is to location $N+1$ in the memory.

Status-1 flip-flop 335 is set when gate 324 (enabled by CSCL) passes a $t_0$ clock signal. The set output of status-1 flip-flop 335 (signal CQBA) is obtained at time $t_1$ of the second minor cycle and this signal is applied along with the CSAR signal obtained from ending pulse storage flip-flop 305 (FIG. 4a) to gates 306 and 333A. These gates when thus enabled pass $t_2$ clock signals to generate respectively FT 432 and FT 363. At this time gate 322 is enabled by the CSCL signal from the completing call flip-flop 319 to pass a $t_2$ clock signal to generate FT 320, FT 331 and FT 345. FT 363 as previously noted gates $N+1$ from the output lines of the B-adder into the memory address decoder 14 so that the second instruction ($N+1$) is called for. At time $t_2$ (of the second minor cycle) the first instruction (contents of memory location N) will be available on the High Speed Bus HSB (see line marked HSB of FIG. 8) from the memory. FT 320 enables gates 100 (FIG. 1a) to pass instruction N into IR–1. Also the B digits from this instruction are passed directly from HSB into the register selector 118 by the application of FT 320 and FT 432 to gates 117. The B digits in register 118 are applied to the register selector decoder (FIG. 1c) so that one of the 100 registers may be selected for use in the B-modification operation. Signal FT 432 as will be noted from FIGURE 4a is also effective to set B-mod flip-flop 308 and call flip-flop 310 and to reset ending pulse storage flip-flop 305. The signals FT 331 and FT 345 respectively clear N from control-counter-1 (104) and enable gates 143 so that the digits $N+1$ coming from B-adder 139 are passed into the aforesaid control counter.

Thus, referring to FIGURE 8 the second minor cycle shows that at time $t_3$ $N+1$ will now be stored in control counter 1 (see line marked CC1 on FIG. 8). The first instruction, comprising IABM', derived from memory location N, will be stored in IR–1 (see line marked IR–1 on FIG. 8), the call for the subsequent instruction $N+1$ will have been applied to the memory address decoder 141, and the B digits from instruction N will be stored in the register selector 118. Again, it is assumed that at $t_4$ the memory not busy signal CGNB will be obtained. Also at $t_4$ FT 435 is obtained from buffer 461 on FIGURE 4b. This latter is effective to clear the register selector 118.

The signal CSBM from the set output terminal of B-mod flip-flop 308 is applied to gates 335a, 335a' and 468 so that at $t_5$ the following signals are generated in the final encoder: FT 312, FT 400, FT 410, FT 425. FT 312 enables gates 102 and 103 to pass the I digits and the A digits in IR–1 to Sections 107 and 107A respectively in Instruction Register-2. Thus, at $t_6$ of the second minor cycle such digits will actually be set up in IR–2 and the I digits will be available for decoding (see, particularly FIGURE 2). The FT 400 signal enables gates 136 to pass the M' digits stored in IR–1 into Input–1 of the B-adder (see line marked B input 1 on FIG. 8). The FT 410 signal enables gates 133 to pass the five least significant digits from the addressable register designated by the B digits of instruction N into input 2 of the B-adder (see line marked B input 2). This is the B-modification operation by which the designation of operand addresses may be varied for each instruction. The FT 425 signal enables gates 122 to recirculate the information obtained from the selected addressable register via the regeneration pulse formers 124.

At time $t_7$ gates 145 (FIG. 1b) are enabled and a comparison is made between the B digits of instruction N (stored in IR–1) and the contents of selector storage 113. A similar comparison will also have been made at time $t_3$ with the B digits stored in register selector 118 passed via gates 119 to the register selection comparator 142. Since the computer has just been started selector storage 113 will be in its cleared state and register selection comparator 142 will generate a CAAL signal. Since B-mod flip-flop 308 is presently generating CSBM gate 496 (FIG. 4b) is enabled to pass a $t_7$ clock signal thereby to set the not equal flip-flop 492. Signals CAAL and CAAM are mutually exclusive therefore equal flip-flop 493 will be in its reset condition at this time and, gate 494 is thereby enabled to generate the CSBS signal. Also at time $t_7$ of the second minor cycle gate 468 (enabled by CSBM) passes a signal to generate in the final encoder FT 311 (FIG. 4a). Since at time $t_7$ the B-adder 139 has as its output the sum of the M' digits of instruction N and the digits from the selected B register, this sum will be passed via gates 105 into section 108 of IR–2 and at $t_0$ of the third minor cycle these modified M digits will be set up in IR–2. Finally at $t_7$ FT 363 will be generated. This signal is obtained at this time from gate 465 on FIGURE 4b and will be so obtained by the generation of a CHRM signal. CHRM is generated from the instruction digits of the instruction N which are now in IR–2. When these instruction digits specify an instruction requiring that a read from the memory be performed the CHRM signal will be obtained from the Program Counter decoder 207 of FIGURE 2. The CHRM signal is effective to render gate 465 permissive so that the $t_7$ pulse passing therethrough generates the signal FT 363. As previously noted the FT 311 signal from gate 468 (FIG. 4a) permits the read in to section 108 of IR–2 of the modified M digits obtained from the output of the B-adder 139. The FT 363 signal permits these M digits from the B-adder to be set up in the memory address decoder 141 to be sent therefrom to the memory address lines on which they specify the address of an operand to be derived from the memory.

It is to be observed that at this time the completing call flip-flop 319 is still set. Completing call flip-flop 319 was set by the enabling of gate 314 through the combination of the set output signal CSAA from call flip-flop 310 and the CGNB signal derived from the memory as the result of the second instruction call, and while a reset signal was applied to the reset input terminal of completing call flip-flop 319 at the same time ($t_4$) as the set signal was applied, it shall be shown subsequently that all flip-flops are of a design such that where signals are simultaneously applied to both the set and reset input terminals the set input signal always overrides the reset input signal. Accordingly, at $t_0$ of the third minor cycle completing call flip-flop 319 is set and the CSCL signal obtained therefrom is once again permissive with respect to gates 320 and 320' so that once again the signals FT 401, FT 411 and FTUA are generated by the final encoder. These, as in the previous instance, enable the first control counter 104 to pass its contents ($N+1$) into input 1 of the B-adder and for decimal digit 1 (00001) to be placed on Input 2 of the B-adder. Accordingly, the contents of the first control counter 104 are once again increased by one so that a call for the next succeeding instruction ($N+2$) may be made. As in the previous instances the times at which the foregoing signals are actually set up in the respective inputs to the B-adder appear on the timing diagram at $t_1$ of the third minor cycle.

Since at $t_0$ the memory has been addressed for the extraction therefrom of an operand, at $t_1$ a memory not busy signal will be obtained, assuming as in previous instances that the memory is indeed not busy. This signal CGNB is applied as shown to gate 328A in FIGURE 4b. Because the instruction presently in IR–2 is assumed to be of the type requiring a memory access the CHTA signal will be obtained from the instruction decoder 204 of FIGURE 2. Accordingly, gate 328A will be permissive with respect to the $t_1$ clock signal, and the output of this gate designated CHNA is thereafter effective to set the operand memory not busy flip-flop 331 and true memory not busy flip-flop 480. Both of these flip-flops will produce an output signal by time $t_2$ of the third minor cycle. For the time being the only flip-flop which must be considered is the operand memory not busy flip-flop 331. Its output signal CHNB–A is applicable to a number of further elements. First of all it will be noted that CHNB–A operates as a permissive signal for gates 330A and 332. Both of these gates require as additional permissors a CHJP–EP signal and this signal is obtained from the function encoder of FIGURE 2 considering the fact that the instruction is still being stored in Section 107 of IR–2, and considering further the assumption that the instruction is of a type requiring only one minor cycle for its execution in the Arithmetic Unit. Gate 332 requires, in addition, a CQBA output signal from the status-1 flip-flop 335 and this will, in fact be obtained from the previously established set condition of this latter flip-flop. Both of these gates, therefore, pass $t_2$ clock signals so that FT 363 and FT 432 are generated by the final encoder. FT 363 as in the previous instances permits the output from B-adder 139 to be passed to the memory address decoder 141 so that the third call to the memory for an instruction $(N+2)$, is made. The signal FT 432 as in pevious instances, is effective as a permissive signal on gates 117 on FIGURE 1 and as a set input signal for B-mod flip-flop 308 and call flip-flop 310 (FIG. 4a).

At time $t_2$ completing call flip-flop 319 is still set so that the CSCL signal is still effective to enable gate 322 to drive the final encoder whereby again signals FT 320, FT 331 and FT 345 are generated. These signals, as in the previous instance, permit the passing of the contents of memory location $N+1$ (representing the next instruction) from HSB into IR–1, and the clearing of control counter-1 and the reading thereinto of the digits $N+2$ derived from the output of the B-adder. Through the enabling of gates 117 (FT 320, FT 432) the M′ digits of instruction $N+1$ are modified as previously described.

Referring briefly to FIGURE 4e and considering for the moment the previous discussion of the equality comparison circuits of FIGURE 4b it will be recalled that at $t_7$ of the preceding minor cycle (MC2) the inequality flip-flop 492 (FIG. 4b) has been set while the equal flip-flop 493 is in its reset condition so that gate 494 will at $t_0$ of the third minor cycle be producing a CSBS signal. This signal coacting with the CQBA signal from status-1 flip-flop permits the passage of the $t_0$ clock signal through gate 403 thereby to effect a setting of the status-2 flip-flop 400 (FIG. 4e). The status-2 flip-flop will accordingly be producing the status-2 output signal by time $t_1$ of the third minor cycle.

Again with reference to FIGURE 4a, signal CSBS enables gate 458 to pass the $t_1$ clock signal to generate FT 321. FT 321 clears IR–1.

Returning once again to the operand memory not busy flip-flop 331 (FIG. 4b) a CHNB–A signal obtained therefrom is permissive with respect to gate 483. The output from this gate (designated CHNB) is similarly permissive with respect to gates 466 and gates 464 in the timing decoder. Prior, however, to the time at which these gates pass signals gate 463 is rendered permissive by the CHJP 30 signal. This signal is generated from the function encoder 210 (FIG. 2) by all instructions which require the selection of an addressable register in order to obtain an operand therefrom. Accordingly, at $t_2$ assuming instruction N to have been of such nature, gate 463 causes the final encoder to generate FT 403 and FT 411. These signals enable gates 153 and 134 on FIG. 1c) respectively, to pass decimal zeros into input 2 of the B-adder and the A digits from section 107A of IR–2 into input-1 of the B-adder. The output of the B-adder 139 thus comprises the A digits stored in Section 107A on IR–2 and is now directed to the register selector 118 by means shown hereinafter. In this instance these A digits are not changed in any way but rather the B-adder serves as a conduit and also serves to perform certain timing functions. At time $t_4$ gate 466 is enabled by CHNB and a CHJP 54 signal. This latter signal is derived from function encoder 210 for all instructions involving the ultimate storage of a result in a selected addressable register. Gate 466 drives the final encoder to derive FT 403 and FT 411 for a second time within the same minor cycle. It is to be noted, however, that the second derivation of these signals is for the purpose of setting up the selector storage 113 in order to preserve the address of the addressable register wherein the result is to be stored. Accordingly, at $t_4$, FT 403 and FT 411 again place the A digits from section 107A of IR–2 into the B-adder along with zeros from the zero register 147.

The CHNB signal from gate 483 is also applied to gates 426, 426A, 425, and 419A appearing on FIGURE 4c. These gates form an essential part of the addressable register chain. Gate 426 requires for its enabling a CHJP 27 signal in addition to the CHNB signal. The CHJP 27 signal is generated by instructions requiring the use of the addressable registers and it will be assumed that this signal is presently generated. Accordingly, gate 426 passes the $t_3$ clock signal via buffer 426B to set the AR–AU input flip-flop 415 and this, in turn, produces a signal designated CHBA at $t_4$. Similarly, the CHJP 50 signal is passed via buffer 425A as an enabling signal to render gate 425 permissive and is generated by those instructions requiring the use of addressable registers whereby the result of such an instruction is stored. Accordingly, with the CHNB signal gate 425 is permissive to pass a $t_4$ clock signal so that AU–AR flip-flop 418 is set thereafter to generate a signal designated CHCA. Gate 419A is rendered permissive by a CHTA signal generated from the instruction decoder 204 (FIG. 2) by those instructions requiring memory access, in combination with the CHNB signal. Thus, gate 419A passes a $t_4$ clock signal to set generate 370 flip-flop 419.

Accordingly, at $t_4$ (of the third minor cycle) the following events take place: the CGNB memory not busy signal is obtained from the memory for the instruction $N+2$ call; clear signal is applied to register selector 118 (FT 435) to clear therefrom the B digits, and gating signals FT 403 and FT 411 permit the A digits of instruction N to be passed into the B-adder for the second time. Also gate 435 in FIGURE 4c is enabled to pass a signal to generate from the final encoder FT 431. Thus, register selector 118 is cleared of its B digits while gates 115 are enabled to pass the A digits from the B adder output into register selector 118.

At $t_5$ a B modification operation is performed again, this time on the M′ digits of Instruction $N+1$. This follows when it is considered that the B-Mod flip-flop 308 has been set by FT 432 obtained via gate 332 (FIG. 4b), to generate CSBM thus enabling gates 335 and 335A to drive the final encoder to generate once more FT 312, FT 400, FT 410 and FT 425. These signals are effective as in the previous instance to pass the A and I digits of instruction $N+1$ from IR–1 into IR–2; to pass the M′ digits from IR–1 into input 1 of the B-adder; to pass the five least significant digits from the addressable register selected by the B digits of the $N+1$ instruction into input 2 of the B-adder, and finally to permit recirculation of the contents of the selected addressable register via regeneration pulseformers 124.

The CHJP (EP) signal generated by instruction N coacts with the CHNB signal to enable gate 475 on FIGURE 4b. Gate 475 accordingly passes a $t_3$ clock signal to set the program counter clear flip-flop 473. The output signal therefrom designated CPKD is enabling with respect to gate 471 and with respect to gate 460 in the timing decoder. Thus at $t_5$ FT 313 is generated from gate 460 which effects a clearing of the I and A digits of instruction N from sections 107 and 107A of IR–2 at the same time as the I and A digits from instruction

41

$N+1$ are passed thereinto. Gate 471 also enabled by CPKD passes a $t_6$ pulse to set the clear IR–2 flip-flop 464A. The set output signal from flip-flop 464A is available at time $t_7$ and enables gate 459 in the timing decoder to pass the $t_7$ pulse to generate FT 314. FT 314 clears the M digits of instruction N from section 108 of IR–2 whereafter the M digits from instruction $N+1$ may be set up therein.

In FIGURE 4*b* gate 464 will be receiving thereon the CHJP 38 signal from function encoder 210. This signal is generated from the function encoder by all instructions requiring that encoded instruction digits from encoder array 110 be sent to the Arithmetic Unit 131. Thus, gate 464 will be enabled by CHJP 38 coacting with the CHNB signal from gate 483 to pass the $t_5$ clock signal thereby to generate FT 300 and this latter signal permits the encoded instruction digits from the Arithmetic Unit instruction encoder 110 to be passed into AU control 130.

At $t_5$ flip-flops 418 and 419 on FIGURE 4*c* will both be producing their output signals. It will also be noted from FIGURE 4*c* that the CHBA signal from flip-flop 415 is applied to gates 423 and 424. Herein it is to be observed that a further equality comparison has been made. This time the comparison is between the A digits now in the register selector 118 as received from the B adder output via gates 115, and the contents of selector storage 113. Since, at the present time, selector storage 113 is still in its cleared state the register selection comparator 142 will produce a CAAL signal. Accordingly, gate 424 will pass a $t_5$ clock signal to set unequal flip-flop 417 which generates an output signal at time $t_6$ of the third minor cycle.

At time $t_6$ the CHCA signal generated by flip-flop 418 enables gate 432 to drive the final encoder to generate FT 421. FT 421 is permissive with respect to gates 112 on FIG. 1*b* and at this time the B-adder 139 will be generating a sum output following the second passing thereto of the A digits from section 107*a* of IR–2. These A digits as previously noted, specify the addressable register in which the eventual result from instruction N is to be stored. Thus, FT 421 enables these A digits to be set up in selector storage 113 wherein they appear at time $t_7$ of the third minor cycle.

At time $t_7$ of this third minor cycle the contents of the addressable register A comprising one of the operands of instruction N will be available and also available will be the contents of memory location $M_N$ comprising the other operand for this instruction. The set output signal of the inequality flip-flop 417 enables gate (FIG. 4*c*) to pass a $t_7$ clock signal to generate FT 380. At the same time gate 434 enabled by CHBA supra generates FT 425. Accordingly, the contents of the selected addressable register are passed through gates 128 (FIG. 1*c*) by the FT 380 signal into the A input pulse formers 129A of the arithmetic unit 131 and will be set up in pulse formers 129A at time $t_0$ of the fourth minor cycle. Also FT 425 permits recirculation of the contents of the selected addressable register via the regeneration pulse formers 124. At the same time gate 431 (FIG. 4*c*) is enabled by the set output signal to generate 370 flip-flop 419 drives the final encoder to generate FT 370. FT 370 is enabling with respect to gates 146 (FIG. 1*c*) whereby the M operand derived from the memory is passed from the High Speed Bus HSB into the M input register 150.

It will be observed that following the B modification performed on the M′ digits of instruction $N+1$ via the B adder the modified digits M will call the memory for the selection of an operand. This follows the assumption that a CHRM signal has been generated by the I digits of instruction $N+1$ now in section 107 of IR–2. This aforesaid CHRM signal enables gate 465 (FIG. 4*b*) to pass the $t_7$ clock signal thereby to generate FT 363 in the final encoder. Thus, again the output of the B adder (this time the M digits from instruction $N+1$) is gated into the memory address decoder 141 and these same M digits are gated into section 108 of IR–2 (by FT 311 from gate 468)

42 which as noted previously is cleared of its previous content by FT 314. Thus, at $t_0$ of the fourth minor cycle the memory is once again addressed for an operand. Also at $t_0$ of the fourth minor cycle the M operand and A operand from instruction N are set up in the Arithmetic Unit inputs.

At $t_5$ of the third minor cycle gate 408 on FIGURE 4*e* will have been enabled by the CHJP–EP signal coacting with the CHNB signal from gate 483. Thus, at $t_5$ the ending pulse delay flip-flop 407 will have received a set input signal thereto so that at $t_6$ it will generate its output signal CSPA. This signal CSPA is applied to gate 404 also on FIGURE 4*e* along with the set output signal from the status–2 flip-flop 400. Thus, at $t_0$ of the fourth minor cyclst status–3 flip-flop 401 receives a set input signal so that at $t_1$ thereof the status–3 flip-flop will be in its set output condition.

If the foregoing events continue in normal sequence it is apparent that by the next minor cycle all four status flip-flops will be in their set condition and the computer will be operating in full overlap. However, at this point it is desired to introduce one of the various contingencies in order to observe its effect on the overall operation. It is stipulated therefore, that in the fourth minor cycle when the memory is addressed for the M operand of instruction $N+1$ there is a failure to receive the memory not busy signal CGNB. The consequences which follow from such a failure will be observed from the timing diagram of FIGURE 8*a* and may also be determined from a study of various portions of FIGURE 4.

It will be appreciated that via buffer 343A on FIGURE 4*b* a $t_5$ clock signal will be applied every minor cycle to the reset input terminal of operand memory not busy flip-flop 331. Accordingly, by time $t_6$ of the third minor cycle flip-flop 331 is no longer producing its set output signal CHNB–A. Normally, with receipt of the CGNB signal at $t_1$ (assuming the presence of a CHTA signal from the nature of the instruction), flip-flop 331 would have had applied to the set input terminal thereof, the $t_1$ clock signal via gate 328*a* and buffer 329. However, the failure of the CGNB signal following the call to the memory for an operand determines that at time $t_2$ of the fourth minor cycle the CHNB–A signal will not be generated. Thus, while completing call flip-flop 319 (FIG. 4*a*) is still set to provide FT 401, FT 411 and FT UA via gates 320 and 320′, thus passing the contents of the first control counter 104 through the B adder and augmenting such contents by one, gate 330A in FIGURE 4*b* is not enabled and FT 363 is not generated at time $t_2$. Accordingly, gates 140 (FIG. 1*b*) are not alerted and the memory is not addressed for instruction $N+3$. Furthermore, gate 332 does not receive its enabling CHNB–A signal so that FT 432 is not generated. Accordingly, at $t_2$ B mod flip-flop 308 (FIG. 4*a*) fails to receive a set input signal and is therefore reset via buffer 342A. However, the CSCL signal still being generated from completing call flip-flop 319 enables gate 322 to pass a $t_2$ clock signal thereby to generate FT 320, FT 331 and FT 345. The signals FT 331 and FT 345, as previously, pass the output of B-adder 139 into control counter 104 via gates 143 after clearing the previous contents of the control counter. Also FT 320 passes the instruction $N+2$ from the memory lines into IR–1 via gates 100. However, since FT 432 is not generated, the B digits from instruction $N+2$ are not passed into register selector 118 via gates 117 (FIG. 1*b*) at this time. Accordingly, there is no selection of an addressable register for B-modification purposes. Furthermore because of failure to set B-mod flip-flop 308, CSBM is not generated and accordingly, gates 335, 335A and 468 in FIGURE 4*a* are not enabled so that the signals FT 312, FT 400, FT 410, FT 425, and FT 311, are not generated. In the absence of FT 312 the instruction digits and the A digits presently in IR–1 are not gated into IR–2 which retains the digits of the preceding instruction $N+1$. Such retention follows from the failure to generate CHNB so that flip-flop 473 (FIG. 4b) fails to receive a set input signal. The failure of FT 400 prevents section 108 of IR-2 from passing its contents into the B-adder via gates 136 and the failure of FT 410 prevents any information from passing into the B-adder via gates 133. Since no call has been made to the addressable registers 121 for the selection of an operand therefrom there is of course no need at this time to regenerate a selected register. Accordingly, FT 425 is unnecessary. The failure of CSBM also prevents the generation of FT 311 at time $t_7$ via gate 468 so that gates 105 (FIG. 1a) are not enabled.

It is to be observed that CHJP 30 previously discussed, is generated by instruction $N+1$ to render gate 463 permissive so that at $t_2$ FT 403 and FT 411 will be generated. These as in the previous instance allow the A digits from section 107a of IR-2 to be passed through the B-adder along with zeros presumably to select an addressable register for an A operand. However, the failure of the CHNB signal prevents the flip-flops appearing in FIGURE 4c as previously discussed, from being set. Of these, flip-flop 415 will have received a reset input at $t_0$ of the fourth minor cycle and flip-flop 417 will likewise have received a $t_0$ reset input signal. Flip-flop 419 will also have been reset at time $t_0$ of the fourth minor cycle. Flip-flop 418 does not receive a reset input until $t_4$ of the fourth minor cycle as shall be seen hereinafter. It is necessary to keep this flip-flop set for storing the results of the preceding instruction N. Flip-flop 428 on the other hand does not receive a set signal until $t_3$ of the fourth minor cycle. The reasons for this sequence of events will become apparent when the fifth minor cycle is discussed.

In the meantime the memory is again called for the M operand of instruction $N+1$. Reference to FIGURE 4d will show the means by which this is accomplished. Gate 4029 appearing on FIGURE 4d is enabled by a CHRM signal derived from the Program Counter decoder 207 of FIGURE 2 and discussed supra.

Gate 4029 is inhibited by the presence of a CHNB signal. Since, however, at the present time the CHNB signal is absent, gate 4029 will be enabled to pass a $t_5$ clock signal thereby to generate in the final encoder FT 402 and FT 411. Signal FT 402 enables gates 135 so that the contents of section 108 of IR-2 (which is presently storing the M digits of instruction $N+1$ already modified) are passed into input-1 of the B-adder. Signal FT 411 enables gates 153 and causes zeros to be placed on input 2 of the B-adder 139 from zero register 147. The same CHRM signal is also permissive with respect to gate 465 in FIGURE 4b thereby to generate in the final encoder FT 363 at time $t_7$. The signal FT 363 as hereinabove permits the M digits emerging from the B-adder output to be passed into the address decoder 141 in order again to address the memory for the M operand of instruction $N+1$.

Before considering the events following, consider now the result chain of instruction N. It will be recalled that at $t_4$ of the third minor cycle the AU to AR flip-flop 418 on FIGURE 4c received a set input signal thereby to derive signal CHCA at $t_5$ of the aforesaid third minor cycle. Since this flip-flop 418 is not reset until time $t_4$ of the fourth minor cycle it follows that at time $t_3$ of the fourth minor cycle gate 427 will be enabled to place a set signal on delay flip-flop 428. The set output from delay flip-flop 428 will be available by time $t_4$ of the fourth minor cycle. Accordingly, gate 430 is enabled to pass a $t_6$ clock signal to the final encoder thereby generating FT 434. From FIGURE 1c it may be determined that FT 434 is permissive with respect to gates 114 whereby the contents of selector storage 113 are passed into register selector 118 to choose the A register in which the results of the computation of instruction N are to be stored. Since all instructions are presently considered to involve one minor cycle of arithmetic unit time it will be appreciated that by time $t_7$ of the fourth minor cycle the result of instruction N will be available at the output of arithmetic unit 131. Accordingly, it is desired to store this result in the selected addressable register A. The selection of this register via selector storage 113 and register selector 118 causes the contents of such register to be read out, and since such read out is destructive in nature unless a subsequent regeneration takes place it is apparent that the pre-existing contents of register A will be destroyed. However, at $t_1$ of the fifth minor cycle gate 429 is enabled and drives the final encoder thereby to generate FT 426. The signal FT 426 is permissive with respect to gates 126 (FIG. 1c) and these pass the arithmetic unit result through the regeneration pulseformers 124 and into the addressable register A as selected from selector storage 113.

At time $t_6$ selector storage 113 will have received a clear signal so that in the absence of incoming information at time $t_7$, selector storage 113 will remain cleared. Also at time $t_0$ of the fifth minor cycle FT 435 will have been generated via buffer 461 thereby to clear out register selector 118. At $t_1$ of the fifth minor cycle IR-1 is not cleared as is usually the case. Generally speaking every $t_1$, IR-1 will be cleared by the application thereto of FT 321. This signal is derived inter alia from gate 458 appearing on FIGURE 4a and such gate is as previously noted enabled by the CSBS signal derived from gate 494 on FIGURE 4b. It will be appreciated that the CSBS signal will not at this time be generated and the reason for this is apparent when it is considered that the B-mod flip-flop 308 was reset during the preceding minor cycle and has not yet again been set. Thus, the CSBM signal necessary to enable the setting of flip-flop 492 at $t_7$ is absent so that the $t_5$ clock signal applied to the reset input terminal of flip-flop 492 is able to effect a resetting thereof. Since both flip-flops 492 and 493 are reset it follows that neither of signals CSBG or CSBS are present. Thus, FT 321 is not generated and IR-1 is not cleared.

The effect of the failure to get a memory not busy signal CGNB as regards the status flip-flops (FIG. 4e) will not become apparent until the fifth minor cycle. At $t_0$ of the fifth minor cycle the status 3 flip-flop is still set and this set output signal is applied to gate 405 thereby to pass the aforesaid $t_0$ timing signal to set status 4 flip-flop 402 by time $t_1$ of the fifth minor cycle. Because of the $t_0$ reset signals which are applied to the status flip-flops 3 and 4 it is necessary to have set signals applied thereto during every minor cycle in order to override the reset signals applied thereto. Gate 404 will have applied thereto during the fifth minor cycle the set output signal from the status 2 flip-flop. However, the CSPA signal also necessary to effect setting of status 3 flip-flop 401 via gate 404 will not be present. This, again, is a consequence of the failure to obtain the CHNB signal during the fourth minor cycle. Such failure prevents gate 408 from passing the $t_5$ timing signal to set the ending pulse delay flip-flop 407. Accordingly, at $t_0$ of the fifth minor cycle no set input signal will apply to status 3 flip-flop 401 thereby permitting this latter flip-flop to be reset by the timing pulse applied to its reset input terminal.

In the fifth minor cycle the memory is addressed for the next instruction which in this case is $N+3$. The failure during the fourth minor cycle to obtain a CHNB–A signal prevented the addressing of the memory for this instruction through failure of gate 330A to generate FT 363. Accordingly, it is now necessary to take the address $N+3$ presently stored in control counter 104 and pass it through the B-adder without augmenting it by one, since no call has ever actually gone out for instruction $N+3$. Since no call went out for instruction $N+3$ it is apparent that at $t_4$ of the fourth minor cycle no signal CGNB was generated. The failure of signal CGNB at time $t_4$ permits completing call flip-flop 319 (FIG. 4a) to be reset via buffer 341A. Thus, at $t_5$ its normal output signal CSCL ceases. Accordingly, the ending pulse CHJP (EP) generated from the function encoder 210 of FIGURE 2 (from instruction $N+1$ stored in IR–2) is effective to enable gates 321 and 321' to pass the $t_0$ clock signal to generate FT 401 and FT 411 in the absence of the inhibiting CSCL signal on gate 321. It follows that the contents ($N+3$) of control counter 104 are gated into input-1 of the B-adder and zeros are added thereto from zero register 147. In the meantime it is assumed that the memory not busy signal CGNB is received on calling for the M operand of instruction $N+1$ for the second time. This signal as in the previous instance, coacting with the CHTA signal will enable gate 328A (FIG. 4b) to pass the $t_1$ clock signal to set operand memory not busy flip-flop 331 so that once again at time $t_2$ the CHNB–A signal is available therefrom. This CHNB–A signal thereafter operates in the same manner as was discussed in connection with the third minor cycle. Thus, from gate 330A, FT 363 is generated at $t_2$ thus to enable the output of the B-adder representing the address of instruction $N+3$ to be passed to the memory address decoder 141 to address the memory. Gate 332 once again is enabled to generate FT 432 and once again places a set signal on B-mod flip-flop 308 so that at time $t_3$ the signal CSBM is once again available. Additionally call flip-flop 310 is set by FT 432 applied via gate 490 so as to produce CSAA at time $t_3$.

Since no call was made to the memory for an instruction during the previous minor cycle it will be realized that at time $t_2$ of the fifth minor cycle no instruction will be available from the High Speed Bus HSB to be placed into IR–1. Rather, instruction $N+2$ has been stored in IR–1 during this period of time and awaits B-modification of its M' digits prior to calling for an operand from the memory. Also it will be realized that since completing call flip-flop 319 is presently reset, FT 320, FT 331 and FT 345 are not generated thereby preventing any information passing into IR–1 as well as preventing the replacement of the contents of control counter 104.

The CHNB–A signal from flip-flop 331 (FIG. 4b) will, as in the previous instance, be applied via gate 483 to generate CHNB thus to enable gates 466 and gates 464 and as in the previous instance CHJP 30 will still be present thereby to enable gate 463. Thus, at $t_2$ of the fifth minor cycle FT 403 and FT 411 are generated and these once again pass the A digits from section 107a of IR–2 through the B-adder for the purpose of selecting an A register containing an operand for instruction $N+1$. In the meantime instruction $N+3$ is called from the memory via the memory address decoder 141 and it is again assumed that the CGNB memory not busy signal is obtained thereafter at $t_4$.

In addition to setting the B-mod flip-flop 308 the signay FT 432 has been as noted above, effective to set call flip-flop 310. The set output of flip-flop 310 coacts with CGNB thereby enabling gate 314 to pass a $t_4$ clock signal to set completing call flip-flop 319, whereafter once again a CSCL signal is generated. The aforesaid signal FT 432 also is enabling with respect to gate 116 in FIGURE 1 so that the B digits of instruction $N+2$ which are presently stored in IR–1 may now be passed to the register selector 118 to select one of the addressable register for B modification of $N+2$. It will be recalled that in previous instances of B-modification the selection of a register 121 was made directly from the high speed bus following the receipt of an instruction thereon from the memory. Because of the delay brought about through failure of instruction $N+1$ to obtain the memory operand on the first call, it was not previously possible to carry out the B modification on instruction $N+2$ directly. For this reason it is necessary to provide storage in IR–1 for the B digits of the instruction. As in the previous instance however, once the appropriate addressable register has been selected, the B modification operation will be performed through generation via gates 335 and 335A in FIGURE 4a of FT 312, FT 400, FT 410 and FT 425. These are generated at $t_5$ of the fifth minor cycle and FT 312 as in previous instances permits the I and A digits from IR–1 to pass via gates 102 and 103 into IR–2.

The remaining sequence of operations will be the same as for the third minor cycle as regards the setting of flip-flops in FIGURE 4c for the arithmetic unit input chain for the result chain, and for the clearing of IR-2.

Thus, at $t_6$ the instruction digits for instruction $N+1$ are gated into the arithmetic unit control 130 by the generation of FT 300. Similarly FT 421 will pass the A digits from an instruction $N+1$ into selector storage 113.

The only matter to be noted in conjunction with the sixth minor cycle is departing from a normal sequence of operations is the resetting of status-4 flip-flop. This, of course, follows immediately in view of the fact that at $t_0$ of the sixth minor cycle status-3 flip-flop 401 (FIG. 4e) is in its reset condition. Accordingly, gate 405 is not enabled at $t_0$ and the $t_0$ clock signal applying to the reset input terminal of status-4 flip-flop 402 will place it in its reset condition. The condition of the four status flip-flops generally indicates the extent to which the computer is operating in overlap, wherein the set condition of status-1 flip-flop indicates the presence of an instruction in IR–1. The set condition of status-2 flip-flop indicates on instruction undergoing execution and stored in IR–2. The set condition of status-3 flip-flop indicates the condition wherein an instruction is currently in the arithmetic unit and is within one minor cycle of time of being completed. The set condition of status-4 flip-flop indicates that a result is ready to be transferred to the addressable registers. The usefulness of these flip-flops as indicators of conditions within the system will become more apparent hereinafter. However, by reference to the timing diagram as already discussed it will be apparent that the aforesaid conditions are indeed reflected by the condition of these four flip-flops.

Consider next FIGURE 8b which is concerned with further contingencies which may arise in operating the computer. During the seventh minor cycle of operation full overlap operation will have been attained. Thus, the instuction call for instruction $N+5$ is sent to the address decoder 141 (FIG. 1b) from the control counter 104 via the B-adder. The instruction register IR–1 during the first two pulse times $t_0$ and $t_1$ is still storing instruction $N+3$. Instruction register IR–2 is storing the I and A digits of instruction $N+3$ during the first six pulse time $t_0$–$t_5$ and during this time the A operand for instruction $N+3$ is selected from the addressable registers 121 and selector storage 113 is set up to store the address of the result obtained from the execution of instruction $N+3$. By time $t_2$ the contents of memory location $N+4$ representing the next succeeding instruction are available on the high speed bus and by time $t_3$ instruction register IR–1 has been cleared of its previous contents and subsequently refilled with the various digits of the new instruction. Also at time $t_3$ the usual selection of an addressable register is made for the purpose of B-modification. In the meantime both the M operand and the A operand have been derived for instruction $N+2$ and passed to the Arithmetic Unit 131. Also the result of instruction $N+1$ is available from the arithmetic unit output lines. The addressable registers have been addressed to select the register for storage of this result. Finally, it may be seen that all four status flip-flops are in their set condition.

During the eighth minor cycle the instruction from memory location $N+5$ is available at $t_2$ on the high speed bus. It is assumed that the instruction $N+5$ requires that both operands be obtained from the addressable registers 121 rather than as in the previous instances where one operand is obtained from the memory and the other is obtained from the addressable registers. One further contingency occurs during the eighth minor cycle and this will be discussed extensively following the tracing through of the $N+5$ instruction. This further contingency is that on the call to the memory for instruction $N+6$ and there is failure to receive the CGNB memory not busy signal. In the discussion of ensuing minor cycles it will be assumed that altogether four calls are made to the memory for instruction $N+6$ before a memory not busy signal is received. For the present, however, the discussion will be confined to the changes in operation necessitated by the nature of the instruction $N+5$.

An instruction specifying that both operands are to be obtained from the addressable register may so specify by providing special digits in its M address portion. Thus, in a specific embodiment where these M digits are specified as being 999XX the digits 999 identify the instruction to be of this category and the digits XX are actually effective to select the desired addressable register. The instruction $N+5$ is received into IR–1 and set up therein at the usual time through the generation of FT 320 from the set output signal CSCL of completing call flip-flop 319 via gate 32 (FIG. 4a). The usual chain of events occurring in a full overlap operation has resulted in this flip-flop 319 remaining set. It will also be apparent that with the computer operating in full overlap the operand memory not busy flip-flop 331 (FIG. 4b) will be in its set condition until after the $t_5$ clock signal has been applied to its reset input terminal. Accordingly, signal CHNB–A will be present and this coacting with the CHJP–EP signal from instruction $N+4$ (presently in IR–2) and the CQBA signal from status 1 flip-flop 335 enables gate 332 (FIG. 4b) to generate FT 432. The signal FT 363 is also generated at this time via gate 330A and this signal as usual permits the memory address decoder to be set up to call for instruction $N+6$. Signal FT 432 functions as in previous instances, i.e., it applies a set input signal to the B mod flip-flop 308 and also to the call flip-flop 310. The output signal CSBM from the B-mod flip-flop is as in previous instance effective to carry out the B-modification operation and at the same time to advance the contents of IR–1 into IR–2. Since the instruction is presumed to be of the type which normally requires that an operand be obtained from the memory, the decoding of the instruction digits in the Program Counter decoder 207 in FIGURE 2 will result in generation of the CHRM signal notwithstanding the presence of the 999 digits in the M address. Therefore, following the B-modification operation in the B-adder, at time $t_7$ of the eighth minor cycle gate 465 in FIGURE 4b will be effective as in previous instances to drive the final encoder to generate FT 363. The signal FT 363 will set up the memory address decoder 141; however, the memory is arranged and designed in a manner such that there is no address therein corresponding to 999XX. Accordingly, the memory does not generate the CGNB memory not busy signal.

Refer now to FIGURE 4d. When output signals are obtained indicative of the digits 999XX from the B-adder 139 such digits place enabling signals on gates 4069 and 4071. Gate 4069 will also receive at this time a CHRM signal indicative as previously indicated of an instruction requiring an operand to be read from the memory. The coincidence of these signals enables gate 4069 to pass a $t_7$ clock signal thereby to set flip-flop 4070. At time $t_0$ of the ninth minor cycle flip-flop 4070 will produce its output signal CHFR and this signal is applied to gate 4044 in the timing decoder and also to buffer 339 in FIGURE 4b. Gate 4044 passes a $t_0$ clock signal to generate FT 433. Reference to FIGURE 1b shows that FT 433 is permissive with respect to gates 181 and gates 181 permits the two least significant M digits stored in section 108 of IR–2 to be passed into the register selector 118. These events are depicted in minor cycle 9 of FIGURE 8b wherein the digits from the M portion of IR–2 are shown set up in the register selector 118 by time $t_1$. Thus, it is apparent that such digits will now be effective to select an addressable register rather than a memory location.

It will be apparent from a consideration of events occurring during a normal full overlap operation it is necessary to have the CHNB signal from the operand memory not busy flip-flop 331. Accordingly, CHFR derived from the set output of flip-flop 4070 in FIGURE 4d is applied to buffer 339 in FIGURE 4b and thus gate 327A will be enabled to pass the $t1$ clock signal via buffer 329 to set flip-flop 331.

Most of the events taking place hereinafter are similar to the events which occur wherein the operand is selected from the memory, however some changes will be evident. Thus, referring once again to FIGURE 4d it is seen that the CHFR signal from flip-flop 4970 will be effective via buffer 4066 to enable gate 4065 to pass a $t_0$ clock signal thereby to set flip-flop 4064 designated as the AR to M flip-flop. The output signal from flip-flop 4064 is designated CHAA and is applied to gates 4063 and 476 as well as to gate 4045 in the timing decoder. Gate 4063 provides a set signal to the input terminal of the unequal flip-flop 4062. Since there is presently stored in selector storage 113 the address for the result of instruction $N+4$ a comparison will be made in register selection comparator 142 of this address and that specified by the M digits derived from the M portion of instruction $N+5$ which digits are presently stored in the register selector 118. Such comparison may result in the generation of either an equal signal CAAM or an unequal signal CAAL. For the time being the consequences which follow the generation of unequal signal CAAL are considered. Subsequently to be considered are the result which follow when the CAAM equal signal is obtained. The signal CAAL coacting with signal CHAA enables gate 4063 to pass a $t_1$ clock signal to flip-flop 4062, whereby flip-flop 4062, will produce a set output signal at time $t_2$. This set output signal is enabling with respect to gate 4047 and it enables the latter to pass a $t_4$ clock signal to drive the final encoder and thereby generate FT 373. Also gate 4045 will have passed a $t_3$ clock signal thereby to generate FT 425. The occurrence of these last signals enables regeneration of a selected addressable register following selection thereof by the two least significant M digits of the instruction $N+5$ and allows the contents of such register (forming one of the operands of the instruction $N+5$) to be passed thereafter into the M input register 150 of FIGURE 1 via gates 171 so that such M input register will store the operand three pulse times earlier than in the case where the operand is derived from the memory.

The A operand for the instruction $N+5$ is selected in precisely the same way as the A operand of any of the instructions considered heretofore. Also the A address for the result storage of instruction $N+5$ is treated as previously, being passed through the B-adder and gated into a selector storage 113 (FIG. 1b). These operations take place as in previous cases. By way of recapitulation it will be observed that during the ninth minor cycle the I digits of the instruction $N+5$ are stored in section 107 of IR–2 so that assuming as previously, the instruction to be one of the type making a regular operand call from the addressable registers and storing the results eventually obtained, the usual CHJP signals will be generated. Thus CHJP 30 will be applied to gate 463 in FIGURE 4b to generate FT 403 and FT 411 at $t_2$ thereby to make an A operand call via the B-adder. Similarly CHJP 54 will be effective through gate 466 to generate FT 403 and FT 411 at $t_4$ and thereby pass the result address through the B-adder for storage in selector storage 113. Likewise CHJP 38 will at time $t_5$ generate FT 300 thereby gating the encoded instruction digits into Arithmetic Unit control 130. Similarly, with reference to FIGURE 4c the addressable register chain and result chain of flip-flops will be activated at the times indicated so that the output from the B-adder at time $t_4$ representing the address of one of the addressable registers 120 for the operand select, will be gated into register selector 118 via gates 115 and the contents of the selected register will subsequently be gated into the A input pulseformers 129A of the arithmetic unit via gates 128 at time $t_7$. It will be noted that the generate 370 flip-flop 419 will be set, however gate 431 will not be able to pass the $t_7$ clock signal because of inhibit signal CHAK drived from the set output condition of unequal flip-flop 4062 (FIG. 4d). Thus, FT 370 is not generated at $t_7$, and no clearing of M input register 150 or read in thereto of information from the HSB will take place at this time. The result chain flip-flops 418 and 428 will be set in the usual manner whereafter the address from selector storage is gated into the register selector 118 via gates 114 through the generation of FT 434 and finally in the tenth minor cycle at $t_7$ thereof the results of instruction $N+5$ will be available to be passed back into the addressable register selected via selector storage 113 as in the previous instances.

Consider now instruction $N+6$. As previously indicated the call for this instruction was made via the address lines to the memory at time $t_3$ of the eighth minor cycle. It was stipulated that there was failure to obtain the CGNB signal. Consider now the effects of such failure. The first effect to be noted is that at time $t_4$ of the eighth minor cycle the completing call flip-flop 319, in FIGURE 4a, will be reset so that at $t_5$ the signal CSCL is no longer available. Accordingly, call flip-flop 310 will remain set by virtue of the failure of gate 337 to pass the $t_6$ clock signal, it being of course, assumed that none of the other resetting signals were applied to buffer 340A. At $t_0$ of the ninth minor cycle the status-1 flip-flop 335 in FIGURE 4e will be reset. This is because the CSBS signal will under normal conditions still be generated from gate 494 (FIG. 4b) while there will be no permissive signal CSCL applied to gate 324. Gate 325 enabled by the CSBS signal will pass a $t_0$ clock signal to the reset input terminal of status-1 flip-flop 335 which will thereafter be reset. Accordingly, it follows that gate 332 in the timing decoder section of FIGURE 4b will not be enabled and FT 432 will not be generated. In the absence of FT 432, at $t_2$ of the ninth minor cycle, B-mod flip-flop 308 in FIGURE 4a will also be reset so that the CSM signal will thereafter also be missing.

Consider now the absence of these signals with respect to the ninth minor cycle as shown on FIGURE 8b. It will be observed that there is no effect with respect to the instructions $N+4$ and $N+5$ which are further advanced toward completion and this, of course, is because operand memory not busy flip-flop 331 is still set. As previously described, however, at $t_0$ of the ninth minor cycle call flip-flop 310 in FIGURE 4a will be producing its output signal CSAA and this in turn enables gate 315 in the timing decoder to generate FT 411 and FT 401 so as to pass the contents of control counter 104 ($N+6$) through the B adder and add zeros thereto. FT 363 will be generated at $t_2$ via gate 311 thereby enabling gates 140 so that memory address decoder 141 will again address the memory for instruction $N+6$. Also occurring as usual at $t_1$ of this minor cycle is the enabling of gate 458 in FIGURE 4a by CSBS so as to generate FT 321 and this latter signal as in previous instances is effective to clear IR-1. Since there was failure to address the memory successfully in the previous minor cycle for instruction $N+6$ there will be no information on the high speed bus ready to be read into IR-1 at $t_2$ and thus the failure of signal CSCL means that in addition to failure to increase the count shown by the control counter 104, there will likewise be failure to obtain FT 320, FT 331 and FT 345 so that IR-1 remains cleared and control counter-1 (104) retains the $N+6$ digits. Since the B-mod flip-flop 308 has also been reset there is no CSBM signal so that FT 312, FT 400, FT 410 and FT 425 are not generated at $t_5$ and thus it follows that no B modification operation is attempted nor is there transfer of information from IR-1 to IR-2. Finally, IR-2 will be cleared. The I and A digits of instruction $N+5$ are cleared by the application of FT 313 to IR-2 at $t_5$. The M digits are cleared by the application of FT 314 to IR-2 at $t_7$. Generation of these latter signals is shown on FIG. 4b wherein the ending signal CHJP (EP) decoded from the instruction digits of instruction $N+5$ coacting with CHNB will have been effective at $t_3$ via gate 475 and buffer 474 to set program counter clear flip-flop 473. The set output signal from flip-flop 473 (CPKD) permits gate 460 in the timing decoder to pass the $t_5$ clock signal thus to generate FT 313. Also gate 471 is enabled to pass a $t_6$ clock signal to set flip-flop 464 via buffer 470. The set output of this latter flip-flop which is available at $t_7$, thereafter enables gate 459 of the timing decoder to generate FT 314 in the final encoder.

In the tenth minor cycle, it will be apparent that from failure to successfully address the memory on the preceding call thereto, CSCL will not have been generated and call flip-flop 310 will still be generating its set output signal CSAA. Accordingly, gate 315 in the timing decoder is again enabled to pass the $t_0$ clock signal to generate FT 411 and Ft 401. As in previous instances these signals once again pass the contents of the first control counter 104 into the B-adder 139 along with zeros. Thereafter, gate 311 is enabled by CSAA to pass tht $t_2$ clock signal to generate FT 363 whereby the memory is once again addressed for instruction $N+6$. Again, there is failure to obtain the memory-not-busy signal (CGNB). At time $t_0$ of the tenth minor cycle a reset signal will be applied to status 2 flip-flop 400 (FIG. 4e). This follows when it is considered that ending pulse delay flip-flop 407 (FIG. 4e) will have been set at $t_5$ of the ninth minor cycle by CHJP (EP) of instruction $N+5$ coacting with CHNB. Flip-flop 407 will not be reset until $t_5$ of the tenth minor cycle and therefore at $t_0$ will still be producing its set output signal CSPA. This latter signal coacting with the output signal from status 2-flip-flop 400 enables gate 404 to pass the $t_0$ clock signal to maintain status 3 flip-flop 401 in its set output condition and at the same time to reset status 2 flip-flop 400. Since status 1 flip-flop 335 was reset during the preceding ninth minor cycle, it follows the gate 403 will not be enabled and, therefore, status 2 flip-flop 400 will be reset.

Remaining events taking place during the tenth minor cycle are entirely concerned with the execution and result storage of instruction $N+5$. As has been discussed previously the operation of the elements pertaining thereto has already been determined and will not be affected by failure to receive instruction $N+6$.

During the eleventh minor cycle the call flip-flop 310 (still in its set output condition) once again causes a call to be made to the memory for instruction $N+6$. At time $t_4$ the memory-not-busy signal CGNB is received, indicating that the memory is now available and that the instruction $N+6$ may be obtained therefrom. The only other event to be noted in connection with the eleventh minor cycle is the resetting of the status 3 flip-flop. Obviously at $t_0$ neither of the signals CSPA or status 2 will be present. Accordingly, gate 404 will not be enabled. Thus, the $t_0$ clock signal applied to the reset input terminal of the status 3 flip-flop 401 will cause the latter to be reset.

In the twelfth minor cycle instruction $N+6$ will be received from the memory and the regaining of overlap will be initiated. From the successful memory call made during the eleventh minor cycle, it is apparent that completing call flip-flop 319 will once again have been placed in its set output condition to generate CSCL and by $t_7$ of the eleventh minor cycle call flip-flop 310 will be reset. At $t_0$ of the twelfth minor cycle signal CSCL enables gates 320 and 320' to generate FT 411, FT UA and FT 401 so as to cause the contents of the first control counter 104 to be augmented by 1 in the B-adder and sent out on the memory address lines to address the memory for instruction $N+7$. Also, at $t_0$ of the twelfth minor cycle, the signal CSCL enables gate 324 to set status 1 flip-flop 335. In the meantime, however, since the regain of overlap has just been initiated and since the status 3 flip-flop is presently reset it follows that at $t_0$ the status 4 flip-flop 402 will be reset by the application thereto of the $t_0$ clock signal.

As in previous instances, instruction $N+6$ is received into IR–1 and at the same time the B-digits thereof are placed in register selector 118 for effecting subsequent B-modification of the M' digits. The reading in of the B-digits to register selector 118 requires inter alia the generation of FT 432. This latter signal is generated as follows: During normal full overlap operation ending pulse storage flip-flop 305 (FIG. 4a) will be maintained in its reset condition; however, following the initial failure to obtain memory-not-busy signal CGNB upon making the $N+6$ instruction call it will be recalled that in the ninth minor cycle, the status 1 flip-flop 335 was reset. With the resetting of status 1 flip-flop its set output signal CQBA is no longer effective to inhibit gate 336 in FIGURE 4a. Thus, this gate is enabled by the presence thereon of the CHNB signal from operand memory-not-busy flip-flop 331 coacting with the ending signal CHJP (EP) from instruction $N+5$, to pass the $t_2$ clock signal thereby to effect a setting of ending pulse storage flip-flop 35. Since during the tenth and eleventh minor cycles the signal FT 432 is not generated (absence of status one (CQBA) on gates 306 or 332), thus, 305 is thereby maintained in its set output condition. Thus, when in minor cycle 12, the status one flip-flop 335 is once again set, it follows that gates 306 and 333a in the timing decoder will be enabled by CSAR and CQBA to generate at $t_2$ the signals FT 432 and FT 363 respectively. As in previous instances FT 432 sets the B-mod flip-flop 308, resets the ending pulse storage flip-flop 305, sets the call flip-flop 310, and enables the B-digits of instruction $N+6$ to be gated from the high speed bus into register selector 118. With the setting of B-mod flip-flop 308 the signal CSBM is once again generated and is available to generate the various function signals associated with the B-mod operation and the transferring of the instruction from IR–1 to IR–2. Also, the signal CSBM enables gates 494 and 496 on FIG. 4b whereby as a result of the B-equality comparison in register selection comparator 142 either the CSBG signal or the CSBS signal will be generated. Since at the present time, selector storage 113 is cleared it follows that the CAAL signal and thus the CSBS signals will be generated.

Refer now to FIGURE 8c. In the fourteenth minor cycle a further contingency is introduced. By the fourteenth minor cycle, it will be observed, that the A-digits of instruction $N+6$ are stored in selector storage 113 (FIG. 1b) for the purpose of selecting the addressable register wherein is to be stored the result obtained from the execution of instruction $N+6$. Since the memory has been available for each instruction call, following the call for $N+6$ in minor cycle 11, status flip-flops 1, 2 and 3 (FIG. 4e) will be in their set output condition during minor cycle 14.

In the thirteenth minor cycle, the contents $(N+7)$ of the first control counter 104 are augmented by one thereafter to make the call for instruction $N+8$. The memory being available it follows that at $t_2$ of minor cycle 14 the contents of memory location $N+8$ are passed from the high speed bus into IR–1. The B-digits of instruction $N+8$ will at this time be passed into register selector 118. At time $t_3$ a comparison of these B-digits is made with the A-digits presently stored in selector storage 113, the B-digits being passed into the register selection comparator 142 (FIG. 1c) via gates 119 and buffers 149 (FIG. 1b). It is assumed that the B-digits from instruction $N+8$ are the same as the A-digits of instruction $N+6$. In other words, the B modifier register for instruction $N+8$ is the same register in which the results of instruction $N+6$ are to be stored. Such equality raises a problem. If the B-modification for $N+8$ were to take place at the normal time it is evident that the register selected by the B-digits thereof would not contain the most recent information. In order to ensure that only the most recent information is used in B-modification, it is necessary to delay this B-modification process for instruction $N+8$ until the result of instruction $N+6$ has been transferred from the arithmetic unit and into the result register designated by the A-digits now held in selector storage. To provide for this contingency, the register selection comparator 142 now generates signal CAAM indicating that an equality comparison has been obtained.

The CAAM signal is applied to gate 493A (FIG. 4b) and since B-mod flip-flop 308 is presently producing its output signal CSBM, it follows that gate 493A is enabled to pass the $t_3$ clock signal and thus set equality flip-flop 493. In the meantime, flip-flop 492 will have been reset by the application thereto of a $t_2$ clock signal. Thus, at time $t_4$ of minor cycle 14 flip-flop 493 is set and flip-flop 492 is reset and this combination enables gate 498 to generate the CSBG signal. The effects of the CSBG signal will be more particularly observed in the fifteenth minor cycle. At time $t_0$ gate 4014 on FIGURE 4a is enabled to generate signal CSAV. This latter signal CSAV will effect a setting of ending pulse storage flip-flop 305 via buffer 304A and will also set the block memory-not-busy flip-flop 485 (FIGURE 4b) via buffer 4108. Also signal CSAV drives the final encoder to generate FT 411, and resets completing call flip-flop 319 so that by time $t_1$ CSCL is no longer present.

At $t_6$ of the fourteenth minor cycle an actual B-modification operation takes place nothwithstanding the wrong information in the selected addressable register. Accordingly, it is necessary to delay operation of the computer long enough for the correct information to be received so that the operation may be repeated. Since however, the memory is actually addressed incorrectly for the M operand of instruction $N+8$, it is necessary to block certain gates in order to prevent the computer from processing wrong information. Thus, while the memory-not-busy signal CGNB might normally be expected to set the operand-not-busy flip-flop 331 (FIG. 4b), thereby to generate CHNB–A, it is evident that setting the block not busy flip-flop 485 to generate CHXA inhibits gates 328A, 427A and 483. Accordingly, during the fifteen minor cycle, gates 466 and gates 464 in the timing decoder will not be enabled so that the instruction digits for instruction $N+8$ are not sent to the arithmetic control 130 and the A-digits from this instruction are not routed to selector storage 113 via the B-adder. Also, CHNB–A is not generated in the fifteenth minor cycle and gates 330A and 332 are not enabled. Fnally, the output signal CXHA of block memory-not-busy flip-flop 485 is applied to gate 462 which is thus enabled to pass a $t_3$ clock signal to set the program counter clear flip-flop 473 via buffer 474. This in turn, sets the clear IR–2 flip-flop 464. The resulting signals from both of these flip-flops are effective to generate at $t_5$ and $t_7$ respectively signals FT 313 and FT 314. These signals are effective as in previous instances to clear IR–2.

If reference is made to FIGURE 4a in the timing decoder section thereof, it will be noted that gate 458, which normally generates FT 321 to clear IR–1, will not be enabled during the fifteenth minor cycle since signal CSBS is not being generated, in view of the signal CSBG from gate 498 (FIG. 4b). Thus, through this fifteenth minor cycle, IR–1 will continue to store instruction $N+8$. Also, it will be noted that the signal CSBG is effective to block gate 320' so that when the call generated by CSCL at $t_0$ is made from the first control counter 104 the contents thereof are not, as in previous instances, augmented by one. Since, however, the signal CSAV (output of gate 4014, FIG. 4a) is effective to generate FT 411 in the final encoder it is obvious that instruction $N+9$, which was first called in the fourteenth minor cycle will again be called. Even though instruction $N+9$ is presently available on the high speed bus it cannot, during the fifteenth minor cycle, be passed into IR-1 since completing call flip-flop 319 has been reset and CSCL is not available at time $t_2$ to generate FT 320. Thus, the memory is addressed twice for instruction $N+9$.

Since during the fifteenth minor cycle gates 330A and 332 (FIG. 4b) are not enabled, it is necessary to derive FT 363 and a FT 432 elsewhere and this is done from the set output signal CSAR presently available from ending pulse storage flip-flop 305. It will be recalled that this latter flip-flop was set by the CSAV signal. The FT 363 signal as in previous instances passes the output of the B-adder to the memory address decoder 141 to address the memory for instruction $N+9$. FT 432 places a set signal on B-mod flip-flop 308, a reset signal on ending storage pulse flip-flop 305 and a set signal on call flip-flop 310. As already noted signal CSCL is no longer present at time $t_2$ so that gate 322 is not enabled. Thus, during the fifteenth minor cycle the signals FT 320, FT 331, and FT 345 are not generated. Since FT 432 is generated from gate 306, however, the B-digits from instruction $N+8$ presently stored in IR-1 are passed into register selector 118 via gates 116. It is noted that these B-digits are also compared at $t_7$ of the fourteenth minor cycle. The latter comparison is made with the contents of selector storage 113 at this time, which comprises the A-digits representing the result address for instruction $N+7$. It is presumed for present purposes that the result of this latter comparison is the generation of a CAAL signal indicating inequality. Notwithstanding the generation of the CAAL signal at $t_7$ and the presence of the CSBM signal, the inequality flip-flop 492 will not be set because signal CSBG is still present and is effective to inhibit gate 496.

Referring again to the fifteenth minor cycle, since the I and A digits for instruction $N+8$ are stored in IR-2, it is apparent that the various CHJP signals associated with the $N+8$ instruction will be generated from the function encoder. Thus, at $t_2$ of the fifteenth minor cycle, the CHJP 30 signal will enable gate 463 (FIG. 4b) to generate FT 403 and FT 411 as in previous instances, thus passing the A-digits from IR-2 into the input of the B-adder along with zeros. However, since operand memory-not-busy flip-flop 331 is reset at $t_5$ of the fourteenth minor cycle and prevented from being set by the output signal CHXA of the block memory-not-busy flip-flop 485, it follows that the CHNB signal will not be available to enable gate 426 in FIGURE 4c to set flip-flop 415. Thus, the output of the B-adder at time $t_4$ representing the A operand address for instruction $N+8$ will not be gated into register selector 118 through failure to generate FT 431.

As previously noted, the addressing for a register for B-modification purposes for instruction $N+8$ during the fifteenth minor cycle takes place from IR-1 rather than from the high speed bus. This is because FT 432 was generated while FT 320 was not generated. The set output condition of the B-mod flip-flop 308 enables the normal B-modification operation to take place. This time since the results of the comparison with the A digits of instruction $N+7$ showed an inequality and since the result of instruction $N+6$ is stored in the addressable registers at time $t_2$ of minor cycle 15 it will be apparent that B-modification will take place with the most recent information. Thereafter, the modified M digits from instruction $N+8$ will again address the memory.

Before considering the succeeding cycle of events, it should be noted that as a result of the equality comparison between the B digits of $N+8$ and the A digits of $N+6$ status 2 flip-flop 400 (FIG. 4e) will be reset. This follows when it is observed that in order to set status 2 flip-flop 400 it is necessary to generate CSBS in order to enable gate 403. At $t_0$ of the fifteenth minor cycle, however, the CSBG signal was present thereby excluding the CSBS signal. Thus, gate 404 will be enabled by the coacting of the set output signal from status 2 flip-flop 400 and the CSPA signal from ending pulse delay flip-flop 407 to reset the status 2 flip-flop via buffer 401B.

It is noted that because of the comparison which was made showing the B-digits of instruction $N+8$ equal to the A-digits of $N+6$, overlap has been partially interrupted for one minor cycle. During the fifteenth minor cycle, the results obtained from the execution $N+6$ are available in the arithmetic unit and are, in fact, stored in the addressable registers 121 by time $t_2$. Accordingly, it follows that the B-modification of instruction $N+8$ may proceed with the assurance that the contents of the selected B-register will represent the most up-to-date information. After B-modification for instruction $N+8$ takes place in the fifteenth minor cycle the system thereafter proceeds to regain full overlap. It is assumed that during the next three minor cycles the comparisons in the register selection comparator 142 all result in generation of the inequality signal CAAL.

By the sixteenth minor cycle, it is apparent that equality flip-flop 493 will have been reset and by time $t_0$, inequality flip-flop 492 will be generating its set output signal so that at $t_0$ gate 494 is once again generating a CSBS signal. The memory call for an M operand for instruction $N+8$ following B-modification step is assumed to result in the obtaining of the memory-not-busy signal CGNB. Accordingly, operand memory-not-busy flip-flop 331 will again receive its set input signal at time $t_1$ via gate 328A and buffer 329 so as to generate the CHNB-A signal at time $t_2$ of the sixteenth minor cycle. It is noted that during the fifteenth minor cycle the call made to the memory at $t_3$ for instruction $N+9$ also results in the obtaining of the CGNB signal at time $t_4$. Thus, it is apparent that completing call flip-flop 319 will by time $t_5$ of the fifteenth minor cycle, by producing its set output signal CSCL. Accordingly, with the foregoing signals once again generated a normal instruction call will take place, and the contents of control counter 104 presently storing $N+9$ will be augmented by one so as to address the memory for instruction $N+10$. The CSBS signal enables gate 458 (FIG. 4a) to pass the $t_1$ clock signal to generate, thereby FT 321, thus to clear IR-1. The contents of memory location $N+9$ are available in the sixteenth minor cycle at time $t_2$ and will pass into IR-1 by the generation of FT 320 via gate 322 at the same time. FT 311 and FT 345 clear the control counter 104 and pass thereinto the memory address of instruction $N+10$ which has just been called for. The generation of signal CHNB from gate 483 enables the normal sequence of events to take place for the fetching of the A operand for instruction $N+8$, the execution of that instruction by the arithmetic unit and the storage of the eventually obtained result. These events will take place in the same manner as previously described.

It is apparent that during the sixteenth minor cycle the status 2 flip-flop 400 (FIG. 4e) will once again be set; however, status 3 flip-flop 401 will be reset. This follows when it is considered that at time $t_0$ of the sixteenth minor cycle both the CSBS signal from gate 494 (FIG. 4b) and the CQBA signal from status 1 flip-flop will be generated. The coacting of these signals enables gate 403 to pass the $t_0$ clock signal to effect setting of the status 2 flip-flop 400. whereby a status 2 signal is produced at time $t_1$. Gate 404, however, will not be enabled because of the absence at time $t_0$ of the status 2 set output signal. It follows that the $t_0$ clock signal will effect a resetting of the status 3 flip-flop 401. The condition of the four status flip-flops during the sixteenth minor cycle indicates that there is an instruction in IR-1, and an instruction in IR-2 awaiting execution. There is no instruction within one minor cycle of being completed by the arithmetic unit but there is a result in the process of being placed into the adressable registers. This latter, of course, is the result of instruction $N+7$.

During the seventeenth and eighteenth minor cycles, a normal execution of instructions and calling for new instructions is carried out so that by the eighteenth minor cycle, the system will once more be operating in full overlap. The details of the operation may readily be understood from a consideration of the timing diagram since these follow in all respects details of normal operation as previously described.

In FIGURE 8d, two more contingencies are illustrated. The first of these is shown as being initiated in the nineteenth minor cycle and this is similar to the previous contingency where an equality comparison was obtained between B-digits of instruction $N+8$ and the A-digits of instruction $N+6$. It will be realized that equality comparisons are at all times being made in order to ensure that whenever operands are called from the addresable registers only the most recent information is used. Thus, where the B-digits of any instruction are the same as the A-digits of a previous instruction not yet executed it is necessary to hold up the overlap operation until such previous instruction has been executed and the results stored. Where, however, an A operand is called for and found to be equal to the A operand of a previous instruction, the overlap operation is not affected as shall be shown subsequently, although certain changes take place in the operation of the computer. For the time being, however, the results of another B-digit comparison will be discussed with reference to the effect on overlap.

In the nineteenth minor cycle, instruction $N+13$ is called from the memory and instruction $N+12$ is passed from the high speed bus into IR–1. It is assumed that the B-digits of instruction $N+12$ are the same as the A-digits of instruction $N+11$. Since at the time the B-modification operation is initially carried out for instruction $N+12$, instruction $N+11$ has just been transferred to the arithmetic unit it will be apparent that a proper B-modification of instrutcion $N+12$ cannot take place unit at least two minor cycles have elapsed and the result of instruction $N+11$ is actually stored in the addressable regsisters. This situation is to be compared with the previous case wherein the result of instruction $N+6$ was available within one minor cycle of the initial B-modification of instruction $N+8$. In the previous case, overlap was held up for one minor cycle; in the present case overlap will be held up for two minor cycles.

The first comparison occurs at $t_7$ of the nineteenth minor cycle. At this time the B-digits of instruction $N+12$ are stored in IR–1 and will be gated via gates 145 and buffers 149 into the registers selected comparator 142. At time $t_7$ the result address digits (A-digits) of instruction $N+11$ are set up initially in selector storage 113. It will be noted that an actual B-modification of the M′ digits of instruction $N+12$ has taken place so that at time $t_0$ of the twentieth minor cycle an M operand call will be made. However, the equality comparison which takes place at time $t_7$ of the nineteenth minor cycle results in generation once again of the equality signal CAAM. This signal coacting with the CSBM signal from B-mod flip-flop 308 enables a setting of equality flip-flop 493 at $t_0$ of the twentieth minor cycle, while flip-flop 492 will have been reset at $t_5$ of the nineteenth minor cycle. Thus at time $t_0$ of the twentieth minor cycle, gate 498 is once again enabled to generate CSBG. As will be obvious the presence of the CSBG signal precludes the presence of signal CSBS from gate 494.

The signal CSBG has an effect similar to the effect previously discussed. Thus, gate 4014 on FIGURE 4a is enabled to pass the $t_0$ clock signal to generate the signal CSAV. Also, gate 320′ in the timing decorer is inhibited. The CSAV signal is effective as in the previous case to set ending pulse storage flip-flop 305, to reset completing call flip-flop 319 and to set the block memory-not-busy flip-flop 485. The CSAV signal is also effective to generate FT 411 via the final encoder. Accordingly, at $t_0$ in the twentieth minor cycle gate 320″ does not generate FT UA or FT 411. However, gate 320 does generate FT 401 and as noted above, CSAV generates FT 411. Thus, it follows that the contents of the control counter representing the adress of instruction $N+13$ are passed through the B-adder but are not increased; accordingly, another call is made from instruction $N+13$. In the absence of the CSBS signal gate 458 on FIG. 4a is not enabled. Accordingly, FT 321 is not generated and IR–1 is not cleared. Similarly, as in the previous instance, the resetting of completing call flip-flop 319 by the CSAV signal terminates CSCL by time $t_1$ of the twentieth minor cycle. Thus, it follows that instruction $N+13$ available on the high speed bus at time $t_2$, is not gated into IR–1 through failure of gate 322 to generate FT 320. The setting of ending pulse storage flip-flop 305 results, as in the previous case, in the generation of signal CSAR and this, in turn, in the presence of the CQBA signal from the status one flip-flop 335 enables gates 306 and 333A to pass the $t_2$ clock signal to generate FT 432 and FT 363 respectively.

The setting of the block memory-not-busy flip-flop 485 as in the previous instance inhibits gates 327A and 328A thereby preventing any setting of the operand memory-not-busy flip-flop 331. Thus, once again the CHNB–A and CHNB signals are not generated. The failure of these signals has the same consequences as it did previously inasmuch as gates 466 and 464 (FIG. 4b) are not enabled so that the A-digits of instruction $N+12$ are not routed to selector storage and the instruction digits of instruction $N+12$ are not sent to the arithmetic unit. It follows also that gates 330A and 332 will not be enabled, however, this is inmaterial in view of the enabling of gates 306 and 333A from the ending pulse storage flip-flop 305. Additionally, it follows as in the previous instance that the AR to AU input flip-flop 415 (FIG. 4c) will not be set at $t_3$, through failure of the CHNB signal.

Reference is made to the equal flip-flop 493 and the unequal flip-flop 492 on FIGURE 4b. It may be seen that at time $t_2$ a reset signal is applied to the equal flip-flop 493 via buffer 495. Accordingly, by time $t_3$ of the twentieth minor cycle, equal flip-flop 493 will be in its reset condition. Accordingly, since flip-flop 492 is still reset at time $t_3$, neither of signals CSBG nor CSBS will be generated. However, a further comparison is made, that is to say, the B-digits gated from IR–1 into register selector 118 by FT 432 (which are the B-digits of instruction $N+12$), are compared with the contents of selector storage 113. Since selector storage 113 is still storing the A-digits of instruction $N+11$ it follows that there will still be an equality comparison whereby signal CAAM is again generated. It follows that at $t_3$ flip-flop 493 will again receive a set input signal so that at $t_4$ the CSBG signal is again generated by gate 498.

By time $t_7$ of the twentieth minor cycle, selector storage 113 will have been cleared. Thus, it follows that the B-digit comparison from IR–1 which takes place at this time, will result in register selection comparator 142 generating the CAAL signal. This in combination with the CSBM signal from B-mod flip-flop 308 would normally effect a setting of unequal flip-flop 492. However, at this time, gate 496 is inhibited by the application thereto of the CSBG signal. Accordingly, the CSBG signal is maintained. This, again, results in the generation of the CSAV signal from gate 4014 at time $t_0$ of the twenty-first minor cycle.

During the twentieth minor cycle, it will have been noted that a further call is made for instruction $N+13$ and that the memory-not-busy signal CGNB is obtained. Also, the call flip-flop 310 is set by the generation of FT 432. Accordingly, at $t_4$ of the twentieth minor cycle, completing call flip-flop 319 will have received a set input signal so that at $t_0$ of the twenty-first minor cycle the CSCL signal is present. This, as in the previous instance, enables gate 320′ to drive the final encoder to generate FT 401. However, the existance of the CSBG signal once again inhibits gate 320 so that FT UA and FT 411 are not generated. Again, the CSAV signal is effective to generate FT 411. Thus, again a call is made to the memory for instruction $N+13$. The CSAV signal as in the previous instance effects a resetting of the completing call flip-flop 319 so that time $t_1$ of the twenty-first minor cycle, CSCL is no longer being generated. Therefore, gate 322 is not enabled to pass the $t_2$ clock signal and the signals FT 320, FT 331 and FT 345 are again not generated. The failure of these signals as in the previous instance, prevents any read-in to IR-1 and also prevents clearing and recirculation into the control counter 104.

The remaining operations taking place in the twenty-first minor cycle are similar to those in the twentieth minor cycle. However, it will be noted that at time $t_2$ therein, the result from instruction $N+11$ will have been received from the arithmetic unit and stored in the appropriate addressable register. The significance of this is that the succeeding B-modification of instruction $N+12$ may now take place with the most up to date data.

It will have been observed that during minor cycle 20, status two flip-flop 400 is reset and that it is not set again until the twenty-second minor cycle; thus, it is apparent that with the present contingency overlap has been held up for two complete minor cycles. It follows that during succeeding minor cycles the status three and the status four flip-flops will also each be reset over two minor cycles. Since the resetting of these flip-flops and the subsequent setting thereof, follows the same pattern as previously, it will not be described in detail.

In the twenty-first minor cycle, proper B-modification of instruction $N+12$ takes place. Thus, it follows that in the twenty-second minor cycle, overlap will once more commence to be fully restored. Except for the condition of the status three and status four flip-flops and the absence of a result to be placed into the addressable registers the twenty-second minor cycle in its showing of events is basically the same as the sixteenth minor cycle previously discussed. Therefore, it is thought unnecessary to describe further details.

During the twenty-third minor cycle, another contingency is shown. It will be realized from a consideration of FIGURE 1 that the contents of register selector 118 will be continuously compared with the contents of selector storage 113 except for time $t_7$, at which time the B digits from IR-1 are compared. It follows, therefore, that the A-digits representing the address of an operand to be selected from the addressable registers 121, as well as the B-digits similarly representing the address of one of the registers 121 but for a different purpose, will be compared with the result addresses stored in selector storage 113. It will be apparent that where an A operand is to be selected from these addressable registers it is desirable that such A operand represent the latest information available, just as in the case where an operand for B-modification is selected. Hence, it follows that where the A operand address of one instruction is the same as the result address of the preceding instruction it would ordinarily be necessary to wait until such time as the result of the aforesaid preceding instruction was actually placed into its result register. However, it has been found possible and practical, by a simple expedient, to avoid any waiting and thus loss of overlap.

Consider the twenty-third minor cycle. Herein it is stipulated that the A-digits representing an operand address for instruction $N+13$ are the same as the A-digits of instruction $N+12$ representing the result address of this latter instruction. At time $t_2$ of the twenty-third minor cycle the A-digits of instruction $N+13$ are routed from section 107a of IR-2 through the B-adder 139 and from the output of the B-adder into register selector 118. This follows when it is considered that the signal CHJP 30 will enable gate 463 (FIG. 4b) to pass the $t_2$ clock signal to generate FT 403 and FT 411, subsequently the CHJP 27 signal coacting with the CHNB signal will enable gate 426 (FIG. 4c) to set the AR to AU flip-flop 415 at $t_3$. This latter flip-flop generates CHBA at time $t_4$ and CHBA enables gate 435 to pass the $t_4$ clock signal to generate FT 431. Thus, at time $t_5$ the A-digits of instruction $N+13$ are set up in register selector 118 and are at thtis time compared with the contents of selector storage 113. The resulting equality comparison causes register selection comparator 142 to generate CAAM.

The signal CHBA from flip-flop 415 coacting with signal CAAM enables gate 423 to pass a $t_5$ clock signal thereby to effect setting of equality flip-flop 416. The inequality flip-flop 417 is, of course, not set at this time since there is no CAAL signal applied to its input gate 424. Thus, it will be apparent from a consideration of the timing decoder that gate 433 is enabled to pass the $t_7$ clock signal to generate FT 381, whereas, FT 380 is not generated.

The effect of the failure to generate FT 380 at time $t_7$ while generating at this time FT 381 may be observed from FIGURE 1 considered in conjunction with the timing diagram. The signal FT 381 enables gates 127 whereas FT 380 would normally enable gates 128. Both gates 127 and gates 128 provide inputs to the A input pulseformers 129A of the Arithmetic Unit 131. Whereas gates 128, when enabled, allow the contents of a designated addressable register to be passed into the A input pulseformers 129A, it is clear that gates 127 when enabled will cause a result derived from the Arithmetic Unit to be directed into the A input pulseformers 129A. It will be realized from a consideration of the normal sequence of events occurring during the full overlap operation that at time $t_7$ of the wenty-third minor cycle the result of instruction $N+12$ will become available from the Arithmetic Unit output.

It will be recalled that when the equality comparison for A operands was made for instruction $N+13$ the A operand of this instruction $N+13$ was found to have the same address in the addressable registers as the result of instruction $N+12$. It would seem that under ordinary circumstances this fact would necessitate delaying the derivation of the A operand for instruction $N+13$ until such time as the result from instruction $N+12$ had been stored. However, the provision of gates 127 eliminates the need for any delay. It will be realized that what is done is to direct the results from instruction $N+12$ back into the arithmetic unit rather than store such results in the appropriate A register to await a subsequent call by instruction $N+13$. This appears both from FIGURE 1 and the timing diagram. Thus, at $t_0$ of the twenty-fourth minor cycle which is the time for setting up the A input pulseformers 129A with the A operand for instruction $N+13$, it will be observed that the M operand has been derived from the memory in its normal fashion. The A operand, however, has been obtained in this instance, not by a read out from the addressable registers but from a rerouting of the result of instruction $N+12$. No other changes in operation are necessitated and there is no loss in overlap.

During the twenty-third minor cycle the status three flip-flop is once again set and during the twenty-fourth minor cycle the status four flip-flop is set thereby indicating the regaining of full overlap operation.

Figure 8E:
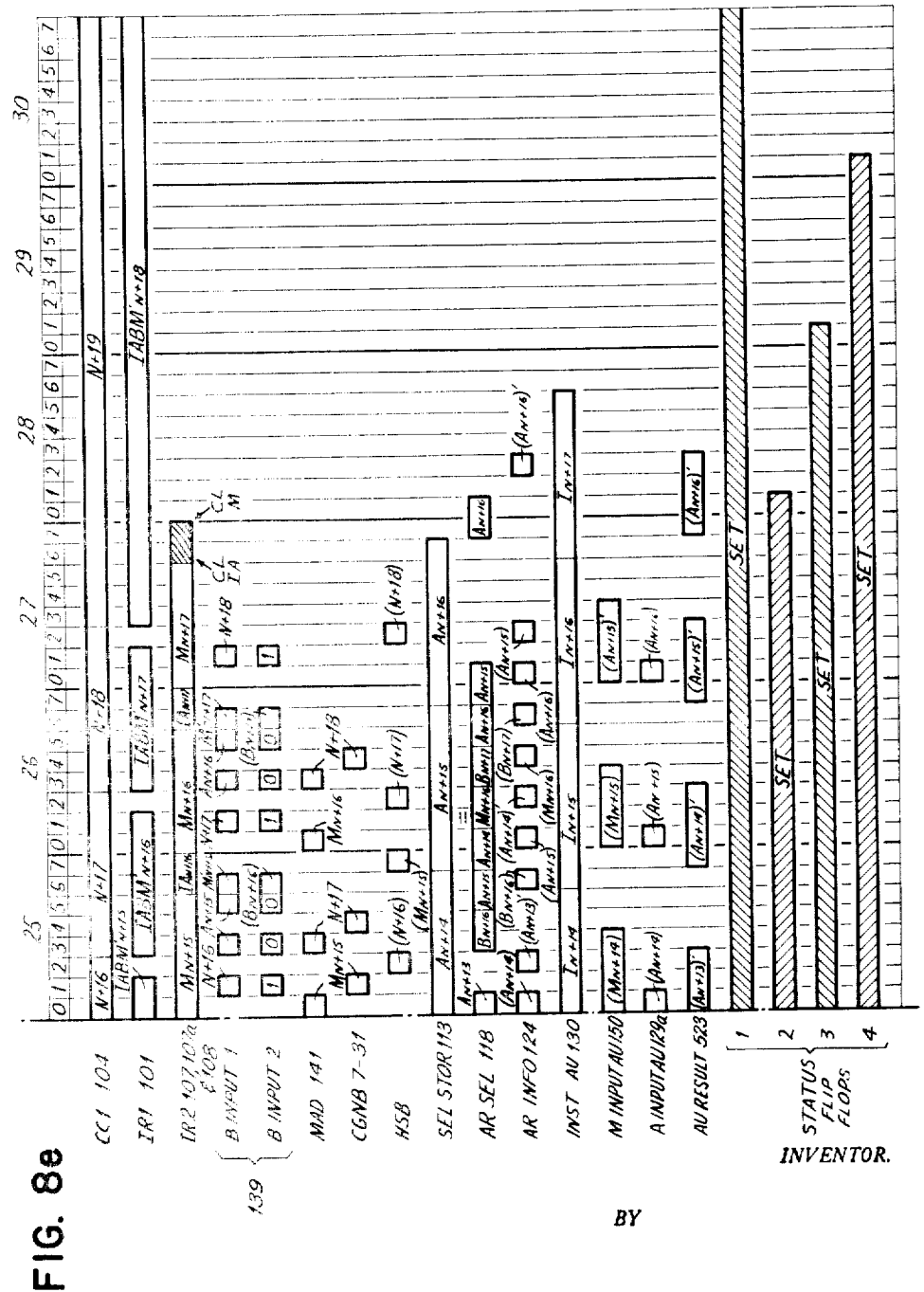

During the twenty-fifth to thirtieth minor cycles now to be considered only two further events are shown. FIGURE 8e illustrates the situation arising when both operands are to be derived from the addressable registers, that is to say $N+16$ is a 999 type instruction and again the operand address of the instruction is the same as the result address of the preceding instruction. Here again as in the case of instruction $N+13$ there is no loss of overlap. Finally to be considered will be the effects obtained when the computer is stopped.

In the twenty-fifth minor cycle in FIGURE 8e, it will be observed that the computer is operating in full overlap (all status flip-flops set) and that a call is made to the memory for instruction $N+17$ in the usual fashion. Also during this minor cycle it will be observed that instruction $N+15$ is during most of the time in IR–2 undergoing execution and that instruction $N+14$ is within one minor cycle of being completed by the Arithmetic Unit. Finally, the result of instruction $N+13$ is stored in the addressable registers at time $t_2$. It is stipulated that instruction $N+16$ for which the B modification operation is performed during the twenty-fifth minor cycle has as its M digits 999XX. Some of the consequences of this particular situation have already been considered in conection with instruction $N+5$. However, it is now further contemplated that the digits XX of instruction $N+16$ derived from the M digits thereof, upon comparision in the register selection comparator 142 are found to be the same as the result or A address of instruction $N+15$. Following the B modification step which takes place on the M' digits of instruction $N+16$ during the twenty-fifth minor cycle the usual memory call for the M operand is made by passing the modified M digits into the memory address decoder 141 at $t_0$ of the twenty-sixth minor cycle. As in the previous case, however, it is apparent that since the M digits are in the form 999XX there is no memory address corresponding thereto. Also as a result of having the 999 digits decoded within the B-adder and having the I digits of the instruction generate CHRM indicating an instruction requiring a normal memory reference, it is evident that gate 4069 in FIGURE 4d will be enabled to pass a $t_7$ clock signal thereby to set read flip-flop 4070. The setting of this flip-flop again, as in the previous instance, causes the generation of the CHFR signal and this places an enabling signal on gate 4044 in the timing decoder as well as on gate 4065. Gate 4044 passes a $t_0$ clock signal to generate FT 433 and this latter signal is effective as in the previous instance to enable gates 181 on FIGURE 1b to pass the two least significant digits (XX) of the M address of instruction $N+16$ (now in IR–2) into the register selector 118. Since FT 433 is generated at $t_0$ it will be apparent from what has been said previously that these digits XX will be set up in register selector 118 at time $t_1$ of the twenty-sixth minor cycle. Also at $t_0$ the AR–M flip-flop 4064 receives a set input signal resulting in the generation at time $t_1$ of the CHAA signal. Since the digits XX from the M portion of instruction $N+16$ are now in the register selector 118 they are compared with the contents of selector storage 113. Since the computer presently is operating in full overlap, the contents of selector storage 113 will be the result address of instruction $N+15$. Equality between the digits stored in these respective registers will again result in the register selection comparator 142 generating the signal CAAM.

Signal CAAM occurring in coincidence with signal CHAA enables gate 476 in FIGURE 4d to pass a $t_1$ clock signal to effect thereby the setting of equality flip-flop 477. The setting of this flip-flop results in the generation at time $t_2$ of the signal CHAJ. The signal CHAJ is permissive with respect to gate 4046 appearing in the timing decoder portion of FIGURE 4d. This gate is thereby enabled to pass a $t_7$ clock signal and thus to generate FT 371. Since equality flip-flop 477 is not set until $t_2$ of the twenty-sixth minor cycle it will be apparent that FT 371 will be generated at $t_7$ of this minor cycle which is the normal time for the generation of FT 370. It will also be apparent from FIGURE 8e that at time $t_7$ of the twenty-sixth minor cycle the result of instruction $N+15$ is available from the Arthimetic Unit. By generation of FT 371 the result of the computation on instruction $N+15$ is routed back into the Arthimetic Unit. In this instance, however, because the equality comparison was between digits normally representing a memory address this result is routed not into the A input pulseformers 129A but rather into the M input register 150. Once again, since by the foregoing rerouting provision it has become unnecessary to await storage of the result of instruction $N+15$, it is seen that no overlap is lost. Thus, in the twenty-seventh minor cycle the operands for instruction $N+16$ which comprise respectively (1) the contents of the addressable register represented by the A digits of this instruction and (2) the results of instruction $N+15$ are entered into the Arithmetic Unit to be executed and such execution takes place in due course.

Instruction $N+17$ is a stop order. It will be observed that instruction $N+17$ is called for in the usual manner during the twenty-fifth minor cycle. In the twenty-sixth minor cycle instruction $N+17$ is received on the high speed bus from the memory and gated into IR–1 to be therein set up at time $t_3$ in the usual manner. The usual B-modification operation is performed on the M digits of this instruction and the entire instruction as in previous instances is advanced into IR–2. In the meantime, in the twenty-sixth minor cycle the usual call is made for instruction $N+18$ from control counter 104 via the B-adder 139 and the address decoder 141. When the I and A digits of instruction $N+17$ are in the normal course of events advanced into IR–2 the I digits are as usual decoded and such decoding results in the generation of certain CHJP signals associated with the instruction. The CHJP 13 signal is effective via buffer 339 in FIGURE 4b to enable gate 327A to pass a $t_1$ clock signal which is effective to set the operand memory not busy flip-flop 331 and this as in previous instances generates a CHNB–A signal. The CHJP 67 signal is likewise generated by this stop instruction and enables gate 4105 appearing in FIGURE 4f to pass a $t_0$ clock signal which thereafter via buffer 4104 enables a setting of stop flip-flop 4106. The set output of flip-flop 4106 is the CNEA signal and this is applied to a number of gates variously located. The immediately noticeable effects of signal CNEA result from the inhibits placed on gates 330A and 332 in FIGURE 4b. While CHNB–A is generated it will be apparent that because of the aforesaid inhibiting effect of CNEA that FT 363 and FT 432 are not generated at time $t_2$. Furthermore, since the instruction is not of the type requiring a memory reference it is obvious that the CHRM signal is not generated so that at time $t_7$ of the twenty-sixth minor cycle FT 363 is not generated. Thus, at $t_0$ of the twenty-seventh minor cycle there is no call for a memory operand for instruction $N+17$ and at $t_3$ of the twenty-seventh minor cycle there is no call for instruction $N+19$. However, since the completing call flip-flop is still at this time generating its signal CSCL it is evident that the contents of control counter 104 will be passed through the B-adder and augmented by one. This follows from the generation of signals FT 401, FT UA and FT 411. Also the instruction $N+18$ currently available from the memory will be gated into IR–1 at time $t_2$ while the digits $N+19$ will be gated back into control counter 104. This latter follows from the generation at time $t_2$ of FT 320, FT 331 and FT 345 via gate 322. The failure of FT 432 from gate 332 by reason of the inhibiting effect of CNEA means that at $t_2$ of the twenty-seventh minor cycle B-mod flip-flop 308 will be reset and call flip-flop 310 will not receive a setting signal. Accordingly, there will be no B-modification carried out for the time being on instruction $N+18$ which is now stored in IR–1 nor will there be any advance of instruction $N+18$ from IR–1 into IR–2. However, the CHNB signal generated from gate 483 will enable the instruction digits from instruction $N+17$ to be passed to the Arithmetic Unit control 130 where they effect a skip operation. This latter takes place when it is considered that CHNB–A enables gate 483 which in turn enables gate 464 in the timing decoder. Gate 464 requires in addition CHJP 38 which is also generated by the stop order. Since no operation is to be performed by instruction $N+17$ other than stopping the computer it will be evident that there are no operands to be called for. It has already been shown that no M operand will be called for. It is evident that through failure to generate the appropriate CHJP signals no A operands will be called, nor will there be any result storage provided. However, it is necessary to clear IR–2 and this clearing takes place via the Program Counter clear flip-flop 473 and the clear IR–2 flip-flop 464A both appearing on FIGURE 4b. The ending signal generated by instruction N+17 coacting with the CHNB signal enables gate 475 to pass the $t_3$ clock signal thereby to effect setting of flip-flop 473. Flip-flop 473 will be producing its set output signal by time $t_4$ of the twenty-seventh minor cycle. At time $t_4$, therefore, gate 460 in the timing decoder will generate FT 313 and this as in previous instances will effect a clearing of the I and A portions 107 and 107A respectively of IR–2. Also gate 471 is enabled to pass a $t_6$ clock signal resulting in flip-flop 464A being set to produce an output signal at $t_7$. This latter in turn enables gate 459 to pass a $t_7$ clock signal resulting in the generation of FT 314. As in previous instances FT 314 is effective to clear the M digits from section 108 of IR–2.

Since at time $t_3$ the CSBM signal is no longer being generated it is obvious that regardless of the signal generated by register selection comparator 142 the equality and inequality flip-flops 493 and 492 respectively are both reset. Thus, neither signal CSBG nor signal CSBS are generated. It follows that in the ensuing twenty-eighth minor cycle there will be no clearing of IR–1 since gate 458 (FIG. 4a) from the timing decoder will not be enabled to generate FT 321. The absence of the CSBS signal also indicates that no resetting of status one flip-flop 335 will take place. This is consistent with what has previously been said since an instruction (N+18) is stored in IR–1 awaiting a restarting of the computer. However, the remaining status flip-flops will each be reset in turn. At time $t_0$ of the twenty-eighth minor cycle a set signal will still be applied to the status three flip-flop 401. This is because status two flip-flop 400 will still be producing its output signal at this time and the CSPA signal from the ending pulse delay flip-flop 407 will also be generated at this time. This latter flip-flop 407 will be set during the preceding twenty-seventh minor cycle by the coincidence of the CHJP ending signal and the CHNB signal generated as a result of the stop instruction N+17. However, the set signal applied to status three flip-flop 401 is at the same time effective to apply a reset signal to the status 2 flip-flop 400. This in the absence of enabling signals to gate 403 resets status two flip-flop 400 in the twenty-eighth minor cycle so that by time $t_1$ thereof it will no longer be producing a set output signal. The resetting of the status three flip-flop 401 and the status four flip-flop 402 thereafter follows as a natural consequence and has been described previously.

Having considered the various events which may take place over a period of thirty minor cycles wherein the computer was originally started with all registers cleared except the control counter 104 and all status flip-flops in the reset condition, the only remaining consideration for this portion of the description concerns the restarting of the apparatus following either a stop order or an actual manual stop, the latter obtained through depressing of the stop button 4102. For this contingency it is observed that the computer is left stopped with IR–1 storing instruction N+18 therein and status one flip-flop 335 in its set output condition. In order to restart the computer, start button 300 is once again depressed and this initiates a cycle somewhat similar to the original start cycle, although some differences arise in view of the condition of IR–1 and status one flip-flop 335. Nevertheless, the call flip-flop 310 will be set and the ending pulse storage flip-flop 305 will likewise be set. The CNBA signal generated by start flip-flop 302 is effective to reset stop flip-flop 4106 by permitting gate 4107 to pass a $t_0$ clock signal. At $t_2$ of the minor cycle following depression of the start button, ending pulse storage flip-flop 305 will generate its set output signal CSAR. Since status one (CQBA) is present it would seem that gates 306 and 333A might be permissive to pass a $t_2$ clock signal thereby to generate FT 432 and FT 363. However, these gates are inhibited by the CNBA signal from the start flip-flop. The call flip-flop 310 is set by time $t_4$ as in the case of the initial start signal so as to make the initial call for the instruction in the second minor cycle following the pushing of the start button. This occurs through generation of FT 411 and FT 401 from gate 315 and FT 363 from gate 311. Both of these gates are enabled by a CSAA signal from the call flip-flop. By time $t_6$ of the first minor cycle following depression of the start button the start flip-flop 302 will be once again reset and the inhibit will be removed from gates 306 and 333A. Thus, during the second minor cycle following pushing of the start button FT 432 is once again generated. This signal is effective as in the various previous instances to set B-mod flip-flop 308, to reset ending pulse storage flip-flop 305, and to set the call flip-flop 310. Also FT 432 is effective to enable the B-digits of instruction N+18 to be read from IR–1 into the register selector 118. From this point on, the normal succession of calls and executions and storage of instructions proceeds as previously delineated.

*Information transfers*

The next problems to be considered in connection with the computer control circuits of the present invention are those associated with placing information presently stored in the addressable registers into the memory. Since the computer may form a portion of an overall larger system which may employ a second computer as well as various input and output units the memory may, in effect, serve as a central exchange through the medium of which, information may be transferred between the various separate units. Thus, all information to be brought into the computer is first introduced to the memory and this may be done either from the results of the computations performed by another computing unit or by the introduction of raw data from an input device. Similarly, the results of computations performed by the present computing unit in order to be made available to the operator or to the other units associated with the complete system must be transferred out and this, as noted, involves transferring such results to the memory initially. Because of these various separate pieces of equipment which may attack the memory it is necessary that this memory be time-shared. Also, because of the numerous pieces of equipment which may attack the memory the memory may be busy when addressed by the computer. It is with this contingency that the present discussion will be initially concerned.

Accordingly, reference is now made to FIGURES 9a and 9b to be considered in conjunction with FIGURES 1 and 4. FIGURES 9a and 9b comprise timing diagrams which although similar in many respects to the timing diagrams of FIGURE 8 are concerned with the state of various components on occasions when information is being transferred from the addressable registers of the computer to the memory. However, it will be seen subsequently that FIGURE 9b also depicts the situation wherein information is transferred from one addressable register to another. FIGURE 9a illustrates a call for and execution of instruction N wherein instruction N requires that the contents of the addressable register designated by the A digits of the instruction are to be transferred to the memory address designated by the M digits of the instruction. At the time instruction N is performed the computer is operating in full overlap and this is indicated by showing the progress and completion of instructions N–4, N–3, N–2 and N–1. Instruction N shows the cycle of events occurring when upon an attempt to transfer information from the computer into the memory there is failure to get the memory not busy signal CGNB.

The normal steps in transferring information from an addressable register to the memory are as follows: The instruction is called via control counter 104, the B-adder 139 and the address decoder 141 as usual. In the ensuing minor cycle, provided the memory is accessible, the instruction is received into IR-1 from the memory and the B-modification operation is performed. It will be recalled that the B-modification operation involves the addition of the five least significant digits from a selected one of the addressable registers to the M digits of the instruction as received into IR-1. Subsequently the then modified M digits are sent to the memory via the address decoder 141 for the purposes of selecting an operand. In the present instance, however, the modified M digits upon being sent to the memory designate the memory address into which it is desired to write the information from the addressable register designated by the A digits of the instruction. Also during the B modification operation the instruction N is transferred from IR-1 to IR-2. From a consideration of the previous timing diagrams of FIGURE 8 it will be recalled that the transfer of the A and I digits is completed at time $t_6$ of any given minor cycle. The transfer of the M digits is delayed two additional pulse times because of the transmission thereof via the B adder.

The I digits of the write instruction upon being set-up in IR-2 are subsequently interpreted by the chain of decoders and encoders as more particularly shown in FIGURES 2 and 4. From the decoders 202, 203 and 204 the signal CHTC is generated which indicates that the instruction is of a type requiring information to be written into the memory. From the Program Counter decoder 207 signal CHWM is generated which also indicates a write into the memory. The function encoder 210 generates the various CHJP signals associated with the particular write to memory instruction under consideration. For the present purposes it is only necessary to consider the basic write instruction specifying simply that the contents of the addressable register designated by A are to be transferred to the memory location designated by M. For this purpose CHJP signals numbered 01, 03, EP, 25 and 38 are generated.

Refer now to FIGURE 9. During the First minor cycle instruction N is called from the memory. This, as usual, takes place by augmenting the contents of control counter 104 (presently $N-1$) by one and sending the augmented contents N out on the memory address lines via the address decoders 141. At time $t_3$ of the first minor cycle the address of instruction N is actually set up in the address decoder and at time $t_4$ the memory not busy signal CGNB is received indicating a successful call to the memory for instruction N. The remaining operations taking place within the first minor cycle are concerned with the instructions preceding instruction N and since such matters have been discussed in detail in connection with FIGURE 8 it is believed that no further description is necessary for an understanding thereof. It is to be noted that in the lower portion of FIGURE 9 is depicted the state of certain of the flip-flops found in FIGURE 4. Knowledge of the state of these flip-flops is helpful in following the course of events throughout the overall control system.

During the second minor cycle instruction N is received from the memory and instruction $N+1$ is called for. The call for instruction $N+1$ follows from the fact that the computer is presently operating in full overlap and that the memory operand call for instruction $N-1$ was successful (i.e. CGNB received) so that the operand memory not busy flip-flop 331 (FIG. 4b) is set to produce its output signal CHNB-A at time $t_2$. The signal CHNB-A performs its usual functions as previously described including the generation of FT 363 and FT 432. The signal FT 363 as in previous instances enable the digits $N+1$ to be set up in the memory address decoder 141 while FT 432 coacting with FT 320 generated from the completing call flip-flop 319 (FIG. 4a) via gate 322 allows instruction N to be gated into IR-1 and the B modification operation for this instruction to be commenced. Signal FT 432 as in previous instances performs its usual functions of setting the B mod flip-flop 308 and the call flip-flop 310 so that the next call may be made. The remaining events taking place in the second minor cycle are again concerned with instructions preceding instruction N and need not be considered in any further detail. Thus far the instruction N is processed in the same manner as the typical instructions previously considered. It is to be noted that by time $t_6$ of the second minor cycle the I and A digits of instruction N have been transferred into IR-2 so that at this point the CHTC signal, the CHWM signal and the various CHJP signals associated with instruction N are available.

At time $t_7$ of the second minor cycle the CHWM signal generated from the I digits of instruction N enables gate 465 in FIGURE 4b to generate FT 363. Thus, at $t_0$ of the third minor cycle the M digits of instruction N are set up in the address decoder 141 via gates 140 (FIG. 1b). Thus, the memory has now been addressed for the purpose of writing thereinto the contents of the addressable register designated by the A digits of the instruction N.

The signal CHJP 01 generated by instruction N as previously noted, passes through buffer 4066 in FIGURE 4d and enables gate 4065 to pass to $t_0$ clock signal thereby to set the AR to M flip-flop 4064. The output signal CHAA from flip-flop 4064 is permissive with respect to gates 476 and 4063 respectively providing set inputs to equality flip-flop 477 and inequality flip-flop 4062 and is also permissive with respect to gate 4045 in the timing decoder. The signal CHJP 03 is permissive with respect to gate 4042 of the timing decoder as shown in FIGURE 4c. This latter gate will accordingly pass a $t_0$ clock signal to generate FT 430 at the start of the third minor cycle. From FIGURE 1c it may be seen that FT 430 is permissive with respect to gates 180 and these gates when enabled transmit the A digits stored in section 107a of IR-2 directly into the register selector 118. As may be seen from FIGURE 9 the A digits are actually set up in register selector 118 by time $t_1$ of the third minor cycle. At this time it would be normal to receive a memory not busy signal CGNB indicating that the memory had been successfully addressed for the write operation. However, to illustrate another of the contingencies which may arise in the operation of the control circuits it is stipulated that at this time there is failure to receive the signal CGNB. The immediate effect of such failure is that operand memory not busy flip-flop 331 will not be set and therefore various operations which depend on such setting will not occur. It is further observable that the true memory not busy flip-flop 480 (FIG. 4b) which has not previously been discussed in detail will likewise not be set so that signal CHNBT is also not generated.

The ensuing effects of these failures will be evident from the timing diagram. Thus, at time $t_2$ gates 330A and 332 will not be enabled and therefore FT 363 and FT 432 will not be generated. The failure of FT 363 means that the call for instruction $N+2$ is prevented from being set up in the address decoder 141 so that the memory is not addressed for instruction $N+2$. Failure of FT 432 means that at time $t_2$ the B mod flip-flop 308 will be reset and that the call flip-flop 310 (FIG. 4a) will not be set during the third minor cycle. Since, however, the completing call flip-flop 319 is at this time still generating its output signal CSCL it is evident that at $t_2$ the signals FT 320, FT 331 and FT 345 are all generated. FT 320 as in previous instances permits the instruction $(N+1)$ available on the high speed bus at this time to be gated into IR-1 wherein it is set up by time $t_3$. The signals FT 331 and FT 345 are as in previous instances respectively effective to clear the control counter 104 and to transmit thereto the address $N+2$ from the B-adder output. It is evident that due to the failure of FT 432 no B modification operation for instruction $N+1$ can take place. This is so because of failure to set B mod flip-flops 308 and in addition failure to enable either gates 116 or 117 (FIG. 1b) to pass the B digits of N+1 from either IR–1 or the high speed bus into register selector 118. Since instruction N+2 has not been sent out on the address lines to the memory, because the FT 363 has not been generated to activate gates 140 (FIG. 1b) it is further evident that there is no memory not busy signal CGNB received in conjunction with this instruction at the present time. Thus, at time $t_4$ gate 314 (FIG. 4a) fails to pass a set signal to the completing call flip-flop 319 through the double failure of the CSAA signal and the CGNB signal so that completing call flip-flop 319 is thereafter reset.

Reference is now made to FIGURE 4f. Since, as previously noted in the instruction N is a write to memory instruction and generates the signal CHTC it is obvious with the failure of signal CHNB–A from operand memory not busy flip-flop 331 and consequent failure of CHNB from gate 483 that gate 4060 will be enabled to pass a $t_2$ signal thereby to set the busy on write flip-flop 4059. The setting of this flip-flop generates signal CQTA at time $t_3$ as indicated on FIGURE 9a. It will be noted however, through failure to set true memory not busy flip-flop 480 (FIG. 4b) that gate 484 is not enabled, notwithstanding the presences of the CHTC signal. Thus, at time $t_4$ FT 352 is not generated and the contents of the addressable register as previously selected from register selector 118 are not gated out to the memory write bus via gates 125, FIGURE 1c. The addressable register selected, however, is regenerated through generation of FT 425 via gate 4045 (FIG. 4d). This latter gate is enabled by CHAA to pass a $t_3$ clock signal to generate FT 425.

The signal CQTA from flip-flop 4059 (FIG. 4f) is permissive with respect to gates 4023 and 4019 in the timing decoder. When this signal is present coincidentally with the generation of certain other signals these gates will generate their respective function table signals. As has previously been noted the write instruction presently under consideration gives rise to a CHJP 25 signal. The CHJP 25 signal enables gate 4025 to pass a $t_4$ clock signal thereby generating FT 401. It is apparent, therefore, that at time $t_5$ the address N+2 presently stored in control counter 104 will be set up on input-1 of the B-adder 139. Gates 4041 and 4036 likewise receive as permissors the CHJP 25 signal. In addition, however, gate 4041 requires a set output signal CQBA from the status-1 flop-flop 335. If this latter signal is present at this time it is to be observed that it operates as an inhibit on gate 4036. Thus, with the presence of CHJP 25 either gate 4041 or gate 4036 will pass a signal depending respectively on whether or not status-1 flip-flop 335 (FIG. 4d) is set at this time. Either of these gates when enabled pass a $t_4$ clock signal.

From FIGURE 9a it is to be observed that at the present time, namely the third minor cycle, the status-1 flip-flop 335 is set to produce its CQBA output signal. Accordingly, gate 4041 passes the $t_4$ clock signal and gate 4036 is inhibited. Gate 4041 causes the final encoder to generate FT 415, 416 and FTUA. Each of these signals is effective with respect to input gates to input 2 of the B-adder. FT 415 enables gates 159 to pass digits 9999X from register 157 (FIG. 1b) into input 2 of the B-adder. FT 416 enables gates 160 to pass digits XXXX8 from register 158 into input 2 of the B-adder. Finally, FTUA places a carry into the least significant digit position of the B-adder. The net result is that −1 will be placed on input 2 of the B-adder so that 1 will be subtracted from the digits placed on input-1 of the B-adder. Thus, it is apparent that the address N+2 now being passed through the B-adder will be diminished by 1 so as to become N+1.

It will be appreciated that the instruction N+1 from the memory has already been transferred to the instruction register IR–1. However, since the memory was busy on instruction N, which was a write to memory order, it is assumed that this instruction was transmitting information into the memory at a location from which the instruction N+1 was to be extracted. Hence, instruction N+1 must again be sought (if updated instructions are to be executed), and as shall be seen the contents of IR–1 (i.e., the previously extracted instruction N+1) must be scrapped.

The signal CQTA and the signal CHJP 25 are permissive with respect to gate 4023 of the timing decoder whereby this latter gate is enabled to pass a $t_6$ clock signal. The $t_6$ clock signal is thereafter effective to generate FT 331 and FT 345 in the final encoder. These signals as in previous instances clear the control counter 104 and pass thereto the output from the B-adder. Thus at time $t_7$ of the third minor cycle the contents of control counter 104 will be N+1. The CQTA signal is also a permissive with respect to gate 4019. This gate is enabled to pass a $t_1$ clock signal thereby to generate FT 321 in the final encoder. This, as in previous instances, is effective to clear IR–1 by the end of time $t_1$ of the fourth minor cycle.

Since instruction N is still stored in IR–2 it is apparent that the signal CHWM will continue to be generated. From FIGURE 4d it is to be observed that this signal is permissive via buffer 4073 with respect to gate 4029. It will be appreciated that during the third minor cycle through failure to obtain a memory not busy signal at time $t_1$, the memory not busy flip-flop 331 (FIG. 4b) was not set. Accordingly, the signal CHNB which normally acts as an inhibitor on gate 4029 is absent. Thus, gate 4029 is enabled to pass a $t_5$ clock signal thereby generating FT 402 and FT 411 in the final encoder. From FIGURE 1b it is once again to be observed that these signals are effective to pass the M digits presently stored in Section 108 of IR–2 into the B-adder along with zeros. The CHWM signal is also permissive with respect to gate 465 in FIGURE 4b to pass a $t_7$ clock signal thereby generating FT 363 in the final encoder. FT 363 as in previous instances enables the output of the B-adder (presently the M digits of IR–2) to be set up in the address decoder 141 by time $t_0$ of the fourth minor cycle.

The output signal CQTA from the busy or write flip-flop 4059 has an additional effect not previously noted. It is permissive with respect to gate 4016 on FIGURE 4e and enables this latter gate to pass a $t_0$ clock signal to the reset input of status-1 flip-flop 335 via buffer 4017. Since at this time the completing call flip-flop 319 (FIG. 4a) is in its reset condition, it is apparent that there is no set input signal presently applied to the status-1 flip-flop 335 (FIG. 4e). Accordingly, by time $t_1$ of the fourth minor cycle of the status-1 flip-flop will be reset. This resetting of the status-1 flip-flop will subsequently effect a resttting of each of the remaining status flip-flops in turn during ensuing minor cycles. That such follows is believed to be apparent from a consideration of FIGURE 8 and so has not been specifically illustrated on FIGURE 9.

At the beginning of the fourth minor cycle observe that the memory has once again been addressed by the M digits of instruction N for the purpose of writing thereinto the contents of the addressable register designated by the second memory call is successful so that at time $t_1$ the A digits of the instruction. It is stipulated that this memory not busy signal CGNB is received. Thereafter the computer proceeds to regain full overlap. The receipt of the CGNB signal at time $t_1$ will be effective to set the operand memory not busy flip-flop 331 (FIG. 4b) the true memory not busy flip-flop 480 so that by time $t_2$ both signal CHNB–A and CHNB–T are generated. In the meantime the absence of signal CSCL from completing call flip-flop 319 (FIG. 4a) and the presence of the ending signal CHJP–EP' from instruction N enables gate 321 on FIGURE 4a. It shall be noted that CHJP–EP and CHJP–EP' are both ending pulse signals and are generated by function decoder 210 (FIG. 2) in response to instructions. All instructions generate the CHJP–EP and CHJP–EP' ending pulse signals and some instructions as shall be discussed only generate the CHJP–EP ending pulse signal. The CHJP–EP' is also permissive with respect to gate 321'. Thus, at $t_0$ the contents of control counter 104 ($N+1$) are gated into the B-adder along with zeros thereby to enable instruction $N+1$ to be called again. The generation of CHNB–A by the operand memory not busy flip-flop 331 enables gate 330A thereby generating FT 363 in the final encoder. However, in the absence of the signal CQBA from the status-1 flip-flop 335 gate 332 is not enabled so that FT432 is not generated. Thus, it follows that the B-mod flip-flop 308 is not set during this fourth minor cycle. It is also apparent that in the absence of CSCL FT 320 is not generated and gates 116 and gates 117 in FIGURE 1 are not permitted to pass signals. Hence no information passes from either IR–1 or the high speed bus into the register selector 118.

The signal CHJP 03 is continuously generated by the instruction N while the I digits are stored in IR–2 so that at time $t_0$ of the fourth minor cycle gate 4042 in FIGURE 4c is again enabled to generate FT 430 in the final encoder. Thus, at $t_1$ the A digits from instruction N are again passed directly from section 107a of IR–2 into the register selector 118 via gates 180 and again select the addressable register whose contents are to be transferred to the memory. The setting of the true memory not busy flip-flop 480 (FIG. 4b) generates CHNB–T and this coacts with CHTC from the instruction decoder to enable gate 484 (FIGURE 4b) to pass a $t_4$ clock signal thereby to generate FT 352. From FIGURE 1c it will be seen that FT 352 enables gates 125 to transmit output signals from regeneration pulseformers 124 representing the contents of the selected addressable register to the high speed write bus to memory FT 425, which enables gates 122 to pass the output of the selected addressable register through the regeneration pulse formers and thence to the memory and back into the selected register, is generated as previously discussed. In particular CHJP 01 is present and permissive with respect to gate 4065 in FIGURE 4d. Accordingly, the AR–M flip-flop 4064 is again set and generates the CHAA signal. This latter is permissive with respect to gate 4045 to pass a $t_3$ clock signal thereby generating FT 425.

The CHAA signal is also enabling with reference to gates 476 and 4063 so as to generate signals indicating the result of an equality comparison via flip-flops 477 or 4062. Since at the present time selector storage 113 is cleared it necessarily follows that the signal CAAL indicating an inequality will have been generated. This sets flip-flop 477 via gate 476 which in turn generates FT 373 at $t_4$ via gate 4047 FT 373 passes the contents of the selected addressable register into the M input register 150 of the Arithmetic Unit via gate 171 (FIG. 1c).

In the fourth minor cycle the generation of the CHNB signal along with the generation of CHJP 38 enables gate 464 in FIGURE 4b to pass a $t_5$ clock signal thereby generating FT 300 in the final encoder. This as usual permits the I digits of the instruction in the encoded form to be read into the Arithmetic Unit control 130. In this instance the Arithmetic Unit does not operate on the contents of the register but merely transmits such contents to the Arithmetic Unit result register. The reason for providing such a path through the Arithmetic Unit will become apparent hereinafter.

The remaining events in the fourth minor cycle are concerned with the setting of certain flip-flops to enable the regain of full overlap operations. It will be observed that the CQTA signal from the busy or write flip-flop 4059 (FIG. 4f) will be present until the end of time $t_2$ of the fourth minor cycle. CQTA is permissive with respect to gate 490A in FIGURE 4a and enables this gate to pass a $t_2$ clock signal which signal is effective to set the call flip-flop 310 via buffer 309A. Thus, by time $t_3$, call flip-flop 310 will once again be producing its set output signal CSAA. It is also apparent that during the fourth minor cycle gate 336 in FIGURE 4a will be rendered permissive. This is so because of the presence of the CHNB signal, the CHJP–EP signal and the absence of the CQBA signal in view of the reset condition of the status-1 flip-flop 335. It follows that gate 336 will be enabled to pass a $t_2$ clock signal thereby to effect a setting of ending pulse storage flip-flop 305 via buffer 304A. By time $t_3$ of the fourth minor cycle it follows therefore that the signal CSAR will be generated. The setting of the call flip-flop 319 and the Ending pulse storage flip-flop 305 permits regaining of the full overlap operation as shall be seen presently. Thus, setting of the call flip-flop 310 enables setting of the completing call flip-flop 319. This event follows the call for instruction $N+1$ which as previously noted is set up in the address decoder 141 at time $t_3$ of the fourth minor cycle. At time $t_4$ the memory not busy signal CGNB is received and this coacting with the CSAA signal from the call flip-flop enables gate 314 to pass the $t_4$ clock signal thereby setting completing call flip-flop 314.

Thus, it follows that in the fifth minor cycle the computer once again picks up the overlap operation. At time $t_0$ the signal CSCL from the completing call flip-flop enables gates 320 and 320' to pass the $t_0$ clock signal thereby generating FT 401, FT 411 and FTUA. These as in previous instances permit the contents of control counter 104 to be passed into the B-adder and increased by one. Also at $t_0$ completing call signal CSCL is once again effective to place a set input signal on the status 1 flip-flop 335 (FIG. 4e) so that by time $t_1$ of the fifth minor cycle, status 1 flip-flop 335 will once again be producing its set output signal CQBA. At time $t_2$ of the fifth minor cycle FT 320, FT 331 and FT 345 are generated via gate 322 which is enabled by the signal CSCL. These signals operate as on previous occasions respectively to permit the contents of memory location $N+1$ representing the next instruction (which contents are now available on the high speed bus) to be gated into IR–1 and also permit the clearing of the control counter 104 and the reading thereinto of the digits $N+2$ representing the instruction now being called. Also at time $t_2$ FT 363 and FT 432 are generated. FT 363 is generated via gate 311 or gate 333A and FT 432 is generated via gate 306. It follows accordingly that the address decoder 141 will be set up with the digits $N+2$ in order to address the memory for instruction $N+2$. The B-mod flip-flop 308 is set (by FT 432) and the B-modification operation is performed for instruction $N+1$ now stored in IR–1. The remaining portions of minor cycle 5 as well as minor cycle 6 are apparent from the timing diagram of FIG. 9a and need not be discussed in detail. It is provided that the instruction $N+1$ and the instruction $N+2$ are both instructions calling for a writing into the memory of the contents of an addressable register. It is also provided that in both instances the memory not busy signal is received on the first call so that there is no interruption of the overlap operations.

The call for instruction $N+3$ is made during the sixth minor cycle and up until the time such instruction is actually received from the memory the operation of the control circuits is as previously described. However, it is stipulated that instruction $N+3$ provides yet another contingency. In the foregoing discussion it has been shown that where an instruction had in the M digit portion thereof the digits 999XX, instead of selecting an M operand from the memory such operand would be selected from register XX among the addressable registers. When this principle is applied to an instruction of the write into the memory type, it results in an operator being enabled through the use of a single instruction to transfer the contents of any addressable register to any other addressable register. This feature in effect provides a more flexible memory arrangement. If the addressable registers are considered as an extension of the main memory wherein such extension may have special features such as rapid access, it follows that the computer is provided with a memory wherein it is possible to transfer the contents of any address to any other address on a single instruction without the need for transferring into intermediate registers and without the need of a plurality of instructions. Thus this portion, i.e. the addressable register portion of the memory is extremely flexible in nature.

For an understanding of how this feature operates reference is made to FIGURE 9b in connection with instruction $N+3$. By time $t_3$ of the seventh minor cycle the instruction $N+3$ will have been received into IR-1. By time $t_6$ of the seventh minor cycle a B modification operation will have been performed on the M digits of the instruction. The three most significant M digits are 999 indicating the memory is not addressed but rather one of the addressable registers is addressed. Thus such addressable register is chosen in the present instance to be written into and the instruction in effect transfers the contents of register AA to register XX.

By time $t_6$ the instruction $N+3$ as far as the I and A digits thereof are concerned has been transferred into IR-2. Since this is a write instruction the CHWM signal will be decoded from the Program Counter decoder 207 (FIG. 2) The 999 signals from the B-adder along with the CHWM signal enable gate 4071 on FIGURE 4d to pass a $t_7$ clock signal thereby to set the write flip-flop 4072. At time $t_0$ therefore it follows that this flip-flop will be providing its output signal CHWD. Since the instruction is of the write variety it follows that the appropriate CHJP signal from function encoder 210 will be developed as well as the signal CHTC from the decoder 204 of FIGURE 2. However, since the M digits are 999XX it follows from what has been said before that no memory not busy signal will be received from the memory. This being the case gate 328A is not enabled and the true memory not busy flip-flop 480 is not set. The CHWD signal is effective via buffer 339 to place an enabling signal on gate 327A so that the latter passes a $t_1$ clock signal to set operand memory not busy flip-flop 331. Thus, it follows that the CHNB-A signal is generated. CHJP signals 01 and 03 are both generated by this instruction and it follows therefore that the AR-M flip-flop 4064 in FIGURE 4d is set thereby to generate CHAA. Likewise, gate 4042 in FIGURE 4c is enabled (by CHJP 03) to pass the $t_0$ clock signal to generate FT 430. It follows therefore that the address of the addressable register designated by the A digits is by time $t_1$ of the eighth minor cycle stored in register selector 118 so as to extract the contents of such register.

The CHWD signal is also effective to enable gate 4043 in FIGURE 4d to pass a $t_4$ clock signal to generate FT 402 and FT 411 and coacting with CHNB is effective to enable gate 425 in FIGURE 4c to pass a $t_4$ clock signal thereby to set the AU-AR flip-flop 418. Signals FT 402 and FT 411 pass the M digits stored in section 108 of IR-2 into the B-adder along with zeros. The setting of the AU-AR flip-flop 418 enables gate 432 on FIGURE 4c to pass a $t_6$ clock signal thereby to generate FT 421. As will be realized from the previous discussion, this latter signal enables gates 112 (FIG. 1b) to pass a portion of the output of the B-adder into selector storage 113. It follows accordingly that a result address is now set up in selector storage and such result address comprises the digits XX from the M digits 999XX of instruction $N+3$.

As will be realized from previous discussions the setting of the AU-AR flip-flop 418 provides additional effects in the ensuing minor cycles. Thus, in the ninth minor cycle gate 427 is enabled to pass a $t_3$ clock signal thereby to set the delay flip-flop 428. Flip-flop 428 thereafter provides enabling signals to gates 429 and 430 in the timing decoder so that gate 430 is enabled to pass a $t_6$ clock signal in the ninth minor cycle to generate FT 434 and gate 429 is enabled to pass a $t_1$ clock signal in the tenth minor cycle thereby to generate FT 426. As previously noted where a write to memory instruction is executed the contents of the designated addressable register in addition to being sent out on the memory write bus are passed into the arithmetic unit and eventually such contents are available on the arithmetic unit output lines. Since the instruction calls for nothing more than a write into memory it is apparent that in such instance the passing of the contents of the addressable register through the Arithmetic Unit does not serve any particular purpose. In the present instance, however, the Arithmetic Unit serves as a conduit and temporary storage as will be realized from a consideration of the timing diagram. Considering again the generation of FT 434 at $t_6$ of the ninith minor cycle it is observed that this enables the contents of selector storage 113 on FIGURE 1 to be gated into the register selector 118 via gates 114. Thus, the digits XX of the instruction $N+3$ are now in a position to select the register into which the result is to be placed. The result in this case is the contents of the register designated by the A digits of this instruction $N+3$.

It will be realized that during the eighth minor cycle the setting of the AR-M flip-flop 4064 resulted in the generation of signal CHAA and subsequently caused the setting of inequality flip-flop 4062 to generate CHAK. This follows from what has been said previously regarding equality comparisons taking place in the register selection comparator in FIGURE 1 when selector storage 113 is cleared. It follows that by time $t_2$ of the eighth minor cycle flip-flop 4062 will be generating its set output signal CHAK thereby enabling gate 4047 in the timing decoder. Thus, the $t_4$ clock signal will be passed by this latter gate thereby to generate FT 373. This last signal enables the contents of the previously selected A register (which contents are to be transferred) to be gated into M input register 150 of the Arithmetic Unit. By time $t_7$ of the ninth minor cycle the same operand will be available as an output from the Arithmetic Unit. From a consideration of FIG. 1c it will be realized that it is necessary in order to place these result digits into an addressable register to generate FT 426. As has already been pointed out FT 426 is generated at time $t_1$ of the tenth minor cycle via gate 429 of the timing decoder (FIG. 4c). From the foregoing it follows that the contents of a register A may readily be transferred to another register or to the computer main memory. Where it is desired to transfer such contents to the main memory the M digits of the instruction calling for the transfer will designate a memory address. Where the transfer is to be made to another register the M digits of the instruction calling for the transfer will be in the form 999XX where the digits XX designate the address of the register to which the transfer is to be made.

The final contingency to be considered in connection with an instruction requiring an information transfer into the memory arises when an equality comparison is obtained between the address of the register whose contents are to be transferred and the result address of an immediately preceding instruction. When such an equality comparison is obtained it is indicative that the contents of the register to be transferred are about to be changed. Thus in order to ensure that only the most recent information is placed into the memory it is necessary to delay the transfer operation until such time as the updating actually has been completed.

If reference is made once again to FIGURE 9b it will be observed therefrom that instruction $N+5$ is stipulated to be such an instruction. In order to provide for a comparison resulting in the possibility of an equality it is stipulated that instruction $N+4$ is an ordinary arithmetic instruction such that the time $t_7$ of the ninth minor cycle selector storage 113 is holding the A digits from instruction $N+4$ which A digits designate the result address thereof. Instructions similar to $N+4$ have previously been discussed (see FIG. 8), hence there is no present need to consider the details thereof. It will be noted, however, that during the eighth minor cycle instruction $N+5$ is called from the memory and the call is successful inasmuch as the contents of memory location $N+5$ appear on the high speed bus and are placed into IR–1 during the ninth minor cycle. Thereafter the normal B modification for $N+5$ is carried out and the contents of IR–1 are transferred into IR–2. It is to be observed that instruction $N+5$ is of the type requiring the contents of a register designated by the A digits thereof to be transferred to a memory location designated by the M digits thereof. Thus the same CHJP signals are generated as in the case of the write-to-memory instruction heretofore considered. These include, CHJP 01, CHJP 03, CHJP EP', CHJP 25 and CHJP 38.

The signal CHJP 01 enables setting of the AR–M flip-flop 4064 via buffer 4066 and gate 4065 as shown on FIGURE 4d. The setting of this latter flip-flop in turn generates again the signal CHAA. The CHJP 03 signal enables gate 4042 appearing on FIGURE 4c to pass a $t_0$ clock signal thereby generating FT 430. The signal FT 430 enables gates 180 in FIGURE 1c to pass the A digits stored in section 107A of IR–2 directly into the register selector 118. At this point following the selection of the addressable register the contents thereof are normally gated into the high speed bus to the memory through the usual paths. However, when the A digits are gated into register selector 118 the regular comparison between the contents of register selector 118 and the contents of selector storage 113 takes place and it is stipulated that for this instruction $A_{N+5}=A_{N+4}$. As will be realized from previous discussions the result of obtaining an equality on such comparison is the generation of the signal CAAM rather than the signal CAAL from register selection comparator 142.

Thus, instead of setting the inequality flip-flop 4062 (FIGURE 4d) the flip-flop 477 is set so that by time $t_2$ of the tenth minor cycle the signal CHAJ is being generated. Since during normal processing of instruction $N+5$, the M digits thereof have been B modified and sent to the memory thereby to address the location into which it is desired to write, and since a memory not busy signal CGNB is assumed to have been received, it follows that at time $t_2$ operand memory not busy flip-flop 331 (FIG. 4b) will have been set and the true memory not busy flip-flop 480 will likewise have been set.

Turning once again to FIGURE 4d it is to be seen that gates 4067 and gates 4068 are both enabled. Gate 4067 is enabled by CHTC decoded from the instruction digits, the CHNB–T signal from the true memory not busy flip-flop 480 and CHAJ from the equality flip-flop 477. Gate 4067 accordingly will pass a $t_2$ clock signal to generate the signal CHWY. The signal CHWY generated thus at time $t_2$ effects a resetting both of the operand memory not busy flip-flop 331 and the true memory not busy flip-flop 480. Thus, following time $t_2$ neither the CHNB nor the CHNB–T signals are available and the functions normally performed by these signals are not performed. The CHWY signal is passed through a buffer as the write delete signal which is applied to the memory (FIG. 7).

Gate 4068 is enabled by a combination of the signals CHNB–T, from flip-flop 480, the CHTC signal from the instruction, the CQBA signal from the status-1 flip-flop 335 and CHAJ from the equality flip-flop 477. Thus enabled, gate 4068 passes a $t_2$ clock signal through a one pulse delay element thereby to generate CSBZ at time $t_3$. Signal CSBZ occurring at time $t_3$ is effective via buffer 340A on FIGURE 4a to reset call flip-flop 310. Thus, at time $t_4$ the signal CSAA is no longer available so that gate 314 is not enabled and the completing call flip-flop 319 through failure to receive the set signal is reset by the $t_4$ clock signal. The CSBZ signal, in addition to resetting the call flip-flop 310 also effects generation of the CSBX signal at time $t_4$ through buffer 4002 and a one pulse delay appearing on FIGURE 4e. The CSBX signal is effective in turn to reset the B-mod flip-flop 308 (FIG. 4a) and to reset the flip-flops 493 and 492 (FIGURE 4b).

It will be observed, accordingly, from FIGURE 9b that during the tenth minor cycle a call is made for instruction $N+7$ but notwithstanding the receipt of a memory not signal CGNB following such call, the completing call flip-flop 319 is reset. As previously mentioned, where an equality comparison is obtained it is necessary that operations be delayed until the results of the previous instruction with which such equality comparison was obtained, are finally transferred into the result register. Instruction $N+6$ is actually received from the high speed bus at $t_2$ and set up into IR–1, at $t_3$, this being possible through the generation of FT 320 from the completing call flip-flop 319 via gate 322. However at the normal time for B modification of $N+6$ the B-mod flip-flop 308 has been reset. Since FT 432 is generated (from gate 332) and the B digits of the incoming instruction ($N+6$) permitted thereby to select an addressable register for B-modification purposes it is necessary that the so-selected register be regenerated in order to avoid destroying the contents thereof. Such regeneration is accomplished in the usual manner from the B mod flip-flop 308 which is not actually reset until the end of time $t_4$ by the CSBX signal. Thus, gate 335A in FIGURE 4a is enabled to pass a $t_4$ clock signal and the one pulse delay occurring in the output thereof enables the generation of FT 425 at the proper time for the required regeneration.

Reference is once again made to FIGURE 4d. It will be observed that with the resetting of the operand memory not busy flip-flop 331, gate 4029 will be rendered permissive from the presence of the CHWM signal obtained from the instruction digits of $N+5$ via buffer 4073. Thus enabled, gate 4029 passes a $t_5$ clock signal to generate FT 402 and FT 411. These signals as in previous instances gate the M digits of instruction $N+5$ from IR–2 into the B-adder along with zeros. The same CHWM signal is also enabling with respect to gate 465 on FIGURE 4b so that at time $t_7$ FT 363 is generated. Thus, the M digits of instruction $N+5$ are again set up within the address decoder 141 to address the memory for the write operation.

The CHWY signal has one further effect not previously mentioned. When this signal is generated at time $t_2$ during the tenth minor cycle it is sent to the memory to perform a write-delete operation. The receipt of signal CAAM prevents information transfers into the memory from the write bus as previously noted but since it will be realized that the memory has been addressed for the purpose of writing thereinto it is necessary in view of the construction of the memory (see FIG. 7) to provide for recirculation of the contents of the selected memory address in order to prevent destruction thereof. Accordingly, the write delete signal on being sent to the memory causes such recirculation to take place whereby the contents of the selected memory address remain unaltered. It will have been observed that through a resetting of the true memory not busy flip-flop 480 by the CHWY signal, gate 484 in FIGURE 4b is not enabled so that a time $t_4$ FT 352 is not generated. Thus, no information is sent out on the write bus at this time.

During the eleventh minor cycle the result of instruction $N+4$ becomes available and is transferred into the addressable register designated by the A digits in selector storage 113, from which register instruction $N+5$ requires an information transfer into the memory. Thus, it is now possible to proceed with the operation of writing into the memory with the assurance that the most recent information will be placed therein.

As previously noted, by time $t_0$ of the eleventh minor cycle the memory has already been addressed for the write operation. Since instruction $N+5$ is still in IR–2, it follows that the various CHJP signals associated with this instruction are still available. Thus, during the eleventh minor cycle the AR–M flip-flop 4064 in FIGURE 4e is again set by CHJP 01 to generate CHAA which in turn results in setting flip-flop 4062 as well as the generation of FT 425. Also CHJP 03 is once again effective to generate FT 430 via gate 4042 (FIG. 4c). Thus, again the A digits stored in IR–2 are passed directly into register selector 118 thereby to select the register the contents of which are to be written into the memory. The receipt of a memory not busy signal CGNB at $t_1$ of the eleventh minor cycle when the M digits are again sent out via the address decoder 141 will effect the setting of the memory not busy flip-flop 331 and the true memory not busy flip-flop 480. From the setting of flip-flop 480 it follows that gate 484 will be enabled and FT 352 will be generated at $t_4$ which following FT 425 from gate 4045 on FIGURE 4d enables the contents of the selected register to be passed to the memory write bus.

The reset condition of completing call flip-flop 319 enables gates 321 and 321' on FIG. 4a so that the present contents ($N+7$) of the control counter 104 are augmented by zeros and passed to the address decoder 141. It will be realized that during the eleventh minor cycle through failure of the CSCL signal from the completing call flip-flop it is not possible to gate the previously called for instruction $N+7$ from the high speed bus into IR–1. It will be noted, however, that through setting of the operand memory not busy flip-flop 331 and in the presence of the other enabling signals (CHJP–EP and CQBA) FT 432 and FT 363 are both generated at time $t_2$, thus enabling a call to be made for instruction $N+7$ and setting call flip-flop 310, B-mod flip-flop 308 and the gating of the B digits of instruction $N+6$ from IR–1 into register selector 118. Thereafter at time $t_6$ a B-modification operation is performed on instruction $N+6$.

The ensuing minor cycle 12 is concerned with entirely normal operations and accordingly, it is not thought necessary to consider this in detail.

Refer next to FIGURE 9c. FIGURE 9c is basically similar in the information presented thereby to FIGURES 9a and 9b. FIGURE 9c shows the effects of two contingencies occurring together. The instruction wherein these contingencies arise in instruction $N+9$. The B digits of instruction $N+9$ are the same as the A digits of instruction $N+7$ and additionally the A digits of instruction $N+9$ are the same as the A digits of instruction $N+8$. instruction $N+9$ again is a write to memory instruction wherein the contents of the register designated by the A digits thereof are to be transferred into the memory location designated by the M digits thereof. Since for present purposes there is no need to consider the busy on write flip-flop 4059 on FIG. 4f its signal has been deleted from FIGURE 9c and in place thereof has been inserted the indication of signals provided by the equality and inequality flip-flops 493 and 492 respectively (FIG. 4b).

It will be appreciated in this contingency that the overlap operation must be temporarily held up so that the accumulator register specified by the A digits of instruction $N+7$ have the latest information stored therein before the contents of this accumulator register are used to modify the M' digits of instruction $N+9$. Further, the overlap operation must be again temporarily held up because the A digits of instruction $N+9$ specifying an accumulator (the contents of which are to be transferred to the memory) are the same as the A digits of the prior instruction $N+8$ which are assumed to specify an accumulator register about to receive new data. In this latter case overlap must be held up until the accumulator register receives the data specified by instruction $N+8$, so that instruction $N+9$ can transfer up dated data to the memory.

Since the other instructions shown on FIGURE 9c are of a type already explained they will not be considered in detail. It is sufficient to note that for an account of the operation concerning such instructions reference may be made to FIGURE 8 and the description pertaining thereto.

In the thirteenth minor cycle a call is made to the memory for instruction $N+9$ and such call occurs in the usual manner. In the fourteenth minor cycle instruction $N+9$ is received into IR–1. It will be recalled from previous discussion that when the instruction is actually passed into IR–1 the B digits thereof are compared at time $t_3$ with the contents of selector storage 113 (FIG. 1b). This is done via the register selector 118 (FIG. 1b) which receives the B digits at the same time as IR–1 receives the entire instructions. At time $t_3$, therefore, of the fourteenth minor cycle the B digits of instruction $N+9$ are compared with the A digits of instruction $N+7$ presently retained in selector storage 113. An equality results and accordingly from the register selection comparator (FIG. 1c) the signal CAAM is generated. This, coacting with the CSBM signal obtained from B mod flip-flop 308, enables gate 493A in FIGURE 4b to pass the $t_3$ clock signal thereby setting the equality flip-flop 493. Since inequality flip-flop 492 was previously reset by the application thereto of a $t_2$ clock signal it follows that at time $t_4$ gate 498 will generate the CSBG output signal. The signal CSBG, as previously discussed in connection with FIGURE 8, does not actually have any effect until the ensuing minor cycle. At time $t_0$ of the fifteenth minor cycle the signal CSAV is generated via gate 4014 on FIGURE 4a in response to the CSBG signal from gate 498. This signal has the effect of setting the ending pulse storage flip-flop 305 via buffer 304A and of resetting completing call flip-flop 319 via buffer 341A. In addition, the signal CSAV is applied to the final encoder wherein it generates FT 411. It will be noted that the presence of the signal CSBG at time $t_0$ will have the effect of inhibiting gate 320' (FIG. 4a) so that FT 411 and FTUA are not generated therefrom. However, at time $t_0$ completing call flip-flop 319 is still producing its output signal CSCL and this enables gate 320 to generate FT 401. It follows, therefore, that the generation of FT 401 from gate 320 and the generation of FT 411 from CSAV will pass the contents of the control counter 104 along with zeros into the B adder. It thus follows that instruction $N+10$ originally called during the fourteenth minor cycle is again called from the memory during the fifteenth minor cycle.

The absence of signal CSBS at time $t_1$ of the fifteenth minor cycle prevents gate 458 (FIG. 4a) from being enabled to generate FT 321. Thus, IR–1 is not cleared. Furthermore, the resetting of the completing call flip-flop 319 by the end of time $t_0$ prevents gate 322 from being enabled so that FT 320, FT 331 and FT 345 are not generated (see gates 100 on FIG. 1a). Hence instruction $N+10$ which would normally have been received into IR–1 from the high speed bus during the fifteenth minor cycle is not so received.

As noted above instruction $N+9$ is a write into memory instruction. Thus the various CHJP signals associated with such instructions are generated. The AR–M flip-flop 4064 on FIGURE 4d is set by CHJP 01 thus generating CHAA and gate 4042 in FIGURE 4c is enabled to pass the $t_0$ clock signal by CHJP 03 thereby generating FT 430. This latter signal (FT 430) enable gates 180 to pass the A digits from IR–2 into register selector 118. At this time ($t_1$ of the fifteenth minor cycle) another comparison is made in the register selection comparator 142. Since it has been stipulated that the A digits of the instruction $N+9$ are equal to the A digits of instruction $N+8$ it follows that at $t_1$ the CAAM signal will again be generated. This coacting with the CHAA signal from flip-flop 4064 in FIGURE 4d enables gate 476 to pass the $t_1$ clock signal to set equality flip-flop 477 thereby generating signal CHAJ.

Signal CSAV generated at $t_0$ of the fifteenth minor cycle has the additional effect of setting the block memory not busy flip-flop 485 via buffer 4108 (FIG. 4b). The setting of this flip-flop 485 generates signal CHXA at time $t_1$ which has the effect, inter alia, of inhibiting gates 327A and 328A. Thus, during the fifteenth minor cycle the operand memory not busy flip-flop 331 will not be set. Furthermore, the true memory not busy flip-flop 480 will also not be set. It follows that gate 484 will not be enabled and thus FT 352. will not be generated. Accordingly, no information is sent out during this minor cycle on the high speed write bus (see gates 125 on FIG. 1c). However, since the memory has been addressed at time $t_0$ (fifteenth minor cycle) for a write operation as discussed previously it is necessary to provide a write-delete signal. In the present contingency the CSBG signal enables gate 4167 on FIGURE 4d to pass a $t_2$ clock signal thereby generating the write-delete signal YBJ. It will be noted that normally when no equality is encountered on the B modification operation the write-delete signal is generated via gate 4067. Gate 4067 however, requires as an enabling signal the CHNBT signal from the true memory not busy flip-flop 480. Since this signal is not presently generated it follows that an alternative must be provided in order to obtain write-delete signal YBJ.

Since CHNB is not generated during this minor cycle and since the instruction is of the write to memory type which generates a CHWM signal it would normally follow that gate 4029 on FIGURE 4d would be enabled to pass a $t_5$ clock signal thereby generating FT 402 and FT 411, to pass the M digits from IR–2 into the B-adder along with zeros and thereafter address the memory. However, it is evident because of the previous equality comparison prior to the B-modification operation that the M digits now stored in IR–2 are incorrect. Hence it is necessary to repeat the B-modification operation for this instruction. Gate 4068 in FIGURE 4d is not enabled in the absence of CHNB–T and accordingly signal CSBZ is not generated via gate 4002 (FIG. 4e). Thus, signal CSBX will not be generated at time $t_4$. With the failure of this latter signal B mod flip-flop remains in its set output condition.

From the setting of ending pulse storage flip-flop 305 (FIG. 4a) by the CSAV signal, CSAR is generated during $t_1$ and $t_2$ of the fifteenth minor cycle thereby enabling gates 306 and 333A to generate FT 432 and FT 363 respectively. Thus, all signals are available which are necessary both to carry out a normal B modification operation including advancing the contents of IR–1 into IR–2 and the operation wherein zeros are added to the M digits stored in IR–2. However, it has already been shown that during this minor cycle the block memory not busy flip-flop 485 will be producing its output signal CHXA. Signal CHXA is applied to gate 4029 in FIGURE 4d as an inhibit so that at time $t_5$ only the required signals for the B-modification are generated.

At time $t_7$ the CHAJ signal from equality flip-flop 477 (FIG. 4d) enables gate 4046 to pass a $t_7$ clock signal thereby to generate FT 371. FT 371 has the effect of gating the result of instruction N+8 into the M input register 150 of the Arithmetic Unit 131 via gate 170 (FIG. 1c). In the absence of CHNB gate 464 on FIG. 4b is not enabled thus at this time the encoded I digits of instruction N+9 are not available to the Arithmetic Unit control 130. Thus, passing the result from instruction N+8 back into the Arithmetic Unit will have no present effect. Additionally, it will be observed that signal CHXA from flip-flop 485 (FIG. 4b) enables gate 4130 (FIG. 4c) to pass $t_7$ clock signal thereby to generate FT 372 at $t_0$. FT 372 effects a clearing of the M input register 150 (FIG. 1c). The result of instruction N+8 is also gated back into the information recirculation lines of the addressable registers. This latter operation follows from the setting of the AU to AR flip-flop 418 (FIG. 4c) and subsequently delay flip-flop 428 from the CHJP 50 signal generated by instruction N+8.

Finally, in the sixteenth minor cycle the memory has once more been addressed for the write operation and additionally the addressable register containing the information to be transferred is again selected. During this sixteenth minor cycle the selection selector storage 113 (FIG. 1b) is cleared by a $t_6$ timing pulse and accordingly the equality comparison made at time $t_1$ will generate the CAAL signal (FIG. 1c) which, coacting with the CHAA signal, will set the inequality flip-flop 4062. Thus, gate 4047 will be enabled to pass a $t_4$ clock signal to generate FT 373 so that the contents of register A as designated by instruction N+9 are again passed to the M input register 150, and at this time gates 125 on FIGURE 1 will be enabled by FT 352 to pass the contents of the designated register into the high speed write bus.

The remaining matters shown on FIGURE 9c merely repetitions for the sake of completeness of a similar cycle of events described in connection with FIGURE 8.

Double precision operations

The next aspect of the control circuits to be considered is the operation of the various elements, particularly those of FIGURE 4, when double precision instructions are to be performed. As the name would suggest, a double precision instruction employs operands and produces results having twice the precision of instructions of the type heretofore considered. It will be recalled that a normal operand comprises twelve digits. It follows that a double precision operand will comprise twenty-four digits. The added complexity resulting from double precision operations of the type to be considered arises from the fact that the addressable registers and the memory locations each store respectively words having twelve digits only. Accordingly, in carrying out operations on double precision operands, it is necessary for double precisions instructions to specify two memory locations and two addressable registers. Since the instructions are not provided with sufficient digits to do this in the normal course of events, operands for double precision operations are stored in two adjacent memory locations or in two adjacent addressable register locations. Similarly, the results following computation are stored in two adjacent addressable register locations. It follows from what has been said and in view of the instruction format that it is necessary in carrying out double precision operations to make two calls to the memory in order to obtain the two halves of a memory operand (i.e. the most significant half and the least significant half). Similarly, two calls must be made to the addressable registers to secure the two halves of a second operand. Finally, it is necessary to store the result addresses twice in the selector storage in order to provide for the eventual storage of the result in two adjacent addressable register locations. In most of the double precision operations the most significant halves of the respective operands will be called first and the operations will be commenced thereon. Following such call for the most significant half the least significant half will be called and operations commenced on these portions. Finally, the result will be stored, the most significant half again being stored first, followed by the least significant half. Because of considerations arising within the arithmetic unit it is occasionally desirable to reverse this order of selecting operands and accordingly, in double precision multiply and divide orders the least significant halves will be selected first and operated on. This change involves some slight modifications which will be duly considered. However, aside from such minor modifications and not withstanding the manipulations carried on by the arithmetic unit, the selection of operands takes place in much the same manner regardless of the nature of the instruction being performed. It is with this aspect involving as it does the overlap operation that the invention is more particularly concerned.

To secure an understanding of the operations of the circuits in connection with double precision instructions refer now to FIGURE 10a and 10b again to be considered in conjunction with FIGURES 1 and 4. The particular instruction depicted in FIGURES 10a and 10b is that of a double precision addition. Herein the instruction as received into IR–1 will appear the same as any other instruction and will be handled in the same manner up to the point when operands are selected. Thus, during B modifications the I and A digits are advanced into the IR–2 and the modified M digits are sent to address the memory for a memory operand. During the succeeding minor cycle the register selector 118 receives the A digits for the purpose of selecting an addressable register operand. Thereafter, however the M digits from IR–2 are increased by one and sent to the memory address decoder to select another memory operand which in this case will comprise the least significant half of the overall double precision operand. In the following minor cycle the A digit will be increased by one and sent to the register selector 118 in order to select the least significant half of the double precision addressable register operand. These operations are followed by passing into selector storage 113 the address of the most significant half of the result. Thereafter in the ensuing minor cycle the A digits are again sent to the B adder and increased by one to set up selector storage 113 with the address of the least significant half of the result. During the final selection of a result address the next succeeding instruction will be called, in order to enable the computer to regain full overlap operation with the least loss of time.

FIGURE 10a shows the foregoing operations along with certain additional details including the condition of the Program Counter. It will be realized, that due to the double precision operation being carried out, more than one minor cycle is required to execute the overall instruction. Because of the need to prolong certain operations it will be noted that during each program counter step certain CHJP signals are generated and others which might normally be associated with an instruction will not be generated. Thus, for example, during an instruction requiring more than one program counter step it will be apparent that the CHJP ending signals (CHJP (EP)) will not be generated until the final program counter step for that particular instruction has been attained. In the present instruction the program counter is stepped from step 0 to step 2. Thus, it follows that the CHJP ending signal will not be generated until program counter step 2. FIGURE 10b is basically the same as FIGURE 10a except that FIGURE 10b gives an indication of the added complications which arise when there is failure to get a memory not busy signal upon calling for the respective memory operand halves.

The detailed operations follow. For the purpose of this discussion it is assumed that once more the instruction is instruction N and that it is received on the high speed bus at time $t_2$ of the first minor cycle shown on FIGURE 10a. Thus, at time $t_3$ the instruction will actually be set up in IR–1 and the B-modification operation will have commenced with the call to the addressable registers for the designated B operand. Thereafter it follows that at time $t_6$ the I and A digits of instruction N are passed into IR–2 so that the I digits will thereafter be effective to generate the various CHJP signals etc. associated with such I digits. At $t_7$ the modified M digits of the instruction N from the B adder are gated into the address decoder 141 as well as into the M portion 108 of IR–2. Each of the foregoing events is the same as for instructions heretofore considered so that it is not thought to be necessary to go into an involved discussion of the operation of FIGURE 4 concerning generation of the relevant function signals. It is to be noted, as previously mentioned, that the CHJP–EP associated with this particular instruction is not generated until the program counter has reached step 2. This will affect various elements and various events occurring in the second minor cycle.

It is noted that completing call flip-flop 319 is set during the first minor cycle following a successful call for instruction N1. Thus, flip-flop 319 will at time $t_0$ of the second minor cycle be producing its set output signal CSCL, and FT 401, FT 411 and FTUA will each be generated via gates 320' and 320 respectively in FIGURE 4a. Accordingly, $N+1$ presently stored in control counter 104 is augmented by one, and at $t_2$ with the generation of FT 311 and FT 345 via gate 322 the new count $N+2$ will be passed into control counter 104. The generation of FT 320, also via gate 322 enables the contents of memory location $N+1$ called during the first minor cycle and representing the next instruction to be gated into IR–1. However, the B modification operation which normally follows the foregoing will not occur until instruction N is substantially completed.

A successful call to the memory for the operand M of instruction N will, as shown, result in the setting of operand memory not busy flip-flop 331 and this is effective to generate CHNB–A. With the generation of CHNB–A and as heretofore considered in connection with various single precision instructions, gates 330A and 332 (FIG. 4b) are normally permissive as a result of the generation of CHJP–EP from function encoder 210 (FIGURE 2). In the present instance, however, as already noted CHJP–EP is not generated until the program counter has advanced to step 2. Thus, it follows that FT 363 and FT 432 are not generated at this time. The failure to generate FT 363 prevents the call to memory for instruction $N+2$ and as previously noted the digits $N+2$ are passed back into the control counter 104. The failure to generate FT 432 prevents either gates 116 or gates 117 on FIGURE 1b from being enabled at this time. Accordingly, there is no call for the B modifier of instruction $N+1$ just received into IR–1. Similarly, the failure of FT 432 enables B-mod flip-flop 308 (FIG. 4a) to be reset at time $t_2$ and further provides that during this second minor cycle call flip-flop 310 will not be set. In the absence of CSBM from B-mod flip-flop 308 gates 335A, 335A' and 468 are not enabled so that FT 312, FT 400, FT 410 and FT 425 are not generated and the contents $(N+1)$ of IR–1 are not advanced into IR–2 (see gates 102, 103 on FIG. 1a; gates 136, 133 on FIG. 1b and gates 122 on FIG. 1c). The failure to set call flip-flop 310 (FIG. 4a) prevents generation of CSAA so that at time $t_4$ of the second minor cycle completing call flip-flop 319 receives a reset signal which is effective to terminate the output CSCL by time $t_5$. It will be understood, therefore, that until the generation of CHJP–EP no further calls will be made to the memory for instructions and there will be no further stepping of the control counter 104.

Consider now the CHJP signals which are generated during the program counter step 0 of the present instruction and their effect as regards the control circuits of FIGURE 4. In FIGURE 4b gate 463 will be enabled by the generation of CHJP 30 thereby to pass the $t_2$ clock signal to generate FT 403 and FT 411. These signals as in previous instances gate the A digits from IR–2 into the B adder along with zeros (see gates 134 and 153 on FIG. 1b). Also generated is CHJP 27 which coacting with the CHNB signal from gate 483 enables gate 426 in FIGURE 4c to pass the $t_3$ clock signal to set the AR–AU input flip-flop 415. The CHBA output signal from flip-flop 415 places enabling signals on gates 435 and 434 in the timing decoder as well as on the input gates 423 and 424 to the equality-inequality flip-flops 416 and 417 respectively. Gate 435 passes a $t_4$ clock signal to generate FT 431 and gate 434 passes a $t_7$ clock signal to generate FT 425. Thus, the A digits emerging from the B-adder representing the address of the most significant half of the A operand of the instruction are passed to the register selector 118 via gate 115 and finally with the selection of a register corresponding to such A digits the register will be regenerated through the generation of FT 425 (see gates 122 on FIG. 1c). It is assumed that the comparison made by the register selection comparator 142 at time $t_5$ results in no-equality so that signal CAAL is generated and flip-flop 417 is set thus enabling gate 441 to pass a $t_7$ clock signal to generate FT 380. As in previous instances FT 380 operates gates 128 so that the contents of the selected addressable register are transferred into the A input pulse formers 129A of the arithmetic unit 131.

The I digits from instruction N now in IR–2 along with program count 0 from the program counter 215 (FIG. 2) generate CHJP 10. This latter signal along with the CHNB signal from gate 483 (FIG. 4b) enables gate 4028 in the timing decoder section of FIGURE 4d to pass the $t_5$ clock signal thereby generating FT 402, FT 411 and FTUA from the final encoder. From previous discussions it will be realized that these signals are effective to gate the M digits presently stored in section 108 of IR–2 into the B-adder 139 along with zeros and a one in the carry input: Therefore, these aforesaid M digits are increased by one. Since the instruction is of the type requiring information from the memory the CHRM signal is generated. This enables gate 465 on FIGURE 4b to pass a $t_7$ clock signal to generate FT 363.

During program step 0 the I digits of instruction N also generate CHJP 74 and CHJP 12. From FIGURE 4b it is seen that gate 472 is enabled by the coaction of CHJP 74 and CHNB to pass a $t_5$ clock signal. The latter signal is effective via buffer 470 to set clear IR–2 (M) flip-flop 464A. Thus, gate 459 in the timing decoder is enabled to pass a $t_7$ clock signal to generate FT 314. Similarly, gate 4150 is enabled by the coaction of CHJP 12 and CHNB to pass a $t_5$ clock signal to set the B adder to IR–2 flip-flop 4151. The output signal from flip-flop 4151 enables gate 1452 in the timing decoder to pass a $t_7$ clock signal to generate FT 311. From the generation of these function signals it will be realized that the M digits coming from the B adder now increased by one, will be sent to the memory address decoder 141, section 108 of IR–2 will be cleared and the same section of IR–2 will be refilled with the augmented M digits. Additionally during this second minor cycle the CHJP 38 signal is generated and this coacting with the CHNB signal enables gate 464 on FIGURE 4b to pass a $t_5$ clock signal thereby to generate FT 300 which as in previous instances gates the instruction digits from instructions encoder 110 into the arithmetic unit control 130. Finally during program counter step 0 the function encoder will generate CHJP 46. FIGURE 4c shows that CHJP 46 coacting with the CHNB signal enables gate 4124 to pass a signal which in turn via buffer 4125 enables gate 4126 to pass the $t_5$ clock signal. The output of gate 4126 is designated CPCS and effects a stepping of the program counter 215 to step 1. With the program counter 215 now in step 1 a further group of CHJP signals are generated.

During the third minor cycle with the program counter now at step 1 it will be noted that following the memory call for the address designated by the digits $M+1$ the receipt of the memory not busy signal CGNB will again effect a setting of the operand memory not busy flip-flop 331 (FIG. 4b). Hence again the CHNB signal will be generated. As in previous instances, however, the absence of the CHJP–EP signal prevents either of gates 330A or 332 in FIGURE 4b from generating their respective function signals FT 363 and FT 432 in the final encoder. The signal CHJP 30 is again generated during this step and as in the previous instance is effective to enable gate 463 in FIGURE 4b to pass a $t_2$ clock signal thereby generating FT 403 and FT 411. CHJP 77 signal coacts with the CHNB signal to render gate 4140 in FIGURE 4b permissive thereby to pass a $t_2$ clock signal to generate FTUA. Thus, at time $t_3$ of the third minor cycle the A digits stored in IR–2 are transferred to the B-adder 139 via gates 134 (FIG. 1b) and increased by one. The signal CHJP 27 generated by the function encoder 210 (FIG. 2) during this program step coacts with the CHNB signal from the operand memory not busy flip-flop 331 to enable gate 426 to pass a $t_3$ clock signal thereby setting the AR–AU flip-flop 415 on FIGURE 4c. Flip-flop 415 as in previous instances generates the CHBA signal which in turn generates via the timing decoder and via flip-flop 417 FT 431, FT 425 and FT 380. Thus, the addressable register $A+1$, is selected and its contents passed into the arithmetic unit via the A input pulse formers 129A. In particular FT 431 transmits the output of the B adder 139 (FIG. 1b) to the register selector register 118 via gates 115 whereby the contents of a selected register from registers 121 (FIG. 1c) are transmitted via gates 128 (controlled by FT 380 see FIG. 1c) to the input pulse formers 129A via buffer 129. FT 425 allows gates 122 (FIG. 1c) to return the information to registers 121.

During program counter step 1 CHJP 50 will be generated via the program counter decoder 207 and function encoder 210. CHJP 50 is transmitted via buffer 425A to enable gate 425 on FIGURE 4c to pass a $t_4$ clock signal to set the AU to AR flip-flop 418. Additionally, CHJP 54 is generated and coacts with CHNB to enable gate 466 on FIGURE 4b to generate FT 403 and FT 411. It will be realized from previous discussions that the effect of the foregoing generation of signals is that once again the A digits from IR–2 are passed through the B-adder and into selector storage where they are stored prior to selecting and addressable register for result storage. The foregoing operation accomplishes only the first stage of the result address selection, the subsequent selection taking place during the succeeding program count. Finally generated during program count 1 is CHJP 44. This latter signal coacts with CHNB to enable gate 4121 on FIGURE 4c to pass a $t_4$ clock signal thereby to set the repeat flip-flop 4120. The set output of this flip-flop is the CPCW signal which is applied to buffer 339 in FIGURE 4b and to gate 4123 in FIGURE 4c. Gate 4123 is enabled by CPCW coacting with CHNB to pass a signal via buffer 4125 which in turn enables gate 4126 to pass the $t_5$ clock signal thereby again generating the signal CPCS. This latter as in the previous instance steps the program counter. Accordingly, the program counter will now be at step 2.

For this particular instruction program counter step 2 will effect the generation of the CHJP–EP signal. With the generation of this latter signal various operations temporarily suspended will once again be resumed. Thus in the fourth minor cycle gates 321 and 321' on FIGURE 4a will be enabled in the absence of the CSCL signal from the completing call flip-flop, to generate respectively FT 411, and FT 401. Accordingly, the contents of the control counter 104 are once again gated into the B-adder 139 via gates 137 (FIG. 1b) along with zeros from register 147 via gates 153 thereafter to address the memory for instruction $N+2$. It will be recalled that during the second minor cycle the digits $N+2$ were passed through the B-adder 139 but were not at this time sent to the address decoder 141 to call instruction $N+2$ because of failure to generate FT 363. During the fourth minor cycle however, FT 363 is generated via gate 330A (FIG. 4b). As noted above on FIGURE 4b, signal CPCW from repeat flip-flop 4120 is effective via buffer 339 to enable gate 327A to pass the $t_1$ clock signal thereby setting operand memory not busy flip-flop 331 which thereafter generates its set output signal CHNB–A. CHNB–A coacts with CHJP–EP to enable gates 330A and 332 to generate respectively FT 363 and FT 432. It will be appreciated that with the generation of these signals full overlap operation will once again be initiated. FT 363 enables a call to be made to the memory for instruction $N+2$, while FT 432 will be effective to commence a B modification operation on the instruction $N+1$ presently stored in IR–1 and at the same time will effect setting B-mod flip-flop 308 and call flip-flop 310.

During program count 2 again the signals CHJP 54 and CHJP 50 are generated. CHJP 54 acts on gate 466 (FIG. 4b) to generate FT411 and FT403 which, as in previous instances pass the A digits from IR-2 into the B-adder 139 (FIG. 1b) along with zeros (see gates 134 and 153 on FIG. 1b) CHJP 50 sets the AU–AR flip-flop 418 via gate 425. Additionally there is generated CHJP 61. This coacting with the CHNB signal enables gate 4034 on FIGURE 4b to pass a $t_4$ clock signal to generate FTUA in the final encoder. Thus the A digits before being sent to selector storage are augmented by one.

In the fifth minor cycle the result of the first stage of the operation taking place in the arithmetic unit become available and from the signals generated by flip-flops 418 and 428 in FIGURE 4c such result is gated from the arithmetic unit and into the selected addressable register A. Thus the generation of FT 434 via gate 430 passes the A digits held in selector storage into register selector 118 via gates 114 (FIG. 1b). Subsequently FT 426 from gate 429 (FIG. 4c) passes the result from the arithmetic unit into the selected register 121 via gates 126 and regeneration pulse-formers 124 (FIG. 1c).

CHJP–EP coacting with CHNB also effects setting of program counter clear flip-flop 473 on FIGURE 4b, which generates the signal CPKD to clear IR-2 through generation of FT 313 and FT 314 via gate 460 for FT 313 and via gate 471, buffer 470, flip-flop 464A via gate 459 for FT 314. From FIGURE 4c it is seen that signal CPKD is permissive with respect to gate 4122 and enables that gate to pass a $t_5$ clock signal. The output signal from gate 4122 effects resetting of the repeat flip-flop 4120 and at the same time generates the signal CPCL. The signal CPCL clears the program counter 215 (FIG. 2) to the 0 count. Thereafter, through consideration of the timing diagram it will be readily seen how the computer returns to full overlap operation.

The only timing yet to be considered in connection with FIGURE 10a relates to the various status flip-flops on FIGURE 4e. From a consideration of the various signals generated it will be apparent that the status-1 and status-2 flip-flops 335 and 400 respectively, remain set throughout the foregoing operations. However, status-3 flip-flop 401 and status-4 flip-flop 402 are reset. During step 0 of the program counter as previously indicated there was no generation of CHJP–EP. It follows that during the second minor cycle the ending pulse delay flip-flop 407 is not set through failure of gate 408 to pass a $t_5$ clock signal. Thus, the CSPA signal is not generated, and at $t_0$ of the third minor cycle gate 404 is not enabled, so that status-3 flip-flop 401 is reset. Subsequently, in the fourth minor cycle status-4 flip-flop 402 is also reset. During program counter step 2 in the fourth minor cycle ending pulse delay flip-flop 407 will once again be set. Accordingly, at $t_2$ of the fifth minor cycle CSPA is generated and coacts with the status-2 output signal to pass the $t_0$ clock signal thereby again setting status-3 flip-flop 401. Subsequently in the sixth minor cycle status-4 flip-flop 402 is again set.

Further contingencies which may arise in a double precision operation are illustrated in FIGURE 10b to which attention is now directed. In FIGURE 10b precisely the same operation is contemplated as was covered in the discussion of FIGURE 10a. In this instance, however, following both calls to the memory for the operands M and M+1 respectively there is failure to receive immediately the memory not busy signal. The delay in each case is a single minor cycle. Obviously when this occurs it is necessary to make provision for a second call in each case. In FIGURE 10b the instruction to be considered is N+4.

The call for instruction N+4 takes place in the sixth minor cycle on FIGURE 10a. The instruction is duly received on the high speed bus, passed into IR-1 and B-modified (in the seventh minor cycle (FIG. 10b)), substantially as was the case for instruction N. Upon being sent out to the address decoder 141 the M digits of this instruction fail to obtain the memory not busy signal CGNB. The first effect therefore is failure to set the operand memory not busy flip-flop 331 in the eighth minor cycle. It follows that CHNB–A is not generated and the various gates requiring this signal are not enabled. Nevertheless, B-mod flip-flop 308 is set in the seventh minor cycle so that the instruction N+4 is transferred into IR-2 and the I digits will therefore be decoded to generate the CHJP signals associated with program count 0 of this particular instruction. Thus CHJP 30 is effective to generate FT 403 and FT 411 by enabling gate 463 on FIGURE 4b to pass a $t_2$ clock signal. The A digits of instruction N+4 accordingly are gated through the B-adder. Failure of CHNB however, prevents CHJP 27 from enabling gate 426 in FIGURE 4c so that the AR–AU input flip-flop 415 remains reset. Thus FT 431 and FT 425 are not generated at the present time so that register selector 118 does not receive the A digits via gates 115 (FIG. 1b).

It is necessary to make another call to the memory for the M digits representing the most significant half of the memory operand. Obviously, it is not presently desirable to enable gate 4028 to generate FT 402, FT 411 and FTUA thereby to add 1 to the M digits through the B-adder 139 (FIG. 1b). However, gate 4028 (FIG. 4d) requires the coaction of CHJP 10 and CHNB and as noted above CHNB is not generated. Hence the second memory call for the M operand uses the original M digits as B-modified. Gate 4029 in FIGURE 4d is enabled by CHRM in the absence of CHNB and passes a $t_5$ clock signal thereby generating FT 402 and FT 411 which are the signals required in this instance. Also, the CHRM signal enables gate 465 in FIGURE 4b to generate FT 363. Thus, the memory is again addressed to select therefrom the operand representing the most significant half of the double precision operand. It is clearly apparent that with failure of CHNB the program counter cannot be stepped inasmuch as gate 4124 in FIGURE 4c does not receive the required enabling signals. Thus, in the ninth minor cycle the computer will still be operating on program step 0. However, with the receipt of a memory not busy signal CGNB on this second call to the memory the memory not busy flip-flop 331 will be set to generate CHNB–A. The generation of the CHNB signal from gate 483 thereafter enables the remaining steps associated with program count step 0 to proceed. Thus in the ninth minor cycle there is a call for the most significant half of the A operand with CHJP 30 generating FT 403 and FT 411. CHJP 27 coacts with CHNB to enable gate 426 to set the AR–AU flip-flop 415 in FIGURE 4c. CHJP 10 likewise coacts with the CHNB signal to enable gate 4028 on FIGURE 4d to generate FT 402, FT 411 and FTUA. Thus, the M digits are now increased by one preparatory to addressing the memory for the least significant half of the data word to be processed. Generation of CHNB coincidental with CHJP 46 furthermore enables gate 4124 on FIGURE 4c to pass a signal by way of buffer 4125 thereby enabling gate 4126 to pass the $t_5$ clock signal and generate CPCS. CPCS steps the program counter 215 to count 1. Finally during program counter step 0 gate 472 (FIG. 4b) is enabled by CHJP 74 coacting with CHNB and gate 4150 (FIG. 4b) is enabled by CHJP 12 coacting with CHNB. Thereafter FT 314 and FT 311 are generated to clear section 108 of IR-2 and gate thereinto the digits M+1. In particular, gate 472 sets flip-flop 464A via buffer 470. Flip-flop 464A renders gate 459 permissive so that at $t_7$ the FT 314 signal is produced. Gate 4150 passes a $t_5$ pulse to set flip-flop 4151. The set output of flip-flop 4151 enables gate 4152 to pass a $t_7$ pulse whereby FT 311 is generated. Flip-flop 4151 is reset by a $t_0$ timing pulse.

Following the call for the data contained in memory location M+1 again there is failure to obtain the memory not busy signal CGNB. On this occasion however certain phenomena occur which were not previously noted. Thus, the AR–AU flip-flop 415 (FIG. 4c) is set. This results from the CHJP 77 signal associated with program count 1 of this instruction enabling gate 426A in the absence of CHNB to pass the $t_3$ clock signal. However, gate 4140 in FIGURE 4b which is normally enabled by CHJP 77 is not enabled on this occasion through the absence of CHNB. Thus, gate 4140 does not generate FTUA at this time ($t_2$). Therefore with CHJP 30 enabling gate 463 to pass a $t_2$ clock signal, FT 403 and FT 411 will be generated so that the most significant half of the A operand will again be called and sent for a second time to the arithmetic unit.

The most significant half of the M operand is sent to the arithmetic unit 131 by the generation of FT 370 at time $t_7$ of the ninth minor cycle. This operand remains on the M input register 150 throughout the tenth minor cycle since for this instruction the clear signal normally obtained at $t_3$ from the arithmetic unit is not enabled to pass through gate 4131 on FIGURE 4c through failure of the CHNB signal. Thus, FT 372 is not generated.

The second call for the operand $M+1$ (least significant half) requires enabling of gate 4029 in FIGURE 4d. This gate is enabled by the generation of CHRM and the absence of CHNB. Likewise gate 465 in FIGURE 4b is again enabled to generate FT 363. Thus, at $t_0$ in the eleventh minor cycle a second call is made to the memory for the least significant half of the M operand (i.e., $M+1$). It is assumed that this second call is successful and that the memory not busy signal CGNB is received immediately thereafter. Thus, with respect to program count 1 there remain only the operations of calling for the least significant half of the A operand ($A+1$) and setting the AU–AR flip-flop 418. The CHJP 30 signal which continues to be generated during this program count will, as previously enable gate 463 to pass the $t_2$ clock signal to generate FT 403 and FT 411 thus to gate the A digits along with zeros through the B-adder 139 via gates 134 and 153 (FIG. 1b). CHJP 27 coacts with CHNB to pass the $t_3$ clock signal via gate 426 and buffer 426B to set the AR–AU flip-flop 415. During this minor cycle CHJP 77 coacts with CHNB to enable gate 4140 on FIGURE 4b to pass the $t_2$ clock signal thereby generating FTUA in the final encoder. Thus the A digits are increased by one and sent to register selector 118 thereafter to select the least significant half of the A operand. The least significant operand half $A+1$ is passed to the arithmetic unit at the same time as the least significant half of the memory operand $M+1$. It is apparent that with the generation of CHNB, and CHJP 54 as associated with this particular step of the instruction gate 466 on FIGURE 4b is enabled to pass the $t_4$ clock signal thereby generating FT 403 and FT 411. Likewise CHJP 50 coacts with CHNB to enable gate 425 on FIGURE 4c to pass the $t_4$ clock signal thereby setting the AU–AR flip-flop and initiating operations for storage of the result.

Operations from this point on are substantially the same as in the previous case illustrated by FIGURE 10a. Thus, the repeat flip-flop 4120 (FIG. 4c) is set and the program counter 215 (FIG. 2) stepped so that during the twelfth minor cycle operations will be the same as those in minor cycle 4 depicted on FIGURE 10a. It should be obvious that status flip-flops 3 and 4 are reset following the same pattern shown by FIGURE 10a. They will not, however, be set again until some time after minor cycle 12. Thus, status-3 flip-flop 401 will be set in the 13 minor cycle and the status-4 flip-flop 402 will again be set in the 14 minor cycle (not shown).

Certain other signals applied to the various gates concerned with the foregoing double precision operations are provided in view of other contingencies which may arise and which have not been illustrated specifically. Thus, gate 4140 in FIGURE 4b is inhibited by the presence of the CHXA signal. This signal is derived from the block memory not busy flip-flop 485 and it will be recalled that flip-flop 485 is set by the CSAV signal. CSAV is in turn generated from gate 4014 which is enabled by CSBG arising when comparisons are made in the register selection comparator 142 between the B digits of the instruction to be performed and the result address of an instruction presently undergoing execution. Where such equality comparisons result it is necessary to delay further the execution of the double precision instruction and such further signals are employed in connection therewith.

Since, insofar as other double precision operations are concerned the operations of the control circuits of the invention remain basically the same it is not thought to be necessary to describe these in detail. It is to be noted, however, that some of these instructions require many more minor cycles for their actual execution thereof in the arithmetic unit. Thus, a double precision multiplication requires nine minor cycles for its execution and a double precision divide instruction requires forty-six minor cycles. However, the fetching of operands follows substantially the same pattern in with one exception. In these instructions it has been found desirable through logical considerations in the arithmetic unit to select the least significant half of the respective operands first and thereafter select the most significant halves of the operands. This order of selection is, of course, opposite to that just described in connection with the detailed treatment of the double precision add. To bring about this result the I digits which are received in IR–1 are decoded in a special decoder attached to and forming part of IR–1. This decoder is responsive to those instructions received in IR–1 indicating either a double precision multiplication or a double precision division operation and generates a signal CVAD. When the B modification operation is performed on the M' digits of such instruction the CVAD signal is applied to gate 4035 in FIGURE 4a and coacts with the CSBM signal from B-mod flip-flop 308. Thus, gate 4035 is enabled to pass a $t_7$ clock signal to generate FTUA. Thus the M' digits are added to the five least significant digits selected addressable register plus 1 so that the M address sent to address decoder 141 is $M+1$. $M+1$ is then stored in section 108 of IR–2. When the instruction is thereafter gated into IR–2 the call for the least significant half of the A operand must be made to addressable register $A+1$. For this purpose the instruction generates in addition to CHJP 30, CHJP 35 which enables gate 463A. Thus, in addition to FT 403 and FT 411, FTUA will be generated so that the addressable register selected is $A+1$. Thereafter, in order to select the most significant half of the M operand it is necessary to subtract one from the digits $M+1$ now stored in IR–2. For this purpose the instruction generates CHJP 11. CHJP 11 coacting with CHNB enables gate 4030 on FIGURE 4d to pass a $t_5$ clock signal thereby generating FT 402, FT 415, FT 416 and FTUA. The effect of these signals as previously described in connection with gates 135, 159 and 160 (FIG. 1b) is to subtract one from the digits $M+1$ and a call is subsequently made to the memory for the most significant half of the M operand. Following this operation it is then necessary to select the most significant half of the A operand which is accomplished by gating the A digits through the B-adder along with zeros as in previous instances. The other steps involved are much the same with the result storage flip-flops 418 and 428 being set during an appropriate minor cycle as determined by the setting of the Program Counter 215. Thus for a double precision multiplication which requires nine minor cycles (i.e. Program counts 0–8) the result chain will be started during Program count 7 and again during Program count 8. In a double precision division involving forty-six minor cycles (i.e. Program counts 0–45) the result chain will be started during Program count 23 and during Program count 45. Other than these changes the operations carried out are similar to those described in the discussion of the double precision add.

Transfer of control

An important aspect of computers in general is that pertaining to transfers of control or jumps whether conditional in nature or unconditional. The computer control circuits of the present invention provide for several different types of transfer of control but because of the overlap operation various contingencies may arise which must be provided for in the apparatus.

In general, a transfer of control is said to take place when the computer executes a jump from one sequence of instructions to another sequence of instructions. It has already been shown that the routine or instruction sequence of the present computer is determined by the contents of the control counter (element 104 in FIGURE 1). Thus, under normal operating conditions, instructions are called from the memory in a sequence starting with the first number stored in the control counter. The contents of the control counter are thereafter increased by one for each subsequent instruction.

Under certain conditions it may be desirable to effect a jump to a new sequence of instructions bearing no particular relationship to the original sequence. To determine the initial memory location of such a new sequence of instructions, the M digits from a transfer of control instruction are utilized. In order to effect a transfer of control, the M digits from the instruction requiring such transfer are transmitted to the memory address decoder 141 at the proper time to address the memory for an instruction. Subsequently, these M digits are stored in the control counter 104 so that the ensuing series of instructions as called will relate to the starting address M as heretofore noted. Because of the overlap considerations, various conflicts may arise and it shall be shown how the control circuits of the invention deal with such conflicts.

Many different types of transfer instructions may be provided. While most of these are processed in a similar manner, the details of their operation may involve considerable differences. For present purposes, three different types of transfer instructions will be discussed and it may be assumed that while other transfer instructions can be provided, basically the processing of such other instructions will comprise a minor variation of one of these three.

The first such transfer instruction to be considered requires an unconditional transfer of control. Herein the transfer instruction N, called and subsequently entered into the instruction registers IR–1 and IR–2, specifies from the I digits thereof that the next instruction to be called is determined by the M digits of the transfer instruction N. As mentioned supra, such operation requires that the M digits of instructtion N be sent to the memory address decoder to call the first instruction of the new sequence, and thereafter, stored in control counter 104 to determine subsequent instructions of the new sequence. Because of the overlap operation of the computer, it is apparent if no provisions were otherwise made, that long before instruction N calling for the transfer could be executed, a new instruction from the original sequence would have been called and transferred to the instruction registers. Such a call for an instruction of the original sequence is undesirable. However, in the interests of obtaining a maximum data processing rate from the computer it is likewise desirable to preserve overlap to the greatest extent possible. The manner of resolving this conflict is shown by the timing diagram of FIGURE 11a considered in conjunction with FIGURES 1 and 4. While all of the various portions of FIGURE 4 are pertinent, FIGURE 4e is of immediate interest.

FIGURE 11a is similar in format to the timing diagrams previously considered but in addition shows the condition of the second control counter (element 106 in FIGURE 1). This second control counter is a necessary element in transfer operations wherein overlap is involved.

The first minor cycle shown on FIGURE 11a illustrates the same operations as have been considered previously wherein the computer is operating in full overlap and arithmetic instructions such as those of FIGURE 8 are being performed. Instruction N calls for an unconditional transfer of control and specifies that the next instruction to be performed is to be derived from memory location M, as determined by the M digits of instruction N. M in effect, is to go to C where C represents the first control counter 104. As indicated by FIGURE 11a, instruction N has been called in the preceding minor cycle to that shown and instruction N (i.e., the contents of memory location N) is received on the high speed bus at time $t_2$ of the first minor cycle and subsequently transferred into IR–1 (101) wherein it is stored at time $t_3$. Also, during this first minor cycle those instructions preceding instruction N are carried through to completion and storage of their results. It will be apparent from previous discussions, that instruction $N-3$ will have its result stored at time $t_2$ of the first minor cycle while instruction $N-2$ will have its operands and instruction digits transmitted to the arithmetic unit to be completed during the second minor cycle. Instruction $N-1$ is in IR–2 during this first minor cycle during which time its instruction digits are decoded and calls made to the memory and to the addressable registers for operands. Also, it will be noted that at time $t_2$ as shown on the diagram, a memory call is made for instruction $N+1$. Since at this time, instruction N has not been transferred to IR–2, there is no way to prevent a memory call for instruction $N+1$.

At time $t_6$ of the first minor cycle the B-modification operation associated with instruction N is carried out and along with this operation the contents of IR–1 are transferred into IR–2. At time $t_6$, therefore, the instruction digits of instruction N become available for decoding and thus determine the subsequent course of events.

In common with all of the instructions associated with the computer a group of CHJP signals are generated by the present instruction. Since there is no memory call for an operand, it is apparent that following the B-modification operation wherein the M digits are normally sent to the memory address decoder to obtain a memory operand such will not be the case at present. For any instruction requiring the reading of an operand from the memory it will be recalled that the signal CHRM was generated from the I digits of such instruction. Such CHRM signal is enabling with respect to gate 465 on FIGURE 4b so that gate 465 can pass a $t_7$ clock signal to generate FT 363. In the present instance, CHRM is not generated so that FT 363 likewise is not generated. Accordingly, the M digits are not sent to the address decoder. Since the M digits are not thus sent out, it is apparent that the memory-not-busy signal CGNB is not generated. Nevertheless, it is necessary to set the operand memory-not-busy flip-flop 331 on FIGURE 4b. The instruction performs this operation through the generation of CHJP 13, which is effective via buffer 339 to enable gate 327a to pass the $t_1$ clock signal thereby effecting a setting of flip-flop 331 and the generation therefrom of the CHNB–A output signal. The CHNB–A signal passes through gate 483 and appears as the CHNB signal.

CHJP 68 is also generated by the unconditional transfer instruction. On FIGURE 4e gate 4003 is enabled by CHJP 68 to pass a $t_7$ clock signal thereby to generate signal CRAM. If reference is now made to FIGURE 4a, it will be seen that signal CRAM applies a reset signal to the call flip-flop 310 via buffer 340a and to the completing call flip-flop 319 via buffer 341A. Since at the time ($t_7$ of the first minor cycle) when signal CRAM is applied neither of these flip-flops will be receiving set input signals, it is apparent that they will both be in the reset output condition by time $t_0$ of the second minor cycle. Thus, at time $t_0$ the signal CSCL is not available from the completing call flip-flop 319. Accordingly, gates 320 and 320′ are not enabled. It might be thought that in the absence of CSCL and the presence of an ending signal associated with the I digits of instruction, gates 321 and 321′ would be enabled. However, there is associated with this particular instruction a special ending signal CHJP (EP′) which is not applied to either of gates 321 or 321′ on FIGURE 4a. In this regard, it should be noted that ending pulse signals designated CHJP EP and CHJP EP′ are generated for all those instructions discussed except unconditional transfer. Thus, in the former instructions no distinction has been made between the two signals. In the case of the unconditional transfer order the CHJP EP′ ending pulse signal is not produced, however, the CHJP EP signal is generated. Thus, at $t_0$, FT 401, FT 411, and FTUA are not generated, so that in the second minor cycle no call is made for instruction $N+2$ from control counter 104.

In addition to the aforementioned CHJP signals there are generated by this instruction CHJP 24 and CHJP 26 signals. CHJP 24 coacts with CHNB to enable gate 411 on FIGURE 4e, and also enables gate 455 on the timing decoder portion of FIGURE 4e. Gate 455 is enabled to pass the $t_0$ clock signal thereby to generate FT 402 and FT 411. From FIGURES 1a and 1b, it will be observed that these signals are effective to pass the contents of section 108 or IR–2 (i.e., the M digits of instruction N) into the B-adder 139 along with zeros from register 147. At time $t_2$, gate 330A (FIGURE 4b) is enabled by the presence of CHNB–A and the ending signal (CHJP–EP) to generate FT 363 whereby these M digits are sent via the address decoder 141 to the memory, thus to call for an instruction located at address M. It will be observed that the call is made at the normal time for instruction calls.

During the first minor cycle the usual equality comparisons are made by register selection comparator 142 and it is assumed that such comparisons result in generation of the CAAL inequality signal. Thus, if reference is made to FIGURE 4b, it will be evident that during the first minor cycle since the CSBM signal is generated by the B-mod flip-flop 308, equality flip-flop 493 will be reset while at time $t_7$ inequality flip-flop 492 will receive a set input signal. The coaction of these two flip-flops as in previous instances results in the generation of signal CSBS at time $t_0$ of the second minor cycle via gate 494. Referring again to FIGURE 4e, and recalling the resetting of completing call flip-flop 319 by CRAM it is apparent that signal CSCL will not be available at time $t_0$ of the second minor cycle to enable gate 324. However, signal CSBS enables gate 325. Thus at time $t_0$ of the second minor cycle status one flip-flop 335 (FIG. 4e) receives a reset input signal. Accordingly signal CQBA is not available after time $t_0$ of the second minor cycle. If reference is once again made to FIGURE 4b, it will now be observed that gate 332 in the timing decoder enabled by the coaction of CHJP (EP), CHNBA and CQBA lacks the CQBA or status one signal. Thus, at time $t_2$, FT 432 is not generated. It follows that during the second minor cycle, no B-modification takes place and additionally, call flip-flop 310 and the B-mod flip-flop 308 fail to receive set input signals. One further consequence of the termination of the status one signal CQBA is noted with respect to FIGURE 4a. Thereon gate 336 is enabled by CHNB coacting with CHJP (EP) from the instruction, and in the absence of CQBA passes the $t_2$ clock signal, thereby to set ending pulse storage flip-flop 305 and thus generate the signal CSAR at time $t_3$.

Inasmuch as instruction $N+1$ was called during the first minor cycle, it will be available on the high speed bus at time $t_2$ of the second minor cycle. However, due to the resetting of completing call flip-flop 319 by signal CRAM, gate 322 on FIGURE 4a is not enabled and therefore, at time $t_2$ FT 320, FT 331 and FT 345 are not generated. Accordingly, instruction $N+1$ is not gated into IR–1. IR–1, however, is cleared through the generation of FT 321 from gate 458 on FIGURE 4a. Gate 458 produced an output (FT 321) in response to the $t_1$ timing signal and the CSBS signal from gate 494 (FIG. 4b).

It is to be realized that the normal operations associated with instructions $N-1$ and $N-2$ are carried out, inasmuch as the necessary function signals will be generated from the control elements appearing on FIGURES 4c and 4d respectively, which elements are effective to store the previously generated CHJP signals associated with these preceding instructions. Therefore, instructions $N-2$ and $N-1$ are not affected by the operations associated with instruction N.

It has already been shown that the CHJP 24 signal coacts with CHNB to enable gate 411 (FIG. 4e). In view of the forced generation of CHNB from the operand memory-not-busy flip-flop 331 on FIGURE 4b, it is apparent that gate 411 will pass the $t_3$ clock signal thereby to set the call from C2 flip-flop 412 via buffer 411a. At $t_4$, therefore, the output signal CRBC is generated. This signal enables gates 457 and 456 in the timing decoder portion of FIGURE 4e and also coacts with CHNB to enable gate 420 which provides a set input signal to the completing call from C2 flip-flop 413.

Next to be discussed is CHJP 26 which enables gates 454 and 453 in the timing decoder section of FIGURE 4e. At time $t_3$, therefore FT 402 and FT 411 are generated and at time $t_5$, FT 346 is generated. Also generated at time $t_5$ is FT 332 via gate 452. Gate 452 is enabled by CHJP 73 coacting with CHNB. Referring again to FIGURE 11a in conjunction with FIGURE 1, it is observed that the generation of FT 402 and FT 411 at time $t_3$ gates into the B-adder the M digits stored in IR–2 along with zeros. FT 332 clears the second control counter 106 and FT 346 is enabling with reference to gate 144 so that the output of the B-adder presently comprising the M digits is passed into the second counter 106. Thus, at time $t_6$ of the second minor cycle the first control counter 104 is storing the digits $N+1$ and the second control counter 106 is storing the digits M.

Referring again to FIGURE 4e and recalling that at time $t_0$ of the second minor cycle CHJP 24 was effective via gate 455 to generate FT 402 and FT 411 thereby calling for an instruction designated by the M digits, it is presumed that such instruction call is successful and that the memory-not-busy signal, CGNB is generated accordingly. Gate 420 is thus enabled to pass the $t_4$ clock signal thereby setting the completing call from C2 flip-flop 413. Flip-flop 413 generates signal CRCZ at time $t_5$. The flip-flop 412 is reset by signal CRCZ applied thereto via buffer 410. Also CRCZ enables gates 451 and 450 in the timing decoder. In the third minor cycle gate 451 passes a $t_0$ clock signal to generate FT 405, FT 411 and FT UA. In FIGURE 1b, gates 138 are enabled by FT 405 to transfer the contents of the second control counter 106 into input 1 of the B-adder 139. Thus, the M digits presently stored in the second control counter 106 are increased by one. Gate 450 passes a $t_2$ clock signal to generate FT 320, FT 332 and FT 346. FT 332 clears the second control counter and FT 346 enables gates 144 to pass the output of the B-adder 139, which now comprises the digits $M+1$ thereinto. Since the call for instruction N during the second minor cycle was successful the contents of memory location M are available on the high speed bus at time $t_2$ of the third minor cycle. Thus, FT 320 gates new instruction M into IR-1 via gates 100. The B modification for instruction M requires generation of FT 432 which is generated from ending pulse storage flip-flop 305 as shall be shown.

As previously noted ending pulse storage flip-flop 305 in FIGURE 4a was set in the absence of the status one signal CQBA during the second minor cycle. CSAR is therefore available as an enabling signal to gates 306 and 333A, in the timing decoder. These gates also require the status one signal CQBA. From FIGURE 4e, it will be seen that signal CRCZ from flip-flop 413 enables gate 4001 to pass the $t_0$ clock signal thereby setting the status one flip-flop 335. Thus, the signal CQBA is generated during the third minor cycle, and gates 306 and 333A in FIGURE 4a are enabled to pass the $t_2$ clock signal thereby generating FT 432 and FT 363. At time $t_2$ FT 363 gates the digits $M+1$ representing the second instruction in the new sequence from the B adder 139 into the memory address decoder 141, thus to address the memory for this succeeding instruction. The signal FT 432 is effective as in previous instances to set the B-mod flip-flop 308, to reset the ending pulse storage flip-flop 305 and to set the call flip-flop 310. Thus, a B-modification operation is performed on instruction M and the required signals are generated for a return to the normal sequence of operations in connection with the new series of instructions.

One matter remains to be considered in connection with the foregoing transfer of control. The enabling of gate 4100 in FIGURE 4e by CRCZ results in setting the exchange flip-flop 414 (in the third minor cycle) so that at time $t_2$ the signal CRDC is available. The signal CRDC is enabling with respect to gates 439, 438, 437 and 436 in the timing decoder. Gate 439 is enabled to pass the $t_3$ clock signal thereby generating FT 401 and FT 411. Thus, at time $t_3$ of the third minor cycle FT 401 and FT 411 enable gates 137 and 153 to pass the contents of the first control counter 104 along with zeros from register 147 to the B-adder inputs 1 and 2 where they are set up at $t_4$. Gate 438 is enabled to pass the $t_4$ clock signal to generate FT 405 and FT 411. In a like manner to the foregoing, gates 138 and 153 are enabled so that at time $t_5$ the contents of the second control counter 106 are set up in the B-adder inputs 1 and 2. By this time, however, an output is obtained from the B-adder and this comprises the digits $N+1$. Also, at this time, gate 437 is enabled by CRDC to generate FT 346 and FT 332. These, as previously noted, are effective to clear the second control counter and gate thereinto the output of the B-adder. Thus, by time $t_6$ the output of the B-adder $N+1$ is set up in the second control counter 106. Gate 436 is enabled to pass the $t_6$ clock signal thereby to generate FT 331 and FT 345. These signals also, as previously noted, are effective to clear the first control counter 104 and gate thereto the output of the B-adder. At time $t_6$ the output from the B-adder comprises the digits $M+1$ and these are, accordingly, set up in first control counter 104 by time $t_7$ of this third minor cycle. What has occurred through the setting of the exchange flip-flop 414 is that the contents of control counter 1 and control counter 2 have been exchanged so that control counter 1 formerly storing $N+1$ now stores $M+1$ and control counter 2, formerly storing $M+1$ now stores $N+1$. With this exchange completed the unconditional transfer order is now fully accomplished. With the setting, as previously noted, of the call flip-flop 310 and the B-mod flip-flop 308 during the third minor cycle there will be from this time on a normal progression of instruction calls and executions based on the sequence commencing with the M digits of the transfer instruction. This may be seen from the timing diagram of FIGURE 11a wherein the fourth minor cycle shows a normal sequence of events occurring as overlap is fully regained. The fifth and sixth minor cycles are not shown in any detail but it is to be understood that these will follow substantially the pattern suggested by the timing diagrams of FIGURE 8.

*Conditional transfers*

The next matter to be considered in conjunction with jump or transfer instructions is the effect upon the control circuits when a conditional transfer is to be performed. A conditional transfer is, as the name suggests, one which is conditioned on the occurrence of some other event. Thus, it may be desired to compare the contents of two registers in order to determine whether or not such contents are equal or possibly whether the contents of one such register are greater in magnitude than the contents of another. If, following a test of this nature the result appears one way then a transfer of control will take place and the starting address of a new sequence of instructions will be determined by the M digits of the instruction calling for the testing and possible transfer. If, on the other hand, following the test a different result is obtained then no transfer will occur and the next instruction to be called will be determined by the contents of the first control counter 104. Because of the contingency, further conflicts may occur in the apparatus and as in the case of an unconditional transfer, the control circuits have been designed to avoid such conflicts with minimum possible disturbance of the overlap operation.

Reference is now made to FIGURE 11b again in conjunction with FIGURES 4 and 1. For conditional transfers, further elements shown in FIGURE 4f are required. It has already been stated that various types of unconditional transfer instructions may be provided. The same observation holds true with regard to conditional transfer instructions. Basically, however, the control circuits will operate in a substantially similar manner notwithstanding which of the several possible conditional transfers are called for. In the instructions shown on FIGURE 11b contents of two of the addressable registers are compared. Thus, register $a_n$ is compared with the contents of addressable register $a_n+1$. If the contents of these registers are found to be equal, then transfer of control takes place wherein subsequent instructions are determined "M" digits of the instruction. If the contents of these registers are found to be unequal, then the subsequent sequence of instructions will be determined by the present contents of the first control counter 104. Stated briefly, the instruction asks: is $a_n$ equal to $a_n+1$? If yes, then "M" goes to C; if no, then $C+1$ goes to C. Since a comparison of magnitude is required it is necessary to employ the arithmetic unit 131. In the preceding case, where an unconditional transfer was effected, the instruction digits going to the arithmetic unit specified that the element was to perform a skip or omit operation. In the present case, however, the arithmetic unit is required to carry out the comparison between the two quantities entered therein and based on that comparison generate a signal indicating whether or not the transfer is to be effected. That the arithmetic unit is capable of carrying out this portion of the operation will become apparent hereinafter.

Refer now to FIGURE 11b. This shows the sequence of operations occurring when a conditional transfer instruction has been received and following comparison of quantities in the arithmetic unit, the transfer signal has been generated. The first minor cycle shows the computer to be in full overlap operation and instruction N has already been called. Thus, instruction N is received on the high speed bus at time $t_2$ of the first minor cycle and is subsequently transferred into IR-1. Also, it will be noted that the next succeeding instruction $N+1$ is called during this first minor cycle. When instruction N is received into IR-1, a normal B-modification operation is carried out whereafter as in previous instances, the I, A and M portions of the instruction are gated into their respective sections of IR-2. With the receipt of the I digits into IR-2, the instruction N is decoded to generate the group of CHJP signals associated with this particular instruction.

It will be apparent that at the time conditional transfer instructions are transferred into IR–2, there is no knowledge of whether or not a transfer of control will actually be effected. Obviously, this information cannot be obtained until the required comparisons have taken place in the arithmetic unit. Thus, in keeping with object of preserving overlap to the greatest possible extent, there is no attempt to block the call in the second minor cycle for the next succeeding instruction in the normal sequence which, in this case, is $N+2$. It will be recalled that in the case of unconditional transfers the call for instruction $N+2$ was blocked by the generation of the CRAM signal. In the previous case, of course, it was a foregone conclusion that a transfer of control would in fact be effected. Hence, in order to save time, it was necessary to block the call for instruction $N+2$.

As in the case of the unconditional transfer instruction, there is no operand memory reference. Thus, the CHRM signal is not generated and, accordingly, following the B-modification operation, the M digits from instruction N are not sent to address the memory via the address decoder 141 but are simply transferred into section 108 of IR–2. Since the CHNB signal is required during certain phases of the present instruction, however, the CHJP 13 signal is generated. As was the case for the unconditional transfer instruction, CHJP 13 sets the operand memory-not-busy flip-flop 331 on FIGURE 4b via gate 3272 and buffer 329. As previously noted, it is not desirable to block the call for instruction $N+2$; accordingly, this call is made in the usual manner with output signal CSCL completing call flip-flop 319 generating at $t_0$, FT 401, FT 411, and FTUA. Thereafter, at $t_2$ of the second minor cycle the contents of memory location $N+1$ representing instruction $N+1$ are available on the high speed bus and are transferred into IR–1, again with signal CSCL enabling gate 322 to generate FT 320, FT 331 and FT 345 at time $t_2$. The signals FT 331 and FT 345 are as usual effective to transfer the output of the B-adder (now $N+2$) back into the first control counter 104. To the foregoing extent then, the present instruction is similar to any other instruction.

The comparison effected by the instruction is between the contents of an addressable register designated by the A digits of the instruction, and the contents of the next addressable register as designated by the A digits increased by one. Thus, the question asked in effect is: are the contents of $A_n$ equal to the contents of $A_n+1$? It is accordingly necessary to transfer the contents of these two addressable registers into the arithmetic unit. The instruction generates CHJP 03 and this enables gate 4042 in the timing decoder section of FIGURE 4c to pass a $t_0$ clock signal thereby to generate FT 430. The signal FT 430 is enabling with respect to gates 180 on FIGURE 1. These gates when enabled transmit the A digits presently stored in IR–2 into register selector 118. This is shown on FIGURE 11b where at time $t_1$ of the second minor cycle, the digits A from IR–2 are set up in the register selector. Also generated by the present instruction is the signal CHJP 01 and this is enabling with respect to gate 4065 on FIGURE 4d so as to set the AR to M flip-flop 4064. The output signal from this flip-flop is the CHAA signal as previously discussed for operations where all operands were derived from addressable registers.

As the usual equality comparisons are made by the register selection comparator it is assumed for the purpose of simplifying the present discussion that in all such comparisons the inequality signal CAAL is generated. This latter then, coacting with the signal CHAA enables gate 4063 on FIGURE 4d to pass the $t_1$ clock signal thereby setting the inequality flip-flop 4062 to generate CHAK. CHAK is enabling with respect to gate 4047 whereby the latter passes a $t_4$ clock signal to generate FT 373. As in previous cases, FT 373 gates the contents of a selected addressable register, in this case the contents of register A, into the M input register 150 (FIG. 1b) via gates 170. The contents of register $A_n$ will actually be set up in the M input register 150 at time $t_5$ of the second minor cycle.

It will be noted that during the aforesaid second minor cycle the normal B-modification operation is carried out with respect to instruction $N+1$ which is presently in IR–1. Along with the B-modification operation, instruction $N+1$ is transferred to IR–2 and decoded.

A further operand must be sent to the arithmetic unit. Such is obtained from the addressable register as designated by the A digits of the instruction increased by one. Register $A_n+1$ is selected during the normal time in the second minor cycle for an A operand select as associated with the various instructions heretofore considered. Thus, CHJP 30 is generated by the instruction and is enabling with respect to gate 463 in the timing decoder of FIGURE 4b to pass the $t_2$ clock signal thereby generating FT 403 and FT 411. Since the aforesaid A digits are to be increased by one before being sent to register selector 118, it is necessary in this instance to provide a unit add signal (FTUA) to the B-adder 139. The instruction provides this by the generation of a CHJP 35 signal, and this is enabling with respect to gate 463a in the timing decoder portion of FIGURE 4b so that gate 4632 passes $t_2$ clock signal to generate the required FTUA. It will be observed that the signals FT 403, FT 411 and FTUA are all generated at $t_2$. It will be apparent therefore that the A digits stored in IR–2 are passed into the B-adder 139 via gates 134 (FIG. 1b) and a 1 is added thereto.

The instruction also generates CHJP 27. It has already been noted that the CHNB A signal from the operand memory-not-busy flip-flop 331 is generated. Accordingly, gate 426 in FIGURE 4c is enabled by CHNB coacting with CHJP 27 to pass a $t_3$ clock signal thereby to set the AR to AU input flip-flop 415. Thus signal CHBA enables gates 435, 434, 423 and 424. Following the usual pattern, therefore, it will be seen, assuming again the presence of the inequality signal CAAL, that the inequality flip-flop 417 is set so that at time $t_7$ FT 380 is generated to pass the contents of register $A_n+1$ to the A input pulseformers 129A of the arithmetic unit 131 via gates 128 (FIG. 1c). Previously, of course, the digits $A_n+1$ will have been gated into register selector 118 through an enabling of gates 115 by the generation of FT 431 from gate 435. The foregoing operations have all been considered previously in connection with other instructions. At $t_0$ of the third minor cycle it follows that both operands are available to the arithmetic unit for the purposes of making the required comparison. The instruction also generates CHJP 38 and this, as in previous instances, and as indicated on FIGURES 4b and 11b is effective to transfer the encoded I digits from instruction encoder 110 into arithmetic unit control 130.

Before considering the third minor cycle, it is necessary to consider some of the special signals generated by the instruction while stored in IR–2. Refer, therefore, to FIGURES 4e and 4f. The instruction generates CHJP 26 which is permissive with respect to gates 454 and 453 in the timing decoder. Gate 454 passes the $t_3$ clock signal to generate FT 402 and FT 411 so that at time $t_4$ of the second minor cycle, the M digits from IR–2 are set up in the B-adder 139 along with zeros. At time $t_5$ gate 453 on FIGURE 4e generates FT 346. Since the instruction also generates CHJP 73 which in turn, enables gate 452 to pass the $t_5$ clock signal, it is apparent that FT 332 and FT 346 are generated at the same time, thus passing the output of the B-adder (M) into the second control counter 106 via gates 144 (FIG. 1a).

Finally, signals CHJP 21 and CHJP 23 are generated. These are enabling with respect to gates 4053 and 4078a on FIGURE 4f and coact with CHNB from gate 483

(FIG. 4b) to enable their respective gates to pass $t_5$ clock signals thereby effecting a setting of the CNAA flip-flop 1 (4052) and the CNAA flip-flop 3 (4078). Altogether, there are three CNAA flip-flops, flip-flop 4075 being designates CNAA flip-flop 2. The outputs from all of these flip-flops are buffed together in buffer 4055 the output of which is designated CNDF and is applied as one enabling input to gate 4022 in the timing decoder and as one enabling input to gate 4056. Additionally, CNAA flip-flop 1 provides one enabling input to gate 4057, and one enabling input to gate 4076. The CNAA flip-flop 3 provides one enabling input to gate 4056.

It is assumed that in the instant case, a comparison between the contents of the two A registers which contents were sent to the arithmetic unit results in a determination of equality. This determination will effect generation of the transfer signal from the arithmetic unit at time $t_2$ of the third minor cycle. This transfer signal XFER provides an enabling signal for certain of the gates described hereinabove. Thus, gate 4056 is enabled to pass the $t_2$ clock signal thereby generating signal CNLA. CNLA sets the CNFX flip-flop 4058 thereby generating the signal CNFX at time $t_3$. At time $t_2$ however, gate 4076 is not enabled since it requires in addition, an output signal from the CNAA 2 flip-flop 4075. Gate 4022 in the timing decoder is enabled to pass the $t_2$ clock signal thereby generating FT 364.

In addition to setting the CNFX flip-flop 4058, signal CNLA sets the block memory-not-busy flip-flop 485 on FIGURE 4b, so that signal CHXA is thereafter available at $t_3$ to inhibit gate 483. Since the block memory-not-busy flip-flop 485 does not produce its set output signal CHXA until time $t_3$ of the third minor cycle, it is apparent that CHXA will not be effective to inhibit the setting of the operand memory-not-busy flip-flop 331 which will be set following a normal memory operand call for instruction $N+1$. However, the CHNB signal derived from gate 483 will not be generated at time $t_3$ or thereafter in the third minor cycle. Thus, while FT 363 and FT 432 are generated, from gates 330A and gate 332, it is apparent that gates 466 and 464 (FIG. 4b) will not receive their required enabling signals at the proper times in the third minor cycle. Thus, FT 300 is not generated for instruction $N+1$, and the signals FT 403 and FT 411 which relate to the placing of the A digits in selector storage 118 (FIG. 1b) for instruction $n+1$ are likewise not generated. In the absence of CHNB or CHJP 77 it follows that the AR–AU input flip-flop 415 on FIGURE 4c is not set during this minor cycle and furthermore, the AU to AR flip-flop 418 is not set. Thus, notwithstanding the presence of instruction $n+1$ in IR–2 the various operands associated therewith are not passed to the arithmetic unit. The signal CHXA from the block memory-not-busy flip-flop 485 is also effective to enable gate 462 to set the program counter clear flip-flop 473 (FIG. 4b) which in turn sets the clear IR–2 flip-flop 464A. Thus, during the third minor cycle, the signa's FT 313 and FT 314 will be generated thereby to clear instruction $N+1$ from IR–2.

Refer again to FIGURE 4f, the setting of flip-flop 4058 and the generation of signal CNFX thereby enables gates 4049 and 4048 to pass respectively the $t_3$ clock signal and the $t_0$ clock signal, and the output signal from these gates are designated respectively, CNFX–A and CNFX–B. On FIGURE 4e, the CNFX–A signal passes through buffer 4002 and a one pulse delay to generate signal CSBX. Signal CSBX is effective to reset the B-modification flip-flop 308 on FIGURE 4a and to reset both flip-flops 493 and 492 on FIGURE 4b. The resetting of B mod. flip-flop 308 whereby CSBM is terminated by time $t_5$ prevents a B-modification from taking place with respect to instruction $N+2$ now in IR–1 and a subsequent transfer of instruction $N+2$ into IR–2. The termination of the CSBS signal from gate 494 enables resetting of the status 2 flip-flop 400 on FIGURE 4e in the fourth minor cycle, as shall be shown.

The CNFX–A signal (FIG. 4f) is applied to the set input terminal of the flip-flop 412 (FIG. 4e) via buffer 411a so that at time $t_4$ the set output signal CRBC is generated. Finally, in FIGURE 4a the CNFX–A signal is applied to the set input terminal of the ending pulse storage flip-flop 305 via buffer 304A and to the resut input terminal of call flip-flop 310 via buffer 340A.

At time $t_0$ of the third minor cycle, CSCL from completing call flip-flop 319 enables gates 320 and 320' to initiate the instruction $N+3$. It will be noted, however, from FIGURE 1 that in order to pass the output from the B-adder to the address decoder 141 to make a memory call, it is necessary to enable gates 140. This is normally accomplished by the generation of FT 363. However, it is apparent that gates 140 are inhibited by the presence of a transfer signal. Since at time $t_2$ of the third minor cycle the transfer signal is generated, it is apparent that gates 140 are not enabled. Thus, it follows that addressing the memory for instruction $N+3$ is prevented. However, FT 364 is also generated at time $t_2$ via gate 4022 as previously discussed. FT 364 coacting with the transfer signal enables gates 151 in FIGURE 1. The enabling of gates 151 passes the contents of the second control counter 106 into the address decoder 141 via buffers 152. Thus, at time $t_3$ of the third minor cycle, the memory is addressed as usual for an instruction. The instruction, however, in this instance is that designated by the M digits of instruction N. It will be recalled that the aforesaid M digits were stored in the second control counter 106 during the second minor cycle.

The signal CSCL from completing call flip-flop 319 in FIGURE 4a enables gate 322 to pass the $t_2$ clock signal to generate FT 320, FT 331 and FT 345. Thus, in the third minor cycle instruction $N+2$, now available on the high speed bus, is gated into IR–1 and digits $N+3$ from the output of the B-adder are gated into the first control counter 104. Accordingly, the memory has now been addressed for an instruction as designated by the M digits of transfer of control instruction N, but an attempt to call instruction $N+3$ has been made and instructions $N+1$ and $N+2$ have not been executed or made any progress toward execution.

Since at some future time, it may be desirable to return to the routine which was terminated by the receipt of instruction N, it is desirable to preserve the address $N+1$ of the next instruction in the original sequence. For this purpose, element 4050 on FIGURE 4f is provided along with certain gates in the timing decoder. Element 4050 comprises a decoding matrix, the inputs to which comprise the outputs of the status flip-flops 0 to 3 respectively. One output from this matrix is designated CQCH and will be generated when all three status flip-flops are in their set output condition indicating the computer to be operating in full overlap. The output signal CQCG will be generated when two out of the three status flip-flops are set and similarly the output CQCE will be generated, when one out of the three status flip-flops is set. It is evident, therefore, that these respective outputs indicate whether or not the computer is presently operating in full overlap. It is necessary to generate these signals in order to preserve the address of the next instruction in the normal sequence. When the computer has been operating in full overlap, it is apparent that the instruction address in control counter 104 at time $t_3$ of the third minor cycle will be $N+3$. This follows from the previous discussion. It may likewise be determined through inspection of the timing diagrams associated with other contingencies for which overlap is lost, that if only two of these status flip-flops are set at this time, then the contents of the control counter 104 will be $N+2$. Finally, it follows that where one only of the status flip-flops is set at this time, the contents of the control counter 104 will be $N+1$.

As shown by FIGURE 11b the computer has been operating in full overlap up to the time that the transfer signal is received. Therefore, signal CQCH is generated from the decoding matrix 4050. This coacts with CNFX from flip-flop 4058 to enable gate 4040 to pass the $t_4$ clock signal thereby generating FT 415 and FT 416. At the same time, gate 4026 in the timing decoder is enabled by CNFX to generate FT 401. The generation of the aforesaid signals passes the contents of the first control counter 104 into input 1 of the B-adder 139 via gates 137 (FIG. 1b) and at the same time input 2 of the B-adder receives digits 99998 from registers 157 and 158 via gates 159 and 160 which cause the B-adder 139 to subtract two from the digits placed on input 1. At $t_6$ the output from the B-adder 139, therefore, will be $N+1$. At $t_6$, gate 4024 is enabled by CNFX to generate FT 331 and FT 345. Thus, the output of the B-adder now $N+1$, is passed into the first control counter 104 via gates 143, which now stores the next instruction address of the original sequence. Finally, CNFX enables gate 4020 to pass a $t_1$ clock signal in the fourth minor cycle, thereby to generate FT 321. This, as in previous instances, is effective to clear IR–1 of the instruction $N+2$ presently stored therein.

As previously noted the CNFX-A signal is effective to set the flip-flop 412 on FIGURE 4e so that at time $t_4$ of the third minor cycle CRBC is generated. Since during the third minor cycle the memory is successfully called for the instruction designated by M, it follows that at $t_4$ of the third minor cycle the CGNB is generated and coacts with CRBC to enable gate 420 to set the completing call from C2 flip-flop 413. The setting of flip-flop 413 generates signal CRCZ. Since call flip-flop 310 on FIGURE 4a was reset by CNFX-A, it follows that at time $t_4$ of the third minor cycle the completing call flip-flop 319 will fail to receive a set input signal and will, therefore, be reset to terminate CSCL. Accordingly, no call takes place from control counter 104 during the fourth minor cycle. Rather, CRCZ from flip-flop 413 enables gates 341 and 450 in the timing decoder, as well as gates 4100 and 4001. Gate 451 passes the $t_0$ clock signal to generate FT 405, FT 411 and FTUA. From FIGURE 1b, it may be observed that gates 138 and 153 are enabled so that the contents of the second control counter 106 are passed into the B-adder 139 and increased by one therein. Thus, a call is initiated for the second instruction, i.e., $M+1$ of the new sequence. Gate 450 is enabled by CRCZ to pass the $t_2$ clock signal thereby to generate FT 320, FT 332, and FT 346. Instruction M now available on the high speed bus is, accordingly, transferred into IR–1 via gates 100 (FIG. 1a). At the same time, the output of the B-adder ($M+1$) is passed into the second control counter 106 through the generation of FT 332 and FT 346.

In order to perform the B-modification operation on instruction M and the subsequent advancement of the instruction into IR–2 as well as address the memory for instruction $M+1$ it is necessary to generate FT 432 and FT 363. It will be obvious that the memory-not-busy flip-flop 331 is in the reset condition by time $t_6$ of the third minor cycle. Since the memory is not addressed for an operand at the end of the third minor cycle, and since there is at this time no instruction in IR–2, effective to generate the required signals, it is apparent that in the fourth minor cycle operand memory-not-busy flip-flop 331 will not be set. Thus, FT 363 and FT 432 are not generated from gates 330A and 332. These signals, however, are generated from the output signal CSAR of ending pulse storage flip-flop 305 (FIG. 4a). It will be recalled that flip-flop 305 is set by CNFX-A so as to produce signal CSAR at time $t_4$ of the third minor cycle. Thus, during the fourth minor cycle, gates 306 and 333A are enabled by the coaction of CSAR and CQBA (from status one flip-flop 335). That the status 1 flip-flop is not reset during the transfer of control operation will be apparent hereinafter. Thus FT 432 and FT 363 are generated at time $t_2$, so that the memory is addressed for instruction $M+1$ while a B-modification operation is performed on instruction M. As previously described FT 432 sets the B-mod flip-flop 308, resets the ending pulse storage flip-flop 335 and sets the call flip-flop 310. The setting of call flip-flop 310 enables the control circuits to return to the normal sequence of operations.

Returning again to FIGURE 4e, it will be observed that the CRCZ signal enables gate 4100 so that at time $t_1$ of the fourth minor cycle, the exchange flip-flop 414 receives a set input signal. Thus, at time $t_2$ CRDC is generated. CRDC enables gates 439, 438, 437, and 436, and it will be recalled that CRDC was also generated, during the execution of the unconditional transfer instruction. The enabling of these gates by CRDC to pass the various clock signals applied to such gates is effective in exactly the same manner as formerly set forth to exchange the contents of the first and second control counters. This is illustrated on FIG. 11b during the fourth minor cycle and it will be apparent that at time $t_6$ the digits $N+1$ designating the next instruction in the original sequence are stored in the second control counter 106. At time $t_7$ the digits $M+1$ designating the next instruction in the new sequence are stored in the first control counter 104 in preparation for ensuing instruction calls.

In order to preserve the address $N+1$, it may be desirable to transfer this to the memory and such transfer may be accomplished by a suitable instruction in the new sequence. In the fifth and sixth minor cycles, the regular sequence of calls and executions is resumed. It is apparent that by setting call flip-flop 310 during the fourth minor cycle such will indeed occur. In view of the previous detailed discussion (FIGURES 8, 9, 10) it is not thought necessary to specify the exact operations for these last two minor cycles. However, there is one further matter requiring some explanation.

It will be seen from FIGURE 11b that there is one minor cycle during which no instruction is present in IR–2. Because of the switch over to an entirely new sequence of instructions, it is also evident that there will be two complete minor cycles during which no results will be available from the arithmetic unit. These facts are reflected by the condition of the status flip-flops. Status 1 flip-flop 335 is never reset since throughout the operation, there is always an instruction present in IR–1. At time $t_0$ of the fourth minor cycle, however, status 2 flip-flop 400 receives CNFX-B as a reset signal. At the same time, the set input gate 403 is not enabled in the absence of the CSBS signal. As previously discussed, both flip-flops 493 and 492 in FIGURE 4b were reset at $t_4$ of the third minor cycle by the CSBX signal and are not set again during the absence of a CSBM signal from the B-mod flip-flop 308. Thus, status 2 flip-flop 400 is reset by time $t_1$ of the fourth minor cycle. However, at the same time as status 2 flip-flop 400 is reset, status 3 flip-flop 401 is also reset. Status 3 flip-flop 401 is reset in the absence of the CSPA signal to enable its input gate 404. The CSPA signal is dependent for its generation on a setting of the ending pulse delay flip-flop 407. This, in turn, depends on an enabling of gate 408. Even though during the third minor cycle an ending signal CHJP (EP) is available and the operand memory-not-busy flip-flop is set, it is apparent that the setting of the block memory-not-busy flip-flop 485 (FIG. 4b) will prevent generation of the CHNB signal from gate 483 at time $t_5$. Thus gate 408 is not enabled, flip-flop 407 is not set, and CSPA is not generated. It follows that at $t_0$ of the fourth minor cycle, status 3 flip-flop 401 receives an effective reset signal so that by time $t_1$ this flip-flop is reset. In the fifth minor cycle, the status 2 flip-flop is set again by the generation of CSBS and thereafter following a normal sequence the status 3 flip-flop will be set again by time $t_1$ of the sixth minor cycle. The status 4 flip-flop 402 is, of course, dependent on the status 3 flip-flop for its set input signals and will follow the aforesaid status 3 flip-flop in being reset and set in the usual pattern.

If reference is now made to FIGURE 11c therein is depicted the same sequence of operations as in FIGURE 11b with the exception that in this latter instance, there is failure to receive a transfer signal. In other words, the contents of the two designated registers having been passed into the arithmetic unit are compared and found to be unequal. Since no transfer signal is generated, no transfer takes place and therefore, while various elements are prepared in anticipation of a possible transfer, such transfer is never completed. Where there is failure to receive such a transfer signal, there is effectively no loss of overlap because of the preservation of the original instruction sequencing to the greatest extent possible, up until the time a transfer signal is actually received. On FIGURE 11c, it will be observed that up until the normal time at which a transfer signal is received the events taking place are the same as in the case shown by FIGURE 11b. Since the two instructions are the same it necessarily follows that the same CHJP signals will be generated in both instances and therefore, the same flip-flops will be set in anticipation of a possible transfer. Thus, in addition to the storage of the M digits of the instruction in the second control counter 106 at $t_6$ of the second minor cycle, the CNAA flip-flops 1 and 3 (respectively 4052 and 4078 on FIGURE 4f) will be set. At time $t_2$, however, in this instance, no transfer signal is received. Thus, gate 4022 is not enabled and FT 364 is not generated. Similarly, the normal call to memory for instruction $N+3$ is not inhibited. Thus, a regular call is made for instruction $N+3$. Gate 4056 on FIGURE 4f is not enabled, therefore signal CNLA is not generated. Thus, block memory-not-busy flip-flop 485 is not set and CNFX flip-flop 4058 is not set. It, therefore, follows that none of the elements controlled by these flip-flops will be affected. The call flip-flop 310 in FIGURE 4a will not be reset. Furthermore, the CSBX signal generated via buffer 4022 on FIGURE 4e will not be generated and, accordingly, the B-mod flip-flop will not be reset nor will flip-flop 493 or 492 be reset. It follows that the only effect remaining following execution of this instruction where no transfer signal is received is that the M digits thereof, will be stored in the second control counter 106. Instruction $N+1$ is executed normally. The same follows for instruction $N+2$. Selector storage 113 of FIGURE 1 is not filled during the third minor cycle; however, the instruction is a comparison instruction and the result thereof is manifested in the generation or failure to generate the transfer signal. It is believed, therefore, that the operation of the circuits in connection with conditional transfers of the foregoing type will be evident to those skilled in the art.

*Index Transfers*

The feature of the computer next to be discussed is that of indexing. It will be that recalled during a B-modification operation the five least significant digits from a selected addressable register are added to the M digits of an incoming instruction in the B-adder and these modified M digits are then sent to the memory via address decoder 141 in order to select the memory operand for the instruction about to be executed. For one purpose or another it is often desirable to change the contents of an addressable register as used for B-modification. Such alteration of the contents of a selected addressable register is known as indexing and is carried out by special instructions which designate the change to be carried out and the register which is to have its contents modified.

Contents of an addressable register utilized for B-modification may be regarded as comprising three distinct portions. The five least significant digits comprise the modifier portion which are actually passed through the B-adder along with the M' digits which are about to be modified. Digits 6–9 comprise an increment or decrement portion and these may be added to, or substrated from the modifier portion in accordance with the particular indexing instruction undergoing execution. The three most significant digits are designated NNN and it is with the manipulations of these digits that the present invention is mainly concerned. The digits NNN function as a counter and may determine transfers of control arising from indexing operations. For greater particulars concerning indexing, its applications and operations, reference is made to corresponding U.S. patent application 45,242, filed July 25, 1960, and assigned to the assignee of the present invention. The present application is not concerned with the operations and uses of indexing as such. Rather it is concerned with the problems likely to be encountered when an indexing system such as is contemplated in the above-mentioned co-pending application is combined with overlap features such as are set forth in the instant application.

During an indexing operation the contents of a selected addressable register are passed into the arithmetic unit for manipulation thereby. The first step in such manipulation is the subtraction of 1 from the digits NNN. The result of this subtraction is then compared with zero and depending on whether or not such result is equal to zero a transfer of control in the computer may take place. In one type of indexing instruction (82, 83) when NNN is found to be equal to zero, following the subtraction a transfer of control does, in fact, take place. However, in another type of indexing instruction (80, 81) when NNN is not equal to zero following the subtraction, a transfer of control takes place and when NNN is equal to zero, no transfer of control takes place. Generally speaking, the first type of the above-mentioned indexing instructions are similar in their operation, insofar as control circuits are concerned, to the conditional transfer of control instructions discussed supra. Hence, it is thought that they need not be considered in detail. The other type of transfer of control associated with indexing instructions of the second type, however, is quite different in its aspects and requires fuller discussion. The latter indexing instructions are perhaps the most important as far as actual use is concerned. Since they find frequent use in the computer, it is desirable to coordinate the operations thereof with overlap to the greatest extent possible in order to preserve as much time as possible. For this reason, an anticipating or look-ahead type of control system is provided capable of handling the added complications which arise through the use of overlap in connection with conditional transfers generally.

It will be realized that at any one time the digits NNN from an addressable register which is undergoing indexing may range between 000 and 999. It is obvious, therefore, the probability is, that following any single indexing operation when these digits are decreased by one, the result will not be equal to zero. In the type of indexing operation presently contemplated (80, 81), a transfer of control takes place whenever these digits are found to be *not* equal to zero following the subtraction of one therefrom. Accordingly, it is normally to be expected that such a transfer will occur. The arithmetic unit however, does not distinguish between when a transfer is to take place and when no transfer is to take place. Rather it simply identifies the digits NNN as being equal to zero or not equal to zero, and generates a transfer signal accordingly. Thus, when the digits are equal to zero, then the transfer signal is generated. It is apparent that for the instruction about to be considered means must be provided in the control circuits to provide for this contingency wherein no transfer takes place when a transfer signal is received from the arithmetic unit. In effect the instruction may be regarded as a reverse conditional transfer. Because of the frequency with which transfers occur in performing this particular instruction, however, it has been found desirable as previously noted, to save time by anticipating that such a transfer will occur.

Refer now to FIGURE 4 in conjunction with FIGURES 12a and b and FIGURE 1. FIG. 12a depicts a situation where, following the testing of the digits NNN in the arithmetic unit, they are found to be equal to zero. Thus, the transfer signal XFER is generated by the arithmetic unit. However, as noted hereinabove, because of the nature of the instruction, no transfer is to be performed. The first minor cycle depicts the computer operating in normal overlap wherein the instruction N specifying the indexing operation has actually been called in the preceding minor cycle and is available on the high speed bus at time $t_2$. The usual operations are carried out wherein instruction N is transmitted into IR–1 while previous instructions are being completed. A B-modification operation is performed on instruction N at time $t_6$ of the first minor cycle and thereafter the instruction is transmitted into IR–2. All of these operations are in accordance with the normal computer routine. When the I and A digits of this instruction are received into IR–2, the usual decoding of the I digits takes place and CHJP signals associated with this particular instruction are generated. It will be noted that since no memory operand is required, no call is made to the memory. Thus, following the B-modification operation the modified M digits are simply placed into the M portion 108 of IR–2 via gates 105 (FIG. 1a) and are not sent to the memory address decoder 141.

In the second minor cycle, the first event to be observed on the timing diagram is the call for a new instruction which is determined by the M digits of instruction N now stored in IR–2. In effect, a transfer of control will take place is anticipated, so that these M digits are used to address the memory during an instruction select time. For such purpose CHJP 24 enables gate 455 in the timing decoder section of FIGURE 4e to pass the $t_0$ clock pulse thereby to generate FT 402 and FT 411 and pass the contents of section 108 of IR–2 into the B-adder 139 via gates 135 (FIG. 1b) along with zeros register 147 via gates 153, wherein the M digits are set up by time $t_1$ in the B-adder inputs 1 and 2. At this time, presuming a transfer of control, it is also obviously necessary to prevent any call for a new instruction from the first control counter 104. In the present case, such call is prevented by CHJP 68 and will be recalled from the previous account of the unconditional transfer of control instruction that CHJP 68 is permissive with respect to gate 4003 on FIGURE 4e, and enables a $t_7$ clock signal to generate signal CRAM. This signal CRAM then resets call flip-flop 310 and completing call flip-flop 319 (FIG. 4a). With the completing call flip-flop 319, in its reset condition by time $t_0$, of the second minor cycle, it is apparent that FT 401, FT 411, and FT UA as normally generated through gates 320 and 320′ are not generated. Furthermore, the same ending signals found in the unconditional transfer control instruction are utilized here so that gates 321 and 321′ on FIGURE 4a are not enabled by the fact that the completing call flip-flop is reset. That is ending pulse signal CHJP EP is generated and ending pulse signal CHJP EP′ is not. It follows, accordingly, that the call for the next instruction will be derived from section 108 of IR–2 and will comprise the M digits of the indexing instruction N. The resetting of completing call flip-flop 319 also prevents gate 322 on FIGURE 4a from being enabled so that at time $t_2$, FT 320, FT 331, and FT 345 are not generated. Thus, the instruction $N+1$, available during the second minor cycle on the high speed bus, is not transferred into IR–1, and the digits M from the output of the B-adder are not transferred into the first control counter 104.

Since no call is made to the memory for an operand for instruction N it is apparent that the memory-not-busy signal CGNB is not generated. However, again, as in previous cases of transfer of control instructions, the present instruction is effective to generate CHJP 13 which is effective via buffer 339, gate 327A and buffer 329 on FIG. 4b, to set the operand memory-not-busy flip-flop 331.

An additional consequence of the resetting of the completing call flip-flop 319 and termination therefrom of CSCL is that status 1 flip-flop 335, on FIG. 4e, may now be reset at time $t_0$ by CSBS. It is presumed that CSBS is, generated by the B digit comparisons in register selection comparator 142 giving rise to the CAAL signal. Since the B-mod flip-flop 308 is, at this time, still in its set output condition, it is apparent that with generation of CAAL, CSBS will, in fact, be generated and be effective to reset status 1 flip-flop 335. It follows with operand memory-not-busy flip-flop 331 (FIG. 4b) set and generating CHNBA that gate 333A will be enabled whereas gate 332 will not be enabled through failure of status 1 flip-flop 335 to generate its set output signal CQBA. Thus, FT 363 is generated at time $t_2$ so as to pass the output of the B-adder 139 now comprising the M digits of instruction N to the memory address decoder 141. In the absence of CQBA, gate 332 does not, however, generate FT 432 and it follows, therefore, that at time $t_2$ the B-mod flip-flop 308 on FIG. 4a will be reset. Similarly, call flip-flop 310 will fail to receive a set input signal thereto. Since the set output of the call flip-flop 310 is necessary to effect a setting of completing call flip-flop 319, it necessarily follows that during the third ensuing minor cycle, no call will be made from the first control counter 104 for instruction $N+1$.

Other CHJP signals associated with the present instruction, the effect of which is directly perceivable from FIGURE 12a, are CHJP 30 which selects an addressable register for the derivation of an A operand and CHJP 54 which also selects an addressable register for result storage. As previously discussed with regard to other instructions, the selection made by CHJP 30 occurs at time $t_2$ and FT 403 and FT 411 are generated by gate 463 (FIG. 4b). At $t_4$, CHJP 54 again alerts gate 466 which generates FT 403 and FT 411. Additionally, CHJP 27 coacts with CHNB to enable gate 426 on FIG. 4c whereby AR to AU input flip-flop 415 is set. From a consideration of the regular sequence of events which have been described previously, it is readily to be perceived that the A digits from the indexing instruction N are transmitted through the B-adder and from the output thereof to the register selector 118, thus to select the designated addressable register, the contents of which are to be manipulated. The second selection of an addressable register, by the generation of CHJP 54 sets up selector storage 113 whereby the results of the instruction are returned to the designated register.

Further effects directly observable from FIG. 12 include the generation of CHJP 26 which is effective to enable gates 454 and 453 in the timing decoder section of FIG. 4e. The enabling of gate 454 at $t_3$ of the second minor cycle generates FT 402 and FT 411, and the enabling of gate 453 at $t_5$, generates FT 346. Additionally, CHJP 73 is generated at $t_5$ thereby to enable gate 452 to derive FT 332. The effect of these function table signals is as previously shown to gate the M digits from the output of the B-adder into the second control counter 106. It is also to be noted that CHJP 38 coacts with CHNB to enable gate 464 (FIG. 4b) to generate FT 300 whereby the encoded instruction digits from encoder 110 are passed to the arithmetic unit control 130. Finally, the generation of CHJP 50 is effective via gate 425 on FIG. 4c to set the AU to AR flip-flop 418, so that when the results of the manipulation of the contents of the selected addressable register are available, they may be placed back into such addressable register. The operation of this last chain of flip-flops has been covered in detail in connection with earlier described instructions.

With reference now to CHJP signals, the effect of which is not obvious from the timing diagram, it will have been noted from previous considerations that CHJP 24 coacts with CHNB to enable gate 411 (FIG. 4e). Gate 411 passes the $t_3$ clock signal thereby to set flip-flop 412 via buffer 411A. Finally, it may be noted that the instruction generates CHJP 21 and CHJP 22. These enable gates 4053 and 4074 (FIG. 4f) respectively to pass a $t_5$ clock signal thereby setting CNAA flip-flop 1 and CNAA flip-flop 2, so that the set output signals from these flip-flops are available by time $t_6$ of the second minor cycle. From the setting of these two flip-flops it will be obvious that buffer 4055 will pass signal CNDF. Gate 4057 is enabled by CNAA signals 1 and 2 to pass a signal designated CNDH and this latter is permissive with respect to gates 4027 and 4032 in the timing decoder section of FIG. 4f. Gate 4027 passes the $t_7$ clock signal to generate FT 401 and FT 411. Gate 4032 passes both the $t_1$ and $t_2$ clock signals applied via buffer 4033 so that at $t_1$ FT 332 and FT 346 are generated. It follows that at time $t_7$ the contents $N+1$ of the first control counter 104 are gated into the B-adder 139 along with zeros. The output $(N+1)$ of the B-adder 139 available at time $t_1$ of the third minor cycle is thereafter gated into the second control counter 106 from the aforesaid generation of FT 332 and FT 346 which act to clear the control counter 106 and to alert input gate 144 respectively (see FIG. 1a). In the meantime, the setting of call from C2 flip-flop 412 (FIG. 4e) and the generation of CRBC therefrom at $t_4$ places an enabling signal on gate 420. The CGNB memory-not-busy signal is received as a result of a successful call in the second minor cycle to the memory for the instruction designated by M. Thus, gate 420 is fully enabled to pass the $t_4$ clock signal thereby to set the completing call from C2 flip-flop 413 and generate the CRCZ signal at time $t_5$.

It follows that during the third minor cycle gates 451 and 450 will both be enabled. Gate 451 passes the $t_0$ clock signal to generate FT 405, FT 411 and FT UA. From FIGURE 1b, it is to be seen that these signals are effective to pass the contents of the second control counter 106 into the B-adder 139 via gates 138 and therein augment such contents by one. At time $t_1$, there is an output from the B-adder, namely, $N+1$, which is transferred into the second control counter 106 by the generation of FT 332 and FT 346 from gate 4032 as previously described. The enabling of gate 450 by the signal CRCZ from the completing call from C2 flip-flop 413 is effective at time $t_2$ to generate FT 320, FT 332 and FT 346. It follows that instruction M which is now available on the high speed bus will be gated into IR-1 by FT 320. Similarly, the M digits as augmented by 1 in the B-adder are gated into the second control counter 106 by FT 332 and FT 346. From this point on, whether or not a successful call is made to the memory for instruction $M+1$, depends on whether or not the transfer signal is received. Where a transfer signal is received, the next call is for instruction $N+1$ and is derived from the second control counter 106. Where no transfer signal is received, then the next call proceeds from the output of the B-adder and is for instruction $M+1$. In this particular instance, it is assumed that the transfer signal has been received from the arithmetic signal unit indicating that following the test of digits NNN of the addressable register A being manipulated therein, such were found to be equal to zero.

The receipt of the transfer signal has two immediately noticeable effects with reference to FIG. 4f. First, gate 4022 is enabled. Thus, at time $t_2$ FT 364 is generated. Likewise gate 4076 is enabled and at $t_2$ CNFY flip-flop 4077 receives a set input signal. It will be apparent from FIGURE 12a and from FIG. 1 that the generation of FT 364 along with the transfer signal is effective at $t_2$ to enable gate 151 while inhibiting gate 140. It thus follows that the output $M+1$ of the B-adder is not transmitted to the memory address decoder 141 but at this time the contents $N+1$ of the second control counter 106 are transmitted to the memory address decoder. It follows that the next instruction to be called is derived from memory location $N+1$. It is thus apparent that while a transfer of control to the instruction designated by M has been anticipated and prepared for, in this instance no transfer is effective, but rather the next instruction to be executed is that designated by these digits $N+1$. In the meantime, however, it will have been noted that IR-1 is now storing the instruction designated by the M digits of instruction N. It is thus apparent that the contents of IR-1 must be scrapped and replaced by the aforesaid next instruction in regular sequence namely, $N+1$. The setting of the CNFY flip-flop 4077 is effective to accomplish this as shall be seen hereinafter.

The signal CNFY derived from flip-flop 4077 is for the most part only indirectly effective with respect to the timing decoder as shall be shown. However, gate 4031 is directly enabled by signal CNFY thereby to pass a $t_1$ clock signal in the ensuing fourth minor cycle. This generates FT 321 which is effective, as previously noted, to clear IR-1. Thus, the instruction from location M stored therein at that time is effectively scrapped. Similar to its counterpart, CNFX, the signal CNFY is split into two signals CNFY-A occurring at time $t_3$, and CNFY-B occurring at time $t_0$, and this splitting is effected by gates 4079 and 4080 appearing on FIGURE 4f. The signal CNFY-A is effective, to reset the call from C2 flip-flop 412 (FIG. 4e), the completing call from C2 flip-flop 413, and the exchange flip-flop 414, respectively via buffers 410, 413A, and 414A. Also, CNFY-A generates CSBX via buffer 4002 and the one-pulse delay associated therewith. It will be recalled that CSBX is effective to reset the B-mod flip-flop 308 on FIGURE 4a, and in addition, to reset the equality flip-flop 493 and the inequality flip-flop 492 on FIGURE 4b.

Reference is now made to FIGURE 4a. It may be seen therefrom that CNFY-A is effective to set the ending pulse storage flip-flop 305 and also to set the call flip-flop 310. The setting of these latter flip-flops is in preparation for the resumption of normal operation in a regular sequence. In conjunction with the resetting of exchange flip-flop 414 (FIG. 4e), it is to be noted that this flip-flop will have been set by the receipt thereon of a $t_1$ clock signal via gate 4100 in the third minor cycle. This necessarily follows from the generation of CRCZ from flip-flop 413. The resetting of the exchange flip-flop 414 takes place at time $t_3$ of the third minor cycle; therefore, there is no exchange of the contents of control counter 104 and control counter 106. The resetting of the B-mod flip-flop 308 by CSBX at $t_4$ of the third minor cycle prevents the B modification operation commenced on the instruction M stored in IR-1, through the gating of the B digits into the register selector 118, from being carried out. That is, gates 468 and 335A (FIG. 4a) fail to operate and FT 312 and FT 311 are not generated so that gates 102, 103 and 105 (FIG. 1a) do not transmit an instruction to IR-2 (i.e., registers 107, 107a and 108). The resetting of flip-flops 493 and 492 on FIGURE 4b prevents generation of the CSBS signal until such time as the B-mod flip-flop 308 is once again set.

In the meantime, the actual manipulation of the contents of the selected addressable register designated by instruction N will have taken place in the arithmetic unit so that at the end of the third minor cycle, the results of such manipulation will be available. Such results are gated back into the addressable register designated by the result address held in selector storage at time $t_2$ of the fourth minor cycle. In the fourth minor cycle, there is a reversion to a normal sequence of operations and the regaining of full overlap is initiated. From the setting of call flip-flop 310, by CNFY-A during the third minor cycle, and from the receipt of the CGNB memory-not-busy signal following a successful call to the memory for instruction $N+1$ it follows that at $t_4$, gate 314 (FIG. 4a)

will be enabled so that thereafter completing call flip-flop 319 is set to generate CSCL. Similarly, the setting of the ending pulse storage flip-flop 305 by CNFY-A generates CSAR which in the fourth minor cycle will be enabling with reference to gates 306 and 333A in the timing decoder portion of FIGURE 4a. Thus, with completing call signal CSCL, and signal CSAR both generated, it is apparent that a normal call for instruction $N+2$ will take place via the first control counter 104, the B-adder 139 and the memory address decoder 149. Likewise, the instruction $N+1$ now on the high speed bus will be gated into IR-1 through the generation of FT 320 by gate 322 at time $t_2$. It follows also that $N+2$, the output at this time from the B-adder 139, is returned to the first control counter 104 to be stored for calling the ensuing instruction $N+3$ during the next minor cycle. The generation of FT 432 via gate 306 enables a setting of the B-mod flip-flop 308 and an assurance that normal B-modification operation will be carried out on instruction $N+1$, now stored in IR-1. The remaining events depicted on FIGURE 12a are those occurring in the fifth and sixth minor cycles and are obvious from what has previously been described.

The only portion remaining to be considered of the operation in this respect are the operations of the status flip-flops. As previously noted, status 1 flip-flop 335 (FIG. 4e) is reset in the second minor cycle by the failure of CSCL and the generation of CSBS. From the termination of the CQBA signal, it necessarily follows that the status 2 flip-flop 400 will be reset at $t_0$ of the third minor cycle through failure of gate 403 to receive permissive signals thereon. With a setting of status 1 flip-flop 335, at $t_0$ of the third minor cycle, through receipt of the CRCZ signal, it might appear that status 2 flip-flop would be set at $t_0$ of the fourth minor cycle. That this is not so may readily be perceived when it is considered that as previously mentioned, the CSBS signal is not generated from the B comparison equality flip-flops 493 and 492 (FIG. 4b). As can be seen from FIG. 12a, the status 2 flip-flop 401 is reset in the fifth minor cycle, i.e., when the B-mod operation takes place and there is an instruction in IR-2. The status 3 and status 4 flip-flops will, of course, follow the pattern set by the status 2 flip-flop. It is apparent as in previous instances that the conditions of the status flip-flops follow the actual condition of the registers associated with the various stages of the execution of an instruction.

If reference is now made to FIGURE 12b, it will be seen how the execution of the indexing instruction is affected by the failure to receive a transfer signal during the third minor cycle. This is the situation presented wherein it is desired to save time by anticipating the possibility of a transfer. Since in most instances, no transfer signal is received, as previously mentioned, a type of reverse transfer is put into effect and a transfer to M actually occurs. Thus, in summary, where no transfer signal is received, a transfer actually occurs. Where a transfer signal is received, no transfer actually occurs. Up to the third minor cycle, the operations depicted by FIGURES 12a and 12b are exactly the same and it is not considered necessary to describe in detail the generation of the various CHJP signals and the flip-flops and function signals controlled thereby. However, in the third minor cycle it is noted that in this case, no transfer signal is received. In effect, the digits NNN of the addressable register whose contents are being manipulated having had one subtracted therefrom and having been compared to zero are found to be not equal to zero. Thus, no transfer signal is generated.

It follows immediately that gate 4022 in the timing decoder portion of FIGURE 4f is not enabled, and similarly the CNFY flip-flop 4077 is not set. The various operations carried out by the signals produced by these two elements, therefore, do not occur. Since FT 364 is not generated from gate 4022, it follows that the generation of FT 363 from the call from C2 flip-flop (FIG. 4e) 412 is effective to gate the output $M+1$ from the B-adder 139 (FIG. 1b) to the memory address decoder 141. Thus, a call is made for instruction $M+1$. Similarly, the failure to generate the signal CNFY permits the exchange flip-flop 414 to remain set. Thus, an exchange of the contents of the first and second control counter as depicted in conjunction with previous transfer of control orders takes place. There is no generation of the CSBX signal and accordingly, there is no resetting of the B-mod flip-flop 308. It therefore, follows that a normal B-modification is carried out on instruction M now stored in IR-1 and the instruction is thereafter transferred into IR-2.

During the second minor cycle, ending pulse storage flip-flop 305 is set via gate 336 (FIG. 4a). Gate 336 is enabled by the CHNB signal, the CHJP ending signal, and the failure of the status 1 or CQBA signal. Thus, CSAR is available to generate FT 432 and FT 363 during the third minor cycle. The B-mod flip-flop 308 and call flip-flop 310 are set by FT 432 during the third minor cycle. It follows that with a successful call to the memory for instruction $M+1$, completing call flip-flop 319 is set during the third minor cycle. Thus, during the fourth minor cycle, it is apparent that normal resumption of operations takes place wherein a call takes place for the next instruction $M+2$, via the first control counter which will presently be storing the digits $M+1$. From this point on, it will be clear that a normal sequence of operations is resumed so that a new sequence of instruction calls as initiated by the M digits of the indexing instruction now takes place.

With reference to the various status flip-flops, it is believed that their operation, during this type of operation, will be apparent from the timing diagram and from FIGURE 4 itself. The status 1 flip-flop is, of course, reset during the second minor cycle as was the case in the previous instance. It follows that status 2 flip-flop 400 will be reset during the third minor cycle. Since, however, there was no generation of CSBX, it is clear that as long as the proper inequalities are obtained from register selection comparator 142, the CSBS signal will be generated during the fourth minor cycle so that the status 2 flip-flop may once again be set with the receipt of a $t_0$ clock signal on gate 403. As in previous instances, the status 3 and status 4 flip-flops follow the operation of status 2. It is seen from the timing diagram that by the time the sixth minor cycle has been reached, the computer is once again operating in full overlap. This time the instruction sequence is determined by the M digits derived from the indexing instruction N just executed.

In connection with the execution of instructions of the general type as shown by FIGURE 8, one final consideration is contemplated. It will be recalled that in such instructions, that is to say the add, subtract, multiply or divide type instructions, the execution thereof proceeds first of all by calling the instruction and transferring it from the memory into IR-1. Following a B-modification operation the instruction is transferred into IR-2 and the operands are summoned. Also, at this time, the address of the result of the instruction is placed into selector storage 113 on FIGURE 1. It will have been noted in each of the instances previously contemplated, that the address for the result is the same as the address from which the A operand of the instruction has been selected. Under certain circumstances, it may be desirable to preserve the A operand already stored in a designated addressable register. For this purpose a different result address must be set up in selector storage. This may readily be provided by having additional instructions which are substantially identical with the normal instructions originally contemplated. The only change necessary is that when the A address is sent to selector storage, it must be different from the A address from which the original operand was selected. This latter effect is provided for in the instruction itself by having one additional CHJP signal.

From FIGURE 4b it will be observed that gate 4034 in the timing decoder is enabled by the presence of CHJP 61 and CHNB. When so enabled, this gate will pass a $t_4$ clock signal to generate FTUA. Since normally when the result address is to be determined and placed in the selector storage, CHJP 54 enables gate 466 to pass the $t_4$ clock signal, it will be apparent that with the generation of FT 403 and FT 411 from gate 466, the additional generation of FTUA from gate 4034, is effective to increase the A digits sent to the B-adder at this time by one, and these thus increased A digits are subsequently sent to selector storage 113 on FIGURE 1.

Thus, it will be seen that if an add instruction, for example, is being performed, then the effect will be to transfer the contents of memory location M to the arithmetic unit; to transfer the contents of the selected addressable register A to the arithmetic unit; to add these two and therefater transfer the result to addressable register location $A+1$. Although not specifically shown, in the drawings, it is plainly apparent that the foregoing principle is effective if it is desired to alter the result address in various other ways. These other means of alteration may be obtained by the provision of still additional instruction with additional CHJP signals effective to operate on still further gates in the function table whereby one could be subtracted or two or three from the A address as it was transferred through the B-adder, subsequently to be placed into selector storage. The details of such an operation are believed to be apparent to persons skilled in the art.

No overlap operation

From FIGURE 4, it will have been observed that at various places there appears a designation "no overlap" switch. This, in several instances, is effective to place inhibiting signals on various gates. While the present invention is basically concerned with apparatus for the operation of a computer in overlap nevertheless, it will be appreciated that for certain purposes for example, checking and error tracing, it may be desirable to operate the computer without overlap. Such operation is provided by means of the "no-overlap" switch. The "no-overlap" mode of operation is not specifically illustrated in a timing diagram. However some understanding of its operation may be obtained through reference to copending application 45,242, entitled, "Computer Indexing System," and assigned to the assignee of the present invention. Therein are shown four cycling flip-flops and these in effect have a function similar to the status flip-flops of the present invention. In fact, when in the present invention the "no overlap" switch is thrown, the four status flip-flops appearing on FIGURE 4e, thereafter operate in effect as a form of cycling unit. Most of the "no overlap" switch designations are shown on FIGURES 4a and 4b. From these figures, it will be observed, when the "no overlap" switch is thrown, gates 330A (FIG. 4b) and 333A (FIG. 4a) are both inhibited permanently, whereby FT 363 may not be generated. It will be recalled that FT 363 is effective at time $t_2$ to pass the output of the B-adder 139 to the memory address decoder 141 thereby to select the next instruction to be executed in a regular sequence. With the aforesaid gates inhibited, it is clear some other means must be provided for the generation of FT 363 at the proper time. The proper time, however, in this instance will not arrive until the preceding instruction has been completely executed. That is to say, any given instruction must go through all of its various cycles before any additional instruction is actually called and transmitted into IR–1.

Provision for this type of operation is made through call flip-flop 310 (FIG. 4a). This flip-flop, it will be observed, has a number of set inputs. The set input normally associated with an overlap operation is that provided through the enabling of gate 490 by FT 432. With this gate inhibited by the "no overlap" switch, it is apparent that no normal setting may taken place from the setting of the operand memory-not-busy flip-flop 331 which normally generates FT 432. However, on FIGURE 4a, will be observed gate 489 which is enabled by the "no-overlap" switch coacting with the output signal CQBD from the status 4 flip-flop 402. When gate 489 is thus enabled, a $t_2$ clock signal will be passed thereby setting call flip-flop 310. In the succeeding minor cycle, it will be observed that gate 315 is enabled to pass the $t_0$ clock signal thereby generating FT 411 and FT 401. These perform their usual functions of gating the contents of the first control counter 104 into the B-adder 139 along with zeros. Subsequently, at time $t_2$ gate 311 generates FT 363 whereby the output of the B-adder is transferred to the memory address decoder 141. With the receipt of the memory-not-busy signal CGNB, gate 314 is enabled to pass a $t_4$ clock signal thereby setting completing call flip-flop 319.

In the succeeding minor cycle, gates 320 and 320' are both enabled whereby FT 401, FT 411 and FTUA are generated. Thus the contents of control counter 104 are increased by one. Subsequently, at $t_2$ of this minor cycle, gate 322 generates FT 320, FT 331, and FT 345. These perform their usual functions of gating the now available instruction from the high speed bus into IR–1 while at the same time passing the output of the B-adder back into the control counter 104. It is apparent however, that following the generation of FT 401, FT 411 and FTUA from the setting of the completing call flip-flop 319 (FIG. 4a) no call will be made for the next succeeding instruction because of the inhibition of gate 330A on FIGURE 4b through the setting of the "no overlap" switch. Thus, at this time, while the control counter 104 does have its contents increased by one, the memory is not addressed for this next instruction. Gate 332 (FIG. 4b) also enabled by the setting of operand memory-not-busy flip-flop 331, is not inhibited by the "no overlap" switch, so that as usual, FT 432 is generated. This permits the setting of the B-mod flip-flop 308 so that a normal sequence of events occurs and the instruction just received into IR–1 goes through its normal B-modification step and is thereafter gated into IR–2. However, as previously noted, FT 432 is prevented at this time from setting call flip-flop 310.

Hereafter the normal sequence of events takes place in the execution of the instruction. When the result is finally available from the arithmetic unit, the status 4 flip-flop 402 on FIGURE 4e is set, so that once again the call flip-flop 310 (FIG. 4a) may be set via gate 489. Thus a normal sequence of events is provided, but without the overlap.

In starting the computer in the "no overlap" mode, it is necessary to have the status 4 flip-flop 402 (FIG. 4e) in its set output condition. This is accomplished from the start flip-flop. The output signal from gate 303 (FIG. 4a) available at time $t_1$, is designated CSAS and provides a further input to the status 4 flip-flop input buffer 405A. Thus CSAS is effective in all instances when the computer is started to set the status 4 flip-flop. It will be appreciated that under overlap conditions of operation the setting of the status 4 flip-flop at this time is immaterial. This is because the flip-flop will, following one minor cycle of operation, be reset by the $t_0$ clock signal.

Other functions of the "no overlap" switch may be observed on FIGURE 4e where it is shown inhibiting gate 456 in the timing decoder and at the same time providing an enabling signal to gate 4084 the output from which will set the exchange flip-flop 414. The operation of these particular elements in a "no overlap" operation are believed to be reasonably apparent from previous discussions and will not be described.

From the foregoing explanation of FIGURE 4 in connection with the various timing diagrams associated therewith, it is believed that the operation of the overall control circuits of the computer will now be apparent to those skilled in the art.

Refer now to FIGURE 5, which shows in greatly simplified from the basic organization for an arithmetic unit suitable for use with the present invention. Inasmuch as the invention is basically concerned with control circuits for a digital computer, it is to be appreciated that the arithmetic unit as shown is merely representative in nature and that many different forms of arithmetic unit could be provided. It will be apparent that an arithmetic unit suitable for use with the present invention must conform to certain requirements. Primarily, it must be capable of performing various arithmetic operations as designated by the instructions. Arithmetic circuits capable of performing additions, subtractions, multiplications, divisions, as well as other arithmetic operations, are well known to those skilled in the art. Accordingly, it may be assumed that there are many combinations of circuits capable of serving as an arithmetic unit for use with the present invention. However, one further requirement exists. The timing of the arithmetic unit must be such as to coincide generally with the timing of the control circuits.

As previously developed, the basic unit of time considered with respect to the control circuits is the minor cycle comprising eight pulse times, $t_0$ to $t_7$. Accordingly, the basic timing unit of the arithmetic circuits is also the minor cycle comprising eight pulse times. Since the general control circuits, as illustrated in FIGURES 1 and 4 operate in the parallel mode, it follows that, for most efficient results, the arithmetic unit should likewise be designed to operate in the parallel mode. Within the aforesaid limitations, however, arithmetic circuits suitable for use with a computer employing the present invention may take any of a number of different forms. It is readily apparent that very little interaction takes place between the arithmetic unit and the control circuits. The only signal in fact, which is generated by the arithmetic unit and which directly coact with elements in the control circuits shown by FIGURES 4 and 1, is the transfer signal XFER generated by those instructions which call for conditional transfers. With this exception, the arithmetic unit operates substantially completely independent of the control circuits shown previously.

The arithmetic unit of FIGURE 5 will perform additions, subtractions, comparisons, data transfers and indexing. Of these, only additions, comparisons and data transfers will be considered in any detail. For an account of an arithmetic unit similar to the present and which is capable of performing indexing, reference is again made to copending application No. 45,242, assigned to the assignee of the present invention. The operations which are to be considered are therefore representative only.

The heart of the arithmetic unit is a 12-digit parallel adder 512. Three input lines are shown applied to adder 512 and two of these are representative of 60 lines each. The third input is in the form of a function signal, UA, which has the effect of stuffing a carry digit into the least significant digit position. Thus, in common with parallel adders known in the art, the adder as utilized in the present arithmetic unit, receives all of the bits and digits from each of two operands and adds these simultaneously to produce a result, with only a slight delay encountered through the gates and buffers which comprise the logical circuits of the adder. Preferably, however, the adder also includes pulseformers, which prevent deterioration in the signals representing the data. In common with other pulseformers used throughout this application, the pulseformers as utilized by the adder, introduce a one-pulse delay so that following the introduction of data on the inputs to the adder, a result will appear one pulse time later.

As previously described, two operands to be combined or otherwise manipulated by the arithmetic unit are initially stored in the M input register 150 and the A input pulseformers 129 respectively. The output from the M register 150 is connected to register 501 designated RAD via sixty gates 500. Similarly, the output from the A input pulseformers 129A is connected to register 510 designated RAF via sixty gates 509 and sixty buffers 552. The output of register 501 is connected to the AY select buffers 513, via gates 502 and to the shift select buffers 518 via gates 504. Similarly, the output of register 510 is connected to the AX select buffers 511 via gates 525 and to the shift select buffers via gates 517. Both registers 501 and 510 may be bypassed as indicated by the line with an arrow around each of the registers. The bypass line is used to avoid the delay of one pulse period in each of the registers. The AY select buffers 513 receive additional inputs from zero register 550, via gates 528 from the output of the adder 512 via gates 503 and from the output of the shifter 519 as will be considered subsequently. The AX select buffers receive additional inputs from the zero register 548 via gates 549 and from the output of the adder 512 via gates 526. Similarly, the shift select buffers 518 receive an additional input from the output of the shifter 519 via gates 530. Buffers 511 and 513 have an inherent one pulse delay.

The output of AY select buffers 513 is passed either through gates 521 or through complement gates 514. In the presence of FT 113 gates 521 will be enabled whereby the output passed to the adder via buffers 514 will be the same as the input to the AY select buffers 513. When complement gates 514 are enabled by FT 112, then the output passed to the adder via buffers 515 will be the nine's complement of the digits passed into the AY select buffers 513. The output of buffers 515 constitute one of the operand inputs to the adder 512. The output from AX select buffers 511 constitute the other input to the adder 512 and are passed thereto via gates 527 enabled by FT 114. The output from the AX select buffers may also be recirculated to the input of register 510 via gates 529 (enabled by FT 109) and buffers 552. The input to shift select buffers 518 from register 501 passes via gates 504 enabled by FT 127. The input from register 510 to the shift select buffers 518 passes thereto via gates 517 enabled by FT 126. The output of the shifter is recirculated to the shift select buffers 518 via gates 530 enabled by FT 128. The shifter 519 has applied thereto various function signals (L, R and O) which enable it to perform a shift of varying magnitude and direction. The output of the shifter 519 is also gated to the result register 523 via gates 505 enabled by FT 124.

The function signals L and R in the circles identified as 192 and 193 respectively are not shown generated by the arithmetic control apparatus of FIG. 6b. The L and R signals are representative of signals generated for shifting left or right. These function are not germane to the present invention. The function signal O is generated by the control apparatus of FIG. 6b. When the O signal is generated, the shifter does not actually perform any shifting function and it is used as a conduit as shall be explained later.

The output from the adder 512 is recirculated to the AY select buffers via gates 503 enabled by FT 119 and to the AX select buffers 511 via gates 526 enabled by FT 123. The output of the adder is also transmitted to the result register 523 via gates 531 enabled by FT 125. The adder 512 is provided with additional outputs indicative of whether or not an overflow has occurred. It is readily apparent that where two 12-digit numbers are added, the result may contain 13 digits. Since, however, the capacity of the adder 512 is 12 digits only, when such occurs there is a condition of overflow. Thus, an output OF will be generated following a one-pulse delay through delay line 553. Where, however, no overflow occurs, this condition also will be indicated by generation of the signal $\overline{OF}$ through one-pulse delay line 554. The uses of signals OF and $\overline{OF}$ will become apparent hereinafter.

The signs of operands introduced to the arithmetic unit are stored in sign storage flip-flops 608 and 609 appearing on FIGURE 6b. When the sign of a result has been determined the appropriate function signal FT 139 or FT 173 will enable gate 506 or gate 507, respectively, to pass a minus sign or a plus sign to the result register 523.

For the purposes of generating a conditional transfer signal XFER an output is taken from adder 512 and passed to the zero comparison gates 551. When the result of a comparison has been determined as equal to zero, the zero comparison gates 551 pass a signal via buffers 555 to gate 556. On a comparison instruction function signal C will enable gate 556 to generate the transfer signal XFER. A further input to buffer 555 is obtained from sign comparison flip-flop 558. When the operands are brought into the arithmetic unit the signs thereof, in addition to being stored in the sign flip-flops 608 and 609 are compared in quarter adder ("exclusive or") circuit 557. Where such signs are different, quarter adder 557 generates an output signal thereby setting a sign comparison flip-flop 558. Where, however, the signs are the same, no output signal will be generated by quarter adder 557 so that the sign comparison flip-flop 558 remains in its reset condition.

Consider now the operation of the arithmetic unit of FIG. 5 in performing an addition. For this purpose, it is assumed that the two operands to be added have already been placed respectively in the M input register 150 and the A input pulseformers 129A. At time $t_0$, FT 101 and FT 102 are generated by the control circuits as shown in FIGURE 6b. These enable respetcively gates 500 and gates 509 to pass the respective operands into AD register 501 and AF register 510. A time $t_2$, FT 115 and FT 121 are generated, thereby passing the contents of AD register 501 to the AY select buffers 513, and the contents of AF register 510 to the AX select buffers 511. At time $t_3$, FT 114 is generated which enables gates 527 to pass the A operand to the input of the adder 512. At the same time, either FT 113 or FT 112 will be generated to pass either the M operand or the nine's complement thereof, to the other input of the adder via buffers 515. A choice as to whether FT 113 or FT 112 is generated is determined by whether or not a set output signal is obtained from the sign comparison flip-flop 558. As has been explained previously, such a set output signal is indicative that the signs of the two operands are different. Where the signs are the same, however, FT 113 is generated at time $t_3$ so that at this time, both operands are passed to the inputs of adder 512. At time $t_4$, output signals are available from the adder representative of the sum of the inputs thereto and indicative of any occurrence of overflow (OF or $\overline{OF}$). The sum output from the adder is recirculated to the AY select buffers 513 via gates 503 with the generation of FT 119 at time $t_4$. At the same time, FT 136 enables gates 549 whereby zeros are passed to the AX select buffers 511. Again at time $t_5$, FT 114 is generated, and again, either FT 113 or FT 112 is generated. The generation of these latter signals on this occasion is dependent on previously established conditions as determined by the condition of the sign comparison flip-flop 558 and overflow signals OF or $\overline{OF}$ obtained from the adder on the first passage therethrough of the operands. The purpose of recirculating the initially obtained sum through the adder will become more apparent hereinafter. However, at time $t_6$, the final result is available from adder 512 and this is passed to result register 523 via gates 531. At the same time, either FT 139 or FT 173 will be generated and thereby pass either a minus sign or a plus sign to the result. Thus, by time $t_7$, the result register 523 is set up with the result of the foregoing addition.

Consider now the correction process as accomplished by recirculation of the sum initially obtained from the adder. As previously noted, where signs of the two operands are different, the operand derived from the M register 150 is always complemented by being passed from the AY select buffers 513 through complement gates 514 to the adder 512. In effect, then, the M operand is subtracted from the A operand. For a correct result, this assumes that the M operand is the smaller of the two. If such assumption is correct, it follows that no further correction is required, and accordingly, during the recirculation step, the sum as passed back to the adder 512 via the AY select buffer 513 will not be recomplemented. However, where the assumption is false, and where M is actually the larger of the two operands, it follows that recomplementing will be required in order to provide a correct final result. This final recomplementing is necessary is is shown by the following examples. Assume for the purposes of simplicity that the adder is designed to accommodate two digits only, so that where a sum of necessity requires three digits, an overflow condition will result.

Assume M is less than A.

$$M = -03 \quad A = +07$$
9's complement of M   96
                      1   ← UA
                     ___
Overflow  →① 04   ← Sum In this example where M is less than A an overflow (OF) occurs. The sum, however, is correct and does not require recomplementing when recirculated through the adder. The presence of an overflow signal under such conditions therefore. results in no recomplementing.

A second example also illustrates this point.

$$M = +03 \quad A = -07$$
9's complement of M   96
                      1   ← UA
                     ___
Overflow  →① 04   ← Sum Where, however, M is greater than A recomplementing is required as illustrated by the following examples.

$$M = +07 \quad A = -03$$
9's complement of M   92
                      1   ← UA
                     ___
No overflow  →   96   ← Sum Obviously, the foregoing sum is wrong and must be recomplemented to produce a correct final result. Thus, 9's complement of 96 =   03
                        +1   ← UA
                        ___
Corrected result  →    04

In a similar manner $$M = -07 \quad A = +03$$
9's complement of M   92
                      1   ← UA
                     ___
No overflow  →   96        Sum Corrected result obtained by recomplementing thus 96 complemented =   03
                   +1   ← UA
                   ___
Corrected result  →   04

Obviously, in the foregoing examples, the signs of the eventually obtained sums have not been considered. However, it is apparent that where the signs of the two operands are the same, the signs of the result will be the same as the sign of the operands. Where the signs of the operands are different, the sign of the result will be that of the larger of the two operands. The method by which a correct sign is placed into the result register is more particularly shown by FIGURE 6b hereinafter considered.

Consider next the arithmetic unit as employed in comparison instructions. As will be recalled from previous considerations of the general control circuits, comparisons of the contents of two addressable registers are often made for the purpose of determining whether or not transfer of control to a new instruction routine is to be made. In a comparison instruction, the only result of importance is the generation or failure to generate the transfer signal XFER. In the arithmetic unit a comparison instruction is similar to a subtraction. Substantially the same elements are employed in performing the subtraction operation as were employed for the addition previously considered. However, in the comparison order, there is no need for a result other than the generation of the transfer signal; accordingly, steps such as those of recomplementing are unnecessary in this instance.

As previously considered in connection with the add instruction, the two operands are first received into their respective input registers 150 and 129. At time $t_0$ FT 101 and FT 102 are generated, whereby the two operands are transmitted to the AD register 501 and the AF register 510. Because of bypass lines provided through these respective registers, the two operands are not delayed therein but are passed directly to the gates 502 and to the gates 525 which in turn direct these respective operands to the AY select buffers 513 and the AX select buffers 511. Accordingly, for a compare instruction FT 115 and FT 121 are each generated at time $t_0$. At time $t_1$, FT 114 is generated, thereby passing the signals representing the A operand from the AX select buffers 511 to the adder 512 via gates 527. Also generated at time $t_1$ is FT 112 and FT UA. Thus, it is apparent that the complement of the M operand is passed to the adder along with the A operand and in effect a subtraction is performed. The difference resulting is thereafter transmitted to the zero compare gates 551, at time $t_2$. If in the zero compare gates this aforesaid difference is found to be equal to zero, then the transfer signal XFER is generated from transfer gate 556. Such transfer signal is generated at time $t_2$. Even though the magnitude of the two operands is the same, where signs are different a transfer signal will be generated with a compare instruction. This is obvious from consideration of the quarter adder 557 and the sign comparison flip-flop 558. As will be recalled where the signs are different the sign comparison flip-flop will generate its set output signal which will also be transmitted via gate 556 to generate transfer signal XFER which may thereafter be employed in the general control circuits as heretofore described.

The arithmetic unit 131 is in addition to other functions used as a conduit wherein operands are transmitted between the addressable registers. For such transmission of data to take place the elements employed in the arithmetic unit include the M input register 150, the AD register 501, the shifter 519 and the result register 523. Thus, in a transmit order the contents of a designated addressable register are read into the M input register 150. Again, this may take place so that the operand is actually set up by time $t_0$ of a selected minor cycle. At time $t_0$, FT 101 is generated to enable gates 500 to pass the contents of the M input register 150 into the AD register 501. Thereafter, at time $t_4$, FT 127 enables gates 504 to pass the contents of the AD register 501 into the shifter 519 via the shift select buffers 518. In this instance the shifter does not actually perfrom any shifting functions and therefore, there will be a zero shift function signal applied to the shifter. In effect the shifter acts simply as a conduit. At $t_5$ the output of the shifter will be available and is gated via gates 505 into the result register 523. From the result register 523 the operand may be directed as required by the control unit instruction.

While indexing may be carried out by the instant arithmetic unit it is not proposed to describe this operation except to note that as in the case of a compare instruction the difference obtained on subtracting 1 from the digits NNN of a selected addressable register will be tested in the zero compare 551. This test will, as in the case of compare instructions, take place at time $t_2$ so that the transfer signal is available at this time and may be used as required in the general control circuits. For a complete account of the operation of the arithmetic unit in performing an indexing instruction reference is once again made to U.S. patent application No. 45,242, which as previously noted, is assigned to the assignee of the present invention.

FIGS. 6a and 6b show a simplified control unit for the arithmetic circuits depicted by FIG. 5. As in the case of FIG. 5, however, FIG. 6 is intended to be merely symbolic of the much more elaborate control circuits which would be necessary in order to control completely a computer arithmetic circuit having a full range of instructions.

FIG. 6a may be tied in with FIG. 1 by observing on FIG. 1b the AU instruction encoder 110 which upon receiving the coded I digits from IR–2 thereafter encodes such digits and transmits them to the arithmetic unit control 130 to which these various signals may be passed through the generation of FT 300. FT 300 enables gate 132 which thereafter transmit the encoded instructions into a plurality of flip-flops 600a which form a static register 600. Through a scheme of logical classification the number of flip-flops forming the static register may be greatly reduced, however, for purposes of simplicity in explanation it is presently assumed that one such flip-flop is provided for every instruction. It will be observed that these flip-flops receive a set input signal at time $t_5$ which is the time at which FT 300 is generated. Such flip-flops also receive a set input signal at time $t_5$ which latter is derived from the general control signal circuits of FIG. 4. It may be seen from FIG. 4e that the CSPA signal derived from the ending pulse delay ffip-flop 407 enables gate 406 to pass the $t_5$ clock signal thereby providing an ending signal for the arithmetic unit.

Instructions which require a plurality of minor cycles for their execution will step program counter 601 the output of which is decoded in decoder 603 along with the outputs of the various flip-flops forming the static register 600a to 600n. Also, the signals from the static register flip-flops 600 and program counter 601 are decoded with the output signals $t_0$ to $t_7$ from clock pulse generator 602.

The output signals from the decoder 603 in addition to being fed back to the program counter 601 are encoded in encoder 604 thereafter to generate the necessary function table signals for enabling the various gates depicted by FIG. 5 at the proper times.

FIG. 6b shows some details of the decoder 603 and the encoder 604 as depicted by FIG. 6a. In keeping with the arithmetic unit of FIG. 5 and the description pertaining thereto, FIG. 6b shows a possible scheme for decoding instructions for performing an addition, a transmission of data, and a comparison of the contents of the two addressable registers. In the static register portion as shown there are provided an add flip-flop 605, a transmit flip-flop 606 and a compare flip-flop 607. In addition to decoding the output of these flip-flops the output of sign comparison flip-flop 558 is decoded and the sign from the A input pulseformers and the sign from the M input register are both decoded. This latter decoding is provided in order that a proper sign may be placed in the result register 523 as shall be subsequently explained.

Decoding of the OF and $\overline{OF}$ signals derived from the adder 512 (FIG. 5) output also takes place in decoder 603.

When the add flip-flop 605 is set then at time $t_0$, FT 101 and FT 102 will be generated by the final encoder 604, thereafter at time $t_2$, FT 115 and FT 121 are generated. This is in accordance with the previous description of FIG. 5. At time $t_3$, FT 114 will be generated by the decoder and also at time $t_3$ FT 113 will be generated by an add instruction, if the sign comparison flip-flop 558 is in its reset output condition, indicating that the signs of both operands are the same. If, however, the signs of the operands are different, then FT 112 will be generated at $t_3$ by the add instruction.

As previously noted, a time $t_4$ the initial sum output is available from the adder which sum is recirculated for the purpose of recomplementing when necessary. For this purpose FT 119 and FT 136 are generated as shown by the final encoder through a decoding of the $t_4$ signal and with the output of the add flip-flop 605. With the delays provided by elements 553 and 554 on FIG. 5 the OF and $\overline{OF}$ signals are available at time $t_5$ and such signals are subsequently decoded in decoder 603. As previously noted, the presence of the OF signal means that no recomplementing need take place. Accordingly, with this signal present, at time $t_5$ FT 113 is generated, however, if $\overline{OF}$ should be present then at time $t_5$, FT 112 is generated so that a recomplementing of the sum takes place.

At time $t_6$, FT 125 is generated the actual decoding taking place at time $t_5$, however, through the interposition of a one pulse delay, FT 125 is not generated until time $t_6$ and accordingly the result is actually set up in the result register 523 at time $t_7$.

It is to be noted that the complement provided by complement gates 514 is a nines complement. Thus, whenever FT 112 is generated FTUA is likewise generated.

The final matter to be considered in conjunction with the add instruction is the generation of the necessary function signals to provide the proper sign for a result. It will be readily appreciated that where an add instruction is being performed and where the signs of both operands are the same, the result will have the same sign as that of the operands. Where, however, the signs of the two operands are initially different, the sign of the result will be that of the larger of the two operands. With this rule in mind, it is easily seen how the proper sign is placed in the result register 523. With both signs the same, the sign comparison flip-flop 558 will be in its reset output condition. Accordingly, if the signs stored in the sign storage flip-flops 608 and 609 are both "minus," at time $t_6$, FT 139 will be generated. With the generation of FT 139, gate 506 of FIG. 5 is enabled thereby passing a minus sign into result register 523. Also, if both signs are "plus," the reset condition of the sign comparison flip-flop 558 will result in the generation of FT 173 thus placing a "plus" sign into the result register 523 at ime $t_6$.

Where the signs are different then the proper sign determination is dependent upon the OF or $\overline{OF}$ signals derived from the output of the adder at time $t_5$.

As previously shown, where addition of two numbers is to take place and the signs of the two are different, in effect the M digits are subtracted from the A digits by providing a complement input from the AY select buffers to the adder 512. It follows that if M is the smaller of the two operands, the result will take the sign of A. Conversely, if M is the larger of the two operands, then the result will take the sign of M. It has been shown that when M is the smaller of the two operands an OF signal is generated and where M is the larger of the two operands an $\overline{OF}$ signal is generated. Thus, where the signs are different and OF has been generated the sign of A, whether "plus" or "minus," is decoded to enable the generation of FT 139 or FT 173. Where the signs are different and the no overflow signal $\overline{OF}$ is generated, then the sign of M governs the sign of the result and FT 139 or FT 173 are generated according to the sign stored in the M flip-flop 609. The foregoing logical process of ascribing a sign to the result of an addition is believed to be well known in the art.

Where a transmission of data is to take place through the arithmetic unit flip-flop 606 will be set by the instruction and this generates FT 101 at time $t_0$. FT 101 passes the contents of the M input register 150 into the register 501 via gates 500. Thereafter, at time $t_4$, FT 127 is generated so that the contents of the register 501 are passed into the shifter 519. At time $t_5$, the zero shift signal is applied to the shifter 519 so that no actual shifting takes place. Thereafter, at time $t_6$, FT 124 is generated by this instruction so that the output from the shifter is passed into the result register 523. The sign passed to the result register will be entirely governed in this case by the sign stored in the M sign flip-flop 609.

Consider finally the compare instruction. In this case as in the case of the add instruction FT 101 and FT 102 are both generated at time $t_0$. Also generated at time $t_0$ as described with reference to FIG. 5 are FT 115 and FT 121. Thus, the contents of the M input register 150 and the A input pulseformers 129A are passed to the AY select and AX select buffers 513 and 511, respectively.

At time $t_1$ compare instructions generate FT 114 so that the output of the AX select buffers is gated into the adder via gates 527. Since a comparison always requires a subtraction to be performed, FT 112 is generated at time $t_1$, thus enabling complement gates 514. Thus, the complement of M is added to A. Again, as in the case where FT 112 is generated, FTUA is generated to provide in effect a tens complement rather than a nines complement.

At time $t_2$ the difference is available from the adder 512 and this then is directed into the zero compare 551 as shown on FIG. 5. Also at time $t_2$ the C function table signal is generated whereby gate 556 is enabled to pass inputs thereto either from zero compare 551 or from flip-flop 558. In this manner, the transfer signal XFER may be generated and passed to the control circuits of FIGURES 1 and 4.

While many more instructions might be provided for an arithmetic unit of the type set forth it is believed that the foregoing will suffice to give a general understanding of the type of apparatus contemplated. It is reiterated that the arithmetic unit shown hereby is merely representative in nature and the realization of the present invention does not depend on the design details thereof.

Reference is now made to FIGURE 7, parts a, b and c, which respectively show in block form the general organization of a memory unit suitable for use with the computer control circuits of the present invention. It will be appreciated that up to the present time no attempt has been made to set forth in general terms any form of input or output equipment by which information might be introduced to the computer. Such matter has been reserved for separate patent applications. It is sufficient to note for the present that the memory constitutes a common link between the computer and the input output equipment. One further observation which might be made is that in a complete system more than one computing unit of the type described hereinbefore may be provided. Again, the same memory constitutes a common link between each of the various units making up the overall system. As in the case of the arithmetic unit and controls pertaining thereto, the memory unit as shown is not considered to form an actual part of the present invention but is rather included for the sake of completeness.

The memory as provided herein is of the random access type. Each of the various units which may be provided in an overall system including computing units and input output equipment has provision for addressing the memory and for supplying information thereto. In this regard, data is extracted from or inserted into the memory over read and write buses 7–110 and 7–111 respectively. The address designation for data is coupled to the memory over a separate set of lines from memory address decoders such as element 141 in FIGURE 1b. The address lines 7–112 serve to transmit such address data to the various memory units.

Because there are a plurality of units sharing the memory it is obviously necessary to provide for a system of time sharing and in addition a system of priorities. In the present application the priority arrangements will not be dealt with however. It is sufficient to note at this point that memory not busy signal CGNB depends for its derivation upon successfully addressing the memory. Failure to get such a memory not busy signal is indicative of the fact that some other unit has called the memory during the same minor cycle as the computer hereinbefore described. Another occasion for failure to get the memory not busy signal arises when the computer addresses the memory for an instruction and an operand within the same minor cycle. The reason for such failure will become apparent thereinafter.

If reference is now made to FIGURE 7a there is shown in simplified diagrammatic form a general organization of the overall memory. As indicated in this figure, the memory may have a capacity of 97,500 words. For this purpose, there are provided 39 memory units of equal size. Each such unit may provide 2500 words of coincident current core storage. The manner in which the coincident current core memory units are wound is conventional and may take the form indicated by British Patent No. 769,384. Thus each core in a memory unit is threaded with an $x$ wire, a $y$ wire, a $z$ or inhibit wire and finally a sense wire. The array itself comprises 60 planes, 1 plane for each bit of a word and each plane comprises a matrix having 50 columns of cores, with 50 cores in each column. Thus, the 60 planes of 50 columns of 50 cores provide a unit of 2500 words capacity.

As indicated in FIGURE 7a, memory unit 1 (7–100) provides storage locations 00000 through 02499. Memory unit 2 (7–100) provides the storage locations for addresses 02500 through 04999 and so on. The entire 39 units of the memory are housed in 10 cabinets and each cabinet except the last contains 4 memory units so that cabinet No. 0 provides the storage locations for the first 10,000 words, cabinet No. 1 provides storage locations for the next 10,000 words and so on. The last cabinet with only three units, provides the storage locations for words 90,000 to 97,499.

Since the memory accommodates 97,500 words, a 5-digit number comprising 25 bits is required to address any storage location. The address digits can be derived from either the contents of the control counters (104, 106) or the M digits of the instruction word, or again from corresponding portions of words found in other units such as the input output equipment of the overall system.

To select a given storage address the address digits are decoded in the memory address decoder 141 of FIGURE 1. Such address decoding will not be described in detail herein. For particulars of how this is carried out reference is made to co-pending patent application No. 98,148 filed March 24, 1961, and assigned to the assignee of the present invention. It is sufficient to note that such address decoding is entirely conventional in nature and will be readily apparent to those skilled in the art. It can be mentioned, however, that in decoding the given memory address a unit is selected along with the X and Y address to choose a given location in the overall memory. Other input lines to the various memory units include the input line carrying the write delete signal and the input line carrying the read signal. These will be dealt within more detail as the description proceeds.

If reference is now made to FIGURE 7c, there is shown in some further detail the control circuits associated with one of the memory units in the overall system. Herein is shown control circuits for memory unit No. 1 of cabinet No. 0.

The 50 x 50 core matrix with its 60 planes is symbolically indicated in cubic form at 7–1. This memory like most coincident current memories is a destructive read out type; that is, when information is read out from the memory the memory cores which are read out are cleared. Therefore, in the operation of the memory, regardless of whether it is a read operation or write operation, the memory goes through a read-write cycle, wherein, the information contained in the address location interrogated is first cleared or read out as the case may be, and then the new information or the old information is recirculated into the memory location by means of the recirculation circuit.

In addressing the memory, the unit select lines are selectively energized for one pulse time. The particular unit select line which is associated with the memory unit being addressed, in this case, Unit select Line 1 is coupled to seven X and seven Y address input gates, represented as single gates 7–4 and 7–5, respectively as well as to the input of a read gate 7–6 and an interlock gate 7–7. Each of the seven X address input gates 7–4 also receives as an input a corresponding one of seven $X_2X_1$ lines. Similarly, each of the seven Y address input gates 7–5 receives as inputs, a corresponding one of seven $Y_2Y_1$ lines driven from the memory address decoder. Each of the input address gates 7–4 and 7–5 also receives an inhibit signal MCKA. This signal is generated from the output of the interlock flip-flop 7–13. The X and Y address signals are fed through the respective gates 7–4 and 7–5 to the set input of each of seven X address flip-flops 7–2 and seven Y address flip-flops 7–3 to determine the states of these flip-flops according to the code received on the X and Y address lines. The address flip-flops 7–2 and 7–3 temporarily store the X Y address for one minor cycle. The outputs of these X and Y flip-flops are applied to X and Y address decoder matrices shown as 7–17 and 7–18. These decoder matrices may be of the conventional crystal diode type well-known in the art. They function in accordance with the coded input applied thereto to select one of 50 lines in each of their output circuits. These output lines respectively enable one of fifty X and fifty Y switches 7–19 and 7–20 which in turn are connected to the fifty X and fifty Y lines threading the memory.

Read and write current sources shown at 7–23 and 7–71 respectively connect through the fifty X and fifty Y switches 7–19 and 7–20 to energize the selected XY memory lines during the read write cycle of operation.

Also included in the control circuits of each memory unit is a timing unit indicated at 7–21 which is provided to control the timing of the memory cycle. This timing unit which is of conventional design operates in response to the receipt of a calling signal from the computer or one of the input output units which addresses the memory to generate timing pulses in sequence on each of seven taps designated MT–1 through MT–7. The unit select signal is generated coincidentially with the time slot signal $t_0$ to $t_7$ allocated to whichever of the units of the overall system is calling. These tap outputs are fed to the rest of the control circuits of the memory to control the timing of the memory sequencing.

In normal operation the memory unit assumes that a write operation will be performed. If, however, a read operation is to be performed the calling unit such as the computer of the present invention generates a read signal and applies this signal coincidentally with the unit select signal to the read input gate 7–6. The output from this gate is applied to the set input of read flip-flop 7–22. This flip-flop is reset by the memory timing pulse MT–7. Therefore, flip-flop 7–22 is set for a single minor cycle. The unit select signal which sets flip-flop 7–22 is buffed to the input of the timing unit 7–21 to initiate the operation thereof.

To understand the sequence of operations of the control circuits associated with the memory, let it be assumed that a memory read is required by the computer. As previously indicated, the computer sends out an address call which comprises both unit select and X–Y address signals. This address call, assuming that memory unit 1 has been selected and further assuming that memory unit 1 is not busy, enables gates 7–4 and 7–5 to pass X and Y signals from the $X_2X_1$, and $Y_2Y_1$ address lines of the memory address decoder to set the X and Y address flip-flops according to the address being called. At the same time the read flip-flip 7–22 is set by a signal from gate 7–6 as enabled by the unit select signal and the read order generated by the computer. The memory interlock flip-flop 7–13 is set from gate 7–7 by the unit select signal. This unit select signal is also applied to memory not busy gate 7–31 via a buffer 7–30 which receives all the unit select signals for this memory cabinet (see FIGURE 7b). Gate 7–31 also receives four inhibit inputs, one from each of four gates similar to gate 7–41. These latter gates 7–41, a, b, and c respectively, are provided for each memory unit in a cabinet and receive as inputs their own MCKA signals and their own unit select signals. Gate 7–31 is inhibited by gate 7–41 only if the memory unit 1 MCKA signal is present and it is presently assumed that the MCKA signal is absent. Thus, the unit select signal passes gate 7–31 and generates the memory not busy signal CGNB. This signal is returned to the computing unit to indicate that the memory unit called is available and that the operation can proceed. Setting the memory interlock flip-flop 7–13 generates the MCKA signal and places an inhibit on gate 7–31. The output signals from gates 7–6 and 7–7 are buffed together and applied as a start signal to the timing unit 7–21. One pulse time later at memory time MT–1 the timing pulse from timing unit 7–21 is applied to the read current source 7–23 to turn this source on and to start the flow of current through the pair of X–Y switches selected by the X–Y address set up in the flip-flops 7–2 and 7–3. The read current passing through the selected X and Y lines operates to drive all of the intersecting cores to the zero state. Those that are already in this zero state produce substantially no output on their respective sense lines whereas those in the "one" state generate a substantial output pulse during the flow of read current. The respective sense lines are each coupled to output gates identified as 7–24. These gates which have been enabled by the output of the read flip-flop 7–22 are clocked at memory time MT–3 as indicated; whereby, those gates which have "ones" on their inputs produce outputs and those that have zeros produce no output. The outputs from the sixty read gates 7–24 are fed to the inputs of sixty recirculation flip-flops 7–25. The outputs from flip-flops 7–25 are in turn applied respectively to sixty read out gates 7–26. These latter gates are clocked at memory time MT–6 by connecting the MT–6 tap on timing unit 7–21 thereto. The outputs from gates 7–26 are buffed together by element 7–600 (FIG. 7b) with similar gates of the other memory units in the memory cabinet and are applied to the read bus at MT–7, there being a one pulse delay in the read bus amplifier circuit 7–700 on FIGURE 7b. This information then returns to the computer one pulse time later due to the delay in the high speed bus. Thus, the information returns to the computer exactly eight pulse times or one minor cycle after the call.

The information after being read from the selected address must be regenerated. This is done by taking the reset outputs from the sixty recirculation flip-flops 7–25 and applying them to sixty Z gates 7–70 which also receive outputs from the Z driver circuit 7–29 to control the energization of the respective Z plane windings in the memory unit 7–1. The regeneration of the information read out is done during the write portion of the read write cycle. For this purpose, at the time MT–4 the read current is turned off by the timing unit 7–21 and the write current is turned on. At the same time the Z drivers 7–29 are turned on at MT–4 and off at MT–7. In the write operation the current flowing through the selected X and Y lines is reversed and has the tendency to turn all the cores back to the "one" stage except for those that are inhibited by current flow in the Z winding. Since only those cores which have Z windings energized are controlled by the reset outputs from the sixty recirculation flip-flops to inhibit the write current, all the rest of the cores are returned to the "one" state during the write operation. This action therefore, regenerates the information that was originally recorded in the memory and at MT–7 the timing unit 7–21 resets flip-flops 7–2, 7–3, 7–22, 7–13 and 7–25 to ready the memory unit for the next call.

Now assume a condition wherein the memory is not busy and a write operation is to be performed. It is apparent that most of the sequence of events previously described in connection with the read operation will be repeated. Again, assuming the selection of memory unit 1, the unit select line 1 together with the X–Y address pass signals through gate 7–4 and 7–5 to store the X and Y address in the address storage flip-flops 7–2 and 7–3. These X and Y address flip-flop conditions are again decoded by decoders 7–17 and 7–18 to select one pair of the fifty X and Y switches 7–19 and 7–20, respectively, and thereby select the associated X and Y lines. In this case, since a read operation is not specified, gate 7–6 will not be enabled but gate 7–7 will be enabled to set the memory interlock flip-flop 7–13 thereafter to generate the MCKA signal. This signal which lasts for one minor cycle inhibits gates 7–4, 7–5, 7–6 and 7–7 to prevent further interrogation of this memory unit for eight pulse times. The unit select signal is also sent through via buffer 7–30 (FIG. 7b) and gate 7–31 to generate the memory not busy signal CGNB. During the initial part of the operation and with the read current turned on, the memory cores are cleared as before but since the read flip-flop 7–22 has not been set, the read gates 7–24 are not enabled and the information appearing on the sense lines will not be applied to the recirculation flip-flops 7–25. Instead and at memory time MT–5 the information to be written into the memory appears on the write bus and is gated into the recirculation flip-flops 7–25 by the action of gate 7–32 and write gates 7–33. Thus, during the period MT–5 to MT–7 the new information which has been fed into the recirculation flip-flops will be stored in the memory by the action of the write current source 7–71, the Z drivers 7–29 and the gates 7–70. It will be noted that this new information is also sent to the high speed bus at MT–7 by action of the read out gates 7–26. In this manner information written into the memory can be sent to checking circuits (not shown) for verification of the accuracy of the information which has been sent to the memory.

As previously considered in connection with the description of the general control circuits of FIG. 4 there are occasions when it is necessary to delete the effect of the write operation. For this purpose the write delete signal YBJ is generated as shown in FIG. 4d. This signal is applied via gate 7–85 at MT–3 and buffer 7–86 to place a permissive signal on gate 7–24 so that at MT–3 a normal read-out operation is performed and at the same time read flip-flop 7–22 is set. The set output signal from read flip-flop 7–22 is then applied as an inhibit to gate 7–32 via buffer 7–86 so that subsequently the information which would normally be written in, is not permitted to be written through the blocking of gates 7–32 and subsequent lack of enabling signals on gates 7–33.

The general organization of a single memory cabinet is shown in FIG. 7b. Each of the four units associated with such a cabinet receives various input signals and is effective to generate its respective MCKA signal. It will be appreciated, that the enabling of gates 7–41 through 7–41c is dependent not only upon the receipt of the appropriate MCKA signal, but also on the receipt of the appropriate unit select signal. Therefore, it is only when a unit select signal has been received from the given unit, that that unit will henceforth fail to generate a CGNB memory not busy signal. Thus, it is possible that where one unit such as 7–200 is called subsequently and within the same minor cycle a second unit could also be called and would independently generate a CGNB signal. Thus, the memory not busy gate 7–31 may be enabled by any one of the unit select signals, but is inhibited only by the corresponding MCKA signal so that where a subsequent call is made to the memory but to a different unit a CGNB signal may still be generated.

Components

Having considered in detail the organization of control circuits of the computer of the present invention, and having considered to a lesser extent the details of the organization of the memory and of the arithmetic circuits, some of the components utilized in the design of the aforesaid major sections of the computer will now be considered briefly.

In general, such components are well-known elements, at least as regards their logical design and operation. FIGURE 1, in addition to depicting major blocks such as the arithmetic unit and the memory, shows a number of blocks indicative of registers, counters, decoders, etc., and the B-adder.

The various registers such as IR-1 or IR-2 comprise an array of flip-flops wherein IR-1 comprises sixty such flip-flops thereby to store sixty binary digits (five bits for each of 12 decimal digits the code representation being for example, a 5 4 2 1 code with the most significant bit serving as an odd-even check) which are applied thereto. IR-2 may similarly be formed from a plurality of flip-flops wherein 45 such flip-flops (five for each of nine decimal digits) would be required. Register selector register 118 may also comprise a plurality of ten flip-flops thereby to store either A or B digits of an instruction representing the address of an addressable register to be selected. Also, selector storage 113 may comprise ten flip-flops for storing the address of an addressable register which is eventually selected to receive a result. Control counters 104 and 106, respectively, are also registers. Such registers may be considered as representing the accumulator portion of the counter. The entire counter is obtained through the co-action of these particular registers with B-adder 139. Such registers will comprise an array of flip-flops wherein each register comprises 25 such flip-flops capable of storing five decimal digits.

The B-adder 139 (FIG. 1b) comprises a parallel adder capable of accommodating five decimal digits on each input. The basic organization of a parallel adder is shown in FIGURE 13. The parallel adder of FIGURE 13 is of such organization as to be applicable either to the B-adder 139 of FIGURE 1 or the 12-digit parallel adder as shown in the arithmetic unit of FIGURE 5. To accommodate the adder of FIGURE 13 to the arithmetic unit would require additional elements; however, FIGURE 13 shows the basic organization of a parallel adder suitable for this purpose. Such adders are well known in the prior art. It is thought to be unnecessary in the present instance to specify the design details of such an adder. For more logical details of various suitable types of adders, reference is made to chapter 8 in the textbook, "Arithmetic Operations in Digital Computers" by R. K. Richards (Van Nostrand), and also to chapters 4 and 13 in the textbook, "High Speed Computing Devices," by the staff of Engineering Research Associates (McGraw-Hill).

FIGURE 13 shows a parallel adder provided with input buffers 1 and 2 and a carry input to which a carry may be inserted on the generation of a function signal FT UA. The parallel adder of FIGURE 13 is designed to accommodate five decimal digits and accordingly, five digit adders 801 are shown as receiving inputs from input buffers 1 and 2 respectively. Each of the digit adders 801 is provided with three output lines. One of these output lines represents the digit sum, one represents a carry, and the third indicates when nine is the value of the sum. The carry lines and the nine lines are applied to block 802 designated carry net. The carry net is for the purpose of providing a fast propagation of carries throughout the adder and such carry net may comprise a gating and buffing array. When nine is detected as the sum in any particular digit position, the carry originating from the preceding digit position is propagated past the digit position containing the nine. Thus, if as a result of an addition, a plurality of nins were to occur in all but the most significant position of the sum and a carry were placed into the least significant digit position, rather than having to propagate each individual carry, a single carry would be propagated through the entire array of digit positions. The use of such a carry net results in considerable saving of time. Appropriate arrangements for propagating carries are well known in the art and are described, for example, in Richards' "High Speed Computing Devices," chapter eight, and particularly in pages 218 and 219.

Unit adders 803 perform the function of adding carry digits to sum digits. From the outputs of the unit adders 803, the sum is obtained which may be directed as required.

The addressable registers, as in the case of other registers, may be considered as comprising in each case, sufficient flip-flops, i.e., sixty, to store a complete computer word and to enable parallel read in and read out of such computer words.

It will be appreciated that in order to provide a complete computer, many additional gates will have to be provided other than those shown specifically. In the interest of simplicity such gates have not been shown on the drawings except where they are required for providing proper timing entry and exits to the various components actually shown as required for each instruction.

From FIGS. 3 and 4, it is apparent that flip-flops as employed in a computer control circuit of the present invention are characterized in that in many instances the same timing pulse will be applied to both the set input and the reset terminals thereof. These flip-flops are so designed that the application of a set input signal always sets the flip-flop notwithstanding the simultaneous occurrence of a reset input signal. FIGURE 14 shows a typical design for a flip-flop which will operate in accordance with the foregoing proviso.

Input line 901 feeds buffer inverter 902 in FIG. 14. Reset input line 908 similarly feeds buffer inverter 909. Such buffer inverters may be formed from transistors for example, as shown in the U.S. application No. 673,224, now U.S. Patent No. 2,949,543, and are characterized in that for any input exhibiting a relatively high level, an output will be produced therefrom at a relatively low level. If all inputs, however, are at a low level, an output at a relatively high level will be generated. The pulseformer amplifier 904 to which the output from buffer inverter 902 is lead by way of line 903, is likewise an inverter, so that high level inputs applied thereto will result in low level outputs on the set output line 905 and will be complemented to produce corresponding high level outputs on reset output line 906. A feedback path 907 is provided from output line 906 from pulseformer 904 and a further input to buffer inverter 909.

In the operation of FIGURE 14, it is assumed that the normal potential levels on set input line 901 and reset input line 908 are low. If a pulse in the form of a step signal to a substantially higher potential level is applied to inverter 902, a low level output will appear on line 903. This low level output is applied to pulseformer 904 and appears on set output line 905 as a high level signal, and at the same time, on reset output line 906 as a corresponding oppositely directed level. The output from reset line 906 is fed back along the line 907 and applied to buffer inverter 909. Since the other signal applied to buffer inverter 909 is normally at a low level, it is apparent that a high level output will appear on line 910. This in turn is subsequently inverted by inverter 902 and appears as a further low level input at pulseformer 904, whereby the high level initiated by the application of a signal to input line 901 results in a high level output on set line 905.

Because of the fact that element 902 provides an inverting function, it will be apparent that further high level signals appearing on line 901 will have no further effect on the output of line 905, which therefore, remains high. It is further apparent that if simultaneous high level inputs are applied to both set and reset lines 901 and 908, the inputs to buffer 902 are respectively high and low. However, the high level signal will prevail and will be inverted to produce the low level signal on ine 903.

However, if in the absence of a high level signal on set input line 901, a high level input is applied to reset line 908, it is apparent that a low level signal from inverter 909 will appear on line 910. The presence of a low level signal on input 901 will cause inverter 902 to provide a high level output on line 903. A high level input to pulseformer 904 will thereafter produce a low level output on set output line 905 and a high level signal on the reset output line 906. Thus the flip-flop is reset.

It is apparent that the design of many of the components used in the present invention will depend on the nature of the code employed. Such considerations will apply in particular to elements such as the adders, comparators, and complementers. For example, since words are expressed in a coded decimal form, such as the 5 4 2 1 code, complementing may take place in an arrangement of gates and buffers such as described in chapter six on decimal codes in the textbook, "Arithmetic Operations in Digital Computers," by Richards. Thus, if an individual digit is expressed as $T_5T_4T_2T_1$, its nine's complement $C_5C_4C_2C_1$ may be obtained by a logical arrangement of gates and buffers to express the function $$C_1 = T_1$$
$$C_2 = T_2 \cdot \overline{T}_1 + \overline{T}_2 \cdot T_1$$
$$C_4 = \overline{T}_4 \cdot T_2 \cdot \overline{T}_1$$
$$C_5 = \overline{T}_5$$

The design of other elements such as the register selection comparator of FIGURE 1 will likewise depend on certain algebraic principles and may readily be accomplished by those skilled in the art.

The elements depicted by FIGURE 4 with one exception comprise elements either previously discussed or well known to the prior art. The exception is the single pulser element shown in FIGURE 4a and FIGURE 4f. For the details of construction and operation of such a device reference is made to copending U.S. Patent No. 3,124,705, entitled "Synchronized Single Pulse Circuit" as invented by H. J. Gray, Jr., and assigned to the assignee of the present invention.

It will be apparent from the foregoing considerations that a control arrangement has been provided for a general purpose digital computer of a basically simple, yet extremely flexible nature which will enable the computer to process various parts of a plurality of instructions simultaneously. While only one form of the apparatus has been specifically illustrated, many variations of a minor nature will be apparent to those skilled in the art. Accordingly, the present invention is intended to be limited only by the extent of the claims attached hereto.

What is claimed is:

1. A digital computer having a memory for storing instructions, control means including means for extracting instructions from the memory, first means for storing said instructions and performing first steps in the manipulation thereof, second means for storing said instructions and performing second steps in the manipulation thereof, means for transferring an instruction from said first means to said second means and means for transferring a further instruction to said first means after said first named instruction has been transferred to said second means, and while said first named instruction is stored in said second means.

2. A digital computer having arithmetic means, an addressable memory for storing instruction words and operand words, and a plurality of addressable registers for storing operand words, control means including sequencing means for extracting instruction words from said memory, a first instruction register coupled to said memory for storing instruction words extracted from said memory, a second instruction register to which instruction words are transfered from said first instruction register, means for extracting operand words from said memory and from said addressable registers as determined by the contents of an instruction word, means for transferring said operand words to said arithmetic means, a result address register storing the address of an addressable register which is to receive the result of a computation, and cycling means controlled from the memory and from the instruction words stored in the first and second instruction registers and the result address register effective to control the transfer of instruction words from the memory to said first instruction register, and from said first instruction register to said second instruction register so that a plurality of instruction words are manipulated simultaneously.

3. A digital computer having a memory for storing instructions and operands, sequencing means, a plurality of addressable accumulator registers, arithmetic means and at least first and second instruction registers for storing instructions, cycling means comprising means effective to actuate said sequencing means to extract a first instruction from said memory, means effective to enable said first instruction register to receive said first instruction, means controlled from the memory effective to actuate said sequencing means to extract a second instruction from the memory, means effective to control the modification of a portion of said first instruction and transfer of another portion of said first instruction to said second instruction register, means controlled from said second instruction register to extract operands as required from the memory and from the addressable registers and to initiate execution of said first instruction by said arithmetic means, said cycling means actuating said sequencing means and controlling the transfer of instruction between said instruction registers so that further instructions continue to be called from said memory while said first and second instructions are still undergoing processing.

4. A digital computer having a memory for storing instructions and operands, apparatus coupled to said memory for selecting operands and instructions, arithmetic means coupled to said memory to receive said operands, and control means, coupled to said memory for receiving instructions and controlling said computer in response thereto having means for processing instructions in an overlapping sequence including a register for storing a part of an instruction designating the destination in said memory of a result being computed by said arithmetic means, a register for storing a part of an instruction controlling the operation of said arithmetic means, a register for storing a plurality of parts of an instruction which parts control said apparatus for the selection of operands and instructions, a register for storing an entire instruction undergoing preliminary processing and timing and transfer means coupled to said registers and said memory for controlling the transfer of instructions to said registers whereby said registers store at least portions of different instructions so that different steps in the overall processing of a plurality of instructions may be carried out simultaneously.

5. A digital computer control circuit for controlling the operation of an electronic data processing device, comprising a first register for storing an instruction undergoing preliminary processing, a second instruction register for storing at least a portion of another instruction undergoing secondary processing, a third instructions register for storing at least a portion of another instruction undergoing arithmetic processing, a fourth instructions register for storing at least a portion of still another instruction for final processing, means coupling said instruction registers and cycling means controlling the transfer of instructions between said registers so that different steps in the overall processing of data from a plurality of instructions may be carried on simultaneously.

6. A digital computer control circuit according to claim 5 comprising means for simultaneously processing four different instructions.

7. A digital computer having a memory for storing instructions and operands, a plurality of registers for storing operands, arithmetic means for the arithmetic processing of operands, and a plurality of instruction registers for storage of instructions, cycling means including means responsive to signals originating from said memory and from said instruction registers effective to generate signals controlling the transfer of data between said memory and said instruction registers, and between said memory, said registers for storage of operand data and said arithmetic means so that different steps in the processing of data from a plurality of instructions may be carried on simultaneously, means responsive to contingencies arising from the nature of the instruction to be processed and from accessibility of the memory, effective to suspend the transfer of data among the several elements, and means responsive to termination of such contingencies for restoring the transfer of data among the several elements so that minimum interference occurs in the simultaneous processing of said different steps from said plurality of instructions.

8. In a digital computer having a memory means for storing data comprising instructions and operands which memory means during a designated time period may or may not be accessible, said memory means comprising means producing a signal indicating said memory means has been accessed and control means responsive to instructions for governing the operation of said computer comprising a plurality of registers for storage of instruction data whereby different steps in the processing of a plurality of instructions may be carried on by said computer simultaneously, steppable sequencing means calling for the extraction of instruction data from said memory and cycling means including a bistable device responsive to signals indicative of the accessibility of said memory effective to control the operation of said sequencing means and transfers of instruction data between said registers wherein said bistable device in said cycling means is maintained in a predetermined output condition by repeated generation of a memory accessibility signal thereby to step said sequencing means once during each said designated time period so as to extract new instruction data from the memory.

9. A digital computer having a memory means for storing data comprising instructions and operands which memory means during a designated time period may or may not be accessible for data transfers, said memory comprising means producing signals indicating said memory has been accessed and control means responsive to instructions for governing the operation of said computer comprising a plurality of registers for the storage of a plurality of instructions whereby different steps in the processing of a plurality of instructions may be carried on by said computer simultaneously, steppable sequencing means calling for the extraction of instruction data from said memory means and cycling means effective to control the operation of said sequencing means, said cycling means including a first bistable device responsive to signals indicative of the accessibility of said memory for an instruction to develop a stepping signal for said sequencing means, a second bistable device responsive to the condition of said first bistable device so that on failure of a memory accessibility signal said second bistable device remains in a predetermined condition thereby to actuate said sequencing means to make repeated memory calls for the same instruction.

10. In a digital computer cycling means according to claim 9, means for controlling the condition of said third bistable means independent of memory accessibility signals.

11. A digital computer having a memory for storing instructions, means for extracting a sequence of instructions from said memory, a plurality of instruction registers coupled to said memory for receiving and storing said sequence of instructions wherein at least two of said instruction registers store different instructions, means coupled to said at least two instruction registers for manipulating said instructions, instruction execution means controlled by an instruction from one of said instruction registers for executing said instruction, and control means for causing said instruction execution means to be controlled by a different instruction from said instruction registers after said execution means has responded to the instruction last controlling it.

12. The computer defined in claim 11 wherein said means for extracting instructions is governed by said control means to extract a new instruction from said memory for transfer to said instruction registers after said instruction execution means has responded to the instruction last controlling it.

13. A digital computer having arithmetic means for performing computations, an addressable memory having a plurality of locations for storing instructions and operands, and a plurality of addressable registers for storing operands, said instructions comprising a portion designating an operation to be performed by said computer, a first address portion indicative of the address of an operand in said memory and a second address portion indicative of the address of one of said addressable registers to supply an operand and indicative of a related address of one of said addressable registers to receive a result of a computation, control means including sequencing means for extracting instructions from said memory in a sequence, a plurality of instruction registers for receiving instructions from said memory including at least a first instruction register coupled to said memory for storing instructions extracted from said memory, a second instruction register coupled to said first instruction register for receiving instructions from said first instruction register, means for receiving from one of said instruction registers said first and second address portions of instructions for extracting operands from said memory and from said addressable registers, means for transferring an operand from a selected location in said memory and from a selected register to said arithmetic means, a result address register adapted to receive said second address portion of an instruction specifying the address related to the address of one of said addressable registers to receive the result of a computation being performed by said arithmetic means and cycling means controlled by at least one portion of the instruction stored in one of said instruction registers and the address stored in said result address register effective to control the transfer of instructions from the memory to said first instruction register, and from said first instruction register to said second instruction register so that a plurality of instructions are being manipulated simultaneously.

14. A digital computer having arithmetic means for performing computations, an addressable memory having a plurality of locations for storing instructions and operands, said instructions comprising a portion designating an operation to be performed by said computer and at least one address portion indicative of an address in said memory, control means for exacting instructions from said memory, a plurality of instruction registers for receiving instructions from said memory including at least a first instruction register coupled to said memory for storing instructions extracted from said memory, a second instruction register coupled to said first instruction register for receiving instructions from said first instruction register, means adapted to receive an address portion of an instruction word for addressing said memory, a result address register adapted to received a portion of an instruction specifying the address in said memory to receive the result of a computation being performed by said arithmetic means and cycling means controlled by at least one portion of an instruction stored in one of said first and second instruction registers and the address stored in said result address register effective to control the transfer of instructions from the memory to said first instruction register, and from said first instruction register to said second instruction register so that a plurality of instructions are being manipulated simultaneously.

15. A digital computer having arithmetic means for performing computations, an addressable memory having a plurality of locations for storing instructions and operands, said instructions comprising a portion designating an operation to be performed by said computer and at least one address portion indicative of an address in said memory, control means including sequencing means for extracting instructions from said memory in a sequence, a plurality of instruction registers for receiving instructions from said memory including at least a first instruction register coupled to said memory for storing instructions extracted from said memory, a second instruction register coupled to said memory for storing instructions extracted from said memory, means adapted to receive an address portion of an instruction for addressing said memory, a result address register adapted to receive a portion of an instruction specifying the address in said memory to receive the result of a computation being performed by said arithmetic means and cycling means controlled by at least one portion of an instruction stored in one of said first and second instruction registers and the address stored in said result address register effective to control the transfer of instructions from the memory to said first instruction register and to said second instruction register so that a plurality of instruction are being manipulated simultaneoulsy.

16. A digital computer comprising an addressable memory having a plurality of locations for storing instructions, said instructions comprising a portion designating an operation to be performed by said computer and at least one address portion indicative of an address in said memory, control means for extracting instructions from said memory, a plurality of instruction registers for receiving instructions from said memory including at least a first instruction register coupled to said memory for storing instructions extracted from said memory, a second instruction register coupled to said memory for storing instructions extracted from said memory, means adapted to receive an address portion of an instruction word for addressing said memory, said memory including signalling means operative to produce an output when said memory is successfully addressed and cycling means controlled by the output of said signalling means effective to control the transfer of instructions from the memory to said first instruction register, and to said second instruction register so that a plurality of instructions are being manipulated simultaneously.

17. A digital computer comprising an addressable memory having a plurality of locations for storing instructions and operands, said instructions comprising a portion designating an operation to be performed by said computer and at least one address portion indicative of an address in said memory, control means for extracting instructions from said memory in a sequence, a plurality of instruction registers for receiving instructions from said memory including at least a first instruction register coupled to said memory for storing instructions extracted from said memory, a second instruction register coupled to said first instruction register for receiving instructions from said first instruction register, means adapted to receive an address portion of an instruction word for addressing said memory, said memory including signalling means operative to produce an output when said memory is successfully addressed and cycling means controlled by the output of said signalling means effective to control the transfer of instructions from the memory to said first instruction register, and from said first instruction register to said second instruction register so that a plurality of instructions are being manipulated simultaneously.

18. A cyclically operated digital computer having arithmetic means for performing computations, an addressable memory having a plurality of locations for storing instructions and operands, and a plurality of addressable registers for storing operands and instruction modifiers, said instructions having a portion designating an operation to be performed by said computer, some of said instructions having a first address portion indicative of the address of an operand in said memory, and a second address portion indicative of the address of one of said addressable registers to supply an operand and to receive a result of a computation, and a third address portion indicative of the address of one of said addressable registers to supply a modifier for said first address portion, control means including sequencing means for extracting instructions from said memory in a sequence, a plurality of instruction registers for receiving instructions from said memory including at least a first instruction register coupled to said memory for storing instructions extracted from said memory, a second instruction register coupled to said first instruction register for receiving instructions from said first instruction register, means adapted to receive said first, second and third address portions of an instruction for extracting operands from said memory and from said addressable registers and modifiers from said addressable registers, means for transferring an operand from a selected location in said memory and from a selected addressable register to said arithmetic means, a third instruction register adapted to receive from one of said first and second instruction registers said second address portion of an instruction specifying the address of one of said addressable registers to receive the result of a computation being performed by said arithmetic means and cycling means controlled by the address portions of instructions stored in the first instruction register and the address stored in the third instruction register effective to control the transfer of instructions from the memory to said first instruction register and portions of instructions from said first instruction register to said second instruction register and to said third instruction register so that a plurality of different instructions are being manipulated simultaneously, and wherein the third instruction register stores at least a portion of instruction N, the second instruction register stores at least a portion of instruction $N+1$, and the first instruction register stores at least a portion of instruction $N+2$ of a sequence of instructions.

19. A cyclically operated digital computer having arithmetic means for performing computations, an addressable memory having a plurality of locations for storing instructions, operands and instruction modifiers, said instructions having a portion designating an operation to be performed by said computer, a first address portion indicative of the address of an operand in said memory, and a second address portion indicative of the address in said memory to supply an operand and to receive a result of a computation, and a third address portion indicative of the address in said memory to supply a modifier for said first address portion, control means including sequencing means for extracting instructions from said memory in a sequence, a plurality of instruction registers for receiving instructions from said memory including at least a first instruction register coupled to said memory for storing instructions extracted from said memory, a second instruction register coupled to said first instruction register for receiving instructions from said first instruction register, means adapted to receive said first, second and third address portions of an instruction for extracting operands and instruction modifiers from said memory, means for transferring operands from a selected location in said memory to said arithmetic means, a third instruction register adapted to receive from one of said first and second instruction registers, said second address portion of an instruction specifying the address in said memory to receive the result of a computation being performed by said arithmetic means and cycling means controlled by the address portions of instructions stored in the first instruction register and the address stored in the third instruction register effective to control the transfer of instructions from the memory to said first instruction register and portions of instructions from said first instruction register to said second instruction register, and to said third instruction register so that a plurality of different instructions are being manipulated simultaneously, and wherein the third instruction register stores at least a portion of instruction N, the second instruction register stores at least a portion of instruction $N+1$, and the first instruction register stores at least a portion of instruction $N+2$ of a sequence of instructions.

20. A cyclically operated digital computer having an addressable memory comprising a plurality of locations for storing instructions, operands and instruction modifiers, said instructions having a portion designating an operation to be performed by said computer, some of said instructions having a first address portion indicative of the address of an operand in said memory, a second address portion indicative of the address in said memory to receive an operand and a third address portion indicative of the address in said memory to supply a modifier for said first address portion, control means including sequencing means for extracting instructions from said memory in a sequence, a plurality of instruction registers for receiving instructions from said memory including at least a first instruction register coupled to said memory for storing instructions extracted from said memory, a second instruction register coupled to said memory for receiving instructions, a third instruction register adapted to receive said second address portion of an instruction specifying the address in said memory to receive an operand and cycling means controlled by the address portion of different instructions stored in the first instruction register and in the third instruction register effective to control the transfer of instructions from the memory to said first instruction register, to said second instruction register and to said third instruction register so that a plurality of different instructions are being manipulated simultaneously, and wherein the third instruction register stores at least a portion of instruction N, the second instruction register stores at least a portion of instruction $N+1$, and the first instruction register stores at least a portion of instruction $N+2$ of a sequence of instructions.

21. The computer defined in claim 20 further including comparison apparatus controlling said cycling means coupled to said first and third instruction registers for comparing one of the address portions of instruction $N+2$ in said first register with the address portion of instruction N stored in said third instruction register and wherein said comparison apparatus is responsive to a predetermined condition of the addresses compared thereby to prevent said first instruction register from receiving new instructions.

22. The apparatus defined in claim 21 including timing and transfer means for transferring the second address portion of instruction $N+1$ from said second instruction register to said third instruction register whereby said comparison apparatus compares said one of the address portions of instruction $N+2$ in said first instruction register with an address portion of instruction $N+1$ in said third register wherein said comparison apparatus is responsive to a predetermined condition of the addresses compared thereby to prevent said first instruction register from receiving a new instruction.

23. A cyclically operated digital computer having an addressable memory with a plurality of locations for storing information comprising instructions and operands, said instructions having a portion designating an operation to be performed by said computer, some of said instructions having a first address portion indicative of the address of an operand in said memory, a second address portion indicative of the address in said memory to receive an operand and a third address portion indicative of the address in said memory to supply additional information relative to said instruction, control means including sequencing means for extracting instructions from said memory in a sequence, a plurality of instruction registers for receiving instructions from said memory including at least a first instruction register coupled to said memory for storing instructions extracted from said memory, a second instruction register coupled to said memory for receiving instructions, a third instruction register adapted to receive said second address portion of an instruction specifying the address in said memory to receive an operand and cycling means controlled by the address portions of different instructions stored in the first instruction register and in the third instruction register effective to control the transfer of instructions from the memory to said first instruction register, to said second instruction register and to said third instruction register so that a plurality of different instructions are being manipulated simultaneously, and wherein the third instruction register stores at least a portion of the instruction N, the second instruction register stores at least a portion of the instruction $N+1$, and the first instruction register stores at least a portion of the instruction $N+2$ of a sequence of instructions.

24. The computer defined in claim 23 further including comparison apparatus controlling said cycling means coupled to said first and third instruction registers for comparing the third address portion of instruction $N+2$ in said first register with the address portion of instruction N stored in said third instruction register, and wherein said comparison apparatus is responsive to a predetermined condition of the address compared thereby to prevent said first instruction register from receiving new instructions.

25. The apparatus defined in claim 24 including timing and transfer means for transferring the second address portion of instruction $N+1$ from said second instruction register to said third instruction register whereby said comparison apparatus compares the third address portion of instruction $N+2$ in said first instruction register with an address portion of instruction $N+1$ in said third register wherein said comparison apparatus is responsive to a predetermined condition of the addresses compared thereby to prevent said first instruction register from receiving a new instruction.

26. A digital computer having an addressable memory for storing instructions, wherein said instructions specify an operation to be performed by said computer and portions of certain of said instructions further specify the address in said memory of a further instruction, a first sequencing means coupled to said memory for extracting instructions from said memory in sequence, instruction means coupled to said memory for receiving and executing said instructions, and second sequencing means controlled by said instruction means in response to said certain instructions for extracting instructions from said memory in a new sequence.

27. The computer defined in claim 26 wherein said first sequencing means is controlled by said instruction means and is inhibited by said instruction means from extracting instructions from said memory in response to said certain instructions.

28. The computer defined in claim 26 wherein said first sequencing means comprises an electronic counter.

29. The computer defined in claim 28 wherein said second sequencing means comprises an electronic counter.

30. The computer defined in claim 27 comprising means controlled by said instruction means and responsive to said certain instructions for transferring the portion of the instruction received by said instruction means specifying the address in said memory of said further instruction to said second sequencing means whereby said second sequencing means extracts instructions from said memory in a new sequence beginning at an address related to the address specified in said certain instructions.

31. The computer defined in claim 30 comprising means for transferring after a finite time the address in the sequence specified by said second sequencing means from said second sequencing means to said first sequencing means and means for permitting said first sequencing means to thereafter address the memory for a sequence of instructions and inhibiting said second sequencing means from operating.

32. The computer defined in claim 26 comprising means controlled by said instruction means and responsive to said certain instructions for transferring the portion of the instruction received by said instruction means specifying the address in said memory of said further instruction to said second sequencing means whereby said second sequencing means extracts instructions from said memory in a new sequence beginning at an address related to the address specified in said certain instruction.

33. A cyclically operated digital computer wherein instructions are extracted from a memory in sequence comprising an arithmetic means having a result output, an addressable memory having a plurality of locations for storing instructions and operands, and a plurality of addressable registers for storing operands, said instructions having a portion designating an operation to be performed by said computer, a first address portion indicative of the address of an operand in said memory, and a second address portion indicative of the address of one of said addressable registers to supply an operand and to receive a result of a computation from said arithmetic means, means for extracting instructions from said memory, a plurality of instruction registers for receiving instructions from said memory including at least a first instruction register coupled to said memory for storing instructions extracted from said memory, a second instruction register coupled to said first instruction register for receiving instructions from said first instruction register, means adapted to receive said first and second address portions of an instruction for extracting operands from said memory and from said addressable registers, means for transferring an operand from a selected location in said memory and from a selected addressable register to said arithmetic means, a third instruction register adapted to receive from one of said first and second instruction registers said second address portion of an instruction specifying the address of one of said addressable registers to receive the result of a computation being performed by said arithmetic means and transfer means controlled by the second address portion of a later received instruction stored in one of said first and second instruction registers and the address portion from an earlier received different instruction stored in said third instruction register for transferring a result at the output of said arithmetic means to the input thereof.

34. The computer defined in claim 33 wherein said transfer means is selectively operable and including comparison apparatus for selectively operating said transfer means, coupled to said one of said first and second instruction registers and said third instruction register to compare the second address portion of a later received instruction with the contents of said third instruction register storing the second address portion of an earlier received instruction and producing an output rendering said transfer means operable when the address portions compared thereby have a predetermined relationship.

35. A cyclically operated digital computer comprising an arithmetic means having a result output, an addressable memory means having a plurality of locations for storing instructions and operands, said instructions having a portion designating an operation to be performed by said computer, some of said instructions also having a first address portion indicative of the address of an operand in said memory means, and/or a second portion indicative of the address in said memory means to receive a result of a computation from said arithmetic means, means for extracting instructions from said memory means, a plurality of instruction registers for receiving instructions from said memory means including a first instruction register coupled to said memory means for storing instructions extracted from said memory means, means adapted to receive said first and second address portions of an instruction for addressing said memory means to supply operands and to receive results, means for transferring operands from selected locations in said memory means to said arithmetic means, a second instruction register adapted to selectively receive from the first instruction register said second address portion of an instruction specifying the address in said memory means to receive the result of a computation being performed by said arithmetic means and transfer means controlled by an address portion of a later received instruction stored in said first instruction register and the address stored from a different earlier received instruction stored in said second instruction register for transferring a result at the output of said arithmetic means to the input thereof.

36. The computer defined in claim 35 wherein said transfer means is selectively operable and including comparison apparatus for selectively operating said transfer means coupled to said first and second instruction registers for comparing an address portion of a later received instruction with the contents of said second instruction register storing the second address portion of an earlier received instruction and producing an output when the address portions compared thereby are in a predetermined relationship, said output of the comparison means being coupled to said transfer means to render it operable.

37. An electronic digital computer comprising an arithmetic unit for performing operations having an input for receiving operands and an output and producing results at said output, a memory coupled to said arithmetic unit for supplying operands and for receiving results from said arithmetic unit, control means adapted to receive and store a plurality of instructions in a sequence, said instructions sequentially controlling the operations of said arithmetic unit and specifying addresses in said memory for receiving results and supplying operands, and means for comparing the address in said memory to receive a result specified in an instruction being performed by said arithmetic unit with the address in the memory specified in a later instruction in said sequence stored in said control means, said comparing means producing an output when the addresses compared thereby have a predetermined relationship and transfer means controlled by the output of said comparing means for routing the result produced at the output of said arithmetic unit of said instruction being performed back to the input of said arithmetic unit as an operand for said later instruction in said sequence.

38. An electronic digital computer comprising an arithmetic unit for performing operations having an input for receiving operands and an output and producing results at said output, a memory coupled to said arithmetic unit for supplying operands and for receiving results from said arithmetic unit, control means comprising a plurality of instruction registers adapted to receive and store a plurality of instructions in a sequence, said instructions sequentially controlling the operations of said arithmetic unit and specifying addresses in said memory for receiving results and supplying operands, and means coupled to said instruction registers for comparing the address in said memory to receive a result specified in an instruction being performed by said arithmetic unit with the address in the memory specified in a later instruction in said sequence, said comparing means producing an output when the addresses compared thereby have a predetermined relationship and transfer means controlled by the output of said comparing means for routing the result produced at the output of said arithmetic unit of said instruction being performed back to the input of said arithmetic unit as an operand for said later instruction in said sequence.

39. An electronic digital computer including an addressable memory means storing data comprising instructions, instruction modifiers and operands, said instructions having a portion designating the operation to be performed and some of said instructions further comprising a first address portion designating the address in said memory means of an operand, a second address portion designating the address in said memory means of an instruction modifier and a third address portion designating the address in said memory means to receive the result of a data manipulation, data manipulation means coupled to said memory means for manipulating data according to instructions, control means coupled to said memory means for receiving and storing a plurality of instructions in a sequence, sequencing means coupled to said memory means for transferring the next instruction in a sequence of instructions from said memory means to said control means after at least a portion of an instruction is executed by said data manipulation means, and comparing means coupled to said control means for comparing the third address portion of an instruction being executed by said data manipulation means with the second address portion in a later instruction in said sequence stored in said control means, said comparing means producing an output signal when the addresses compared thereby have a predetermined relationship and means coupling said output signal to said sequencing means for inhibiting said sequencing means.

40. An electronic digital computer including an addressable memory means storing data comprising instructions, instruction modifiers and operands, said instructions having a portion designating the operation to be performed and some of said instructions further having a first address portion designating the address in said memory means of an operand, a second address portion designating the address in said memory means of an instruction modifier and a third address portion designating the address in said memory means to receive the result of a data manipulation, data manipulation means coupled to said memory means for manipulating data according to instructions, control means including a plurality of instruction registers for storing a plurality of difference instructions coupled to said memory means for receiving and storing a plurality of instructions in a sequence, modifying means responsive to the second portion of an instruction in a first one of said instruction registers for extracting an instruction modifier from said memory means and modifying the first address portion of said instruction specifying an operand address in accordance therewith, means coupled to said modifying means for addressing said memory means in accordance with said modified address and transferring the contents of said modified address to said data manipulation means, means connected to a second one of said instruction registers for controlling the operation of said data manipulation means in accordance with the instructions stored therein, means including a third one of said instruction registers coupled to said memory for storing the third address portion of another instruction specifying the address in said memory to receive the result being produced by said data manipulation means, sequencing means coupled to said memory means for transferring the next instruction in a sequence of instructions from said memory means to said control means after at least a portion of an instruction is executed by said data manipulation means, comparing means coupled to said third one of said instruction registers for comparing the third address portion of an instruction being executed by said data manipulation means with the second address portion of a later instruction in said sequence stored in said first instruction register, said comparing means producing an output signal when the addresses compared thereby have a predetermined relationship and means coupling said output signal to said sequencing means for inhibiting said sequencing means.

41. The apparatus defined in claim 40 further including a transfer network and wherein said first instruction register is coupled between said memory means and said second and third instruction registers, and said sequencing means is coupled to said transfer network to control the transfer of instructions from said memory means to said second and third instruction registers via said first instruction register.

42. An electronic digital computer including an addressable memory means storing data comprising instructions, instruction modifiers and operands, said instructions having a portion designating the operation to be performed and some of said instructions further having a first address portion designating the address in said memory means of an operand, a second address portion designating the address in said memory means of an instruction modifier and a third address portion designating the address in said memory means to receive the result of a data manipulation, data manipulation means coupled to said memory means for manipulating data according to instructions, control means including a plurality of instruction registers for storing a plurality of different instructions coupled to said memory means for receiving and storing a plurality of instructions in a sequence, modifying means responsive to the second address portion of an instruction in a first one of said instruction registers for extracting an instruction modifier from said memory means and modifying the first address portion of said instruction specifying an operand address in accordance therewith, means coupled to said modifying means for addressing said memory means in accordance with said modified address and transferring the contents of said address and transferring the contents of said modified address to said data manipulation means, means connected to a second one of said instruction registers for controlling the operation of said data manipulation means in accordance with the instructions stored therein, means including a third one of said instruction registers coupled to said memory for storing the third address portion of another instruction specifying the address in said memory to receive the result being produced by said data manipulation means, and sequencing means coupled to said memory means for transferring the next instruction in a sequence of instructions from said memory means to said control means after at least a portion of an instruction is executed by said data manipulation means.

43. A digital computer having memory means for storing instructions and operands, sequencing means, arithmetic means and at least first and second instruction registers for storing instructions, cycling means comprising means effective to actuate said sequencing means to extract a first instruction from said memory means, means effective to enable said first instruction register to receive said first instruction, means controlled from the memory means effective to actuate said sequencing means to extract a second instruction from the memory means, means effective to control the modification of a portion of said first instruction and transfer another portion of said first instruction to said second instruction register, and means controlled from one of said instruction registers to extract operands as required from the memory means and to initiate execution of said first instruction by said arithmetic means, said cycling means actuating said sequencing means and controlling the transfer of instructions between said instruction registers so that further instructions continue to be called from said memory while said first and second instructions are still undergoing processing.

44. A digital computer having data processing means, control means for controlling the operation of said data processing means according to an instruction and, an addressable memory means for storing data comprising instructions and operands which memory means during a designated time period may or may not be accessible, said memory means including means responsive to the addressing thereof for indicating the availability of said memory means, said control means comprising a plurality of instruction registers coupled together and to said memory means for controlling the operation of said computer and storing a plurality of different instructions, each of said instruction registers controlling portions of said computer so that different steps in the processing of said plurality of instructions may be carried on simultaneously and steppable sequencing means calling for the extraction of instructions from said memory means in a sequence for transfer to said instruction registers, said control means including cycling means having a bistable device coupled to said memory means responsive to signals indicative of the accessibility of said memory means and effective to control the operation of said sequencing means and the transfer of instructions between said instruction registers wherein said bistable device in said cycling means is maintained in a predetermined condition by repeated generation of a signal indicating accessibility of said memory means to step said sequencing means once during each said designated time period to extract new instructions from said memory means for transfer to said instruction registers.

45. The apparatus defined in claim 9 further comprising means interconnecting said plurality of registers for the storage of instructions and a third bistable device responsive to signals indicative of the accessibility of said memory means for operands, said third bistable device generating signals to effect said predetermined condition of said second bistable device and to control the transfer of instructions among said plurality of registers.

46. In an electronic computer an addressable memory means comprising a plurality of memory units, each unit having a finite access period and storing data comprising a plurality of instructions and operands, computing means including at least one data storage register coupled to said memory means, control means coupled to said memory means for receiving instructions and controlling said computing means in response thereto, addressing means sequentially and ascendingly addressing said memory means within said access period for instructions and transferring said instructions to said control means and addressing said memory means for operand locations specified by instructions and transferring operands from said memory means to said computing means or vice versa, the improvement which comprises signalling means for each of said memory units producing signals indicating whether or not said unit has been successfully addressed and conditions sensitive means responsive to said signalling means when said memory means is addressed for a location to receive an operand from said computing means to cause said addressing means to descendingly address said memory means for instructions.

47. In an electronic computer an addressable memory means comprising a plurality of memory units, each unit having a finite access period and storing data comprising a plurality of instructions and operands, computing means including at least one data storage coupled to said memory means, control means coupled to said memory means for receiving instructions and controlling said computing means in response thereto, addressing means, sequentially and ascendingly addressing said memory means within said access period for instructions and transferring said instructions to said control means and addressing said memory means for operand locations specified by instructions and transferring operands from said memory means to said computing means or vice versa, the improvement which comprises signalling means for each of said memory units producing signals indicating whether or not said unit has been addressed twice within said access period and condition sensitive means responsive to said signalling means when said memory means is addressed for a location to receive an operand from said computing means to cause said addressing means to descendingly address said memory means for instructions.

48. The computer defined in claim 47 wherein said condition sensitive means is responsive to a signal from said signalling means indicating that said memory has been addressed twice within said access time.

49. In an electronic computer, an addressable memory means comprising a plurality of memory units storing data comprising instructions and operands, computing means including at least one data storage register coupled to said memory means, control means coupled to said memory means for receiving instructions and controlling said computing means in response thereto, addressing means sequentially and ascendingly addressing said memory means for instructions and transferring said instructions to said control means and for addressing said memory means for operand locations specified by instructions and transferring operands from said memory means to said computing means or vice versa, the improvement which comprises signalling means for each of said memory units producing a signal indicating whether or not said unit has been successfully addressed and condition responsive means responsive to said signalling means when said memory means is addressed for a location to receive an operand from said computing means to cause said addressing means to descendingly address said memory means for instructions.

50. The computer defined in claim 49 wherein said addressing means includes an electronic counter for addressing said memory means for instructions and means coupled to said counter to periodically increase the count of said counter by one and said condition responsive means includes apparatus for decreasing the count of said counter by one.

51. The computer defined in claim 49 wherein said addressing means include an electronic counter for addressing said memory means for instructions and means coupled to said counter to periodically increase the count of said counter and said condition responsive means include apparatus for decreasing the count of said counter by an amount equal to the last increase whereby said counter addresses said memory means twice in the same location for an instruction.

52. In an electronic computer, an addressable memory means comprising a plurality of memory units storing data comprising a plurality of instructions and operands, computing means including at least one data storage register coupled to said memory means, control means including a plurality of instruction registers coupled to said memory means for receiving a plurality of instructions in a sequence and controlling said computing means in response thereto, addressing means sequentially and ascendingly addressing said memory means for instructions and transferring said instructions to a first one of said instruction registers in said control means and for addressing said memory means for operand locations specified by instructions and transferring operands from said memory means to said computing means or vice versa, the improvement which comprises signalling means for each of said memory units producing a signal indicating whether or not said unit has been successfully addressed and condition responsive means coupled to said signalling means responsive to a signal indicating that said memory unit has not been successfully addressed when said memory unit is addressed for a location to receive an operand from said computing means to cause said addressing means to descendingly address said memory means for the instruction last received by the first one of said instruction registers.

53. The electronic computer defined in claim 52 wherein said addressing means for addressing said memory means for instructions includes a counter for specifying addresses of instructions in said memory means and means for increasing the count produced by said counter by an amount N when the memory means is addressed thereby, and means coupled to said counter operative when said signalling means produces a signal indicating that said memory unit has not been successfully addressed when said memory unit is addressed for a location to receive an operand from said computing means to decrease the count of said counter by said amount N.

54. The electronic computer defined in claim 53 wherein said amount N is equal to one.

55. The electronic computer defined in claim 52 wherein said control means comprised at least first and second instruction registers storing different instructions in said sequence, said instruction registers being coupled to receive instructions from said first instruction register, and said first instruction register being coupled to receive instructions from said memory means, means for transferring the instructions in said first instruction register to said second instruction register prior to said first instruction register receiving a new instruction from said memory means, said last named means being coupled to said condition responsive means to inhibit the transfer of an instruction from said first instruction register to said instruction register and to inhibit the first instruction register from receiving a new instruction.

56. An electronic digital computer comprising an addressable memory means storing information comprising instructions and operands, information processing means coupled to said memory means and controlled by instructions for processing said information, said information processing means having an output and producing a result of the process performed thereby at said output, said information processing means including a plurality of addressable registers for storing information and transfer means coupling said registers to said memory means and to the output of said information processing means, control means coupled to said memory means and said information processing means for receiving and storing a plurality of different instructions in a sequence, said instructions sequentially controlling the operation of said computer including said information processing means, wherein a first type of said instructions controls the transfer of information from a selected register to said memory means and specifies an address of one of said registers to supply information to said memory means, a second type of said instruction controls the transfer of a result from said information processing means to a selected register and specifies an address of one of said registers to receive a result from said information processing means and means for comparing the address of a register specified in said first type of instruction in a sequence of instructions with the address of a register specified in the second type of instruction later in the sequence of instructions than said first type of instruction.

57. The computer defined in claim 56 wherein said control means comprises a plurality of instruction registers, each instruction register storing at least portions of different ones of said instructions in said sequence, at least two of said instruction registers storing an address specified by instructions, and said comparing means is coupled to two of said instruction registers for comparing addresses specified in the instructions stored in said instruction registers.

58. The computer defined in claim 57 wherein a first of said plurality of instruction registers is coupled to said memory means to receive all the instructions in said sequence, and the remaining instruction registers are coupled to said first instruction register to receive at least portions of instruction therefrom.

59. The computer defined in claim 58 wherein said control means includes cycling and sequencing means for extracting instructions from said memory means in sequence and for transferring said instructions to said first of said instruction registers and from said first of said instruction registers to the remaining registers, said comparing means is coupled to said cycling means and produces an output in response to a predetermined relationship between addresses compared thereby to prevent said cycling means from transferring new instructions into said first of said instruction registers.

60. An electronic digital computer comprising an addressable memory means storing information comprising instructions and operands, information processing means coupled to said memory means and controlled by instructions for processing said information, said information processing means having an output and producing a result of the process performed thereby at said output, control means coupled to said memory means and said information processing means for receiving and storing a plurality of different instructions in a sequence, said instructions sequentially controlling the operation of said computer including said information processing means, wherein a first type of said instruction controls the transfer of information from a selected address in said memory means to another portion of said memory means and specifies the address of information in said memory means for transfer to said other portion of said memory means, a second type of said instruction controls the transfer of a result from said information processing means to a selected address in said memory means and specifies the address to receive said result from said information proccessing means and means for comparing the address specified in said first type of instruction in a sequence of instructions with the address specified in the second type of instruction later in the sequence of instructions than said first type of instruction.

61. The computer defined in claim 60 wherein said control means comprises a plurality of instruction registers, each instruction register storing at least portions of different ones of said instructions in said sequence, at least two of said instruction registers storing an address specified by instructions, and said comparing means is coupled to two of said instruction registers for comparing addresses specified in the instructions stored in said instruction registers.

62. The computer defined in claim 61 wherein a first of said plurality of instruction registers is coupled to said memory means to receive all the instructions in said sequence, and the remaining instruction registers are coupled to said first instruction register to receive at least portions of instruction therefrom.

63. The computer defined in claim 62 wherein said control means includes cycling and sequencing means for extracting instructions from said memory means in sequence and for transferring said instructions to said first of said instruction register and from said first of said instruction registers to the remaining registers, said comparing means is coupled to said cycling means and produces an output in response to a predetermined relationship between addresses compared thereby to prevent said cycling means from transferring new instructions into said first of said instruction registers.

64. A digital computer having a memory for storing instructions, control means including means for extracting information from the memory, first means for storing said instructions and for automatically performing first steps in the manipulation thereof, second means for storing said instructions and performing second steps in the manipulation thereof, means for transferring an instruction from said first means to said second means and means for transferring a further instruction to said first means after said first named instruction has been transferred to said second means and while said first named instruction is stored in said second means.

(References on following page)

References Cited by the Examiner

UNITED STATES PATENTS

| | | |
|---|---|---|
| 3,058,658 | 10/1962 | Schmierer et al. 340—172.5 |
| 3,156,897 | 11/1964 | Bahnsen et al. 340—172.5 |

FOREIGN PATENTS

| | | |
|---|---|---|
| 886,421 | 1/1962 | Great Britain. |

OTHER REFERENCES

Pages 48 to 58, December 1959, Publication I: 1959 Proceedings of the Eastern Joint Computer Conference; "The Engineering Design of the Stretch Computer," vol. 16.

Pages 59 to 74, December 1959, Publication II: 1959 Proceedings of the Eastern Joint Computer Conference; "Design of Univac-LARC System," vol. 16.

Pages 59 to 74, December 1959, Publication III: 1959 Proceedings of the Eastern Joint Computer Conference; "Arithmetic and Control Techniques in a Multiprogram Computer," vol. 16.

ROBERT C. BAILEY, *Primary Examiner.*

IRVING L. SRAGOW, MALCOLM A. MORRISON,
*Examiners.*

L. S. GRODBERG, W. M. BECKER,
*Assistant Examiners.*

Notice of Adverse Decision in Interference

In Interference No. 95,961 involving Patent No. 3,254,329, H. Lukoff, J. P. Eckert, Jr. and W. F. Schmitt, COMPUTER CYCLING AND CONTROL SYSTEM, final judgment adverse to the patentees was rendered July 15, 1970, as to claims 1, 2, 4, 7, 8, 9, 11, 12, 14, 15, 16, 17, 44 and 64.

[*Official Gazette December 15, 1970.*]